United States Patent [19]
Bayless et al.

[11] Patent Number: 5,925,101
[45] Date of Patent: Jul. 20, 1999

[54] COMPUTER TELEPHONE SYSTEM

[75] Inventors: Jeanne A. Bayless, Plano; William B. Black, McKinney; Gary L. Brannick, Plano; Gene W. Lee, Plano; Lora M. Lloyd, Plano; Larry P. Mason, Fairview; Amy L. Mathis, Plano, all of Tex.; James E. Steenbergen, Los Gatos, Calif.; Mark R. Stoldt, Allen, Tex.; Garrett C. Young, Garland, Tex.; Gary C. Young, Dallas, Tex.; James E. Fissel, Arlington, Tex.; Robert W. Withers, Maryland Heights, Mo.

[73] Assignee: Davox Corporation, Westford, Mass.

[21] Appl. No.: 09/056,569

[22] Filed: Apr. 7, 1998

Related U.S. Application Data

[62] Division of application No. 08/804,283, Feb. 21, 1997, Pat. No. 5,754,636, which is a continuation of application No. 08/333,058, Nov. 1, 1994, abandoned.

[51] Int. Cl.[6] .................................................. G06F 17/00
[52] U.S. Cl. ......................................................... 709/219
[58] Field of Search ........................ 345/200.47, 200.48, 345/200.49; 379/201, 355, 216, 354

[56] References Cited

U.S. PATENT DOCUMENTS

| | | | |
|---|---|---|---|
| 4,924,496 | 5/1990 | Figa et al. | 379/199 |
| 5,054,055 | 10/1991 | Hanle et al. | 379/142 |
| 5,077,788 | 12/1991 | Cook et al. | 379/142 |
| 5,097,528 | 3/1992 | Gursahaney | 379/142 |
| 5,117,452 | 5/1992 | Callele et al. | 379/201 |
| 5,152,012 | 9/1992 | Schwob | 455/158.5 |
| 5,210,789 | 5/1993 | Jeffus et al. | 379/127 |
| 5,341,414 | 8/1994 | Popke | 379/142 |
| 5,349,638 | 9/1994 | Pitroda et al. | 379/142 |
| 5,379,030 | 1/1995 | Nolan et al. | 455/158.5 |
| 5,388,150 | 2/1995 | Schneyer et al. | 379/67 |
| 5,393,713 | 2/1995 | Schwob | 455/158.5 |
| 5,483,586 | 1/1996 | Sussman | 379/201 |
| 5,511,117 | 4/1996 | Zazzera | 379/265 |
| 5,673,308 | 9/1997 | Akhavan | 379/354 |
| 5,732,132 | 3/1998 | Hamada | 379/355 |

*Primary Examiner*—Ellis B. Ramirez
*Attorney, Agent, or Firm*—Bourque & Associates, PA

[57] ABSTRACT

A telecommunications system (10) is provided that provides for telephone functions to be accessed through client computer system (14). A server computer system (16) provides telephony services, database services and access to E-mail, voice mail, video conferencing and facsimile systems. A graphical user interface 116 is presented to a user to allow the user to perform a large number of functions and to access databases of information associated with calling and called parties.

10 Claims, 76 Drawing Sheets

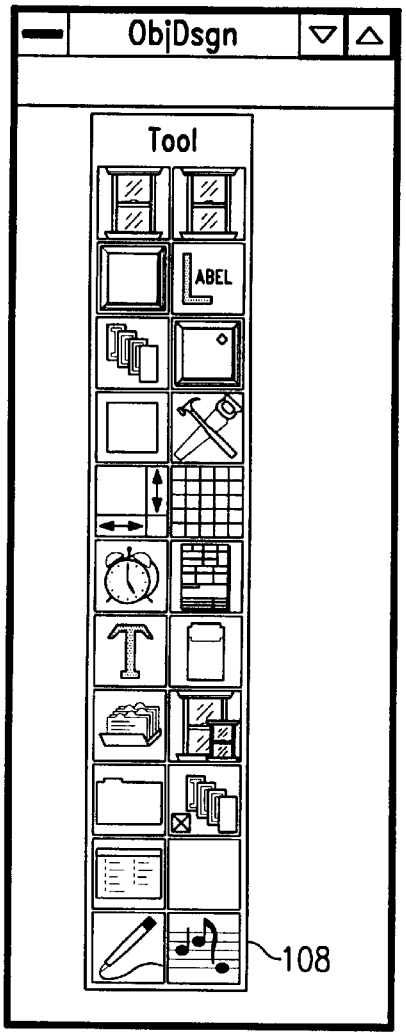
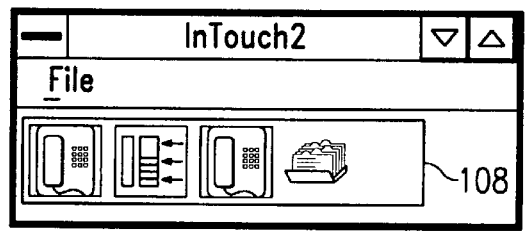
FIG. 9
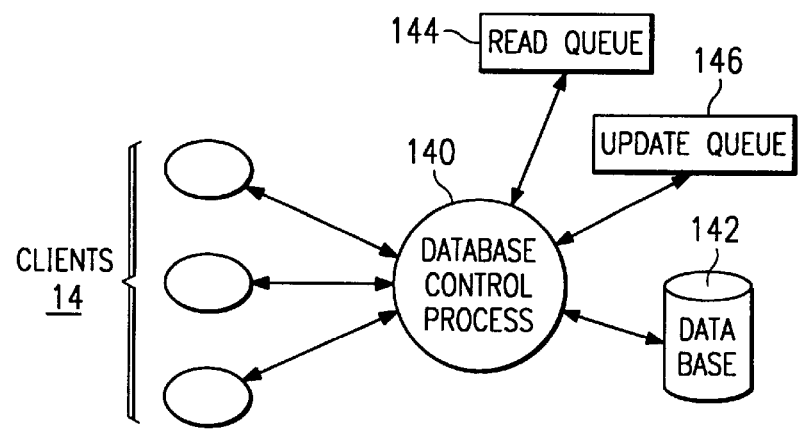
FIG. 10

| CALL STATE | CONFERENCE EXISTS | CONFERENCE CONTROLLER | # CALLS | BUTTON STATE | CALL CONTROL BUTTON |
|---|---|---|---|---|---|
| ALERTING | N/A | N | N/A | ENABLE | ANSWER |
| ALERTING | N/A | N | N/A | ENABLE | DIVERT |
| OFF HOOK | N/A | N | N/A | ENABLE | HANG UP |
| RINGING | N/A | N | N/A | DISABLE | CALL BACK |
| RINGING | N/A | N | N/A | ENABLE | HANG UP |
| BUSY | N/A | N | N/A | DISABLE | CALL BACK |
| BUSY | N/A | N | N/A | ENABLE | HANG UP |
| ACTIVE | NO | N | 1 | ENABLE | SINGLE STEP CONFERENCE |
| ACTIVE | NO | N | 2+ | ENABLE | CONFERENCE ALL |
| ACTIVE | NO | N | 3+ | ENABLE | SELECTIVE CONFERENCE |
| ACTIVE | YES | N | N/A | ENABLE | ADD PARTY |
| ACTIVE | NO | N | N/A | ENABLE | ANNOUNCE CONFERENCE |
| ACTIVE | N/A | N | < MAX | ENABLE | ANNOUNCED TRANSFER |
| ACTIVE | N/A | N | N/A | ENABLE | UNANNOUNCED TRANSFER |
| ACTIVE | N/A | N | N/A | ENABLE | HOLD |
| ACTIVE | N/A | N | N/A | DISABLE | PARK |
| ACTIVE | N/A | N | 2 | ENABLE | MERGE |
| ACTIVE | N/A | N | 3+ | ENABLE | SELECTIVE MERGE |
| ACTIVE | N/A | N | N/A | ENABLE | HANG UP |
| ON HOLD | N/A | N | N/A | ENABLE | OFF HOLD |
| PARKED | N/A | N | N/A | ENABLE | OFF PARK |
| CONF ACTIVE | N/A | N | N/A | ENABLE | DROP PARTY |
| CONF ACTIVE | N/A | N | N/A | DISABLE | HOLD PARTY |
| CONF ACTIVE | N/A | Y | N/A | ENABLE | HOLD CONFERENCE |
| CONF ACTIVE | N/A | Y | N/A | ENABLE | HANG UP CONF |
| CONF ACTIVE | N/A | Y | N/A | ENABLE | DROP YOURSELF |
| CONF ACTIVE | N/A | Y | OPEN CHANNEL | ENABLE | CONF NEW CALL |
| CONF HELD | N/A | Y | N/A | ENABLE | CONF OFF HOLD |

*FIG. 50*

| Name Lookup | | | |
|---|---|---|---|
| Barry Lord | (214)555-5809 | Office | |
| Bob Atkins | (214)555-9452 | Office | |
| Bob Atkins | (214)555-9499 | Fax | |
| Bob Atkins | (214)555-2379 | Pager | |
| Bob Atkins | 5105 | Extension | |
| Penny Burton | (214)555-4967 | HomeOffice | |
| | 718 | | |

Dial / Cancel / Help

6 Numbers

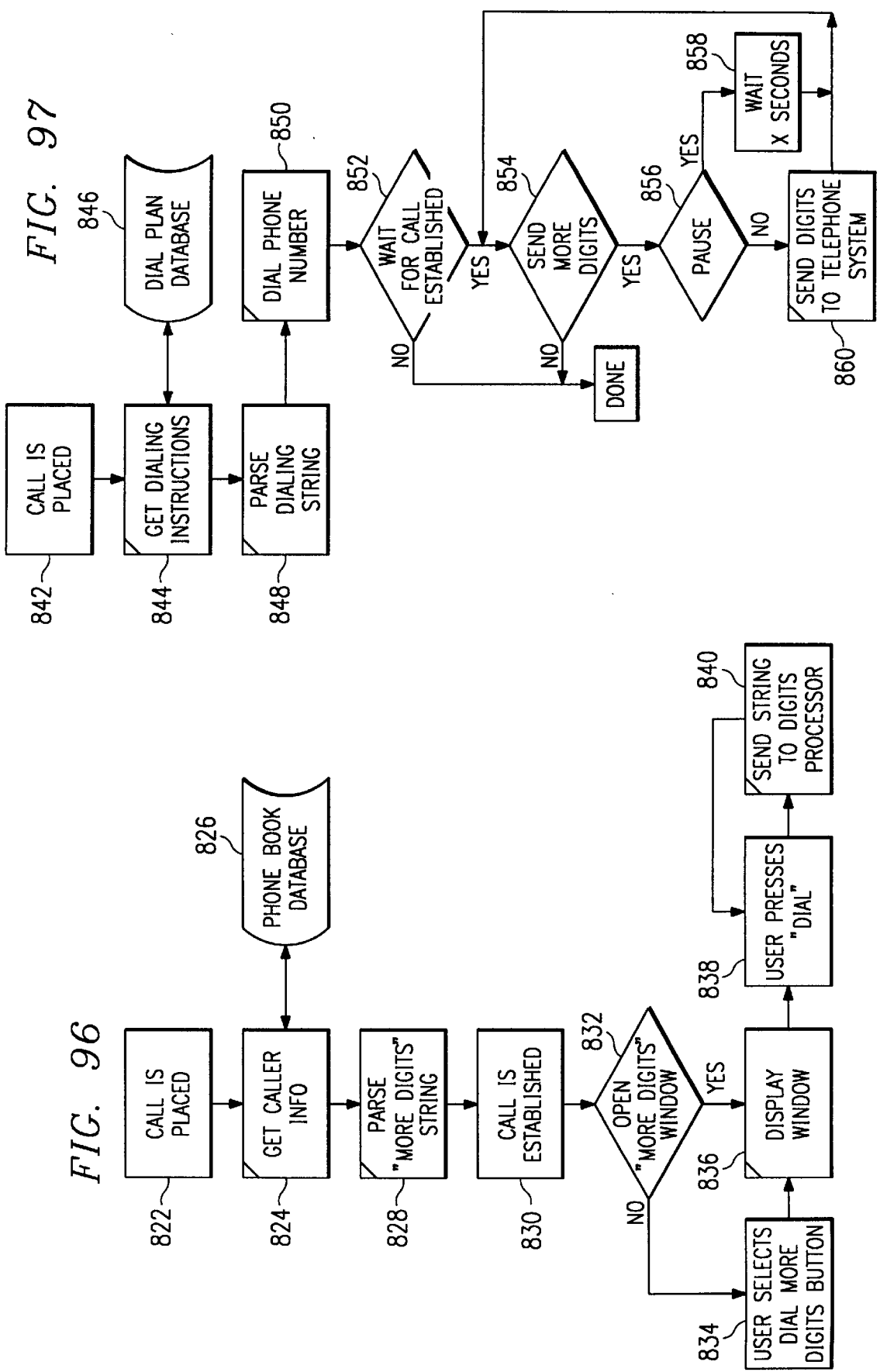

COMPUTER TELEPHONE SYSTEM

CROSS REFERENCE TO RELATED APPLICATIONS

This application is a divisional of U.S. application Ser. No. 08/804,233, filed Feb. 21, 1997 now U.S. Pat. No. 5,754,636 by Jeanne A. Bayless, William B. Black, Gary L. Brannick, Gene W. Lee, Lora M. Lloyd, Larry P. Mason, Amy L. Mathis, James E. Steenbergen, Mark R. Stoldt, Garrett C. Young, Gary C. Young, James E. Fissel, and Robert W. Withers and entitled "Computer Telephone System"; which is a continuation of U.S. application Ser. No. 08/333,058, filed Nov. 1, 1994 now abandonded by Jeanne A. Bayless, William B. Black, Gary L. Brannick, Gene W. Lee, Lora M. Lloyd, Larry P. Mason, Amy L. Mathis, James E. Steenbergen, Mark R. Stoldt, Garrett C. Young, Gary C. Young, James E. Fissel, and Robert W. Withers and entitled "Computer Telephone System," abandoned.

TECHNICAL FIELD OF THE INVENTION

This invention relates generally to telecommunications systems, and more particularly to software and telephone systems that may be used to allow for telephone operations to be performed using personal computers.

BACKGROUND OF THE INVENTION

Telephone systems have been previously developed for use with personal computers. Existing systems, however, are often difficult to use and contain only a limited number of features that users may desire. Such systems do not normally provide robust interfaces to other communications devices such as systems for electronic mail, voice mail, video, facsimile, etc. Many existing systems also are designed for a particular type of computer and may not be easily converted for use on different types of computers. Similarly, the software for many existing systems is difficult to modify to add additional features.

For example, software systems have been provided that display computerized versions of the telephone keys available to the user of the actual telephone. These software systems seek to replicate the telephone interface in order to capitalize on a user's familiarity with that interface. These systems do not take advantage of the flexibility possible in a purely graphical user interface.

In addition, prior systems have not fully capitalized on the ability to identify incoming calls and the ability to build and use a database of information about called and calling parties. While prior art systems have provided some automated directory services, they have not provided the full range of database processing with the flexibility of a graphical user interface.

Therefore, a need has arisen for a software telephone system that provides for database directory service and incoming call identification as well as presenting the user with a fully functional telephone system using a flexible graphical user interface.

SUMMARY OF THE INVENTION

According to one embodiment of the present invention, a telecommunications system is provided that is constructed using a client server architecture. Client processes reside on personal computers available to each user of the system. These personal computers are connected to one another and to a server computer through a local area network. The server computer is connected to a private branch exchange (PBX) which is, in turn, connected to desktop telephone units available to each user. An application program compatible with a typical windowed environment runs on each personal computer to provide each user with a graphical user interface through which each user may receive and place calls and use other telephone functions. In addition, each client computer may access the server computer, as necessary, to access the PBX or to access database information stored in or managed by the server computer. The server computer itself may comprise another personal computer or a larger computer actually storing the information or the server may act as a gateway to information stored on other platforms.

The novel architecture of the present invention allows for a wide variety of telecommunications services to be provided to each user through a highly flexible and efficient graphical user interface. For example, according to one aspect of the present invention, the local time and location of a calling party of a telephone call is displayed for the benefit of a user of the system. In order to accomplish this feature, the system captures automatic number identification (ANI) or Caller ID or DNIS information data for the telephone call. In addition, the system may capture information input by the calling party. This information might be input by the calling party in response to an Interactive Voice Response system. At least a portion of the ANI or Caller ID data may then be used to access database information to determine the place of origin and the local time of the calling party. The local time and place may then be displayed to the user of the system.

This information allows a user to more efficiently communicate with the other party to the call. The present invention may also allow the city and state from which a caller is calling to be displayed to a user of the system. This again allows for more efficient communication between the parties.

According to another embodiment of the present invention, the amount of time a call has been on hold may also be displayed for each telephone call currently in progress with a particular user. Because the hold time may be displayed for each call separately, the user may readily determine how long each party has been on hold and may, for example, handle calls in order from the longest to the shortest time on hold. Because a hold timer is maintained for each call to a user, an employer of the user may log hold timer data for use in monitoring the employee's performance in answering and processing calls in an expeditious manner.

According to a further embodiment of the present invention, telephone directory information is automatically updated in a client/server architecture. When a data value representing shared telephone directory information is updated, the data value is broadcast to a plurality of clients. An active window of one of the plurality of clients is updated with a data value where the active window was displaying a previous version of the data value.

BRIEF DESCRIPTION OF THE DRAWINGS

A more complete understanding of the present invention and the advantages thereof may be acquired by referring to the following descriptions taken in conjunction with the accompanying drawings in which like reference numbers indicate like features and wherein:

FIG. 9 illustrates two views of the tool bar for the GUI object builder, one in design mode and one in run time mode;

FIG. 10 illustrates an embodiment of the architecture that may be used to allow multi-user access to a single user database;

FIG. 50 illustrates a state table used by computer telephone system 10 to maintain the proper display illustrated in FIG. 49;

FIG. 96 illustrates an example of a procedure to implement the dial more digits feature for use with the computer telephone system illustrated in FIG. 1;

FIG. 97 illustrates an example of a procedure used to implement the dial more digits feature for use with the computer telephone system illustrated in FIG. 1;

DETAILED DESCRIPTION OF THE INVENTION

Figure 1:
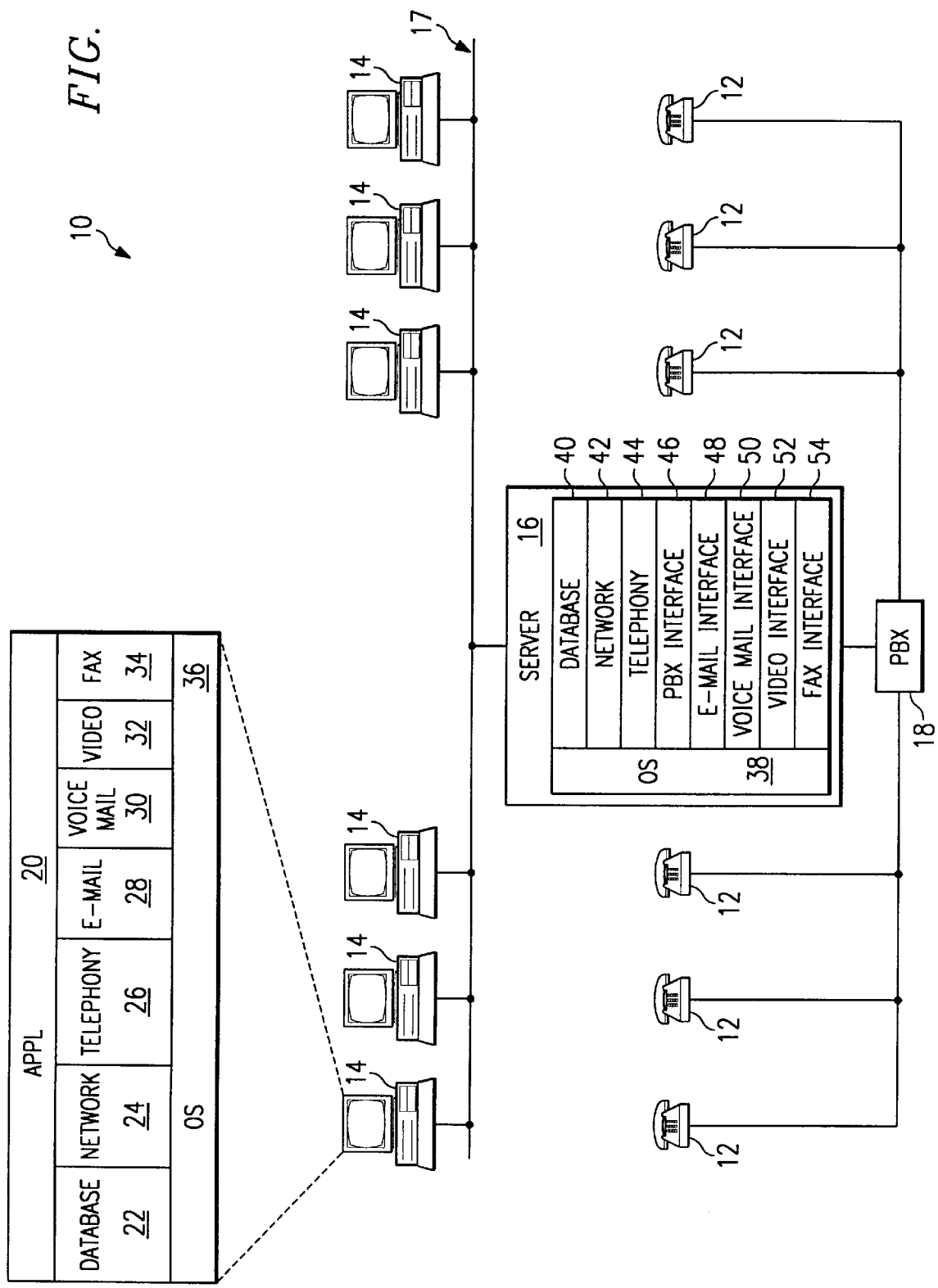
FIG. 1 illustrates a computer telephone system constructed in accordance with the teachings of the present invention.
Figure 111:
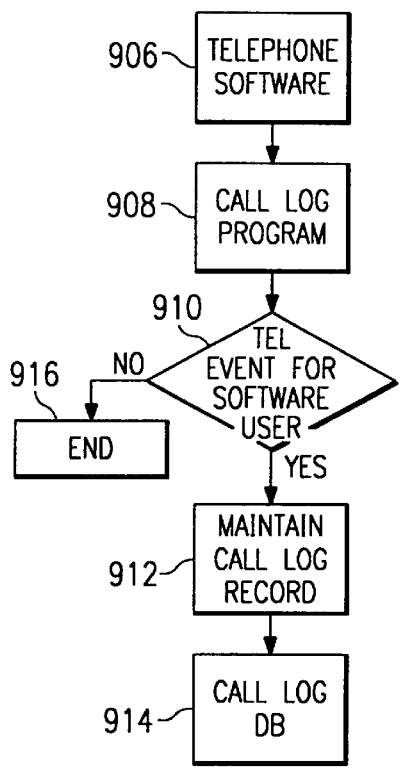
FIG. 111 illustrates an example of a procedure used to log calls for the computer telephone system of FIG. 1.

The present invention and its advantages are best understood by referring to FIGS. 1 through 111 of the drawings, like numerals being used for like and corresponding parts of the various drawings.

SYSTEM ARCHITECTURE

FIG. 1 illustrates an embodiment of a computer telephone system 10 constructed in accordance with the teachings of the present invention. Computer telephone system 10 comprises a plurality of telephones 12, a plurality of client computer systems 14, a server computer system 16 and a Private Branch Exchange (PBX) 18. Each telephone 12 may be connected to PBX 18. Each client computer system 14 may be, for example, a general purpose digital computer such as an IBM-compatible personal computer running the Microsoft DOS operating system and the Microsoft Windows operating environment. Each client computer system 14 may be connected to server computer system 16 using a computer network 17. Computer network 17 may comprise an ethernet or token ring local area network or a wide area network. Server computer system 16, for example, may be a general purpose computer that may also comprise a suitable IBM-compatible personal computer. Server computer system 16 may be connected to PBX 18. Server computer system 16 and client computer system 14 may also be connected to other systems such as, for example, a voice mail system (not explicitly shown). Server computer system 16 may actually comprise several independent hardware servers, each responsible for providing separate services to the client computer system 14. In addition, there may be a plurality of each type of service provided to a client. For example, a single client 14 may be serviced by more than one database server, central office telephone line, E-mail system or PBX. For example, a single hardware server system may be dedicated to providing access to PBX 18 while a separate server computer is dedicated to providing database services to client computer system 14. In addition, server computer system 16 may act as a gateway to remote systems such as mainframe or other database storage systems connected to server computer system 16 through, for example, a wide area network.

A client computer system 14 may serve as a hardware platform to run, for example, one or more application programs 20, one or more client service providers 22 through 34 and an operating system 36. Applications 20 may provide various services to a user using client service providers 22 through 34. Each of the client service providers 22 through 34 may access internal or external hardware-and software through operating system 36 to provide services to applications 20.

The embodiment illustrated in FIG. 1 gives several examples of client service providers that may be used with computer telephone system 10. Other client service providers may also be used. Client service providers 22 through 34 may include database client service provider 22, network client service provider 24, telephony client service provider 26, E-Mail client service provider 28, voice mail client service provider 30, video client service provider 32 and fax client service provider 34.

Similarly, server computer system 16 may comprise operating system 38 and server service providers 40 through 54. Server service providers 40 through 54 may interact with client computer system 14 to provide services to client computer system 14. Server service providers 40 through 54 may also interact with other internal or external hardware or software such as PBX 18 to aid in providing services to client computer system 14. Server service providers 40 through 54 may use operating system 38 to interface with client computer system 14 and PBX 18. As shown in FIG. 1, server service providers 40 through 54 include database server service provider 40, network server service provider 42, telephony server service provider 44, PBX interface server service provider 46, E-Mail interface server service provider 48, voice mail interface server service provider 50, video interface server service provider 52, and fax interface server service provider 54.

Figure 2:
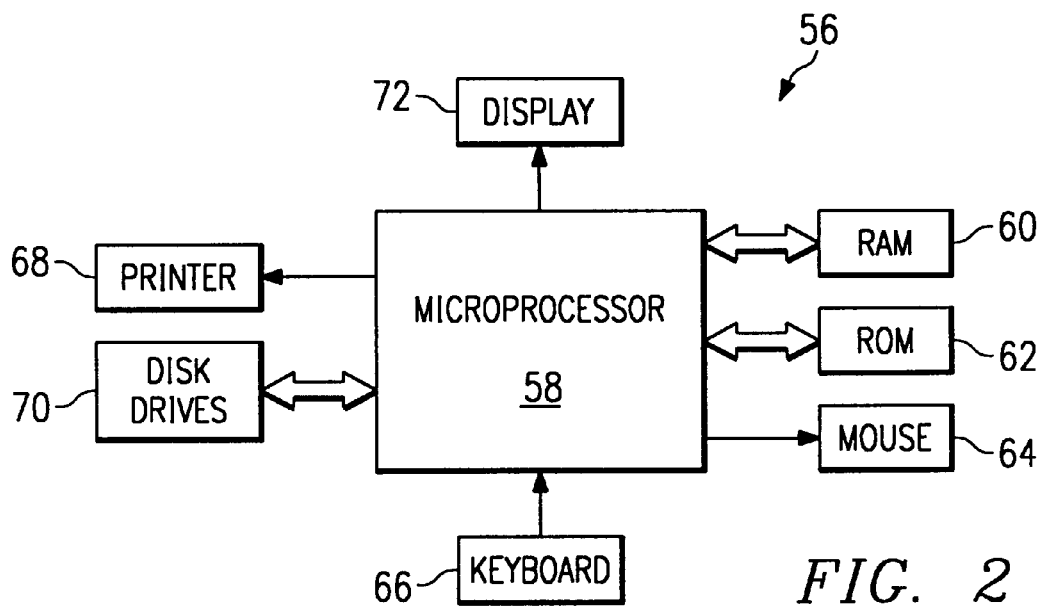
FIG. 2 illustrates a computer system that may be used in the computer telephone system illustrated in FIG. 1.

FIG. 2 illustrates a general purpose computer system 56 that may be used for client computer system 14 and/or server computer system 16. General purpose computer system 56 may be adapted to execute any of the well known, MS-DOS, PC-DOS, OS2, Unix Motif, MAC-OS™, X-Windows, Window™ Operating Systems or other environments. General purpose computer system 56 comprises microprocessor 58, random access memory (RAM) 60, read-only memory (ROM) 62, mouse 64, keyboard 66, and input/output devices, such as printer 68, disk drives 70, and display 72. The present invention includes computer software that may be stored in RAM 60, ROM 62, or disk drives 70 and is executed by microprocessor 58. It will be recognized that disk drives 70 may include a variety of types of storage media such as, for example, floppy disk drives, hard disk drives, CD ROM drives, or magnetic tape drives.

Figure 3:
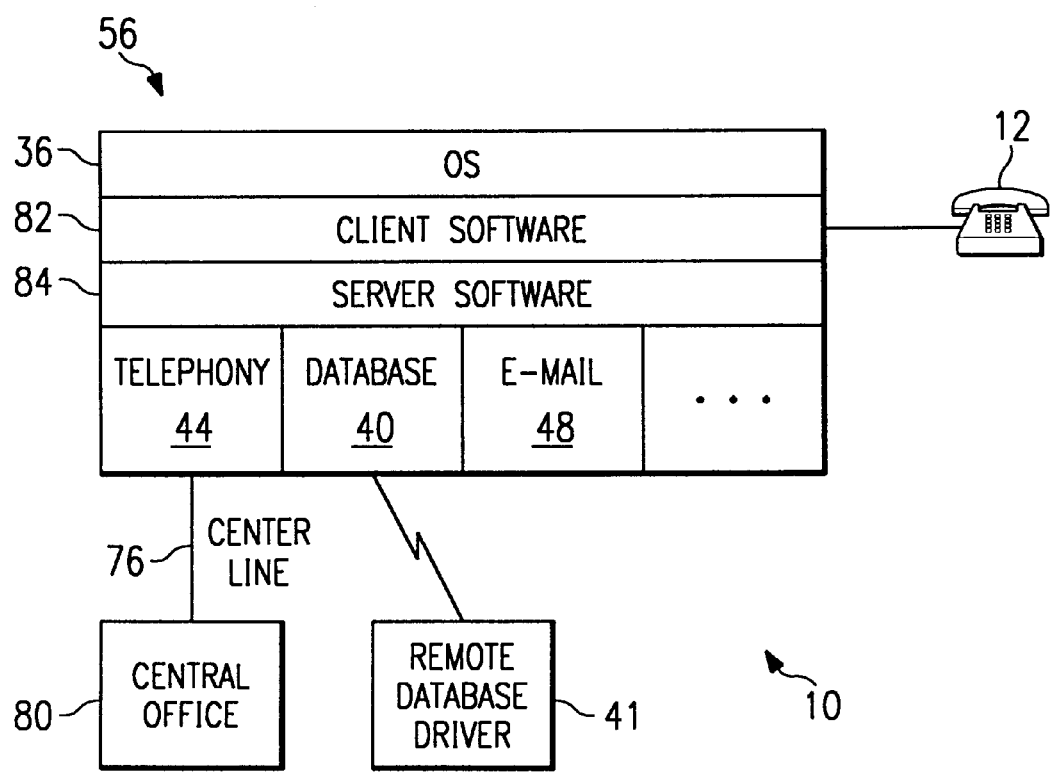
FIG. 3 illustrates a second embodiment of a computer telephone system constructed in accordance with the teaching of the present invention.

FIG. 3 illustrates a second embodiment of computer telephone system 10 constructed in accordance with the teachings of the present invention. Although most aspects of the present invention are described below in the context of a client/server architecture such as that illustrated in FIG. 1, the present invention may also be used with a Centrex system such as that illustrated in FIG. 3.

In the embodiment illustrated in FIG. 3, computer telephone system 10 comprises general purpose computer 56, and telephone 12. Computer telephone system 10 is connected to central office 80 through Centrex line 76. General purpose computer 56 is connected to central office 80 using telephone interface software 78 and Centrex line 76.

To allow all functions of computer telephone system 10 to be utilized with the embodiment illustrated in FIG. 3, both client software 82 and server software 84 are executed on general purpose computer 56. However, various functions, such as database services can still be provided remotely through network connections or similar mechanisms. Client software 82 may interface with server software 84 using various modules contained in client software 82, server software 84 and operating system 36. Client software 82 may include one or more applications 20, and one or more of the client service providers 22 through 34 described previously. Server software 84 may include one or more server service providers 40 through 54 described previously. For example, E-mail server 48 is shown and telephony server 44 is shown coupled to central office 80 in FIG. 3. In addition, database server 40 is shown. Database server 40 is shown coupled to a remote database server 41 which may optionally provide additional database services and may be coupled to computer 56 through, for example, a wide area network. Although computer telephone system 10 may employ a client/server architecture, the same general purpose computer 56 may serve as the hardware platform for the software systems associated with both client computer system 14 and server computer system 16 described previously.

The client/server architecture may allow multiple client computer system 14 to make 'virtual' connections to one or more servers 16 such as, for example, a telephony server. Communications between client computer system 14 and server computer system 16 may be performed using a two-way highway of communication. Two-way communication may occur, for example, using two different mechanisms.

First, an event may cause a message to be generated and sent to the other side of the virtual connection. The receiver of the message will pick up the message and act upon it. In this type of communication, no back propagation of success or failure will normally be generated as it is informational only. For example, telephony server service provider 44 may send a message to a client computer system 14 to communicate that a telephone call has been received by PBX 18 and is directed at the client computer system 14. Client computer system 14 may receive this message and may enable certain user interface options which may represent service requests such as requests for answering the call. Server computer system 16, however, may not listen for any success indication as the message is informational only. Server computer system 16 normally will not track the success or failure of the message action. Server computer system 16, however, may track whether the message was picked up and, if not, may store information about the call in a call received database for later retrieval by client computer system 14. The concept of server computer system 16 tracking whether events generated by it are picked up by client computer system 14 should be considered to be distinct from the concept of whether actions taken by a client computer system 14 due to a message were successful or not.

A second type of communication may include a request for service. Ordinarily, when this type of communication is used, a requestor process is blocked from further requests until server computer system 16 completes the servicing of the request. In the case of multiple threading of processes, multiple requests may be made by the requester because the requestor may spawn child processes which carry out the action of requesting the service and handling request errors. Child processes may generate new messages to send to the parent upon successful completion such that the parent process may update any user interface tools or data structures.

In order to implement computer telephone system 10 for an array of possible service providers, such as telephony or database service providers, a mapping program may map telephony requests to the formats used by different service application program interfaces (APIs) such as the Telephony Application Program Interface (TAPI) used by Microsoft and Intel and/or the Telephony Services Application Program Interface (TSAPI) used by Novell and AT&T. The mapping program may also bypass the mapping functions and serve as an API for various services. Computer system 10 may also be used with various PBX systems and/or first party services. The ability of computer telephone system 10 to interface with various service providers allows client applications 20 to target the mapping program without regard for the first or third party API set required to carry out requests.

Computer telephone system 10 may also be used with an automated client reconnect feature. As with any client/server technology, server computer system 16 may have down time which can present problems for client computer system 14 who have connections that are no longer valid. Computer telephone system 10 may employ an automatic client reconnect mechanism in which server computer system 16 notifies client computer system 14 when it becomes operational. During down time for server computer system 16, requests from client computer system 14 are terminated using network time outs. During time periods when a particular client system 14 is down, all calls logs are still maintained by server computer system 16.

Although various aspects of the present invention are described in the context of a client/server architecture, other architectures could be used to serve as a platform for thee features described herein. The present invention is not limited to the context of a client/server architecture.

Figure 4:
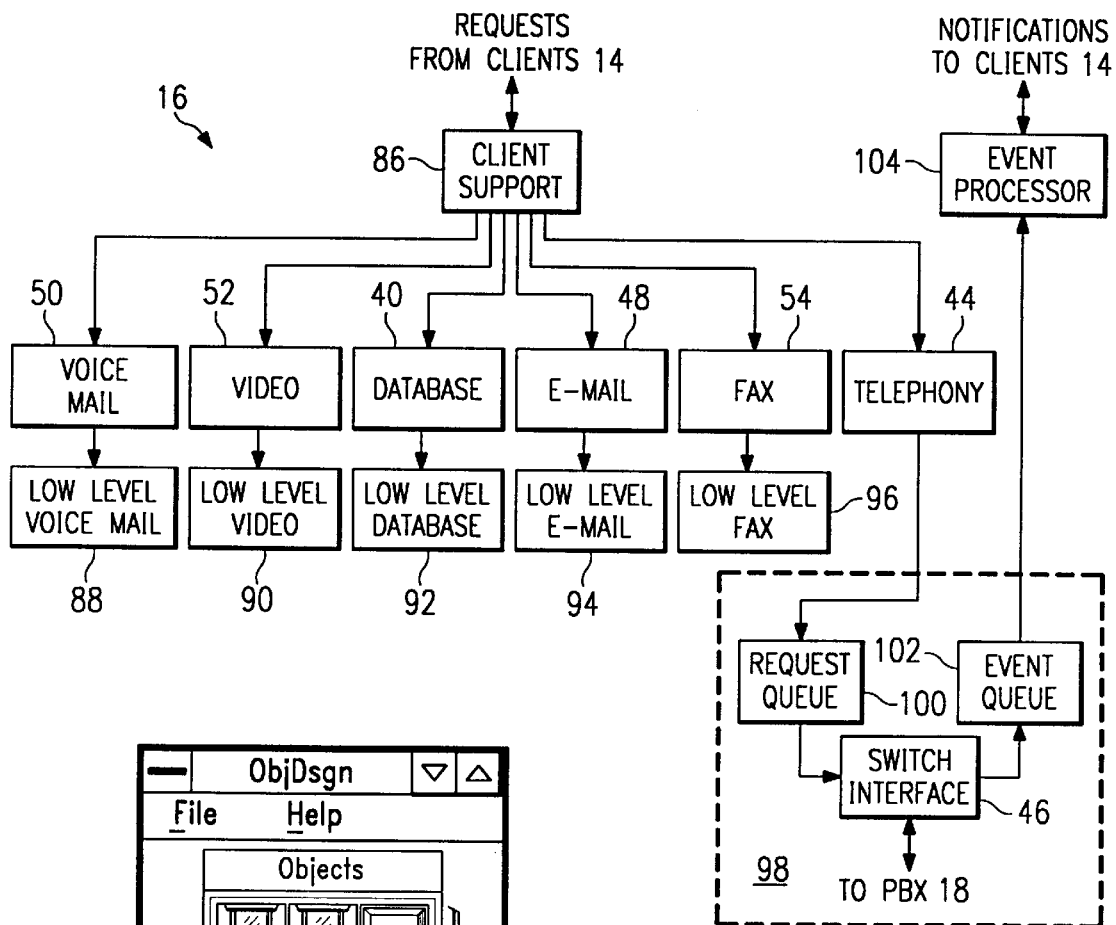
FIG. 4 illustrates an embodiment of a server that may be used in the computer telephone system of FIG. 1.

FIG. 4 illustrates an embodiment of server computer system 16 that may be used in computer telephone system 10. Server computer system 16 comprises client support service provider 86, server service providers 40 through 54, low level service providers 88 through 98 and event processor 104. Client support service provider 86 communicates with server service providers 40 through 54, which in turn communicate with low level service providers 88 through 98. Each server service provider may be associated with a low level service provider such as low level voice mail service provider 88, low level video service provider 90, low level database service provider 92, low level E-mail service provider 94, low level fax service provider 96, and low level telephony service provider 98.

An exemplary embodiment for low level telephony service provider 98 is illustrated in FIG. 4. Each other low level service provider 88 through 96 may include components similar or identical to low level telephony service provider 98. In addition, although not explicitly shown, each other low level service provider 88 through 96 may also communicate with event processor 104 in the manner to be described.

Low level telephony services provider 98 comprises request queue 100, event queue 102 and switch interface server service provider 46. In operation, telephony server service provider 44 receives telephony service requests from client support service provider 86. Telephony server service provider 44 provides these requests to request queue 100 using an API. Request queue 100 sends these requests to switch interface server service provider 46. Switch interface server service provider 46 sends requests to and receives messages from PBX 18. After receiving a message from PBX 18, switch interface server service provider 46 sends these messages to event queue 102 using an API. Event queue 102 may send the messages to event processor 104 that may then send notifications to client computer system 14.

In some instances, telephony server service provider 44 may determine that PBX 18 is not capable of performing a request. In such a case, telephony server service provider 44 may generate a message directly and place it in event queue 102 or send the message directly to event processor 104 although the connection between these blocks is not explicitly shown in FIG. 4.

The architecture of computer telephone system 10 is designed to be information-independent as the client server architecture is capable of creating a virtual connection between a client and server regardless of the type of information to be communicated. Moreover, the system may be implementation-independent as the architecture employs API's to access implementation-dependent hardware and software. The use of APIs and especially the mapping program of the present invention isolates the various components of the system architecture from the machine dependent variables of systems providing services to those components.

Because of the implementation-independent and information-independent nature of the client/server architecture, any number of low level service providers may be supported. For example, low level database service provider 92 may include the in-memory database system described below, a multi-user database system, or a single user database system with the multi-user virtual interface described in FIG. 4. The embodiment illustrated in FIG. 4 employs both an in-memory database and a single user database with the multi-user virtual interface described below. This embodiment may use the C-tree database engine available from Faircom or the Btrieve database engine available from Btrieve. Other database software may also be used by interfacing appropriate APIs.

GRAPHICAL USER INTERFACE TOOLS

Computer telephone system 10 may include a graphical user interface (GUI) to provide an interface between a user and an application 20. In this embodiment a graphical user interface can be created using a GUI object builder. The GUI object builder may have a design mode and a run time mode which allows a designer to visually build an application by specifying the windows, window contents, and the behavior of all components of the system. The GUI object builder may receive messages and generate requests as necessary to other components of the system of the present invention. Each object of the GUI object builder is capable of making requests to, and receiving messages from, any external system to which application 20 interfaces. For example, each object is potentially capable of causing telephony requests and receiving messages related to telephony events.

Figure 5:
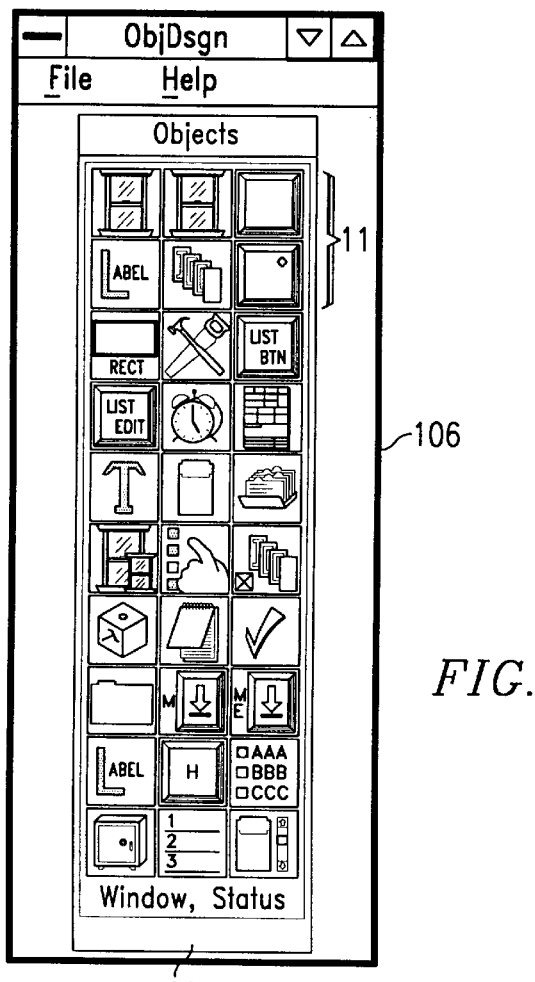
FIG. 5 illustrates a window that may be used with a GUI object builder of the present invention.

FIG. 5 illustrates a window 106 used in the design mode of the GUI object builder. Window 106 comprises tool bar 108 which contains a plurality of objects 110. In this embodiment, each object 110 may be represented by an icon. When an application designer presses on an icon, the GUI object builder causes an object of that type to be created. Table 1 lists the objects 110 associated with each icon illustrated in FIG. 5 according to the icon's position. Other objects could also be used with the GUI object builder.

TABLE 1

| Window | Window with Tool Bar and Status Line | Button |
| --- | --- | --- |
| Label | Icon | Bit Map |
| Rectangle | Tool Bar | List Button |
| List Edit | Timer | Object |
| Text Entry | Container | Multi Column List Box |
| Sub Window | Radio Button | Select Icon |
| Rich Text | Scroll Text | Check Box |
| Folder | Multi Column List Button | Multi Column List Edit |
| Clipping Label | Button | Menu |
| Password | Multi Line Edit | Scrollable Container |

Figure 6:
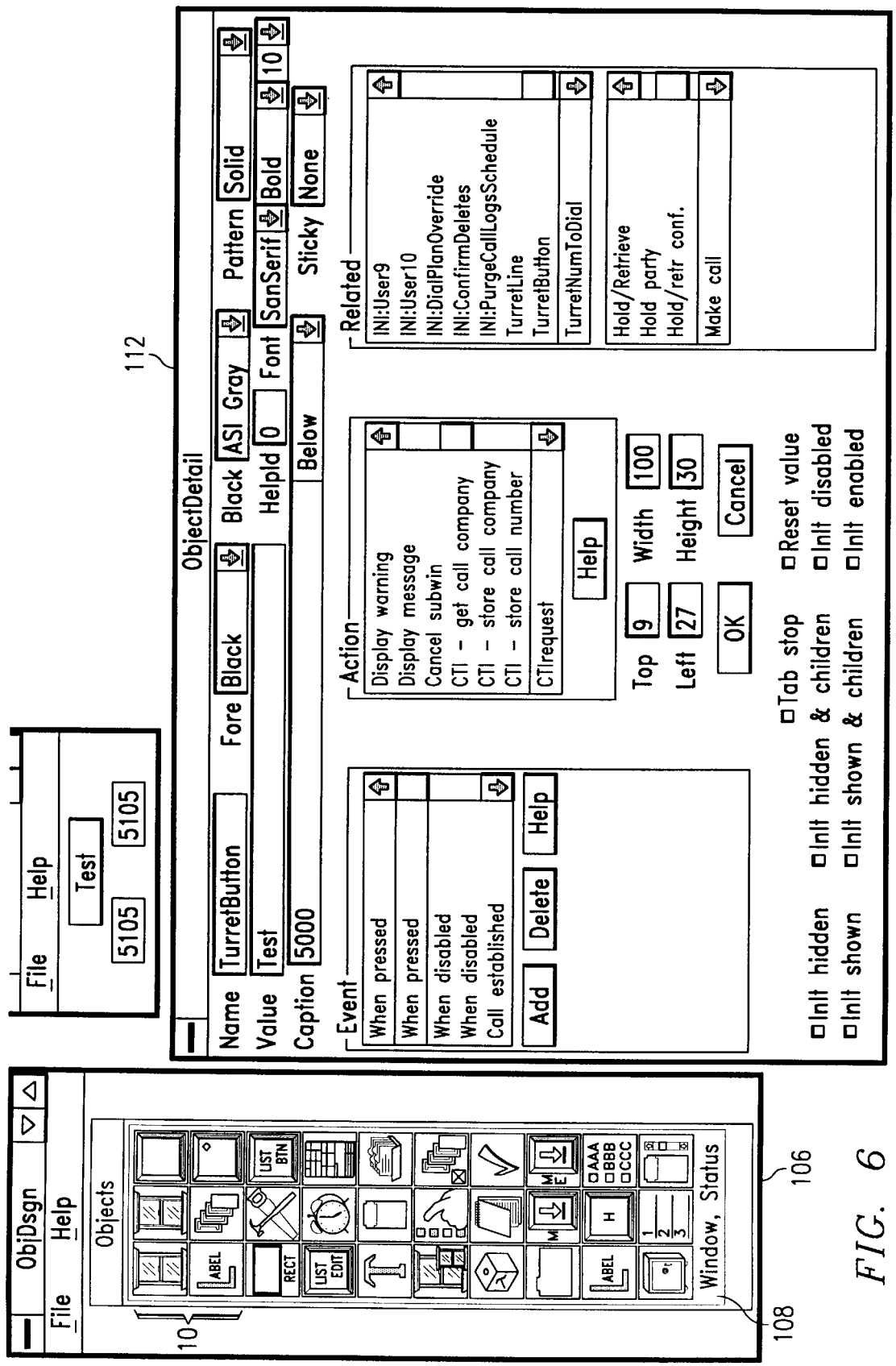
FIG. 6 illustrates a screen which may appear while using the GUI object builder.

FIG. 6 illustrates a screen which may appear on display 72 while using the GUI object builder. After the designer clicks on an object 110 using the mouse 64, that object is dynamically created. Double clicking on an object with the mouse or highlighting an object and pressing the "enter" key causes the object detail window 112 appears on display 72 to allow the designer to define various details about the object.

A mouse pointer whose position is controlled by mouse 64 may appear on display 72. The phrase "click the mouse," or variants thereof, refers to pressing a button on mouse 64 when the mouse pointer is located on top of a certain object on display 72.

As illustrated, the designer may assign various properties to the object as well as define how the object reacts to an event. Specifically, for each event, the designer may specify one or more actions that should be taken in response to an event in a user defined order. Events may correspond to systems mentioned above such as the graphical user interface, the telephony system, database system, E-mail system, fax system, video system, and/or voice mail system. Examples of GUI events may include a button being pressed on mouse 64, the mouse pointer being moved, or an object being disabled. Telephony events may include a call being placed on hold, a call arriving, or a call being terminated.

In the design mode, the output of the GUI object builder may be external files that contain the layout and behavior of each designer-created object. These definition files may be input directly in the run time mode of the GUI object builder.

No compilation is required, although a compiler may be used to create a more compressed image of the information and decrease load time. Definition files are platform independent and may be created by the design tool of the present invention running on any of the supported platforms and used automatically in all supported platforms without any conversion.

Object definitions may be arranged in a hierarchial manner. For example the levels from highest to lowest may be application, window, designer defined objects, and core objects. Examples of core objects may include buttons, labels, text entries, multi-column list boxes and folders. A designer may combine core objects into higher level objects and assign names to them.

Figure 7:
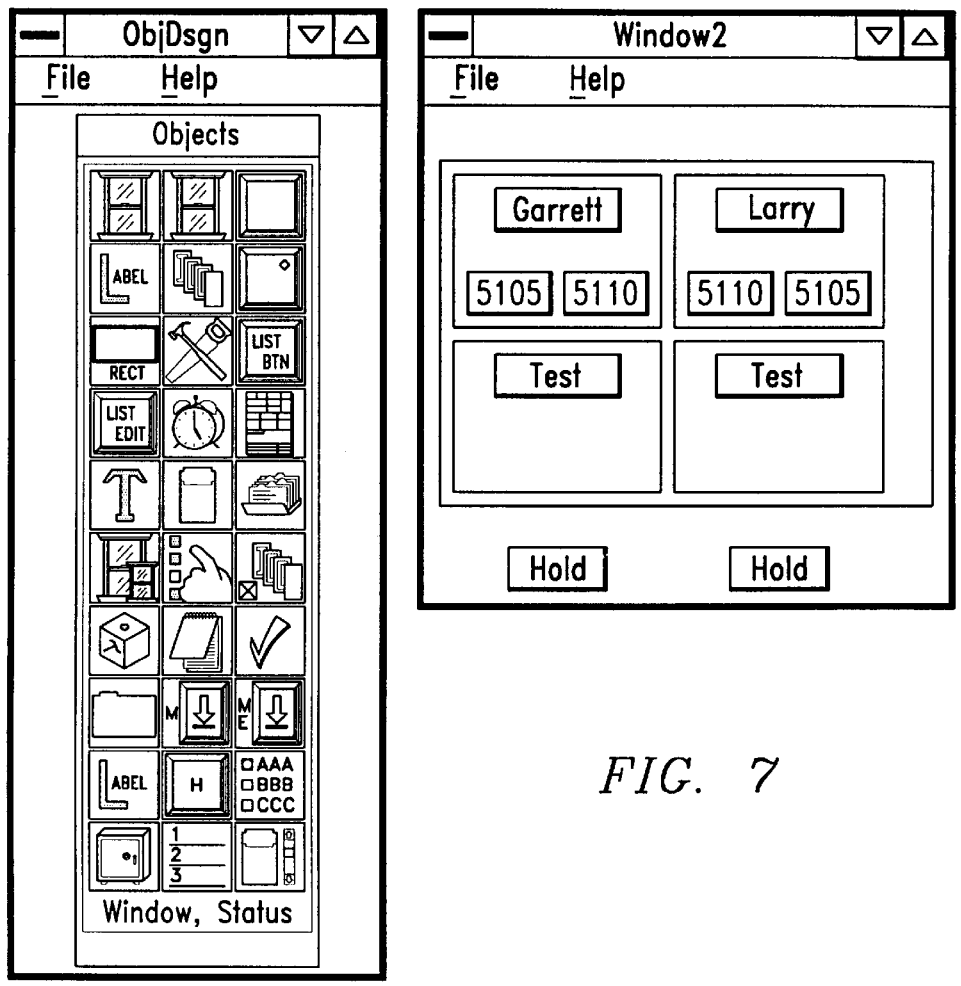
FIG. 7 illustrates objects that may be created by the user of the GUI object builder.

FIG. 7 illustrates several higher level objects that have been created by a designer and duplicated in Window2 as shown. Specifically, FIG. 7 illustrates a number of low level objects such as the numeric labels and buttons. These low level objects have been grouped into a high level object of a window labeled "Window2".

Figure 8:
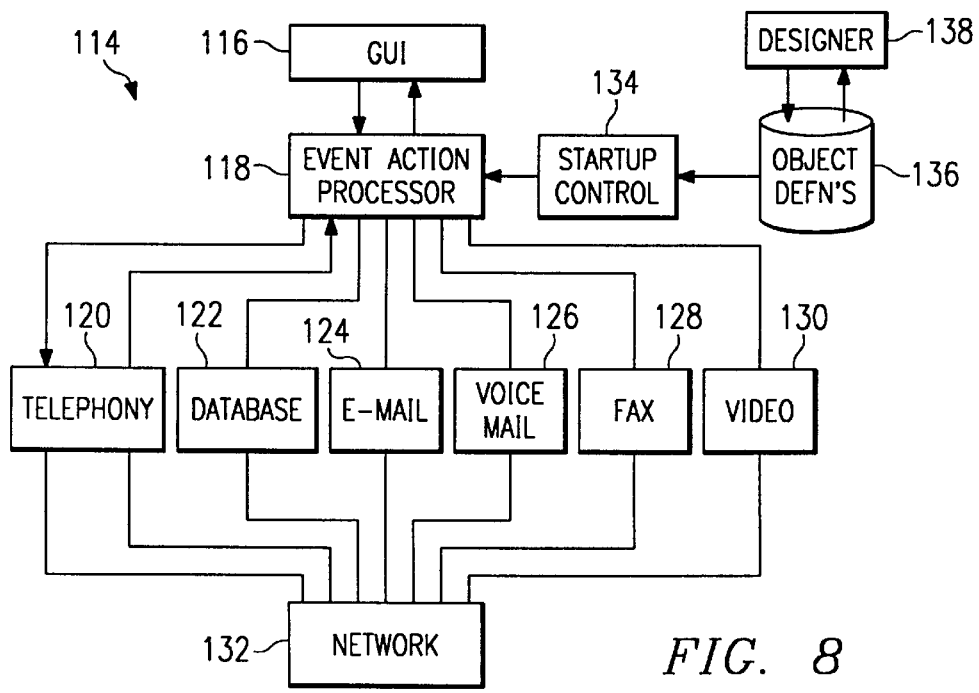
FIG. 8 illustrates an architecture for a GUI object builder.

FIG. 8 illustrates the architecture of an embodiment of GUI object builder 114. GUI object builder 114 comprises GUI 116, event action processor 118, system interfaces 120 through 130, network interface 132, start-up control 134 and object definitions storage 136. During design mode, designer 138 creates an application by defining objects that are stored in object definition storage 136. The remaining components of GUI object builder 114 are primarily used in run time mode, although the designer 138 may create object definitions 136 using GUI 116 (not explicitly shown).

GUI object builder 114 is driven by event action processor 118. Event action processor 118 may be considered to be an application 20. Event action processor receives messages associated with all events from GUI 116 and each of the interfaces 120 through 130. Event action processor 118 interacts with GUI 116 and each of the interfaces 120 through 130 using requests. Each request may be initiated by an event. Event action processor 118 maintains the state of objects and systems and can be queried at any time. Queried states are returned as messages to objects, which, in turn, initiate requests responsive to the received messages.

Event action processor 118 receives object definitions upon start-up from start-up control 134. Start-up control 134 retrieves object definitions from object definition storage 136.

Graphical user interface 116 may be part of operating system 36 and interfaces with devices such as mouse 64 and display 72. Event action processor 118 may be an application 20. Telephony interface 120, database interface 122, E-mail interface 124, voice mail interface 126, fax interface 128 and video interface 130 are each a part of the corresponding client service provider 22 through 34. Network interface 132 is controlled by network client service provider 24. GUI object builder 114 automatically adjusts to the mode of operation being in design mode or run-time mode.

FIG. 9 illustrates how tool bar 108 may change depending upon the mode of GUI object builder 114. In design mode, tool bar 108 shows low level objects used for design as illustrated in the window labeled OBJDSGN. In run time mode, however, tool bar 108 may become a launcher used for launching applications created with GUI object builder 114. The window labeled InTouch2 illustrates tool bar 108 in run time mode.

SINGLE USER DATABASE SYNCHRONIZATION

Computer telephone system 10 may be used with a database system designed to be used only by a single user. Multiple user access to a single user database may be provided using a database control process. In this embodiment, all access requests to the database are sent through the control process. The control process analyzes incoming requests to ensure that a current unit of work is not intermixed with other database requests. A unit of work may be defined as a group of database requests enclosed within a begin request and an end request. During a unit of work, database access is limited to only the process executing the unit of work except that Read Only units of work which are not the currently executing unit of work are permitted to execute unless the currently executing unit of work has requested exclusive control of the database. If exclusive control has been requested then read only requests are queued.

FIG. 10 illustrates an example of an architecture for allowing multiple user access to a single user database. Each client computer system 14 sends database requests through database control process 140. Database control process 140 may be, for example, part of the database server service provider 40. Database control process 140 controls database transactions with single user database 142. Read queue 144 and update queue 146 aid database control process 40 handling request which are not part of the current unit of work and must be deferred until later.

In general, the theory of operation of database control process 140 is to execute requests that are part of the current unit of work and queue those requests that are not part of the current unit of work. Two different queues are maintained by database control process 140. The first queue, read queue 144, stores read requests and the second queue, update queue 146, stores update and add record requests. When database control process 140 executes the END request, signaling the end of the current unit of work, it pulls the next queued request from read queue 144 and begins execution of the new request. When read queue 144 is emptied, database control process 140 then pulls a request from update queue 146. This process continues until read queue 144 and update queue 146 have been emptied. Read queue 144 contains those database requests which do not update the database files. Update queue 146 may contain those database requests which will alter the database files.

The above method of operation is designed to send only atomic operations to database 142. By grouping the execution of requests that make up whole units of work, database 142 operates as if only a single user is accessing the database.

Figure 11:
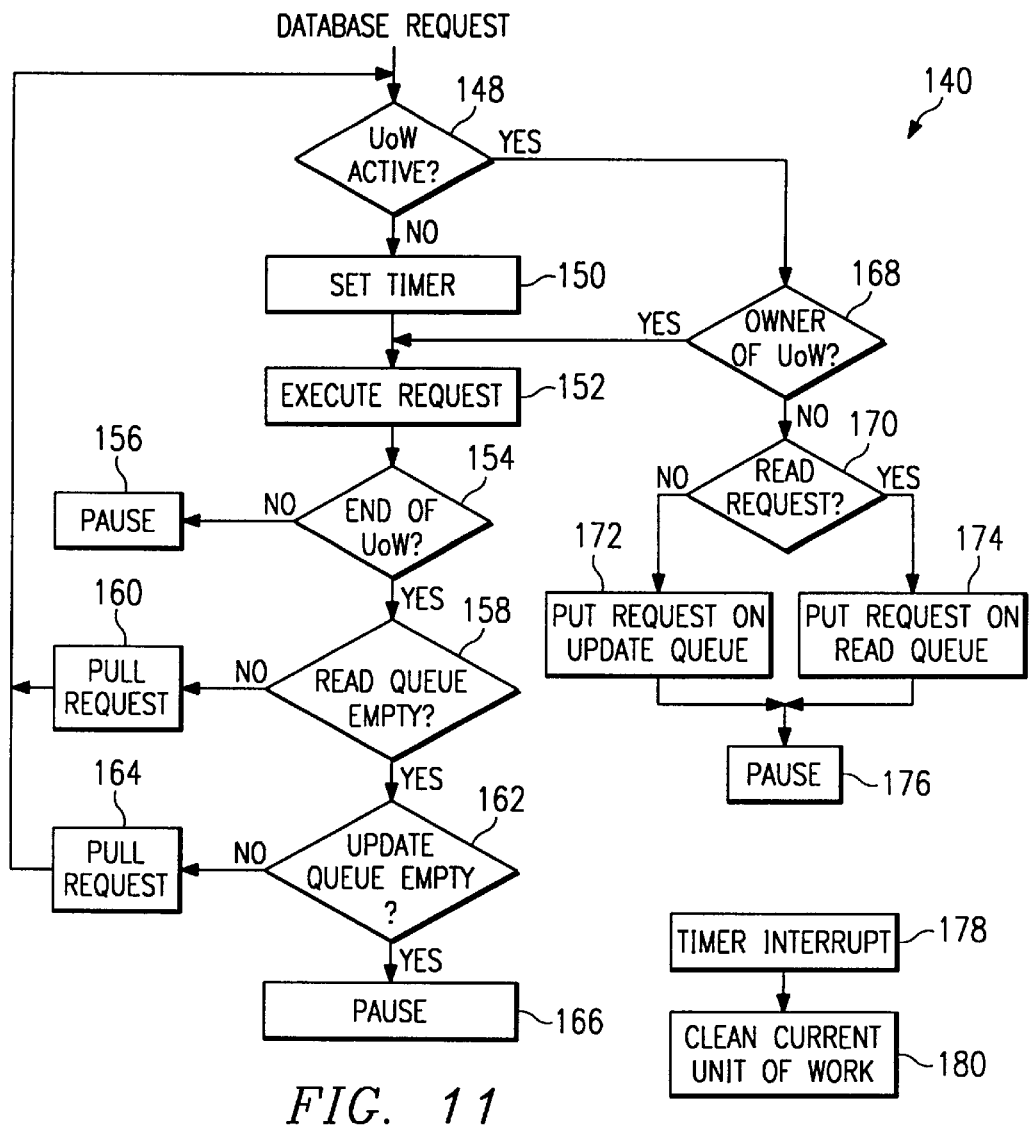
FIG. 11 illustrates an example of a database control process that may be used to provide multi-user access to a single user database.

FIG. 11 illustrates a flow chart of one embodiment of database control process 140. In step 148 a database request is received by database control process 140 and it is determined whether a unit of work is currently active. As discussed above, a unit of work is active when database control process 140 is processing a database request. In step 148, therefore, database control process 140 is checking to see whether any database request is currently being processed. If a unit of work is not active, the current request may be executed and execution proceeds to step 150. In step 150, a time out timer is set in case the stream of database requests from a client computer system 14 is interrupted. Should transmission of a database request from a client computer system 14 be interrupted, the timer that was set in step 150 may cause an interrupt. Interrupts may occur after a predetermined amount of time such as, for example, thirty seconds. When the interrupt occurs, the current unit of work is discarded.

After each database request is executed in step 152, execution proceeds to step 154 where it is determined whether the end of a particular unit of work has been received. If not, execution proceeds to step 156 where database control process 140 pauses and waits for the next database request. If, however, the request executed in step 152 was the end of a unit of work, then execution proceeds to step 158.

In step 158, database control process 140 determines whether read queue 144 is empty. If so, flow then proceeds to step 162 where it is determined whether update queue 146 is empty. If read queue 144 is not empty, a request is pulled off of read queue 144 in step 160, followed by a return to step 148.

Returning to step 162, if it is determined that update queue 146 is empty, then database control process 140 pauses and waits for another database request to be received illustrated in step 166. If update queue 146 is not empty, execution proceeds to step 164 where a pull request is generated to update queue 146. The request pulled from update queue 146 is then processed beginning at step 148.

Returning to step 148, if a unit of work was active when a database request was received, then execution proceeds to step 168. In step 168, database control process 140 determines whether the owner of the currently active unit of work generated the request received in step 148. If so, then that request is executed in step 152. If not, then execution proceeds to step 170.

In step 170, it is determined whether the request received at step 148 is a read request. If so, then the request is put on read queue 144 as illustrated in step 174. Database control process 140 then pauses in step 176 and waits for another database request to arrive. If it is determined in step 170 that a read request was not received, then the request is placed on update queue 146 in step 172. Then, in step 176, database control process 140 pauses to wait for another database request.

The disclosed database control process makes computer telephone system 10 less expensive because multi-user databases tend to be more expensive than single user database systems. As such, the use of database control process 140 results in a cost savings to users of computer telephone system 10.

IN-MEMORY DATABASE ARCHITECTURE

Figure 12:
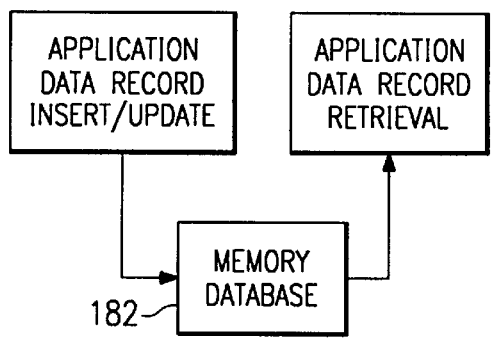
FIG. 12 illustrates an embodiment of an in-memory database constructed in accordance with the teachings of the present invention.

FIG. 12 illustrates an in-memory database 182. In-memory database 182 is a part of database server service provider 40. Most database systems store data on disk drives 70. Often, however, it may be desirable to store data for a database in RAM 60, or in virtual memory. The use of in-memory database 182 may be most desirable where the data for storage in the database will not be maintained permanently and where an application needs fast access to that data.

As illustrated in FIG. 12, in-memory database 182 may receive data record insert/update requests from applications 20. In-memory database 182 may also receive data record retrieval requests from applications 20 and provide those data records to applications 20.

Provisions may be made within in-memory database 182 for efficient storage of variable length data items, sequencing of data based upon application defined keys, and rapid retrieval of data items. In-memory database 182 may employ, for example, an ISAM style database paradigm for storing and accessing data. Records may be stored in any order and one or more indexes may be created to provide an application-determined sequence to the data. In addition, indexes may support the concept of being sparse, meaning that data records must normally meet specific criteria to be included in the index.

In-memory database 182 may be available in two formats, private and shared. A private database may be available for use by a single process. In this context, all memory allocated by the database is private and may not be accessed by other processes running on the machine. Private databases may be most efficient in terms of memory management and data access. However, they normally will not serve more than the creating process. Private, memory databases may be created using an API.

Shared databases may be created by a single process and may be available for use by all processes within the system. The creating process may specify, for example, a 128 character name for the database and all processes that provide the correct name may be granted access to the database. Memory used in storing this type of database may be allocated as shared objects. In-memory database code manages access to the appropriate databases created by new processes.

The creator of a database may also specify that a database is read only. In this case, the process creating the database may be the only process permitted to update the database. All other database users may be restricted to reading the database only. Shared in-memory databases may be created using an appropriate API and access to an existing shared database may also be obtained using the appropriate API.

UPDATING OF CLIENT INFORMATION AUTOMATICALLY

Because computer telephone system 10 may employ a client/server architecture, multiple client computer systems 14 may be using shared data simultaneously. Because a client computer system 14 may update a shared record at any time, it is desirable to immediately update information being used by client computer system 14 when that information is changed. For example, when multiple client computer systems 14 are using a phone directory and information for that directory is updated, all client computer system 14 may desire to have that change reflected in the information that they are currently viewing.

Figure 13:
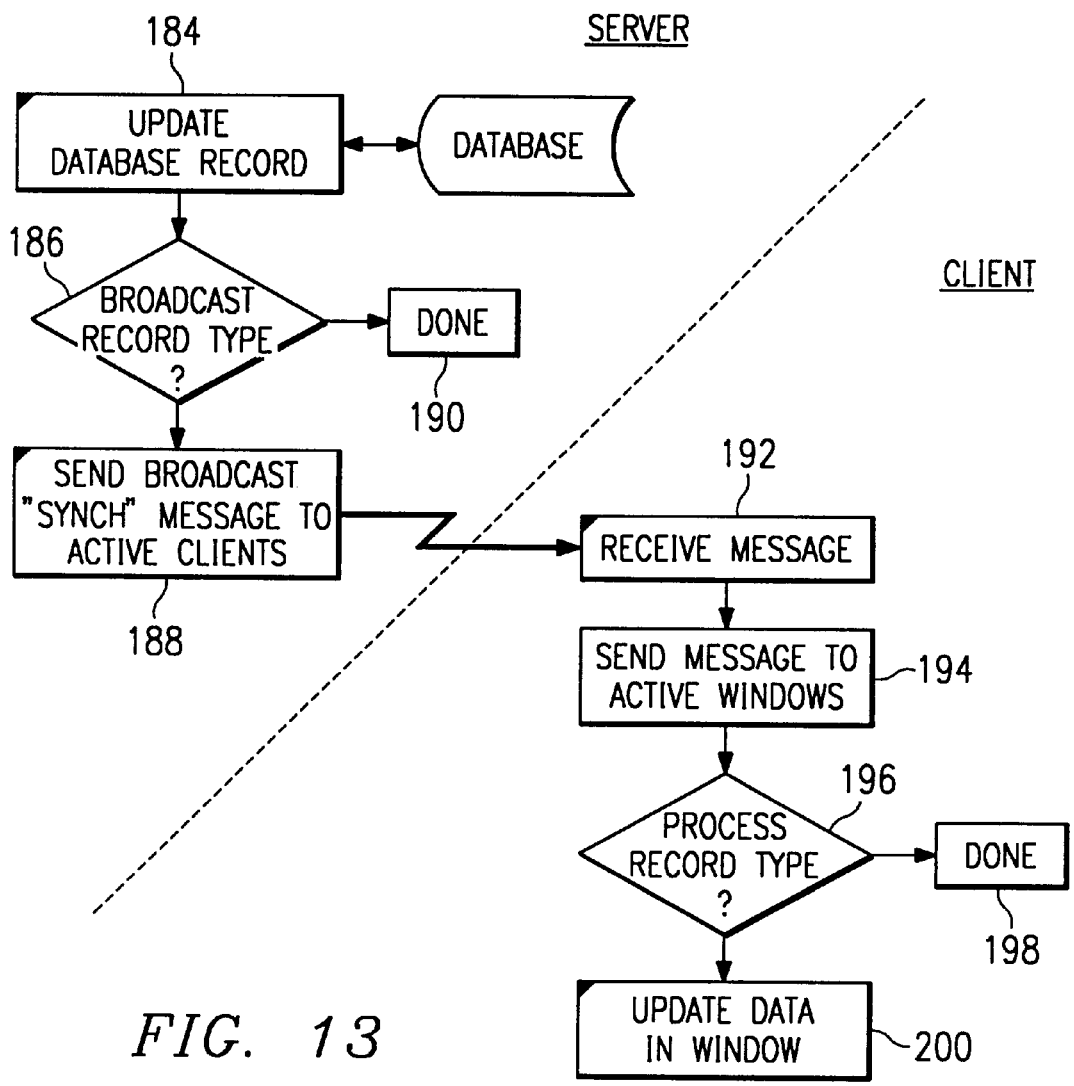
FIG. 13 illustrates an embodiment of a method to achieve automatic updates of shared records in the computer telephone system of FIG. 1.

FIG. 13 illustrates a flow chart of an example process to achieve automatic updates of shared records in computer telephone system 10. In step 184, a shared database record has just been updated and stored in the database as a result of an update request received, for example, from a client computer system 14. Next, in step 186, it is determined whether the record that was updated is a broadcast record type. A broadcast record type is a record shared by multiple client computer system 14 where client computer system 14 desire to know when such a record has been changed. If the record is not of this type, then the process is completed in step 190. If the record is a broadcast record, execution proceeds to step 188.

In step 188 a broadcast synchronization message is sent to all active client computer systems 14. This message informs each client that a database record has been updated and also provides each client computer system 14 with the actual data that was updated. Broadcast synchronization messages are received by a client computer system 14 in step 192. Then, the synchronization message is sent to all active windows as illustrated in step 194. The records sent in step 194 are then processed in step 196 to determine whether that data is currently being displayed in an active window. If the data is not being displayed, then it need not be updated and execution terminates at step 198. If the. data is being displayed, the data is updated in all active windows at step 200.

By updating shared data automatically, each client computer system 14 may always display the most current information. A user may avoid using erroneous data that may have been in use by client computer system 14 in the absence of an automatic update.

DIRECTORY FUNCTIONS

Computer Telephone System 10 may include a number of telephone directory features. These features may be supported using computer software running on client computer system 14 and server computer system 16. The features described below may interface with the user through an application 20, various client service providers 22 through 34, operating system software 36, operating system software 38 and various server service providers 40 through 54. The software in the embodiments described below receives input from the user primarily from keyboard 66 and mouse 64 on a client computer system 14 and provides output to the user using display 72 associated with a particular client computer system 14. The embodiments described below may also use databases which use database server service provider 40 on server computer system 16. The features described below may also interface with PBX 18 using telephony client service provider 26, operating system 36, operating system 38, and telephony server service provider 44.

CUSTOMIZABLE DIRECTORIES

Computer telephone system 10 may allow a user to create custom telephone directories. The user may designate whether these directories are to be private or shared. A private directory may be accessed only by the user that created the directory. A shared directory may be accessed by all users of the system. Both private and shared directories may only be updated by the creator of the directory.

VISUAL INDICATION OF PRIVATE/SHARED STATUS OF DIRECTORY

Figure 14:
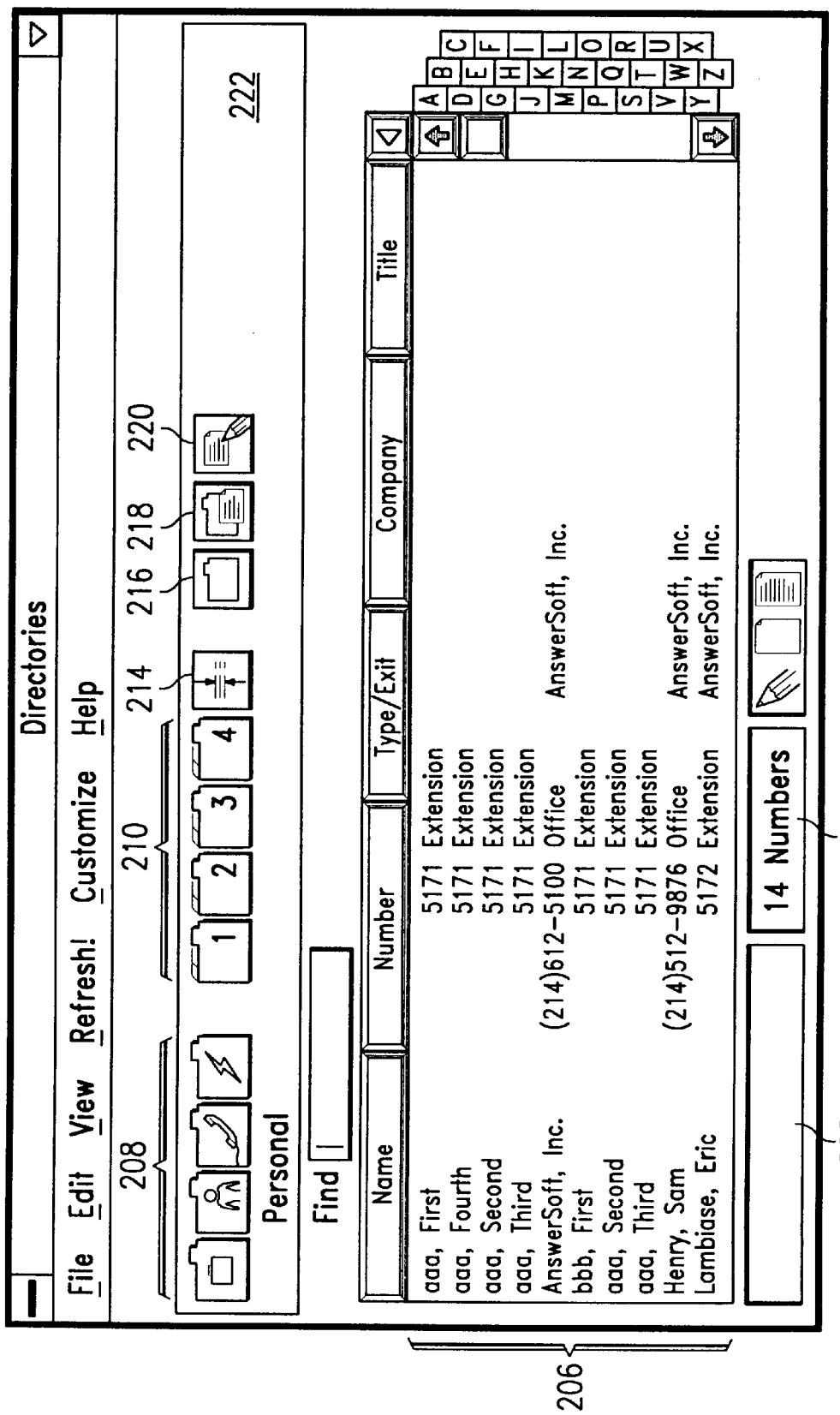
FIG. 14 illustrates a directories window that may be used with the present invention.

FIG. 14 illustrates a directories window 202 that may be used with the present invention. The window 202 allows a user to visually determine whether a telephone directory is private or shared. A user may create any number of directories and have access to a predetermined number of directories at any one time. In the example illustrated in FIG. 14, the user has access to eight directories. The user may access these directories using directory icons.

In directories window 202 illustrated in FIG. 14, the user currently has eight active directories on toolbar 222. Four of these directories are personal directories while four of these directories are shared directories. Private directories may be represented by private directory icons 208 while shared directories may be represented by shared directory icons 210. A private directory icon 208 may be represented by a folder having a single tab while a shared directory icon 210 may be represented by a folder having multiple tabs. In other words, a user may immediately determine whether a directory is private or shared simply by viewing the icon representing that directory.

DIRECTORY NAME DISPLAY FEATURE

Although icons present an efficient method of presenting a user with a large volume of information, a user will sometimes forget what directory is represented by a specific directory icon such as icons 208 through 210. The present invention allows a user to quickly determine the name of a directory without having to perform a number of steps. A user will normally use mouse 64 when performing operations in directories window 202. In directories window 202, the user may reveal the name of a directory simply by passing the mouse pointer over the surface of a directory icon 208 through 210. The directory name will then appear in the position of directory name indicator 212. Alternatively, the . directory name could be displayed beginning underneath the corresponding directory icon 208 through 210.

For example, in directories window 202 illustrated in FIG. 14, the user has passed the mouse pointer (not explicitly shown) over the second private directory icon 208. (This icon has a silhouette of a person.) The name of the directory, "Personal," now appears as directory name indicator 212. The present invention thus allows a user to easily determine the name of a directory represented by an icon without having to perform a series of steps.

AUTOMATIC OPENING OF DIRECTORIES

The present invention allows a user to automatically open one or more directories without having to perform multiple steps or page through a number of menus. Referring again to FIG. 14, a directory may be opened simply by clicking mouse 64 on one of the directory icons 208 through 210. The present invention gives the user a visual indication of which directories are open and which directories are not open. When a directory is open, the background of a Directory Icon 208 through 210 may be light colored. When a directory is closed, the background of a directory icon 208 through 210 may be a shaded color.

For example, in FIG. 14, the left-most private directory icon 208 has a light-colored background and represents an open directory. All other private directory icons 208 and shared directory icons 210 have shaded backgrounds and represent closed directories. In addition, the shading of the directory icon 208 is changed to appear as a "depressed" button when the directory associated with directory icon 208 is active.

As discussed, clicking mouse 64 on one of the directory icons 208 through 210 opens that directory or closes the directory based on the current state of the system and the type of mouse clock performed. When one or more directories are open, their contents are displayed as directory contents 206. The number of entries in that directory may be displayed in directories window 202 with the number of records indicator 204.

The contents,of a directory may be displayed in expanded or compressed mode. Clicking the mouse 64 on expand/compress icon 214 may toggle the display of the directory contents 206 between expanded and compressed mode. In expanded mode, directory contents 206 may reflect all numbers in the directory for a particular name. For example, if the directory includes a home phone number, fax number, and mobile telephone number, these numbers will all be displayed in expanded mode. In compressed mode, however, only the one number marked by the user as the primary number is displayed for each directory entry.

The present invention also allows for efficient creation of directories and editing of active directories. For example, a new directory may be added by clicking the mouse on add directory entry icon 216. An entry may be added to an existing directory by clicking mouse 64 on add directory entry icon 218. A user may edit, or add information to, an existing entry in a directory by clicking on open entry icon 220.

MERGED DIRECTORY LISTINGS

Another feature of computer telephone system 10 allows a user to open any number of telephone directories at any one time. These directories may be sorted and merged together and displayed to a user as one continuous directory. A user may choose to sort the directories using any field of the directory data.

Figure 15:
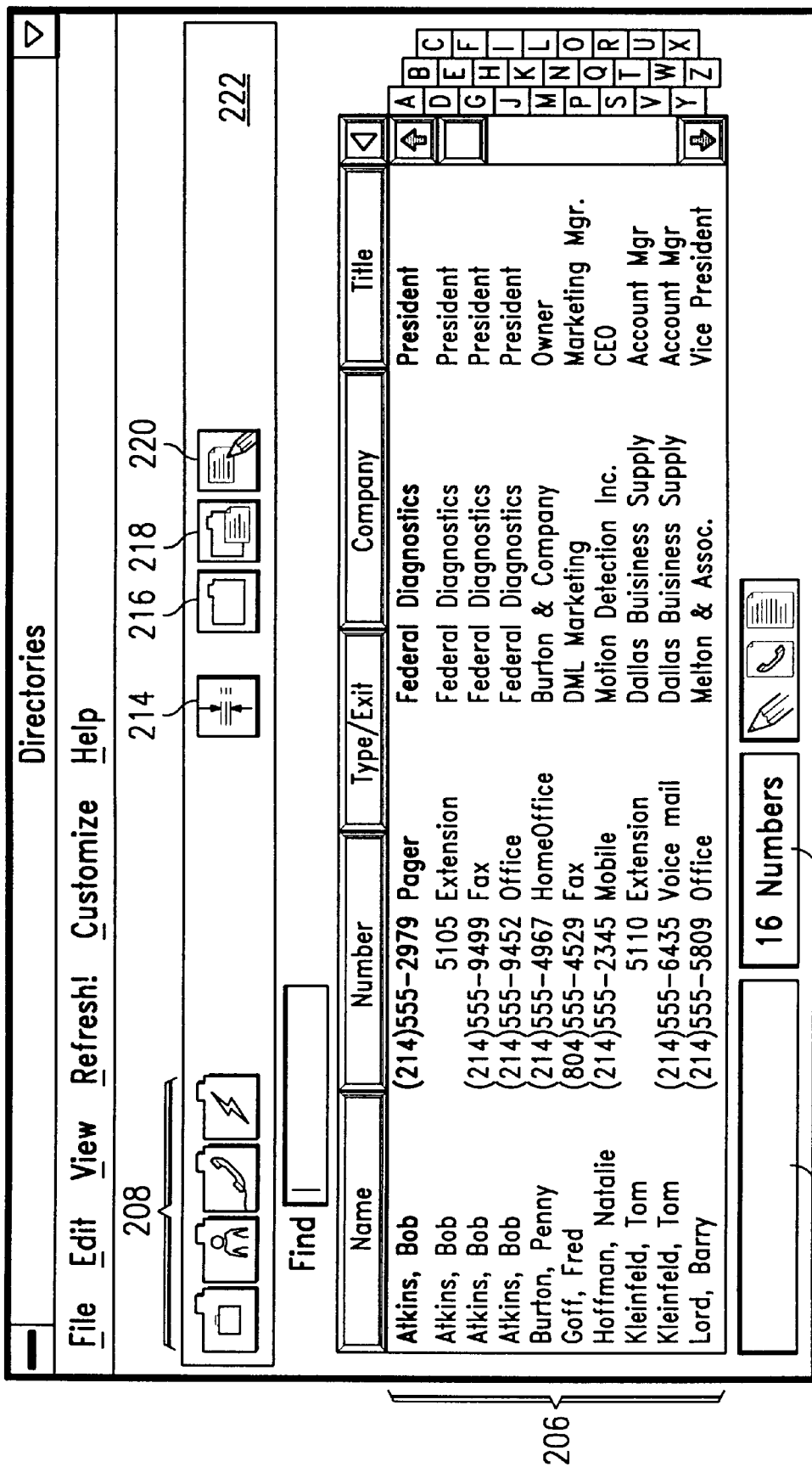
FIG. 15 illustrates the directory window of FIG. 14 with multiple directories opened simultaneously.

FIG. 14, as described above, illustrates a single open directory. FIG. 15 illustrates directory window 202 when multiple directories have been opened simultaneously. All four directories illustrated in FIG. 15 are open, as indicated by the light background of private directory icons 208 and the "depressed" shading of the icons. The present invention may arrange the merged directory listings alphabetically, as illustrated in FIG. 15, but any criteria may be used for sorting the merged directories for display to the user in directory window 202.

To display multiple directories, a user may simply click on the appropriate icon using mouse 64 while holding down a control key. If a user does not desire to open multiple directories, but simply desires to switch from one directory to another, the present invention avoids the need to close the first directory and then open the second directory. Instead, all open directories are closed automatically when the user clicks on a directory icon 208 through 210 for the directory that the user desires to open.

DESIGNATING DIRECTORIES TO PRELOAD AND CUSTOMIZING DIRECTORIES

Figure 16:
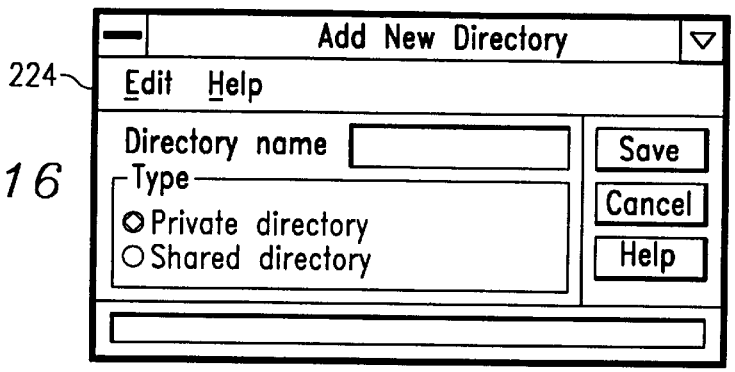
FIG. 16 illustrates an add directory window that may be used to add additional directories to the computer telephone system illustrated in FIG. 1.
Figure 17:
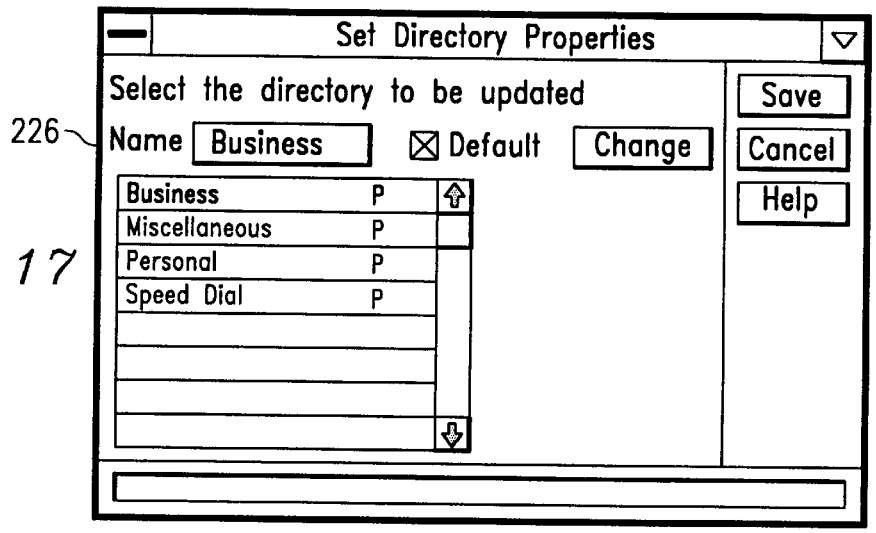
FIG. 17 illustrates a directory properties window that may be used to customize the properties of directories used in computer telephone system 10.

As discussed above, a user may create a new directory by clicking mouse 64 on add directory icon 216. After add directory icon 216 has been clicked on, add directory window 224 illustrated in FIG. 16 appears. Add directory window 224 allows a user to designate the name of a directory and whether that directory is a private directory or shared directory. After a new directory has been added, the user may designate that directory as the default directory using directory properties window 226 illustrated in FIG. 17. Directory Properties Window 226 may appear to the user after a new directory is created using add directory window 224 in FIG. 16. After the above steps, the user may be given the opportunity to customize the directory.

Figure 18:
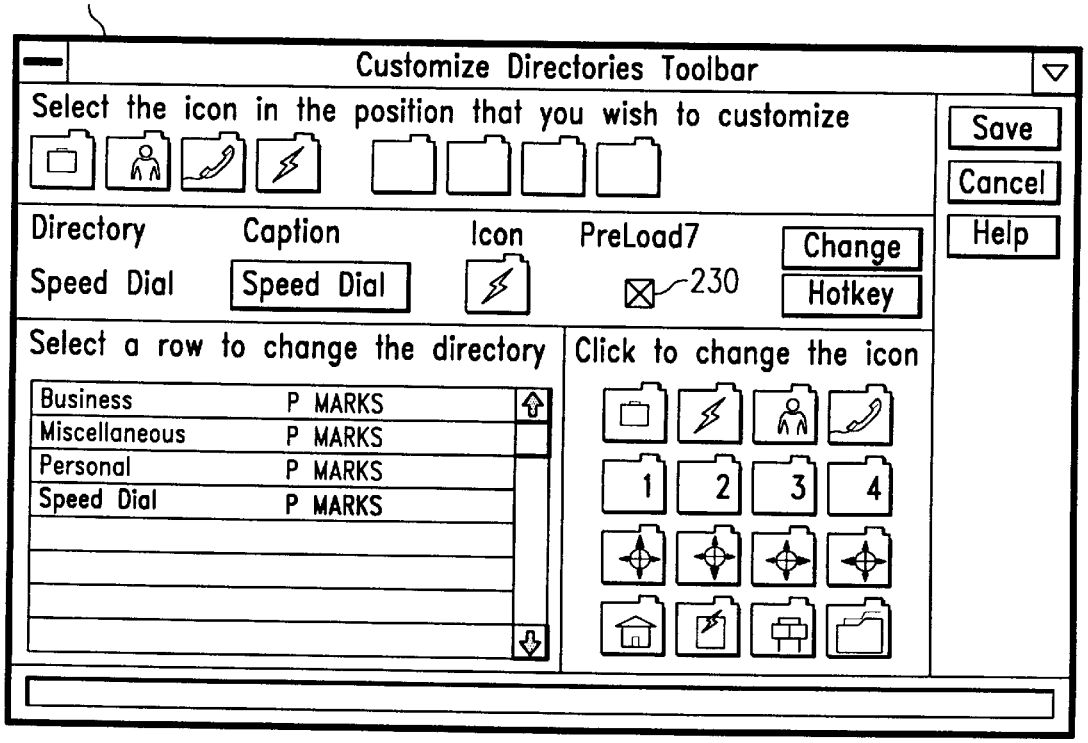
FIG. 18 illustrates the directory customization window that may be used to further customize phone directories used in computer telephone system 10.

FIG. 18 illustrates directory customization window 228. The present invention allows the user to enter a caption to be displayed when the mouse pointer passes over the corresponding directory icon 208 through 210 as described above. The user can also choose a unique icon for each directory. Directory customization window 228 also allows a user to designate whether or not to preload the directory when directories window 202 is first opened. In other words, a user may desire certain directories to always be opened when the user uses computer telephone system 10. The user may specify these directories by designating a preload for each such directory in directory customization window 228.

A user may designate preload in the embodiment illustrated in FIG. 18 by causing an X to appear in preload box 230. The user may cause an X to appear in preload box 230 by clicking mouse 64 on preload box 230. If user clicks again on preload box 230, the X will disappear and the directory will not be preloaded when directory window 202 first opens.

Figure 19:
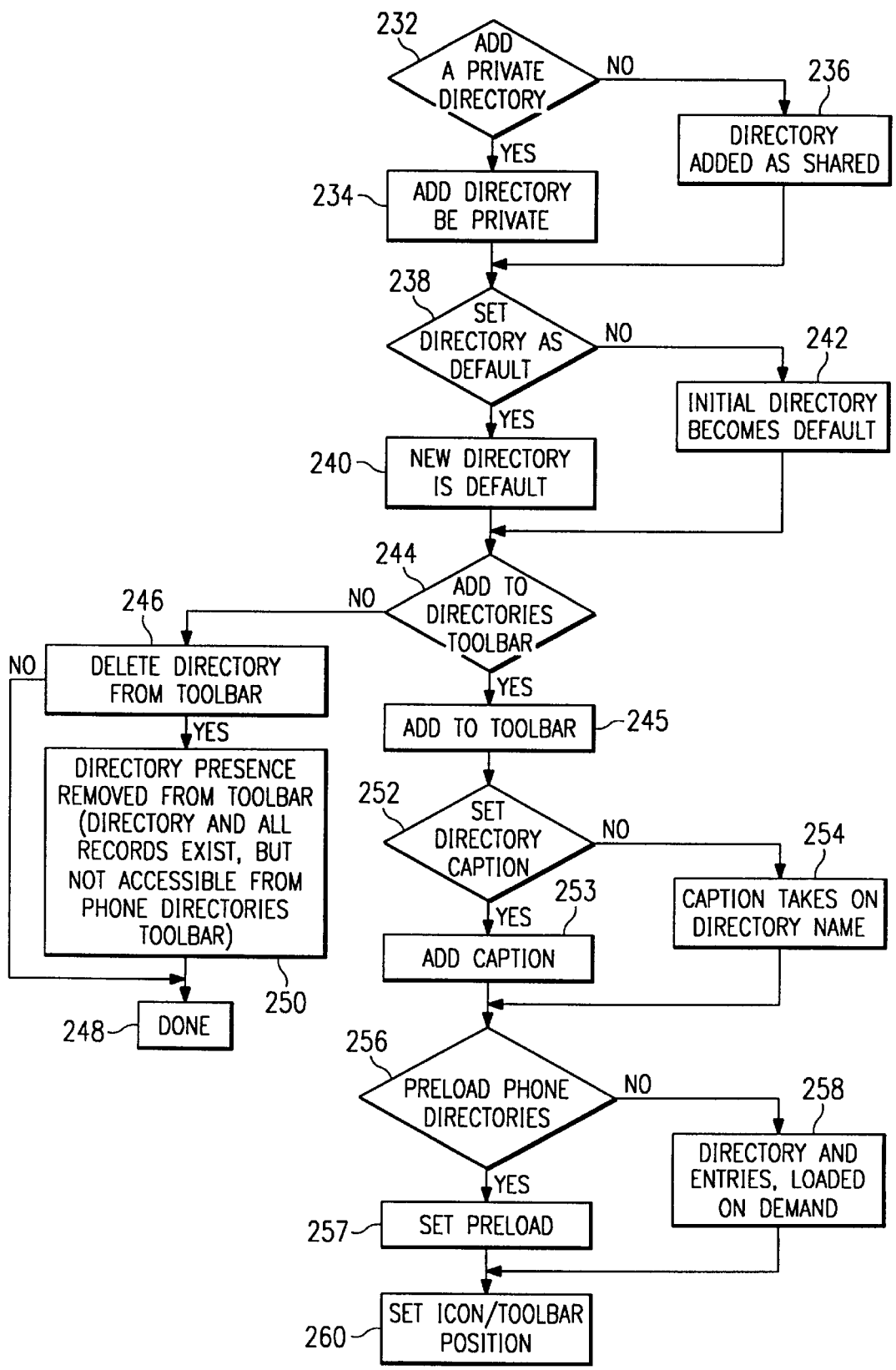
FIG. 19 illustrates an embodiment of a process that may be used to add and customize directories for computer telephone system 10.

FIG. 19 illustrates a flow chart of an example process by which directories may be added and customized. In Step 232, it is determined whether the user wishes to add a directory which is private. If the user wishes to add a private directory, the directory is added as private in step 234. If the user desires a shared directory, the directory is added as a shared directory in step 236. Execution from step 234 or step 236 proceeds to step 218 where it is determined whether the user desires to set the new directory as the default directory. If the user does not desire to set the new directory as a default directory, the initial directory becomes the default directory in step 242. If the user does desire the new directory to be the default directory, the new directory is set as the default directory in step 240.

Execution from steps 240 and 242 then proceeds to step 244 where it is determined whether the user desires to add the directory to the directories toolbar 222. If the user does not desire to add the directory to the directories toolbar 222, execution proceeds to Step 246 where it is determined whether the user desires to delete a directory from the toolbar 222. If so, execution proceeds to step 250 where the directory's presence is removed from the toolbar 222. Note that directories that are removed from the toolbar 222 still exist but are simply not accessible from the phone directory toolbar 222. After a directory is removed, the procedure terminates in Step 248.

If no directory is to be deleted from toolbar 222, the process terminates in step 248. If the user did desire to add a directory to the directory toolbar 222 in step 244, the directory is added to the toolbar 222 in step 245. After the directory is added, the user has the option of adding a caption to the directory in step 252. If the user chooses to add a caption, that caption is added in step 253. If the user does not desire to place a caption on the directory, the caption automatically takes on the directory name in step 254.

Execution proceeds from steps 253 or 254 to step 256 where the user indicates whether he desires to preload phone directories. If the user does not desire to preload phone directories, the directory and its entries are set to be loaded on demand in step 258. If the user does desire to preload phone directories, the directory is set to be preloaded in step 257. After executing steps 257 or 258, the user sets the icon position on toolbar 222 for the new directory in step 260.

PORTABLE PHONE NUMBERS

Computer telephone system 10 may also include customized dial plans that may be separate from the phone numbers. Each phone number stored in a directory may be associated with a dial plan. Dial plans may be used to automate the dialing of access codes, PIN numbers, credit card numbers and other numeric dial strings. For example, a user may desire to use one telephone credit card for personal calls and another telephone credit card for business calls. In computer telephone system 10, a user can establish a dial plan for each credit card and use each dial plan when appropriate. If a user always calls certain numbers for business, the user may designate the appropriate dial plan to be used with those numbers.

Figure 20:
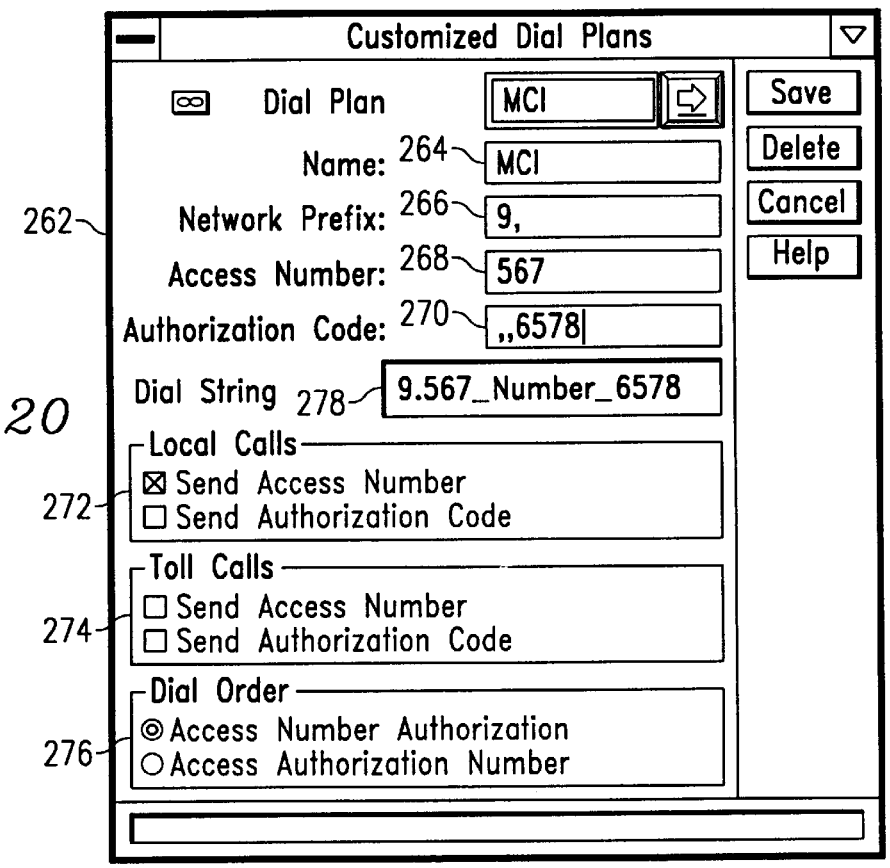
FIG. 20 illustrates a custom dial plan window that may be used to create custom dial plans for use with computer telephone system 10.

FIG. 20 illustrates custom dial plan window 262 that may be used to create a custom dial plan. The user may give each dial plan a name by entering dial plan name 264. A user will often need to use a network prefix to obtain an outside line. For example, in an office environment, the user may sometimes have to dial 9 to obtain an outside line. In the example illustrated in FIG. 20, 9 has been entered as a network prefix. After entering a network prefix, some delay typically occurs before an outside line may be accessed. The comma after the 9 in network prefix 266 indicates that the system should pause for a predetermined time after the 9 has been entered.

The user may also include an access number 268 and authorization code 270 in a custom dial plan. Sometimes, a user needs to dial access number 268, followed by the phone number that the user is calling, followed by authorization code 270. Other times, however, the access number 268 and authorization code 270 both must be dialed before dialing the phone number. The present invention allows the user to designate the dial order using dial order selection 276. In the example illustrated in FIG. 20, the user has selected the order—access number 268, phone number, authorization code 270.

Some phone systems also require an access number 268 to be entered before making both local and toll calls. For example, some businesses monitor outside phone usage of their employees using unique access numbers 268. Local call selection 272 and toll call selection 274 allow a user to designate whether to send an access number 268 with each local call and/or with each toll call. Local call selection 272 and toll call selection 274 may also allow the user to either send or not send an authorization code 270 with each local call or with each toll call.

Custom dial plan window 262 also can display the dial string 278 that will be dialed when the user makes a call. Dial string 278 is updated dynamically as data is entered in other fields to give the user a viausl indication of what digits will be dialed. In this example, the network prefix "9" will be dialed, followed by the access number "567," followed by the phone number to be dialed, followed by the authorization code "6578".

Figure 21:
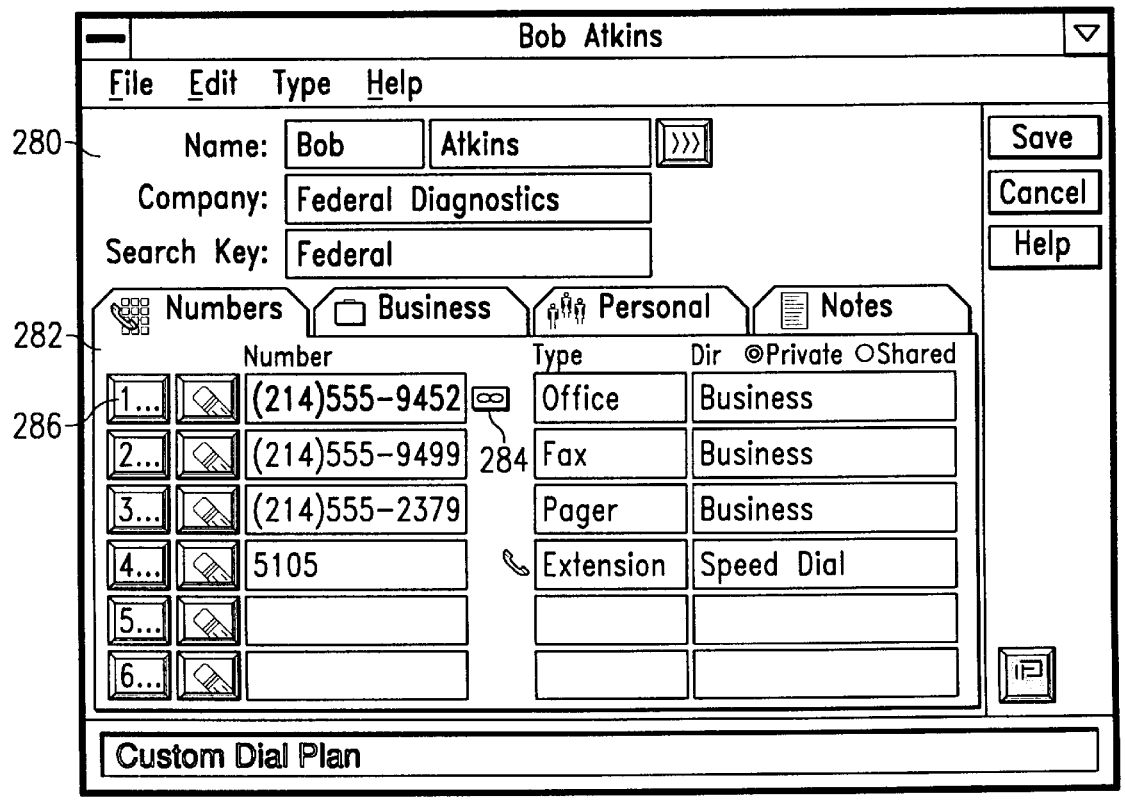
FIG. 21 illustrates a custom dial plan associated with an exemplary telephone number.
Figure 22:
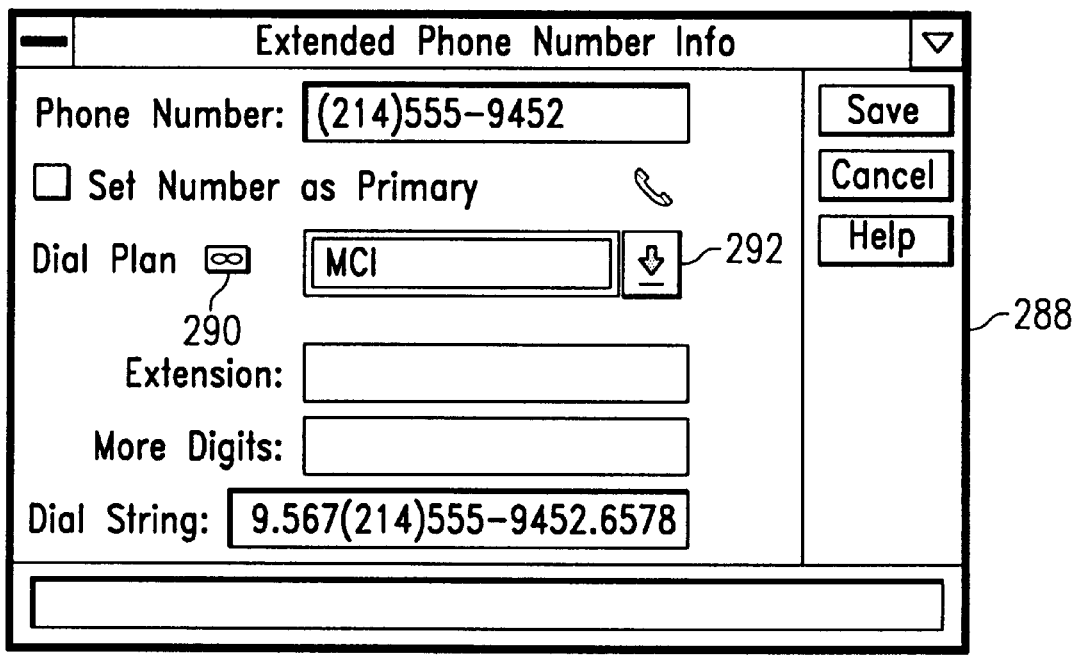
FIG. 22 illustrates an extended phone number information window that may be used to associate a dial plan with a telephone number in the computer telephone system of FIG. 1.

FIGS. 21 and 22 illustrate how a dial plan may be associated with a telephone number. FIG. 21 illustrates directory entry window 280. Directory entry window 280 may display a directory entry for one particular person. In this example, directory window 280 illustrates the directory entry for Bob Atkins. Each directory entry may include a phone number folder 282 which lists a plurality of phone numbers associated with that directory entry. In this example, Bob Atkins has four phone numbers associated with his directory entry—his office number, fax number, pager number and extension.

Each number may have the same dial plan assigned to it or different dial plans may be associated with each number. If no dial plan is associated with a number, a default dial plan may be used when dialing that number. Phone number folder 282 may indicate whether a dial plan has been selected for a given number by the presence or absence of a dial plan icon 284. In this example, dial plan icon 284 appears only after the first phone number for Mr. Atkins. This indicates that a dial plan has been associated with this number, but the other three phone numbers for Mr. Atkins will use a default dial plan.

A user may assign or unassign a dial plan to a particular phone number using extended phone number information window 288. The user may also change the selected dial plan using this window. A user may access extended phone number information window 288 by clicking mouse 64 on extended phone number information icon 286.

Turning to FIG. 22, an example extended phone number information window 288 is illustrated. This window 288 is for the first phone number in phone number folder 282 illustrated in FIG. 21. The user may associate or disassociate a dial plan with the number by clicking mouse 64 on dial plan on/off icon 290. The user may choose which dial plan to associate with the number using dial plan select bar 292. When the user clicks the mouse on dial plan select bar 292, a list of available dial plans may appear and the user need only scroll down and select the appropriate dial plan.

An advantage of the present invention is that a user may easily use computer telephone system 10 on a portable computer while traveling. A user need only design a call plan for the particular location. For example, hotels often have telephone systems where a series of numbers must be dialed to obtain access to an outside line. If a user is in such a hotel, the user may simply create a new dial plan and use computer telephone system 10 with that new dial plan.

Figure 23:
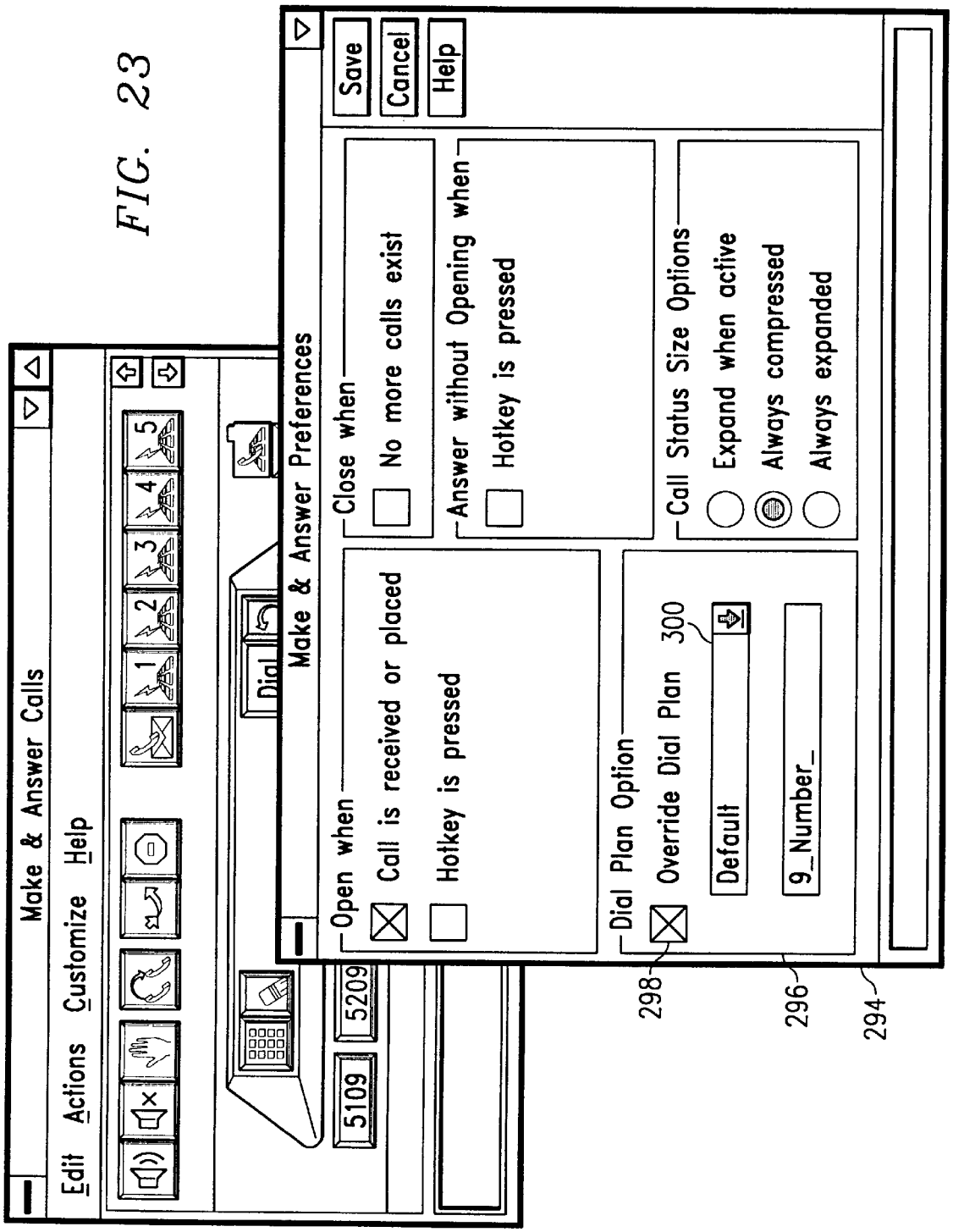
FIG. 23 illustrates a make and answer calls preferences window that may be used to set the dial plan override feature in the computer telephone system of FIG. 1.

Because a user may need to use a different dial plan while traveling, computer telephone system 10 may provide a way to override dial plans that have been associated with numbers in a directory. FIG. 23 illustrates make and answer calls preferences window 294. In window 294, the user may use dial plan option select 296 to override all dial plans associated with numbers in the directory. A user may turn on the override feature by clicking mouse 64 on override dial plan box 298. Clicking on override dial plan box 298, a second time may turn the override feature off. In this example, the override dial plan has been selected.

After the user has chosen to override existing dial plans assigned to specific numbers, the user may indicate which dial plan to use for all calls by using dial plan select bar 300. This dial plan will then be used for all calls that are made from computer telephone system 10 for that user.

A user may also travel on business to a different area code or exchange. The user may indicate to computer telephone system 10 both the area code and exchange where the user will be using computer telephone system 10 . Computer telephone system 10 may then determine whether any call made by the user is a local call or a toll call using an area code/exchange database. In certain area codes, all exchanges are local calls, while in other area codes, calls between certain exchanges are toll calls. In large cities, like Chicago, a city may have multiple area codes such that calls between two different area codes are still local calls. Accordingly, a database of area codes and exchanges may be used to determine whether a call to a particular area code or exchange is a local call or a toll call. As long as the user indicates the proper area code and exchange from which he is calling, computer telephone system 10 will dial the correct number of digits in accordance with the selected dialing plan.

Figure 24:
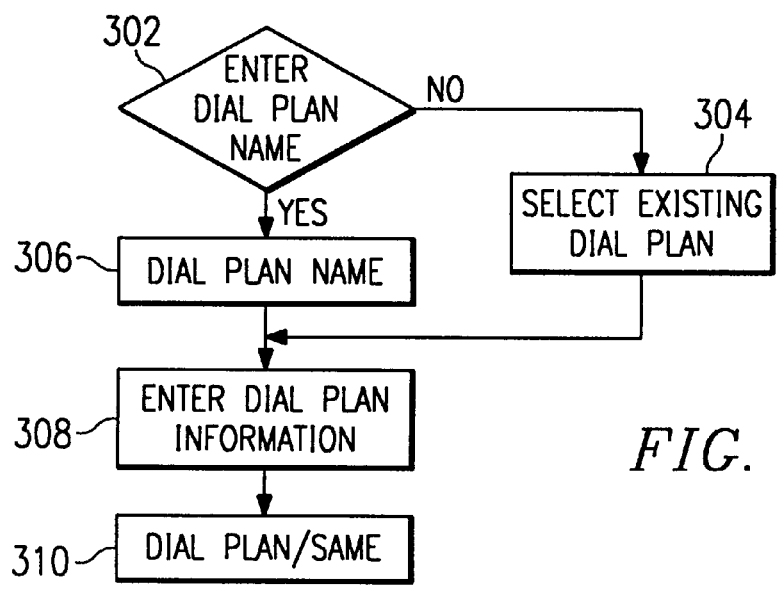
FIG. 24 illustrates an example procedure that may be used to add or update a custom dial plan in the computer telephone system of FIG. 1.

FIG. 24 illustrates a flow chart of an example procedure for adding or updating a custom dial plan. In step 302, a dial plan name may be entered by the user. If a dial plan name is not entered, then the user may select an existing dial plan in step 304. If a user does enter a dial plan name, then that dial plan name is stored at step 306 and will be used for the dial plan. In step 308, all relevant information for the dial plan may be entered. Then, in to step 310, the dial plan may be saved in accordance with information added by the user.

Figure 25:
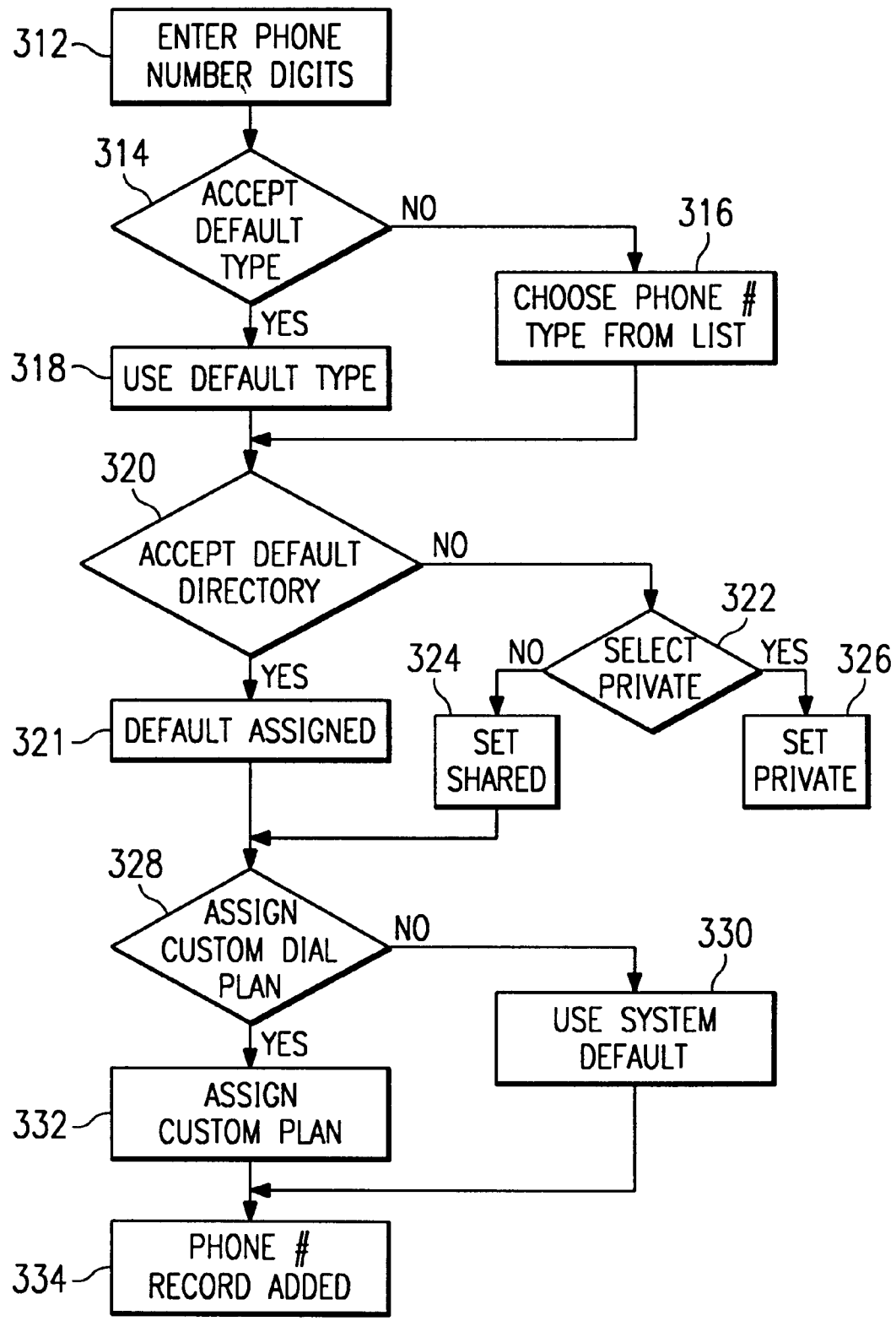
FIG. 25 illustrates an example of a process that may be used to add or update a phone number in a directory using the computer telephone system of FIG. 1.

FIG. 25 illustrates an example procedure for adding or updating a phone number in a directory. In step 312, the user enters the phone number digits. The user then has the option in step 314 of accepting a default type of number or creating a new type. If the user desires to create his own type, flow proceeds to step 316 where the user may choose a phone number type from the list. If the user desires to use a default type, the default may be assigned in step 318.

Execution from step 316 or 318 proceeds to step 320 where the user is given the option of accepting the default telephone directory in which the directory entry will be placed. If the user desires to use the default directory, that directory is assigned at step 321. If the user does not desire to use the default directory, the user is given the option in Step 322 of selecting a private directory. If the user desires to place the entry in a private directory, the user may select the appropriate private directory at step 326. If the user does not desire to select a private directory, the user may select a shared directory at step 324.

Execution then proceeds to step 328 from any of steps 321, 324 or 326. In step 328, the user may choose to assign a custom dial plan to the phone number. If the user does choose to assign a custom dial plan, that dial plan is assigned in step 332 using extended phone number information window 288 as described above. If the user does not desire to assign a custom dial plan to the. number, the system default dial plan is assigned to that number in step 330. From step 330 or 332 execution proceeds to step 334 where the phone number record is added to a database.

Figure 26:
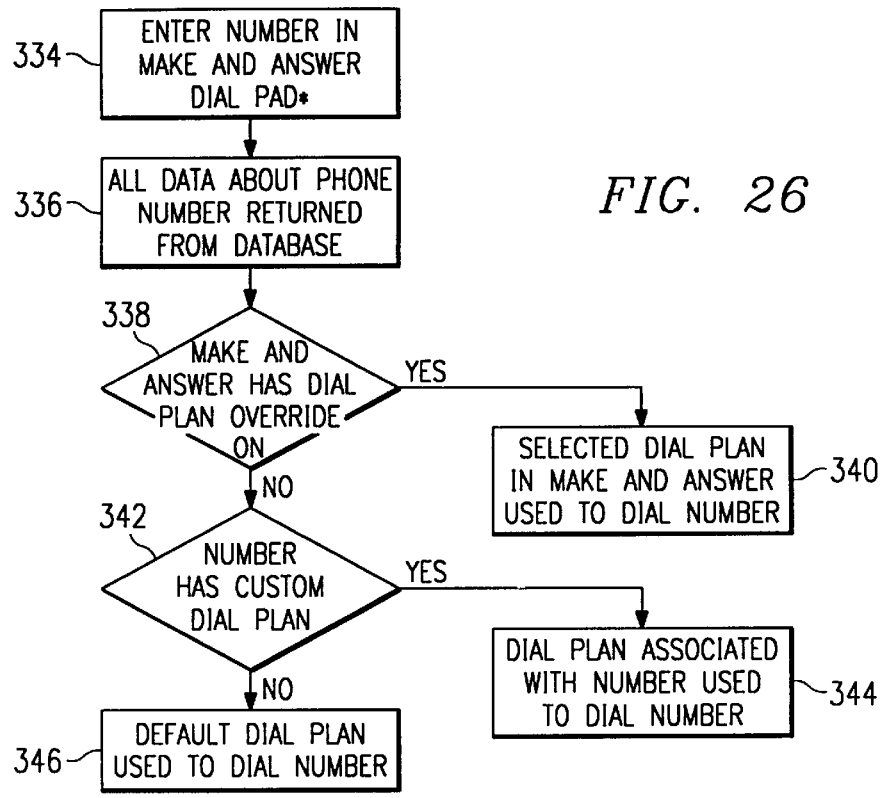
FIG. 26 illustrates a procedure that may be used to implement a dial plan override feature in the computer telephone system of FIG. 1.

FIG. 26 illustrates an example procedure for the dial plan override feature. In step 334, the user enters a phone number on the make and answer calls window dial pad. All data about the phone number entered may be returned from the database at step 336. After the data has been received, the system determines in step 338 whether the make and answer calls dial plan override is turned on. If dial plan override is turned on, then the override dial plan selected in dial plan select bar 300 will be used in step 340 to dial the number. If dial plan override is not on, the system then determines whether the phone number has a custom dial plan assigned to it in step 342. If a custom dial plan has been assigned, the dial plan that is associated with the number is used to dial that number in step 344. If no dial plan has been associated with the number, then the default dial plan may be used to dial the number in step 346.

COLOR CODED DIRECTORY ENTRY FOLDERS

Figure 27:
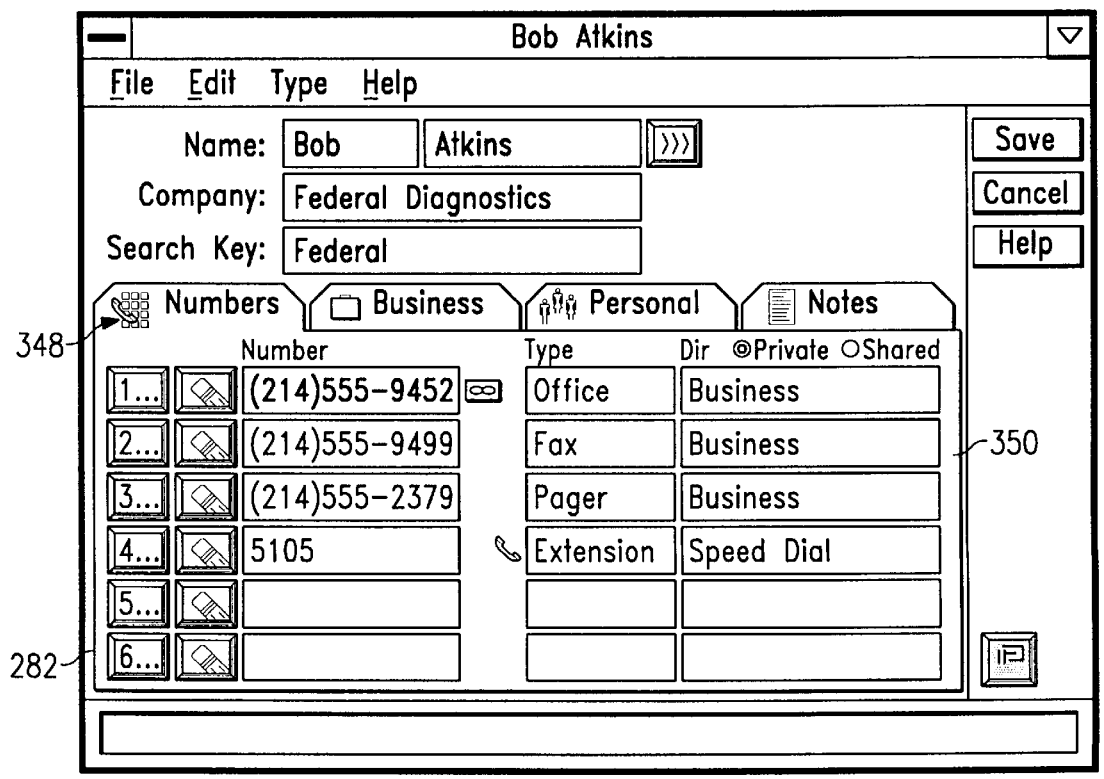
FIG. 27 illustrates a color coded folder that may be associated with a directory entry used in the computer telephone system of FIG. 1.
Figure 28:
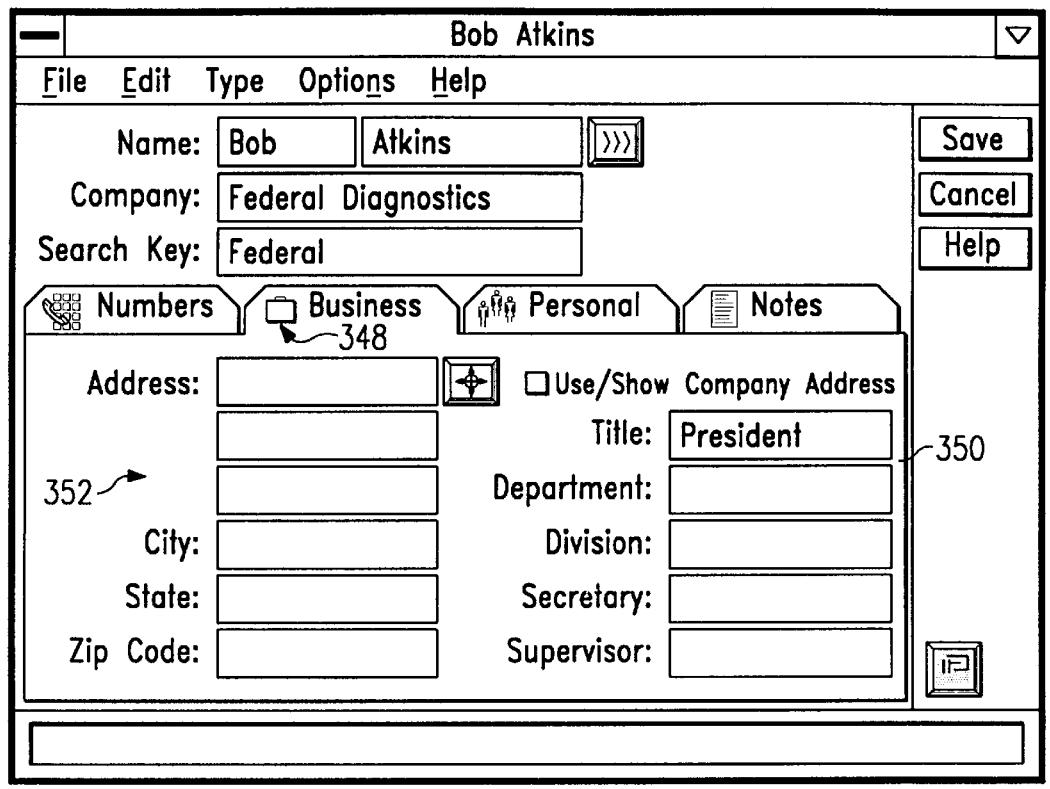
FIG. 28 illustrates a color coded folder that may be associated with a directory entry used in the computer telephone system of FIG. 1.
Figure 29:
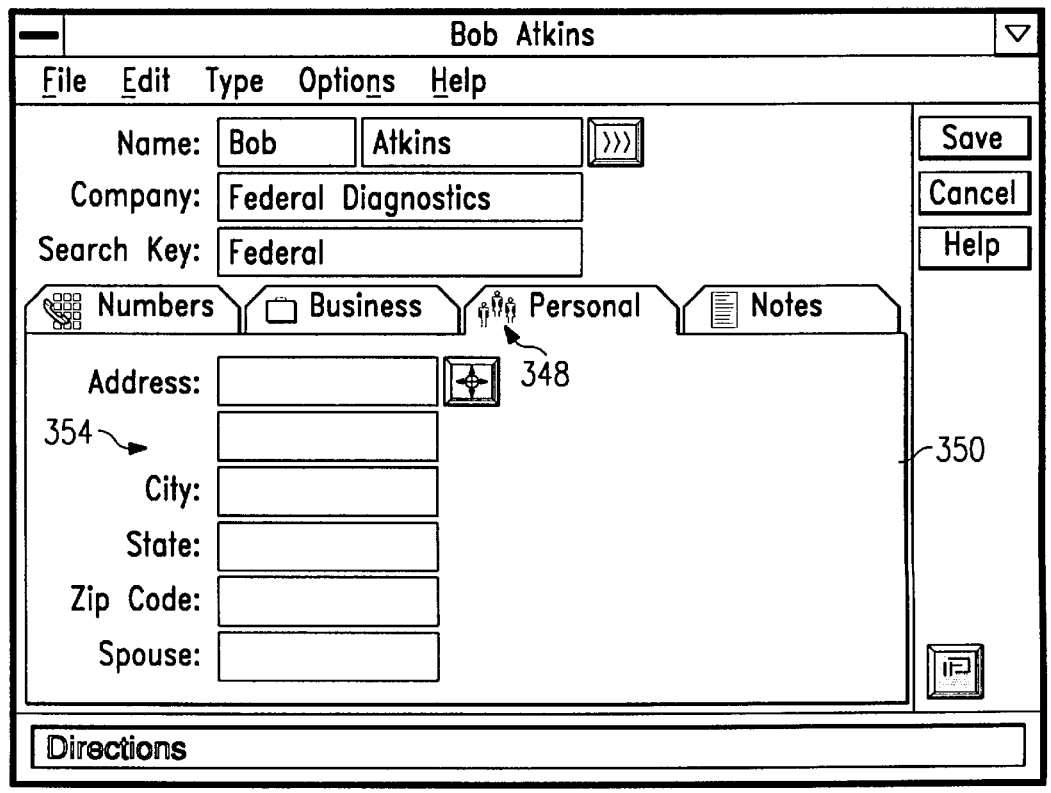
FIG. 29 illustrates a color coded folder that may be associated with a directory entry used in the computer telephone system of FIG. 1.
Figure 30:
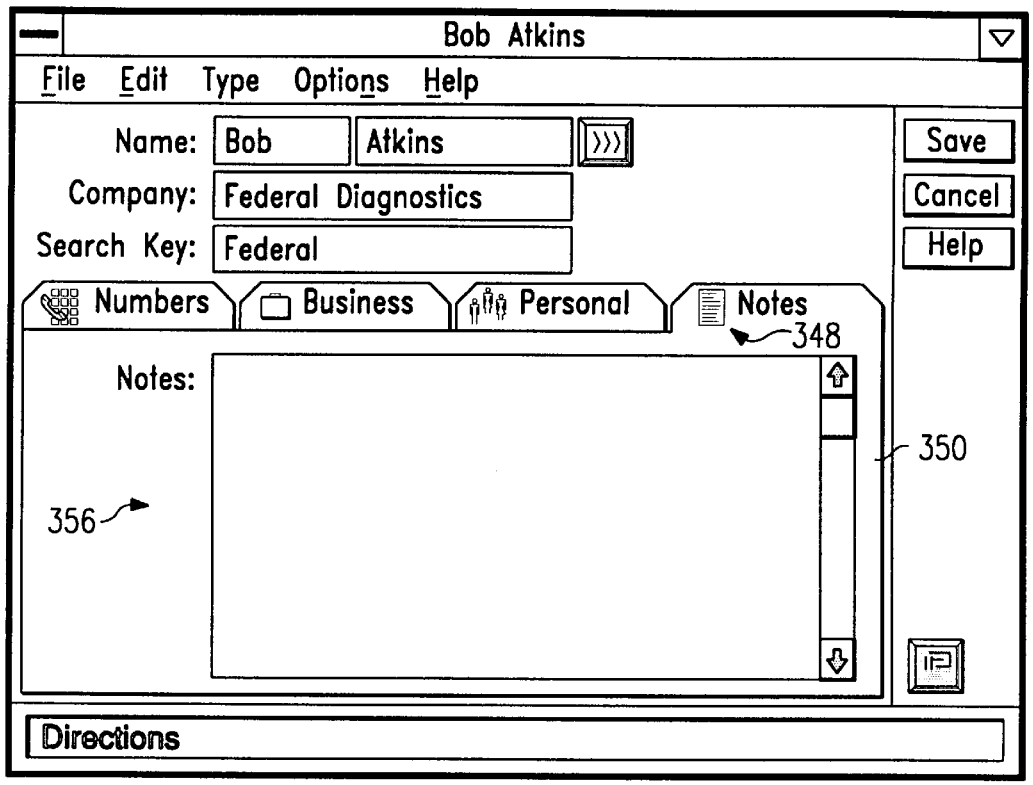
FIG. 30 illustrates a color coded folder that may be associated with a directory entry used in the computer telephone system of FIG. 1.

FIGS. 27 through 30 illustrate folders that may be associated with each directory entry. Again, the directory entry for Bob Atkins has been used as an example. FIG. 27 illustrates phone number information folder 282. FIG. 28 illustrates business information folder 352. FIG. 29 illustrates personal information folder 354. FIG. 30 illustrates notes folder 356. These folders illustrate the information that may be stored for each entry in a telephone directory.

The present invention employs several features to make computer telephone system 10 easier to use. First, folders 282, 352–356 have both a text entry and an icon on their tabs. Second, the folders may have color coded borders to indicate which folder is active.

Existing systems do not typically display both an icon and textual information on the tab of a folder. In this embodiment, both icons and text may be placed on the tabs of folders 282, 352–356 to allow a user to more easily determine which folder he desires to access.

Each folder 282 may also have a color coded folder border 350. In this example, phone number folder 282 has a blue border (not explicitly shown), business information folder 352 has a green border (not explicitly shown), personal information folder 354 has a red border (not explicitly shown) while notes folder 356 has a yellow border (not explicitly shown). These borders may only be displayed when the particular folder associated with the folder is active. Color coded borders allow a user to immediately recognize which folder is currently active on the screen simply by recognizing the color of folder border 350.

Folder icons 348 may also be color coded such that folder icons 348 have the same color as folder border 350 when the corresponding folder is currently being displayed. In this way, the user may easily associate the color coded folder border 350 with a particular folder using a similarly colored folder icon 348.

DIRECTORY IMPORTING

Figure 31:
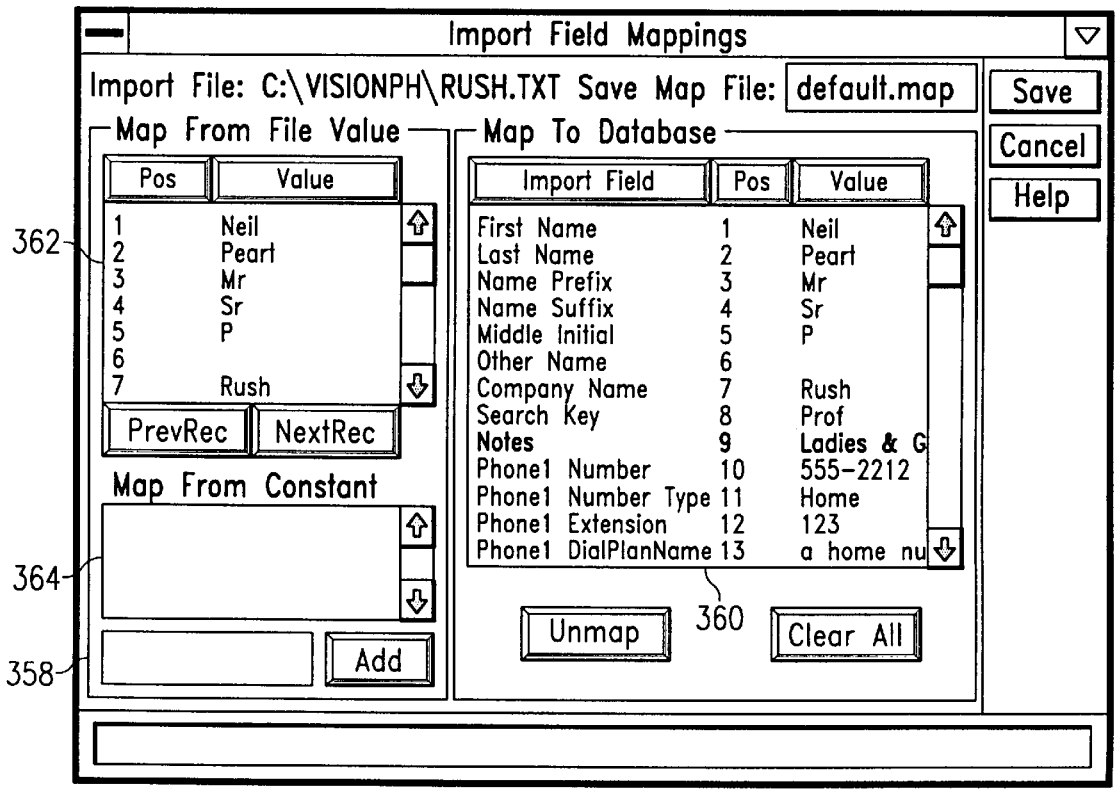
FIG. 31 illustrates an import window that may be used to import directory information from other applications for use with the computer telephone system of FIG. 1.

The present invention allows a user to import phone directories created for other applications. The user may import these records using, for example, a text file wherein each line of the text file has a record to be entered and each field in the record is separated by a delimiter which may comprise, for example, a comma. The user may design a map for the import using import map window 358 as illustrated in FIG. 31.

Import map window 358 comprises database map window 360, file value window 362 and constant window 364. In file value window 362, each field in a record from the file to be imported is displayed on a separate line of the window. A position number is assigned to each field in the record. If a field is missing, no entry will appear for that position. For example, in FIG. 31, position number 6 for the record being displayed was empty. The user may scroll through all fields in a record using the scroll bar on the right hand side of file value window 362.

The user can create a map for performing the import using database map window 360. The first column of database map window 360 displays the fields available for importation in a directory. The user may scroll through all fields available in a directory using the scroll bar on the right hand side of database map window 360. In column 2 of database map window 360, the user uses drag and drop from the file value window to the database map window.

For example, by viewing records to be imported in import window 358, the user can see that position 3 for imported records represents a name prefix. Accordingly, the user would pick up from position 3 and drop on the name prefix. Once a position for the imported field has been assigned to a particular directory field, the data associated with the current record from the import file being viewed may be displayed in column 3 of database map window 360. The user need not designate the position to be associated with each field using a single record. Instead, the user may view other records using the previous record and next record keys in import window 358. A user may then determine what type of data should have appeared, for example, at position 6 of an imported record. When the user has finished designating the mapping in database map window 360, the user may simply save the map to a file and perform the importation using the saved map.

Import window 358 makes importation easy for a user because the values to be imported are displayed in import window 358. The user is thus allowed to view the actual data to be imported, allowing easy creation of a mapping in database map window 360. Computer telephone system 10 has an additional novel feature. Often, a piece of data may not appear in an import file because the application from which the data is being imported did not support inclusion of that type of data. For example, some systems will not allow a user to specify a company name. If a user knows that the same company name is to be used for all records being imported, the user may specify that company name using constant window 364. The user may enter the constant to be used in constant window 364. That constant may then be associated with one of the fields shown in column 1 of database map window 360. When an importation occurs, the constant from window 364 will be used for that field in all records.

Figure 32:
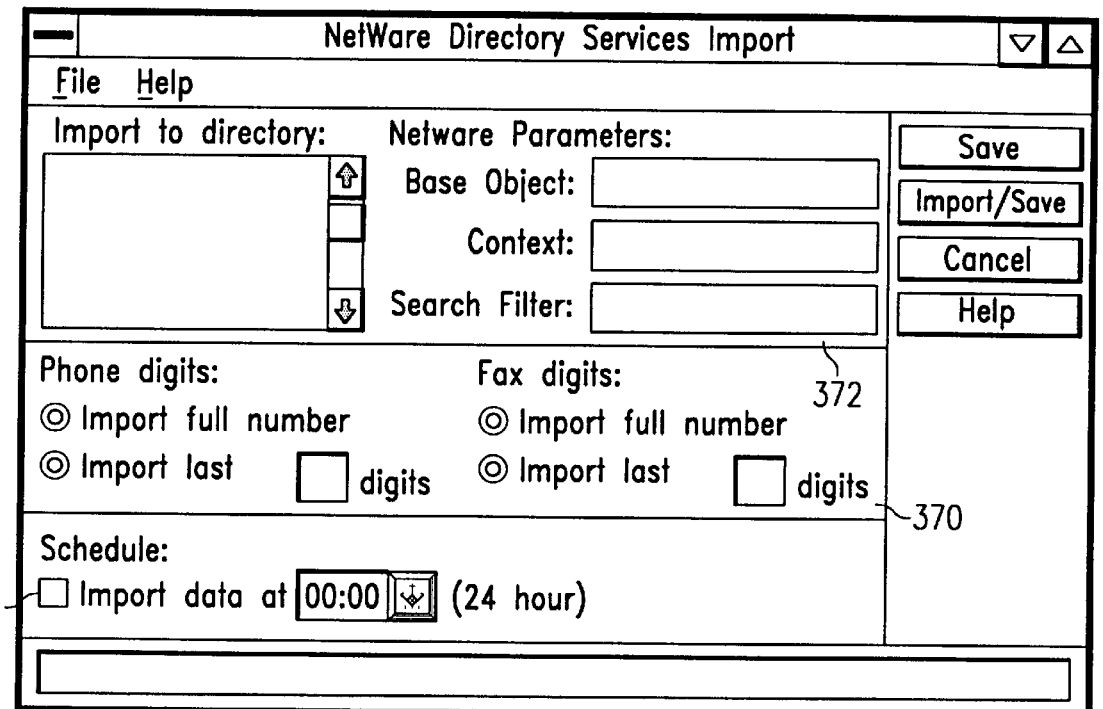
FIG. 32 illustrates a network directory services import window that may be used to import information using Novell's Netware Directory Service (NWDS) in the computer telephone system of FIG. 1.

The present invention also allows importation of Novell's Netware network directory services information. FIG. 32 illustrates Netware import window 366 that may be used to set parameters for a Netware network directory services search. Netware import window 366 comprises schedule window 368, phone number format window 370, and Netware parameter window 372.

In schedule window 368, a user may set a time to do a Netware directory services import each day. In phone number format window 370, the user may specify whether a full number is to be imported and if not, how many digits are to be imported. In Netware parameter window 372, the user may specify the base object, context, and search filter for the search and also the directory into which the data may be imported.

Figure 33:
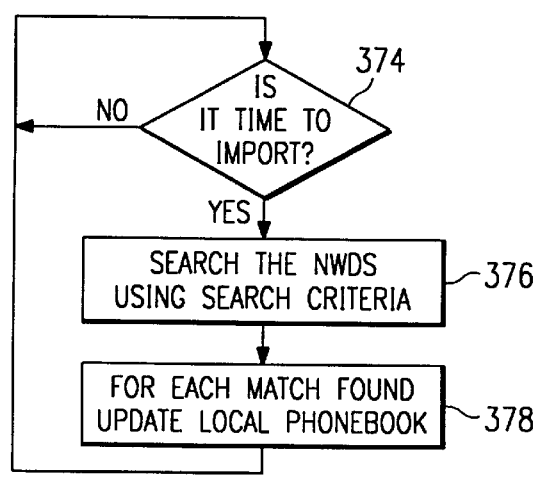
FIG. 33 illustrates an example of a procedure that may be used to implement the Netware/network directory services import feature for use with the computer telephone system of FIG. 1.

FIG. 33 illustrates an example Netware directory services search process that may be used in computer telephone system 10. The process begins at step 374 where it is determined whether it is time to do a Netware directory services import. If not, the process returns to step 374. If it is time to do a Netware directory services import, execution proceeds to step 376 where a network directory services search is performed using the search criteria previously entered by the user. After the search has been completed, the user's phone book is updated at step 378 for each match found during the search in step 376. After step 378, the process may repeat itself by returning to step 374. Because Netware directory services are commonly used, this aspect of the invention allows a user to use computer telephone system 10 of the present invention with an existing system. Users of computer telephone system 10 may thus have access to changes made in phone numbers by other network users that continue to use Netware network directory services.

MAKE AND ANSWER CALLS TOOL

Each user of computer telephone system 10 may be provided with a make and answer calls tool for making and answering telephone calls. This make and answer calls tool has many novel features which make a telephone easy to use, more efficient to use, and more powerful. The make and answer calls tool runs as one of the application programs 20 described previously.

SIMULTANEOUS CALL DISPLAY—ALL ACTIVE CALLS DISPLAYED IN WINDOW

Figure 34:
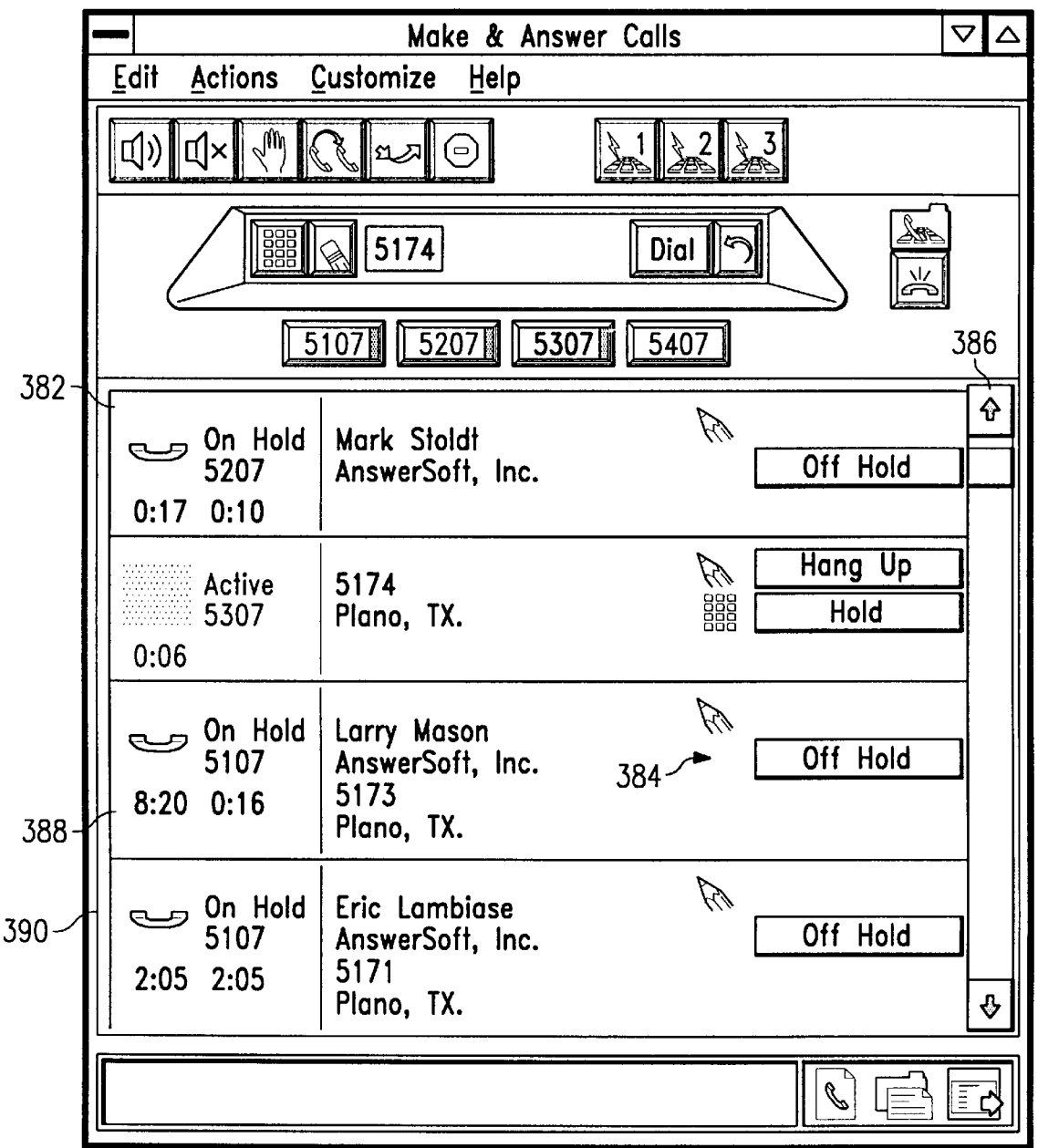
FIG. 34 illustrates a make and answer calls window that may be used with the computer telephone system of FIG. 1.

The present invention allows information for all calls currently in progress to be displayed on a user's screen. FIG. 34 illustrates make and answer calls window 380. Make and answer calls window 380 may include call window 390 for displaying information about each telephone call in progress.

In call window 390, a call object 388 may be displayed for each call in progress. Each call object 388 may include a call status object 382 and a call information/control object 384. Scroll bar 386 may be used to scroll call window 390 to view all calls displayed in call window 390.

Call status object 382 may include information about each call. For example, in the embodiment illustrated in FIG. 34, call status object 382 may display information as to whether a call is active, on hold, conferenced, etc. Call status object 382 may also display the corresponding user phone number on which the call was received or placed. For example, in FIG. 34, the call with Mark Stoldt is on extension 5207 and is "on hold". Call status object 382 may also display information as to how long a call has been in progress and as to how long a caller has been on hold. In the example illustrated in FIG. 34, the call from Larry Mason has been in progress for eight minutes twenty seconds while the call has been on hold for sixteen seconds.

Call status object 382 may also visually indicate whether a call is currently selected or not. When a call is selected, the user may perform various functions on the call. In the example illustrated in FIG. 34, call status object 382 indicates that a call is selected by displaying a light background for call status object 382. A call which is not selected may have a shaded background for call status object 382.

Call information/control object 384 displays information about the party to the call with whom the user is speaking. For example, call window 390 in FIG. 34 is displaying a call from Mark Stoldt of AnswerSoft, a call from extension 5174 in Plano, Tex., and a call from Eric Lambiase of AnswerSoft at extension 5171 in Plano, Tex. Call information/control object 384 also contains phone function buttons that may be controlled by the user for that particular call. For example, the calls that are on hold in FIG. 34 display the "Off Hold" option while the active call displays both the "Hang Up" and "Hold" option. As will be discussed herein, an important advantage of the present invention is that the options presented to the user are not static but depend on the state of the call. As such, a call that is already on hold does not have a "Hold" button or, in other words, a user is only presented with meaningful function choices at any state of a call.

The present invention, therefore, provides a telephone system 10 that may allow a user to simultaneously view all calls currently in progress with that user. The user need not remember which call was on which line because information about the call appears in call information/control object 384. The user also can easily determine how long a call has proceeded or how long a person has been on hold by looking at call status object 382. The present invention thus gives the user immediate visual access to important information about calls in progress.

Figure 35:
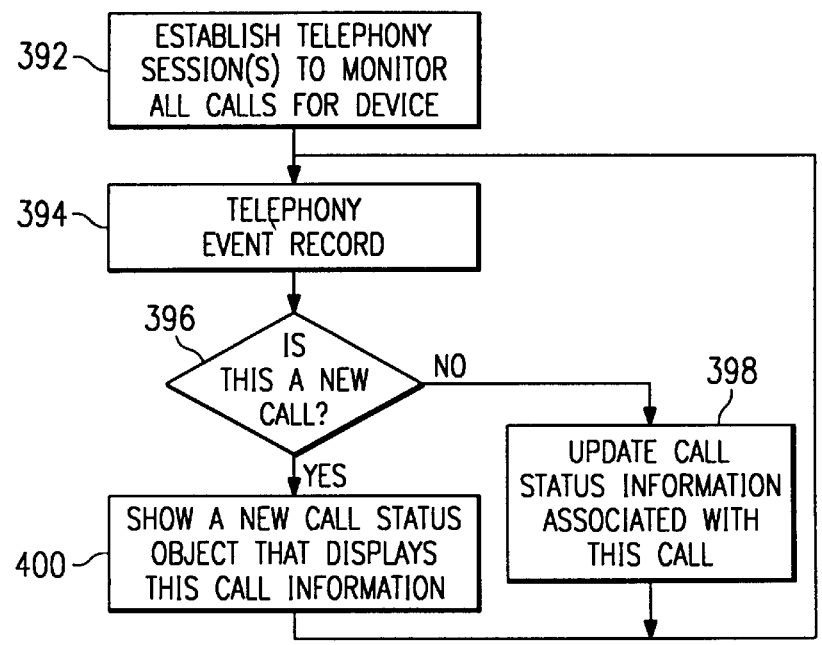
FIG. 35 illustrates an example of a process that may be used to display all active calls in a call window in the computer telephone system of FIG. 1.

FIG. 35 illustrates an example of a process that may be used to display all active calls in call window 390. In step 392, a telephony session is established to monitor all calls for a particular device that may be associated with a user. Then, a telephony event is received at step 394. The process next determines in step 396 whether the event is a new telephone call for the device in question. If a new call for the device has not been received, appropriate call status information associated with the call may be updated in step 398 and the process then may loop back to step 392. If a new call has been made or received, execution proceeds to step 400 where a new call status object is displayed in call window 390, along with the appropriate call information. Execution then loops back to step 392.

GROUPING OF CONFERENCE CALLS

The present invention allows call window 390 to dynamically change in size in accordance with the number of calls in progress. Call window 390 may also group conference calls together such that they are illustrated separately within call window 390. This feature of computer telephone system 10 will be described below with reference to FIGS. 36 through 40.

Figure 36:
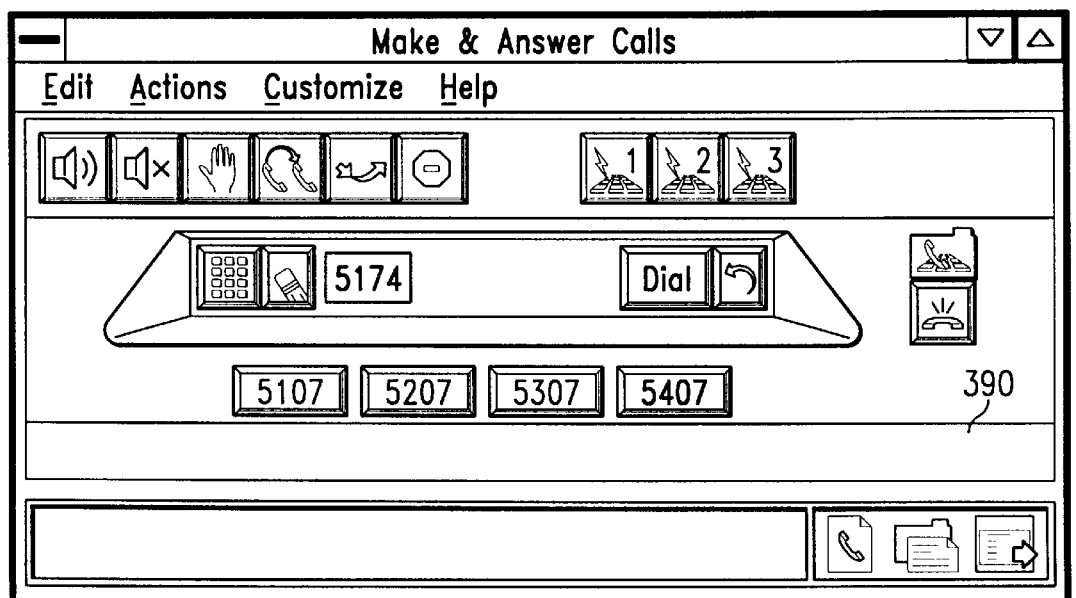
FIG. 36 illustrates a call window for a user with no calls in progress for the computer telephone system of FIG. 1.

FIG. 36 illustrates call window 390 with no calls in progress. With no calls in progress, call window 390 is small and may not display any information. Make and Answer calls window 380 still displays the extensions available to that user, a make a call button, redial button, and various other control functions available to the user such as do not disturb, speaker phone and the like.

Figure 37:
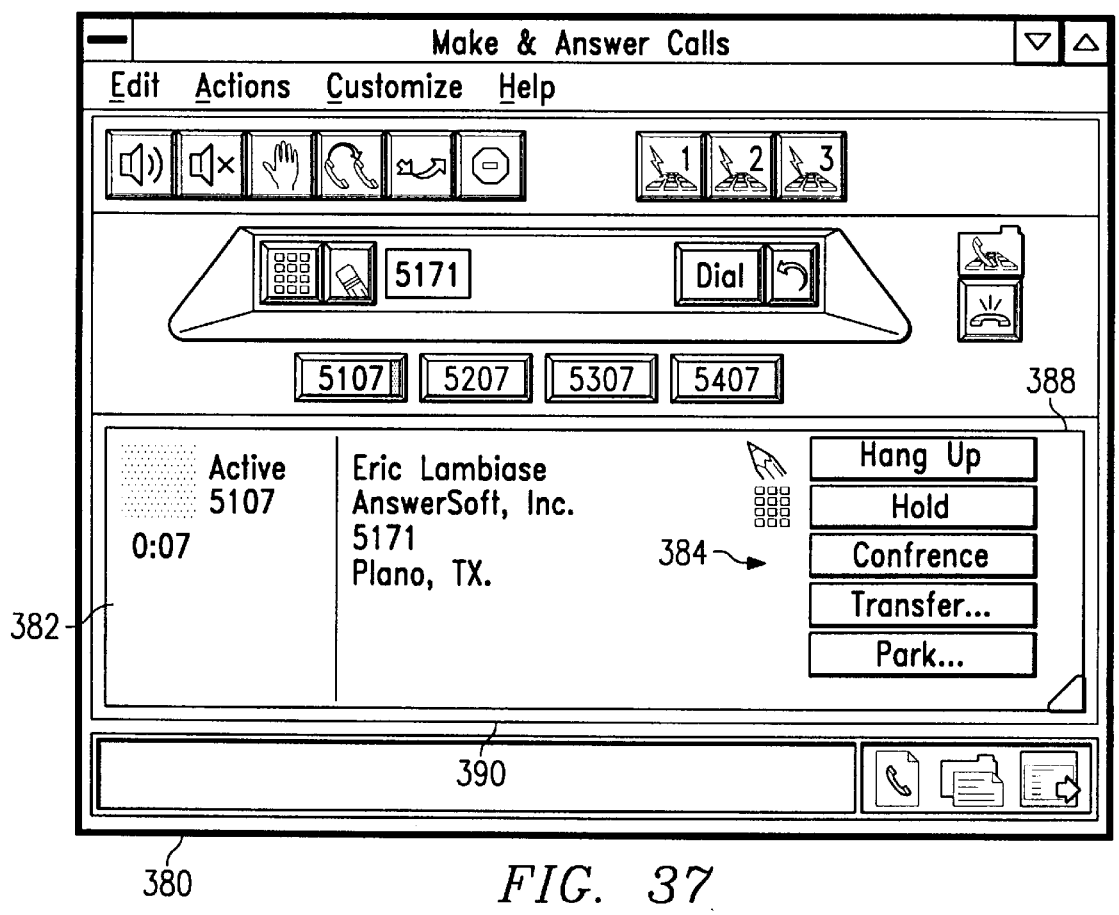
FIG. 37 illustrates a call window for a user with a single call in progress in the computer telephone system in FIG. 1.

FIG. 37 illustrates call window 390 with a single call in progress from Eric Lambiase at extension 5171 of Answer-Soft in Plano, Tex. Call window 390 has expanded to hold call object 388 for the call in progress. Additional active calls may be added at the bottom of call window 390. At this point, the single active call may be hung up, put on hold, conferenced, transferred or parked. As such, buttons for these functions and only these functions are displayed in call object 388.

Figure 38:
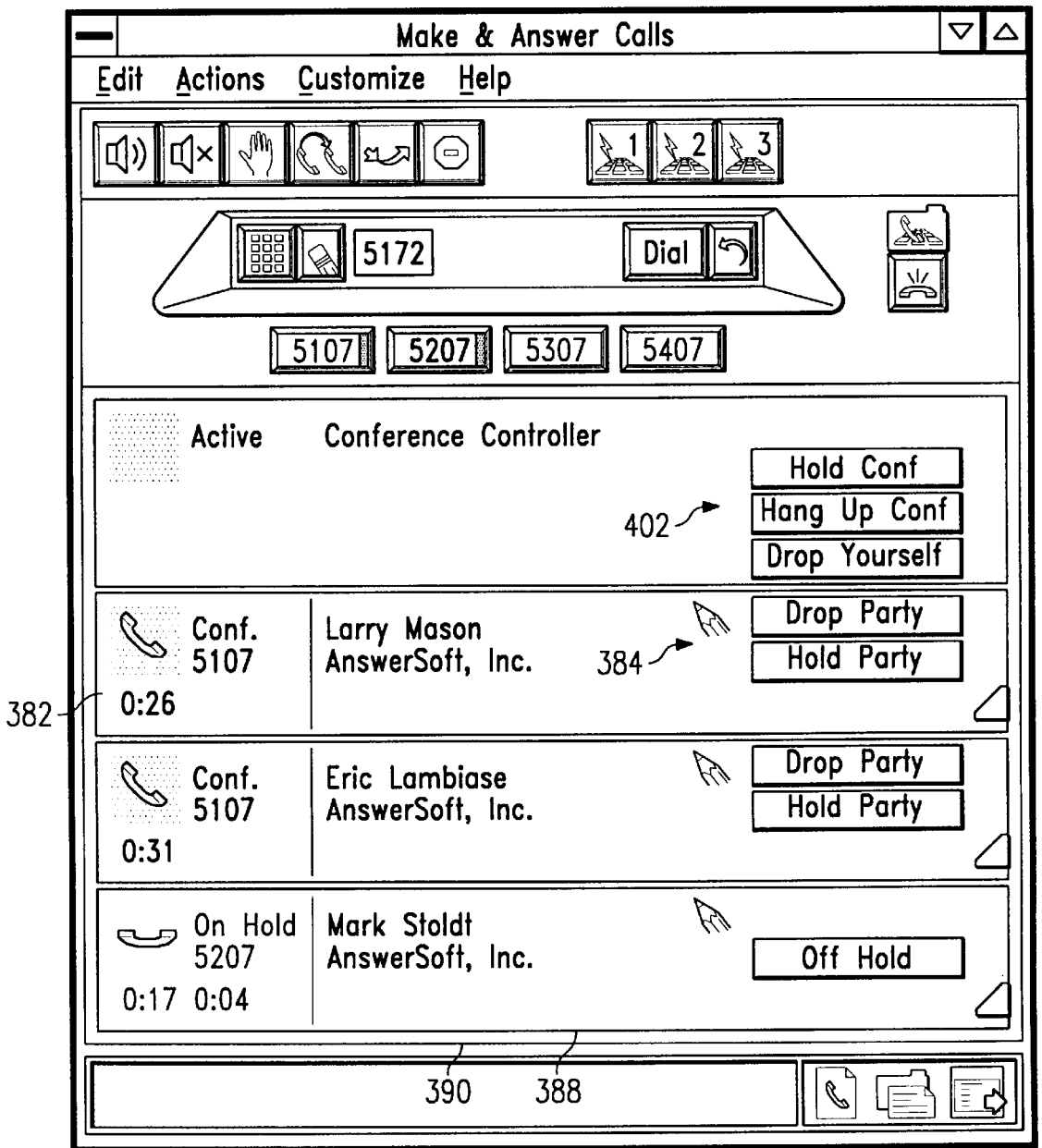
FIG. 38 illustrates a call window for a user with a conference call and another call and a non-conferenced call in progress using the computer telephone system of FIG. 1.

FIG. 38 illustrates call window 390 with a conference call in progress and one individual call in progress. In this example, the conference is between the user and two other parties—Larry Mason and Eric Lambiase. The individual call in the example is with Mark Stoldt.

When the user initiates a conference call, the call status objects 382 for the calls participating in the A conference are grouped together and displayed with conference controller 402. Non-conference calls can be displayed in a group as well. In the example illustrated in FIG. 38, the group of non-conference calls consists of only one call at the bottom of call window 390.

A user may have several conference calls in progress simultaneously. When this occurs, the user may be presented with multiple conference call containers. Each conference call container may contain a conference controller 402 and the call objects 388 for each call participating in that particular conference. By using a unique conference container for each conference call, these conference calls may be grouped together in discrete units so that the user may keep track of which parties are involved in each conference call and easily move between the conference calls.

Conference controller 402 provides function buttons to allow a user to place all parties to a conference on hold using the hold conference button. A user may also hang up the entire conference by pressing the hang up conference button. The user may release himself from the conference by pressing the drop yourself button. When a party is part of a conference call, that party may be individually dropped or placed on hold using the buttons in call information/control object 384 for that party.

Figure 39:
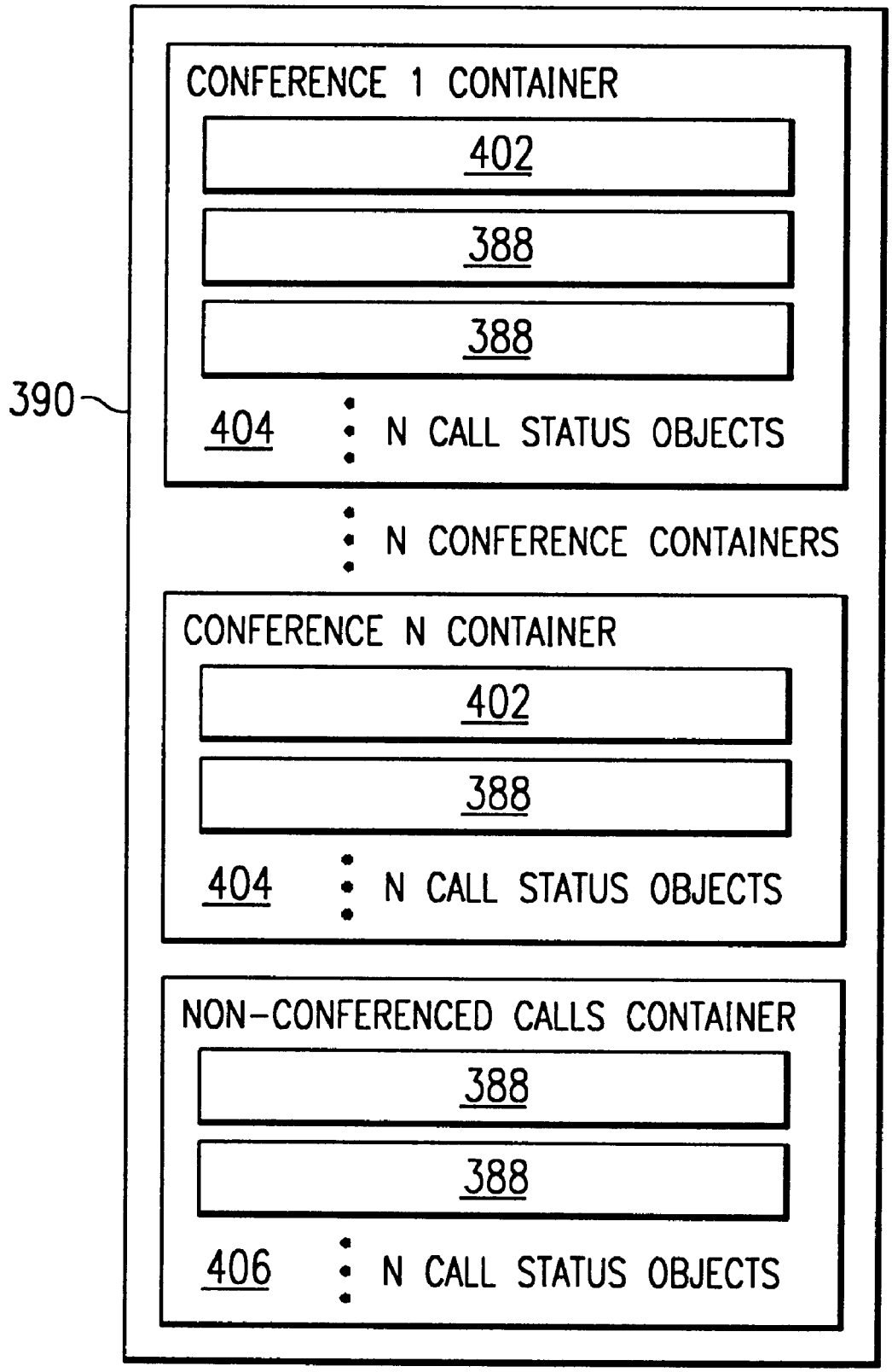
FIG. 39 illustrates a block diagram of the system used to arrange a call window for the computer telephone system of FIG. 1.

FIG. 39 illustrates how conference containers 404 and a non-conferenced calls container 406 may be arranged in call window 390. In this example, a conference container 404 is included for each conference call in progress. Each conference container 404 contains a conference controller 402 and a call object 388 for each party to that particular conference. Non-conferenced calls container 406 may be placed in call window 390 below the conference containers 404. Non-conferenqe calls container 406 may contain a call object 388 for each call in progress that is not part of a conference call.

A conference container 404 may only be visible when a conference is in progress. The size of each conference container 404 may increase or decrease as call objects 388 are added or removed from a conference container 404. Calls automatically move from the non-conference calls container 406 to the appropriate conference container 404 when those calls are placed in a conference state. In this embodiment, call objects 388 may always be added at the bottom of a container.

Figure 40:
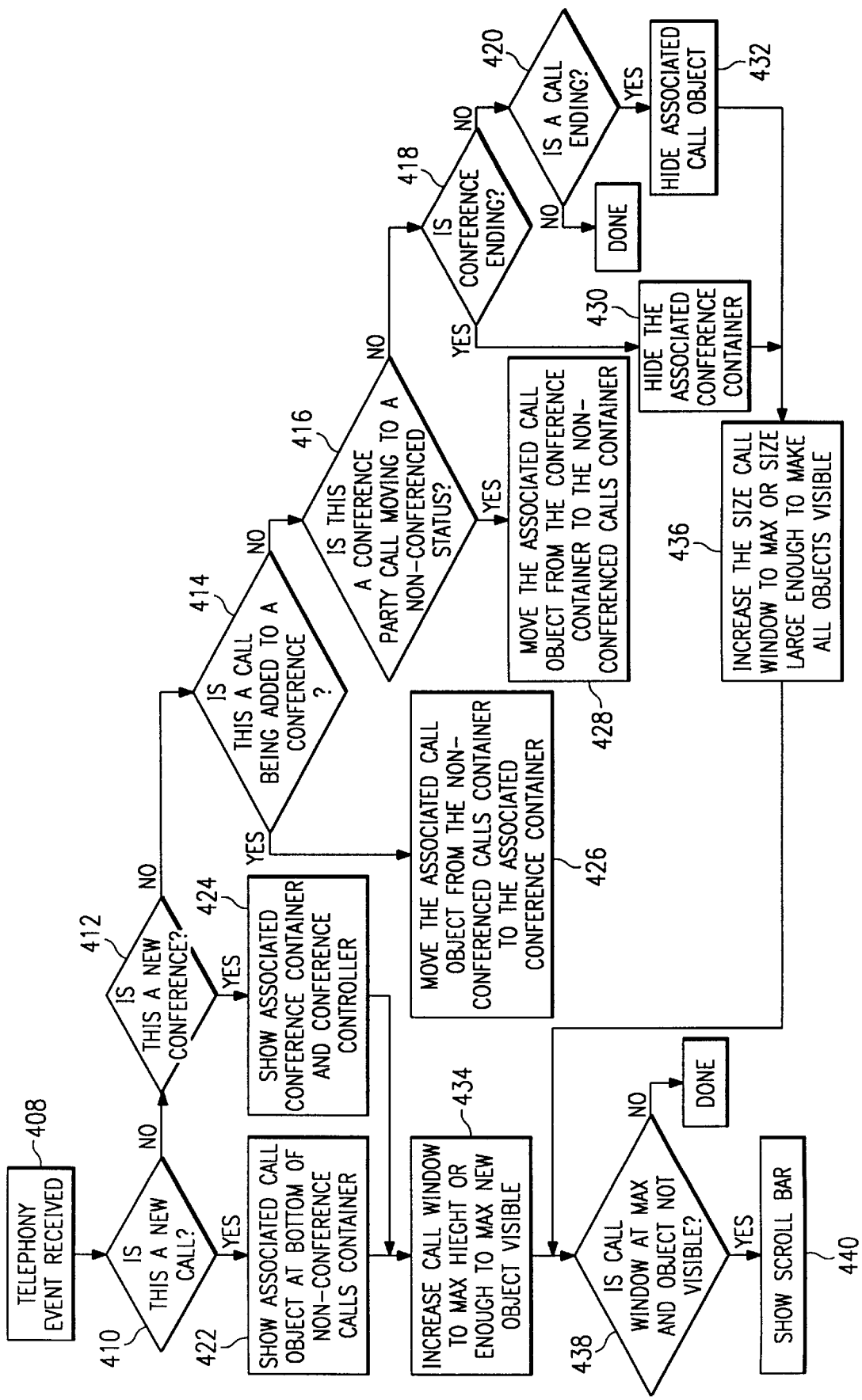
FIG. 40 illustrates a flow chart of a procedure used to update the call window of FIG. 39 in accordance with telephony events received by the computer telephone system of FIG. 1.

FIG. 40 illustrates an example of a procedure that may be used to update call window 390 in accordance with telephony events that may be received from telephony client service provider 26 and/or telephony server service provide 44. In step 408, a telephony event is received. Next, it is determined in step 410 whether the telephony event is a new call. If the telephony event is a new call, a call object 388 is created at the bottom of non-conference calls container 406 at step 422. Then, in step 434, call window 390 is increased to its maximum height or increased to a height high enough to display the new call object 388. Execution then proceeds to step 438 to determine whether the call window is at its maximum height with the new call object 388 not visible. If so, then scroll bar 386 is enabled in step 440. If not, then the procedure is finished.

Returning to step 410, if the telephony event was not a new call, then execution proceeds to step 412 to determine whether the telephony event is a new conference. If the event is a new conference, then step 424 is executed to show the associated conference container 404 and conference controller 402. Execution then proceeds to step 434 to execute the steps described above.

Referring again to step 412, if the telephony event received was not a new conference, it is then determined in step 414 whether a call is being added to an existing conference. If so, then step 426 is executed and the associated call object 388 is moved from the non-conference calls container 406 to the associated conference container 404.

Returning again to step 414, if the telephony event received was not a call being added to a conference, execution then proceeds to step 416 where it is determined whether a party to a conference call is being moved to a non-conferenced status. If so, then the call object 388 for the party being removed from the conference is moved from the corresponding conference container 404 to the non-conference calls container 406 at step 428.

Returning again to step 416, if the telephony event received was not a conferenced party moving to a non-conferenced status then it is determined in step 418 whether a conference is ending. If a conference is ending, then step 430 is executed where the associated conference container 404 is hidden. Next, the size of call window 390 is decreased to a size large enough to make all call objects 388 visible at step 436. Execution may then proceed to step 438.

Returning again to step 418, if the telephony event received was not the end of a conference, then execution proceeds to step 420 where it is determined whether the event was the end of a call. If not, then the procedure terminates. If so, step 432 is executed where the associated call object 388 is hidden. Execution then continues to step 436. It should be noted that in each case where the size of call window 390 is adjusted due to a new call, a new conference beginning or a call or, conference ending, that the call objects 388 are rearranged in any manner desired. The illustrated embodiment provides one example of how the windows may be rearranged.

DISPLAY OF CALL/CALLER INFORMATION— OPTIONAL DISPLAY OF INFORMATION IN EXPANDED/COMPRESSED MODE

The present invention allows the user to decide whether they wish to view the call information in call information/ control object 384 in an expanded mode or a compressed mode. In the expanded mode, a larger number of lines of call status information and a larger number of call control options are visible than in compressed mode. For example, in the embodiment illustrated in FIG. 41, up to 8 lines of call status information may be displayed in call information/ control object 384 and up to 6 call control options may be visible. In the compressed mode for this embodiment, however, only 2 lines of call status information may be displayed and up to 2 call control buttons may be visible.

Figure 41:
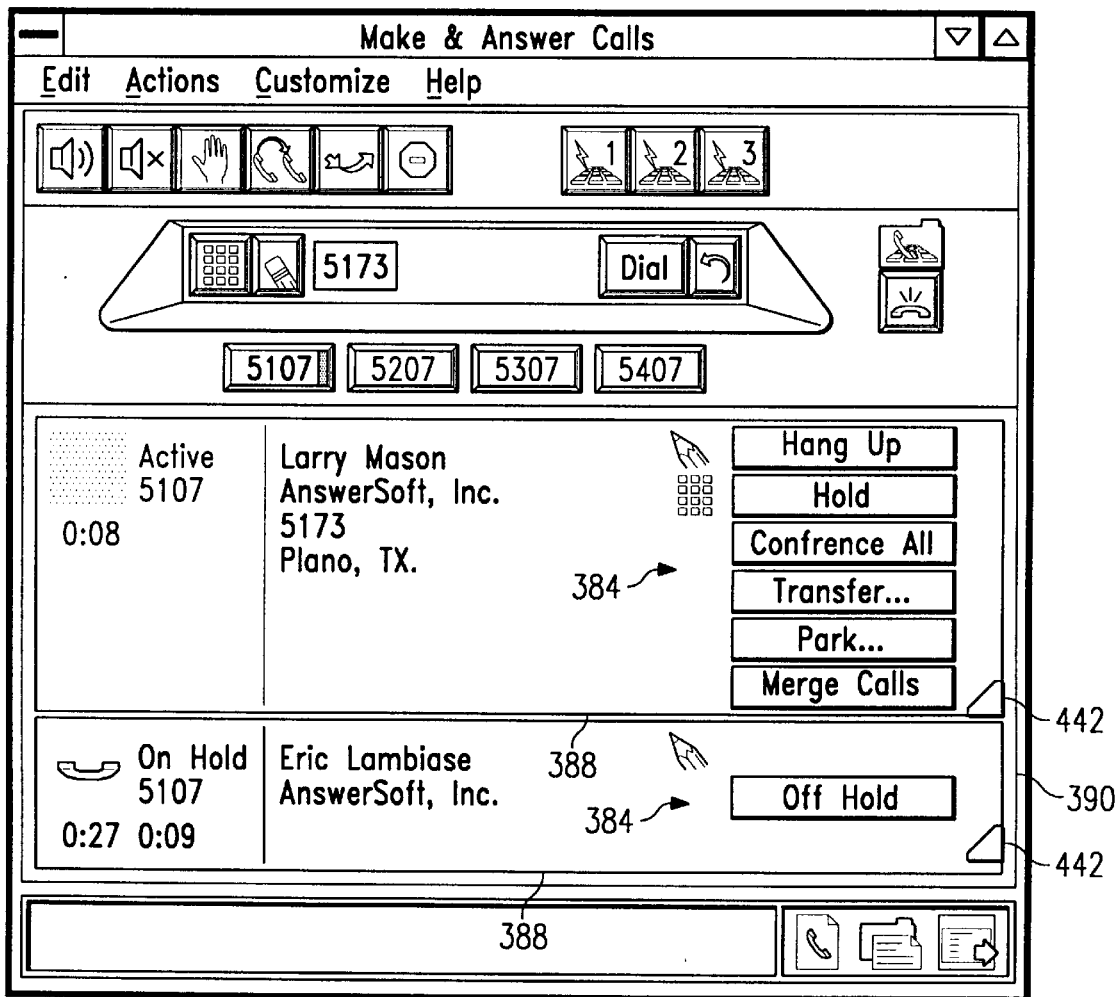
FIG. 41 illustrates how call information may be displayed in expanded or compressed form in the call window that may be used with the computer telephone system of FIG. 1.

For each call in progress, a user may choose whether to display that call in expanded mode or compressed mode. In FIG. 41, the user has chosen to display the call from Larry Mason in an expanded mode and the call from Eric Lambiase in a compressed mode.

Because the user may select an expanded or compressed display format for each call object 388, the user may decide how much information to display for each call according to his needs. This allows the most efficient use of the display area of call window 390. The user may change from expanded format to compressed format or from compressed format to expanded format using expand/compress icon 442. In the expanded mode, clicking on expand/compress icon 442 with mouse 64 may cause call object 388 to be displayed in compressed form. In compressed mode, clicking on expand/compress icon 442 with mouse 64 may cause call object 388 to be displayed in an expanded mode.

Figure 42:
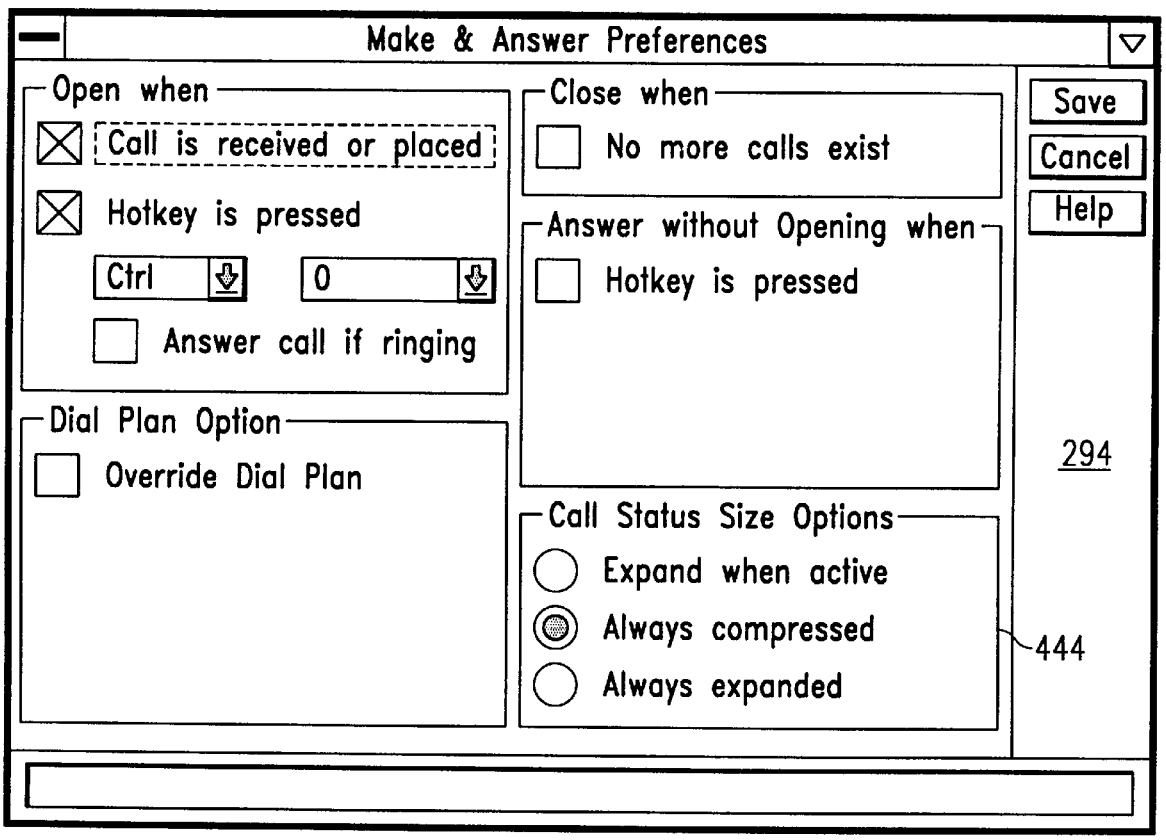
FIG. 42 illustrates a make and answer calls preferences window that may be used to set user preferences in the computer telephone system of FIG. 1.

The present invention also allows the user to designate a default display format in which each call object 388 is displayed when it is first placed in call window 390. The user sets these options using call status size option window 444 located in Make and Answer calls preferences window 294. FIG. 42 illustrates three options that may be used to specify a default initial size for call object 388. A call may be always displayed in compressed mode, always displayed in expanded mode or displayed in compressed mode when on hold, etc., and only displayed in expanded mode when the call is active. In the example illustrated in FIG. 42, the user has chosen to always display calls in compressed mode.

Figure 43:
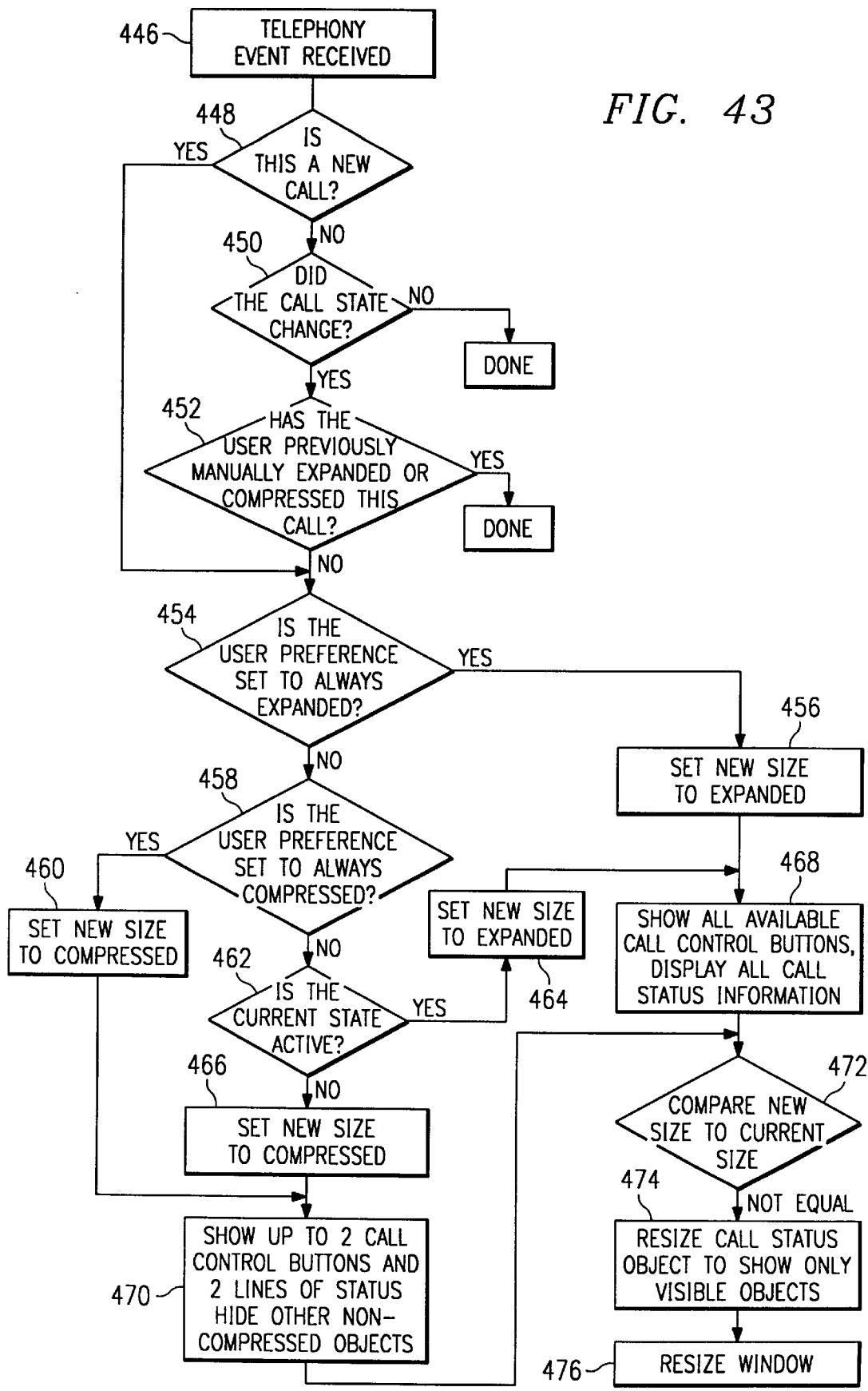
FIG. 43 illustrates an example of a procedure that may be used to change the size of a call object based upon a size preference setting set in the window of FIG. 42.

Thus, the size of call object 388 is determined based upon a size preference setting maintained by the user and/or by a user requested mode for a particular call. An example procedure by which computer telephone system 10 determines how to display a particular call object 388 is illustrated in FIG. 43. The procedure illustrated in FIG. 43 begins at step 446 where a telephony event is received. In step 448, it is determined whether this telephony event is a new call. If the telephony event is not a new call, execution proceeds to step 450, where it is determined whether the state of a call has changed. If the state of a call has not changed, then the expanded or compressed display format need not cause an adjustment and the procedure terminates. A state change includes a change in call display formats. If the state of a call did change, execution then proceeds to step 452, where the system may determine whether a user has previously manually expanded or compressed this call. If so, then the size remains unchanged and the procedure terminates. If not, than execution may proceed to step 454.

Execution also may proceed to step 454 from step 448 if a new call was received as a telephony event. In step 454, it may be determined whether a user preference has been set to always display a call in expanded form. If so, then the size, of the call may be set to expanded in step 456. If not, then execution proceeds to step 458.

In step 458, the system determines whether the user has set a preference to always display calls in a compressed format. If so, then the size of the call is set to be compressed in step 460. If not, then in step 462, the system determines whether the current state of the call in question is active. If so, then the size of the call is set to expanded form in step 464. If not, then the size is set to be compressed form in step 466. After steps 460 or 466, execution proceeds to step 470. After steps 456 or 464, execution proceeds to step 468.

In step 470, a call is displayed in compressed mode. In this embodiment, up to 2 call control buttons and 2 lines of status information may be displayed while other non-compressed objects are hidden. Execution then proceeds to step 472. In step 468, a call is displayed in expanded mode. In this embodiment, all available call control buttons and all call status information is displayed. Execution may then proceed to step 472. In step 472, the new size for display of a call is compared to the current (previous) size. If the sizes are not equal, the call status object is resized to show only visible objects in step 474. In step 476, call window 390 is resized to accommodate the larger or smaller size of the call that has been changed.

HIERARCHIAL DISPLAY OF INFORMATION IN COMPRESSED MODE

Figure 44:
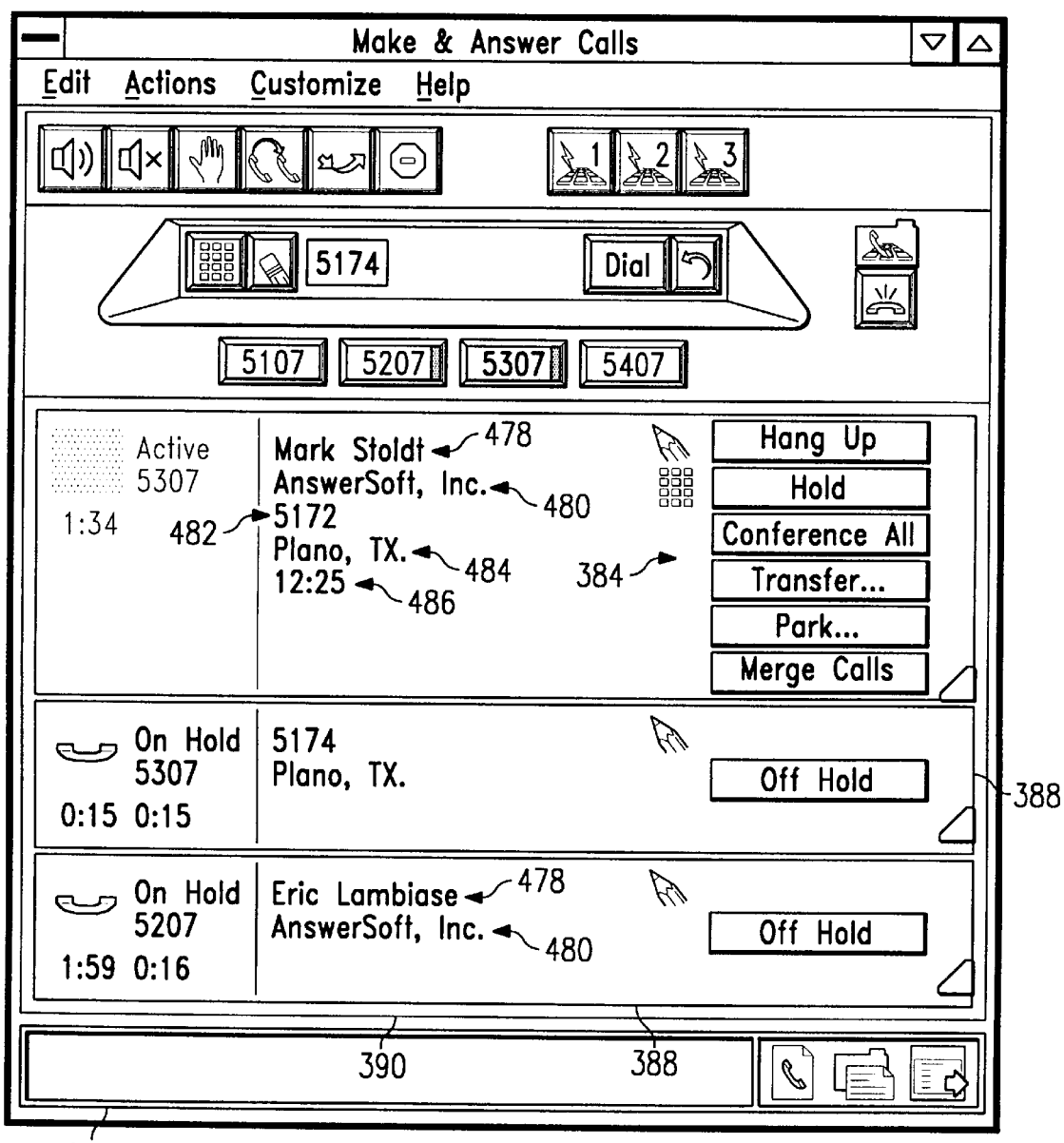
FIG. 44 illustrates call information that may appear in a call window used with the computer telephone system of FIG. 1.

The present invention employs a hierarchial display of information about a phone call in call information/control object 384. FIG. 44 illustrates the hierarchial display of call information possible with the present invention. FIG. 44 illustrates 3 calls in call window 390. The top call is illustrated in expanded mode while the bottom two calls are displayed in compressed mode.

In this example, five lines may be displayed in call information/control object 384 on five information lines: first information line 478, second information line 480, third information line 482, fourth information line 484, fifth information line 486.

In this example for the call objects 388 displayed in compressed mode, only first information line 478 and second information line 480 are displayed in call window 390. More or less lines of information could be displayed in either expanded or compressed mode.

As discussed above, information about a telephone call is displayed in a hierarchical manner. In addition, if information about a call is unavailable, other available information may be displayed. For example, the two most important pieces of information about a call may be the name of a caller and the company from which the caller is calling. If these pieces of information are available for a given call, they are displayed in call window 390 in that call's call object 388. Sometimes, however, this information may not be available. If not, it would be desirable to display other lower priority information that is available. For example, if the name of the caller with which the user is connected is not available, the user may desire for the display to show the phone number from which the caller is calling, or the city and state from which the caller is calling.

The present invention allows the highest priority information available about a call to be displayed. Instead of merely displaying empty fields when certain data is unavailable for a call, lower priority data is displayed in place of the missing data.

In the example illustrated in FIG. 44, five pieces of information about the caller are displayed in expanded mode on information lines 478 through 486 using directories stored in telephone system 10. The calls displayed in FIG. 44 will provide only examples of the types of information that may be displayed in call information/control object 384. Other information could be displayed in a hierarchical fashion without departing from the scope and teachings of the present invention.

In the call displayed in expanded mode in FIG. 44, the name of the party with which the user is speaking, Mark Stoldt, is displayed on first information line 478. The company, AnswerSoft, Inc., with which Mr. Stoldt is associated, is displayed on second information line 480. Third information line 482 displays the telephone number to which the user is connected. In other words, third information line 482 displays the number for the telephone from which Mr. Stoldt is calling. In this example, Mr. Stoldt is calling from an extension, 5172.

Telephone system 10 may obtain the number from which the caller is calling using automatic number identification (ANI) or Caller ID. This information may be provided to an application 20 by telephony client service provider 26 and/or telephony server service provider 44. After obtaining the telephone number from which the caller is calling, application 20 may determine the caller's name and company name by looking the number up in one of the directories associated with computer telephone system 10 by making a database access request that is then serviced by client database server 22 and server database service 40.

Fourth information line 484 in FIG. 44 may contain the city and state from which the caller is calling. The manner in which this information may be displayed is discussed below. Fifth information line 486 may display the local time in the city and state from which the. caller is calling. The way that this information is determined is also described below.

In this example, the hierarchy of the information is caller name, caller company name, caller telephone number, city and state from which caller is calling, and local time in the city and state from which caller is calling. In expanded mode, all of the available information is displayed in the hierarchial order. In compressed mode, however, a lesser number of information lines 478 through 486 is displayed in call information/control object 384. As described above, only 2 information lines 478 through 480 are displayed in this example.

When a lesser number of information lines are displayed in call information/control object 384, the highest priority available caller information is displayed. In the example in FIG. 44, the bottom call object 388 in call window 390 reflects a call from Eric Lambiase of AnswerSoft, Inc. In this case, the highest priority information, the caller's name and company name were available so that information was displayed. For the middle call object 388 displayed in call window 390, the telephone number of the caller did not appear in a directory so the caller's name and company were not available. In this example, however, the number from which the caller was calling, 5174, and the city and state from which the caller was calling—Plano, Tex.—were available and were displayed in call information/control object 384.

Figure 45:
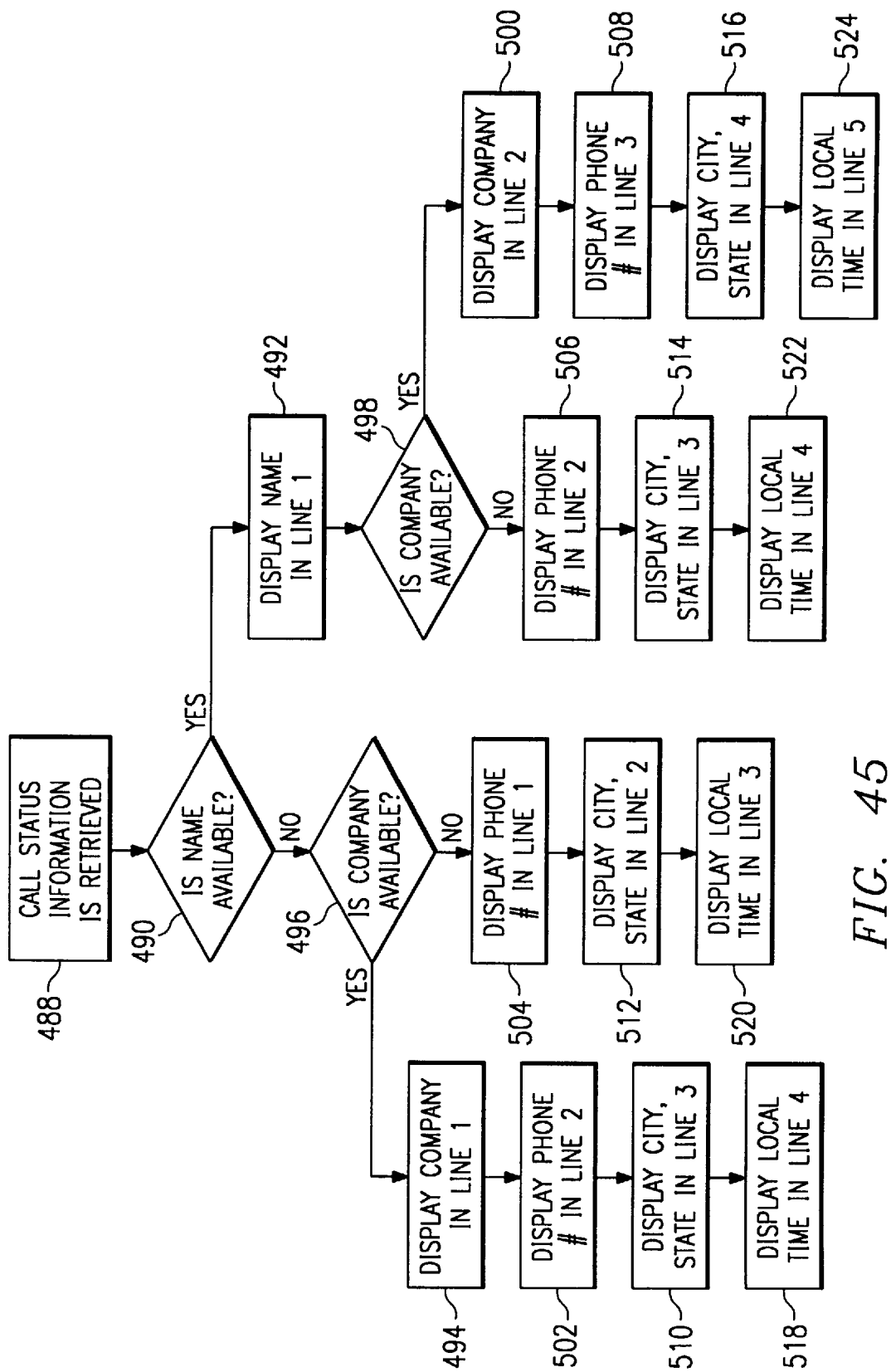
FIG. 45 illustrates an example of a process used to display call information in a hierarchical fashion in the call window illustrated in FIG. 44.

FIG. 45 illustrates a flow chart of an example method that may be used to display call information in a hierarchial fashion. The procedure begins with step 488 where information about the call status is retrieved. Execution then proceeds to step 490 where the procedure determines if the caller's name is available in one of the directories. If the name is available, then the caller's name is displayed in step 492 on first information line 478. If the caller's name was not available, the application 20 determines whether company information for the caller is available at step 496. If so, then execution proceeds to step 494 where the company information is displayed on first information line 478.

Normally, the caller's phone number, city and state from which the call originated, and local time will always be available. The procedure illustrated in FIG. 45 assumes that this information is available. If the information were not available, the procedure could check to see whether each piece of information was available and display only those items of information available on consecutive information lines 478 through 486.

Assuming that phone number, city and state, and local time information are all available, after step 494 has been executed, steps 502, 510 and 518 may be executed. In step 502, the phone number of the caller is displayed on second information line 480. In step 510, the city and state is displayed on third information line 482. In step 518, the local time of the caller is displayed on fourth information line 484.

Returning to step 492, after step 492 has been executed, it is determined in step 498 if company information is available. If company information is available, steps 500, 508, 516 and 524 are executed. In step 500, company information is displayed on second information line 480. The caller's phone number is displayed on third information line 482 in step 508. In step 516, the city and state from which the caller is calling are displayed on fourth information line 484. The local time in the city and state from which the caller is calling is displayed on fifth information line 486 in step 524.

Returning to step 496, if company information was not available, then steps 504, 512, and 520 are executed. The phone number of the caller is displayed on first information line 478 in step 504. Next, in step 512, the city and state from which the caller is calling is displayed on second information line 480. The local time in the city and state from which the caller is calling is displayed on third information line 482 in step 520.

Returning to step 498, if company information was not available, steps 506, 514 and 522 are executed. In step 506, the phone number from which the caller is calling is displayed on second information line 480. The city and state from which the caller is calling is displayed on third information line 482 in step 514. Next, in step 522, the local time in the city and state from which a caller is calling is displayed on fourth information line 484.

The procedure described in FIG. 45 provides only one example of how information may be displayed in a hierarchical manner on call object 388. Other information may be displayed and other hierarchies and/or procedures used without departing from the scope and teachings of the present invention. The hierarchical call information display method of the present invention allows efficient use of the available space in call window 390. Rather than leaving fields blank when certain information is unavailable, the information that a user may most desire to see when other information is unavailable is displayed.

DURATION AND HOLD TIMER DISPLAY

Figure 46:
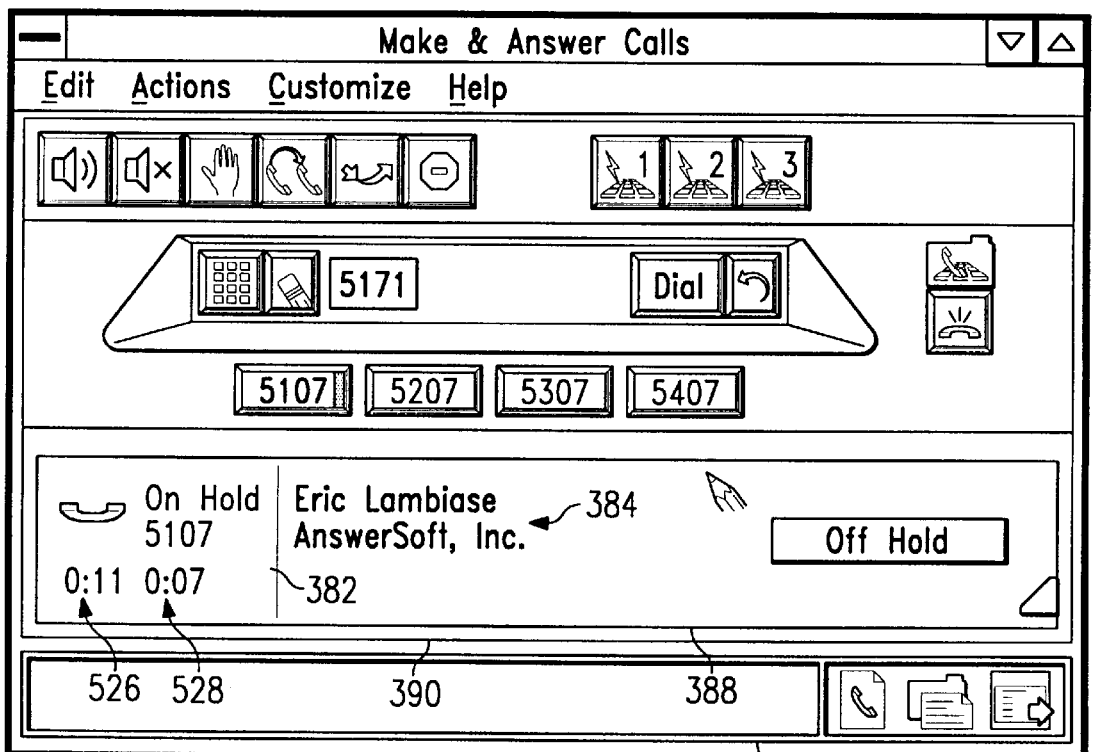
FIG. 46 illustrates a hold timer displayed for a call received by a user of the computer telephone system of FIG. 1.

The present invention may provide a call duration timer 526 and a hold timer 528 associated with each call status object 382 as illustrated in FIG. 46. A user often may desire to know the length of time that a call has been in progress. Call duration timer 526 may display this information so that a user may quickly determine how long a call with a particular party has been in progress.

A user may also want to determine how long a particular call has been on hold. This may be particularly important when a user is handling a number of calls in progress and needs to make sure that a call is not placed on hold for an extended period of time. The present invention may thus display a hold timer 528 for each call in that call's call status object 382. Hold timer 528 may start at zero each time a call is placed on hold and may continually tell the user how long that call has been on hold. Alternatively, a cumulative hold time may be displayed for that call. In such an implementation, hold timer 528 would be started and stopped each time a call is placed on hold, or taken off hold respectively. In the embodiment illustrated in FIG. 46, hold timer 528 resets to zero each time a call is placed on hold.

The amount of time for which a call is placed on hold may be logged using call logging. A total time that a call is on hold may allow a company to monitor performance of its employees. To properly log this information, the value of hold timer 528 may be logged each time a call is taken off hold or each time the user hangs up a call that was on hold.

Figures 47, 48:
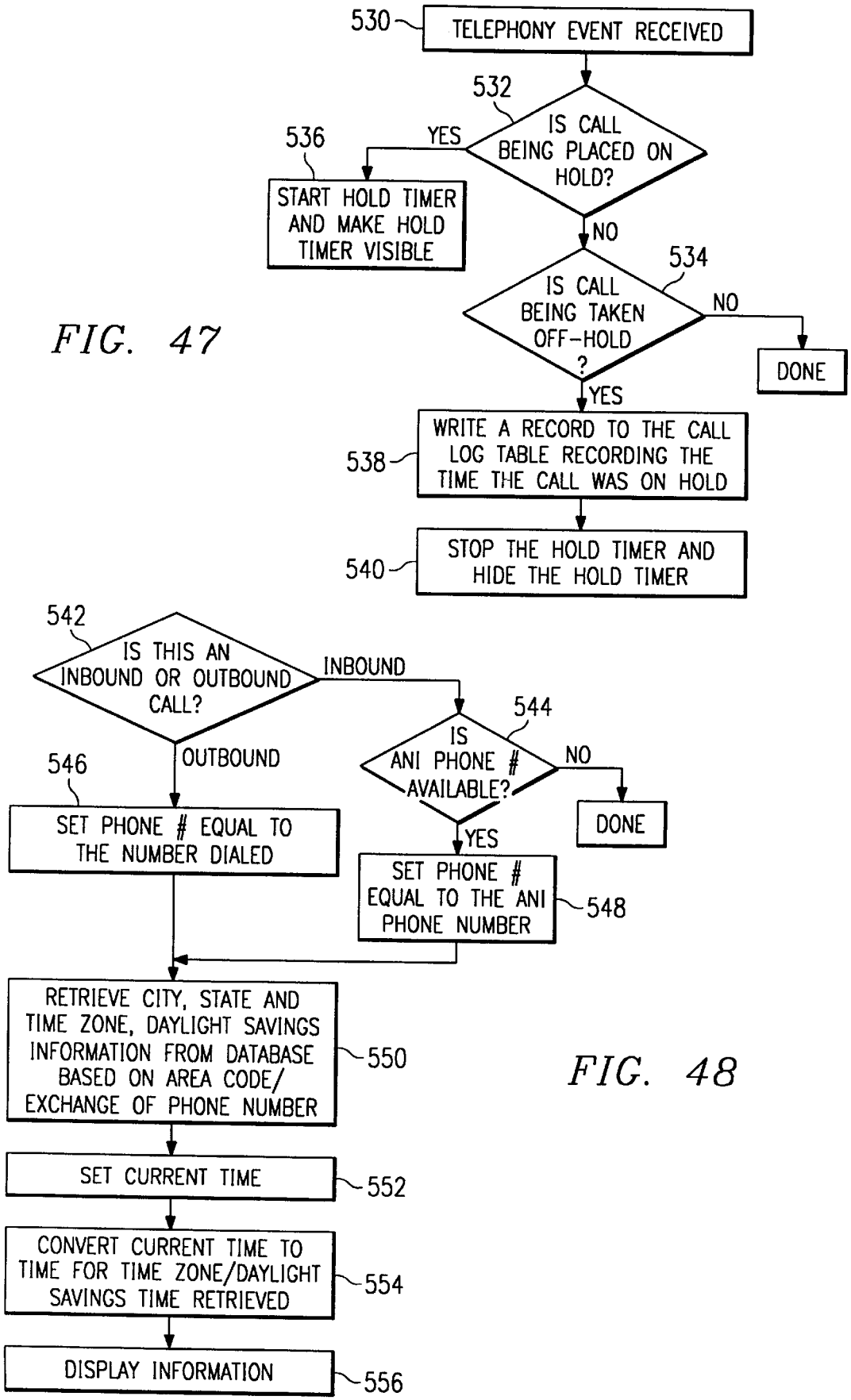
FIG. 47 illustrates a procedure used to maintain a hold timer for each call received or placed by a user of computer telephone system 10.
FIG. 48 illustrates an example of a procedure used to display the city and state and local time of a caller participating in a call with a user of a computer telephone system construction according to the teachings of the present invention.

FIG. 47 illustrates an embodiment of a procedure that may be used to control hold timer 528. The procedure begins in step 530 upon the receipt of a telephony event. Execution then proceeds to step 532 where it is determined whether a call is being placed on hold. If a call is being placed on hold, then step 536 is executed. In step 536, hold timer 528 is started at zero and made visible in call status object 382. If a call was not being placed on hold in step 532, then execution proceeds to step 534.

In step 534, it is determined whether the telephony event received is a call being taken off hold. If a call is not being taken off hold, then the telephony event does not affect hold timer 532 and the procedure terminates. If a call is being taken off hold, then step 538 is executed. A record is written to the call log table recording the amount of time for which the call was on hold in step 538. This information may be used for employee monitoring as described above. Next, hold timer 532 is stopped and erased in call status object 382 at step 540.

DISPLAY OF CITY AND STATE FROM WHICH CALL ORIGINATED

As described above in connection with FIG. 44, the city and state from which a caller is calling may be displayed in call information/control object 384. The city and state may be determined using the ANI or Caller ID of the incoming call. From the ANI or Caller ID telephone information, computer telephone system 10 determines the area code and exchange from which the call originated. Using this information, application 20 uses database client service provider 22 and/or database server service provider 40 to access a database containing the city and state associated with the area code and exchange of the phone number received for that caller. This information is retrieved from the database and displayed in call information/control object 384. The present invention also similarly supplies the same information for outgoing calls. In the case of an outgoing call, the dialed number is used to access and retrieve the needed information from the database. In addition, the system of the present invention can also capture and display any other information included in the ANI or Caller ID information. For example, this information can include, in some circumstances, the name of the calling business or the type of phone calling, such as a payphone, business phone or prison phone.

DISPLAY OF CALLER'S LOCAL TIME

The present invention also allows the local time in the city and state from which a caller is calling to be displayed for each caller with which the user has a call in progress. This information is displayed as illustrated in call information/control object 384. To determine the local time in the city and state of a caller, application 20 uses the local time of the user that is obtained using operating system 36 or operating system 38. Using the ANI or Caller ID information of the incoming call, application 20 determines the local time using a database access as described previously. The present invention also similarly supplies the same information for outgoing calls. In the case of an outgoing call, the dialed number is used to access and retrieve the needed information from the database.

The local time database may identify the time zone and daylight savings time status for each area code and telephone exchange. Because some states do not use daylight savings time, this information may be necessary to properly determine the local time. The daylight savings time information may include the range of dates for which a particular area code and exchange uses daylight savings time and when that area code and exchange uses standard time. The current date may be determined using, for example, a calendar function contained in operating system 36 or operating system 38.

FIG. 48 illustrates a flow chart of an exemplary procedure that may be used to determine both the city and state from which a call originates and a local time in the city and state from which a call originates. As used in these two sections, the term "originates" does not necessarily mean that the caller originated a call. The term is merely used to identify a caller who has a call in progress with a user of computer telephone system 10 The procedure in FIG. 48 begins in step 542 where it is determined whether a call is an inbound or outbound call. If the call is an inbound call, application 20 may determine whether an ANI or Caller ID phone number is available for that call at step 544. If an ANI or Caller ID phone number is not available, the local time and city and state of the call may not be determined so the procedure terminates. If an ANI or Caller ID phone number is available, the phone number is set equal to the ANI or Caller ID phone number in step 548. Execution then proceeds to step 550.

Returning to step 542, if the call was an outbound call, step 546 is executed. In this step, application 20 sets the phone number equal to the phone number that the user dialed. Execution then proceeds to step 550. In step 550, the city, state, time zone, and daylight savings time information are retrieved using a database access based upon the area code and exchange of the phone number. The current time where the user is calling from is obtained in step 552.

In step 554, the current time is converted to the time in the city and state where the call originates using the time zone and daylight savings time information retrieved from the database of area codes and exchanges. Execution then proceeds to step 556 where the information is displayed in call control/information object 384.

DYNAMIC CALL CONTROL FEATURES— DISPLAY OF VALID OPTIONS ASSOCIATED WITH EACH CALL

One advantage of the present invention is that call control buttons 558 are displayed for each call object 388. A user may, therefore, perform actions on a call simply by clicking mouse 64 on one of the call control buttons 558 associated with that particular call's call object 388. If call control buttons 558 were not provided for each call object 388, then the user would have to perform a sequence of steps to accomplish the desired operation. In addition, by providing call control buttons 558 with each call object 388, a user is less likely to become confused and perform an incorrect operation on a particular call.

Another advantage of the present invention is that call control buttons 558 are only displayed in call object 388 for functions that are valid in a certain state. Because only valid options are presented, the user is prevented from attempting to perform an erroneous function. For example, it would not make sense for a user to place a call on hold when that call is already on hold. Accordingly, when a call is on hold a call control button for hold is not displayed in call control/information object 384 for that call.

Figure 49:
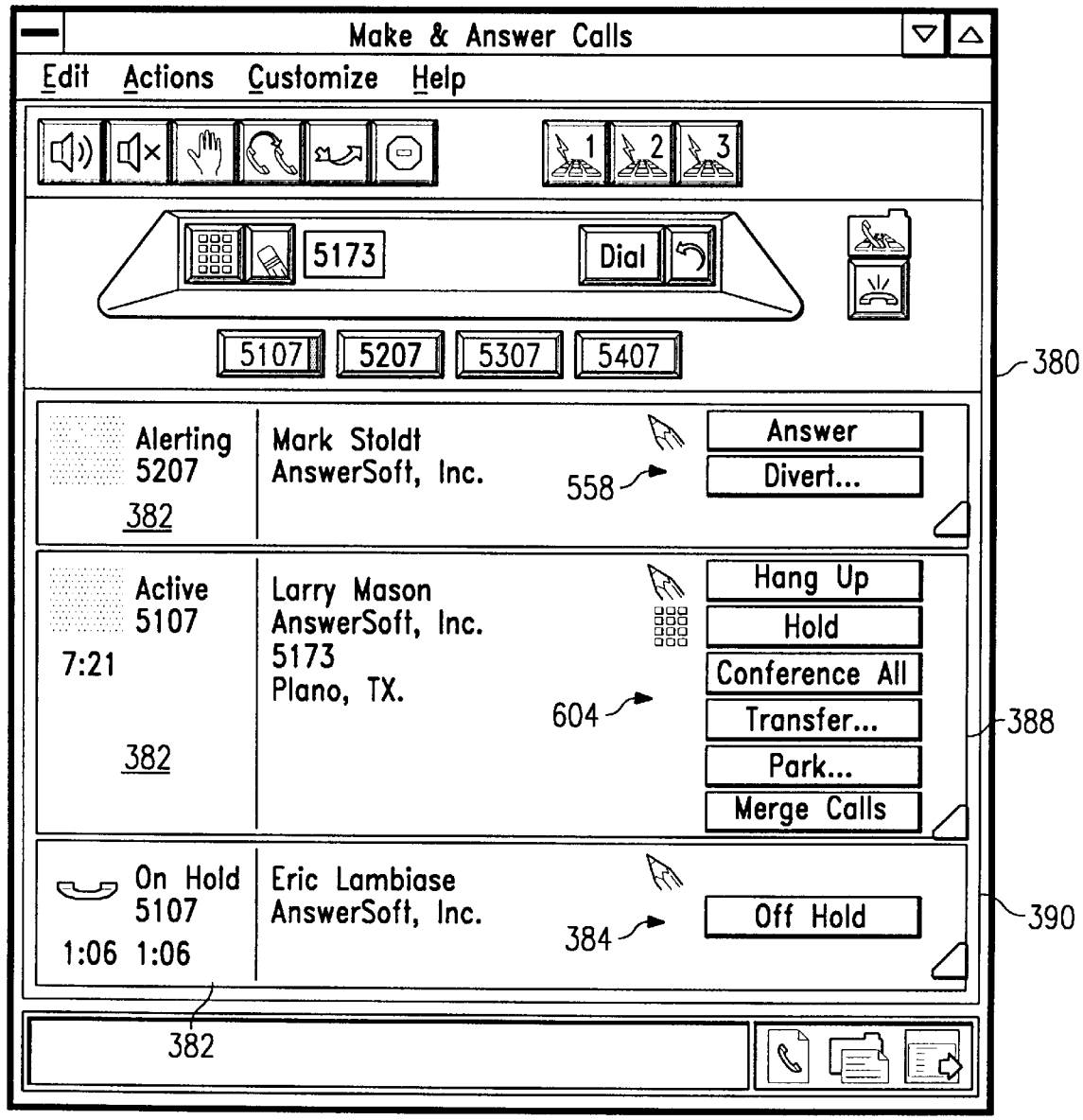
FIG. 49 illustrates how a user of computer telephone system 10 may only be presented with valid telephone functions depending upon the various states of a telephone call.

FIG. 49 illustrates examples of this feature. FIG. 49 illustrates call objects 388. The upper two call objects 388 are displayed in expanded mode while the lower call object 388 is displayed in compressed mode. In compressed mode, only the one or two most useful call control buttons 384 are displayed in call object 388.

The first call object 388 is in an alerting state as indicated by call status object 382. The present invention distinguishes between calls in an alerting state and calls in a ringing state. A call in an alerting state is one from a caller attempting to contact the user of computer telephone system 10. A call in a ringing state indicates a ringing call originated by the user.

Two valid call control buttons 588 are provided for a call in an alerting state as illustrated in FIG. 49. An answer call control button 558 allows the call to be answered while diverting call control button 558 diverts the call. A call may be diverted, for example, to a phone mail system or to a secretary or receptionist.

The second call with Larry Mason illustrated in FIG. 49 is in an active state. In other words, the user may be currently talking to Larry Mason. In an active state, six call control buttons 558 are presented to the user. Hang up call control button 558 allows the user to hang up the call with Larry Mason. Hold call control button 558 allows the user to put Larry Mason on hold. Conference all call control button 558 may allow the user to create a conference among all presently non-conferenced calls in progress. Transfer call control button 558 allows the user to transfer Larry Mason's call to another user. Park call control button 558 allows the user to park the call. Merge calls call control button 558 allows the call from Larry Mason to be merged with another call. The concept of merging calls is described below.

The valid call control buttons 558 displayed in FIG. 49 are only examples. Other valid call control buttons 588 could be included for a specific call state in call object 388. In addition, if the user's telephone does not support certain call control functions, the system will not display the corresponding call control buttons 558 in call object window 388. For example, if the phone used by the user could not be used to transfer a call, the transfer control button 558 would be omitted from call control object 388.

In the embodiment illustrated in FIG. 49, the ability to dynamically display only valid call control buttons 558 may be implemented using a state table. The values in a state table depend upon the functions supported by each telephone and upon the functions supported by PBX Switch 18 and or a Centrex System. In this example, a call state table for an AT&T implementation is illustrated in FIG. 50. For this embodiment, the state information relevant to enabling or disabling call control buttons 558 includes the state of a call, whether a conference exists, whether a conference controller is enabled, and the number of active calls. Depending upon this state information, a particular call control button 588 is enabled or disabled. For example, as illustrated by line 15 in FIG. 50, when a call is active and a conference controller is not enabled, the hold call control button 588 is enabled. If an entry is not found in a state table, the call control button 558 is disabled in this embodiment. A different state table may be provided for each switch implementation.

Figure 51:
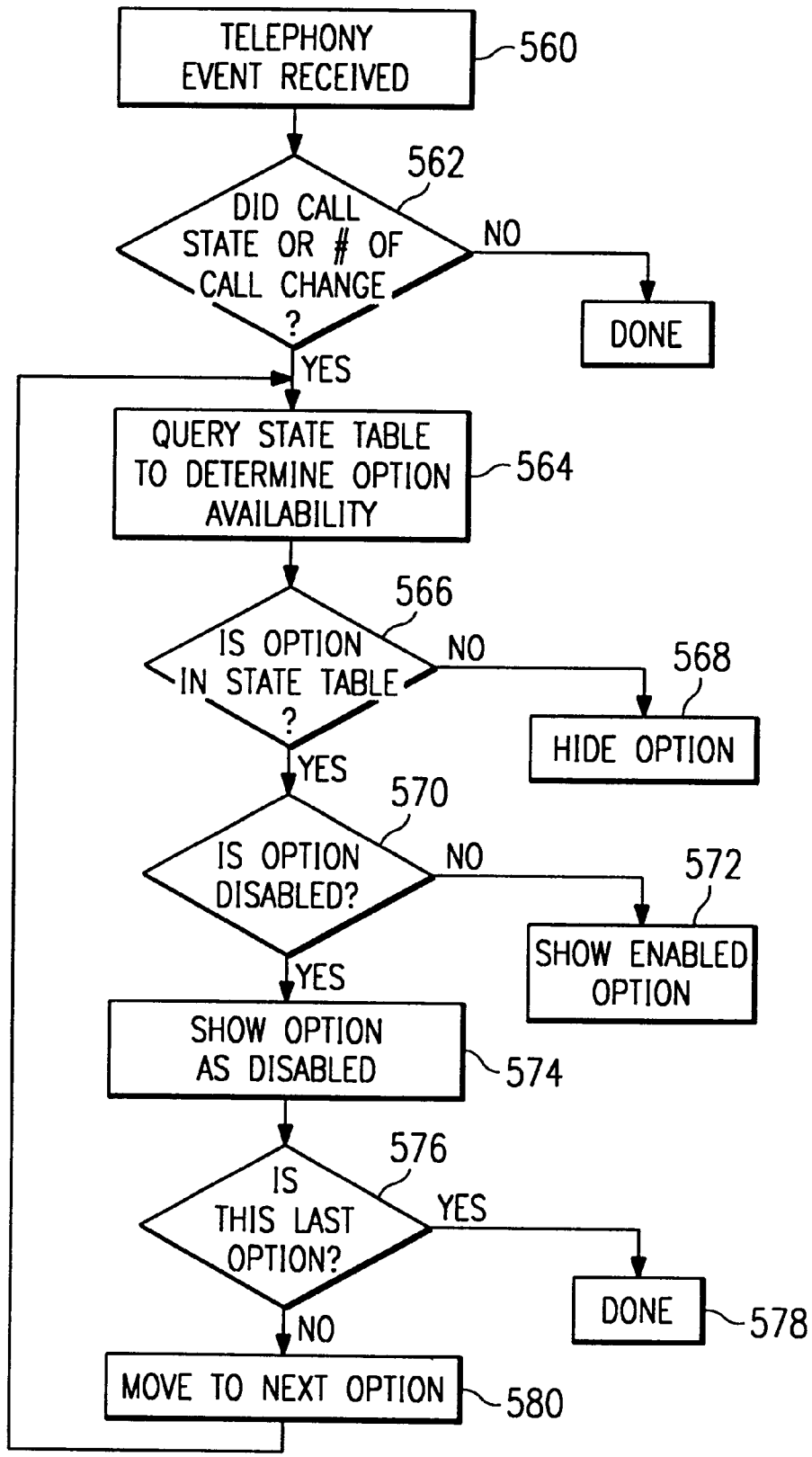
FIG. 51 illustrates an example of a procedure used to display only valid telephone function options to a user of the computer telephone system of FIG. 15.

FIG. 51 illustrates a flow chart of an embodiment of a method that may be used to enable or disable call control buttons 558. The method begins at step 560 when a telephony event is received. Execution then proceeds to step 562 where the process determines whether the call state or number of calls changed. If the call state or number of calls did not change, then the procedure is finished. If the state of a call or number of calls does change, however, execution proceeds to step 564.

In step 564 a query is made to a state table, such as the state table shown in FIG. 50, to determine whether an option should be made available in a particular state. It is determined in step 566 whether an option is in the state table. In this embodiment, if an option does not appear in the state table, that option is hidden in step 568. After step 568, execution proceeds to step 576.

If an option is found in the state table in step 566, execution proceeds to step 570. In this step, it is determined whether an option is disabled. If not, then the enabled option is shown by executing step 572. After step 572, execution proceeds to step 576. If an option is disabled, that option is hidden in step 574. Execution then proceeds to step 576 where it is determined whether this option is the last call control option. If so, then the procedure is done. If not, then in step 580 the next option is produced and that option is examined starting again at step 564.

ONE STEP CONFERENCE CALLING

Figure 52:
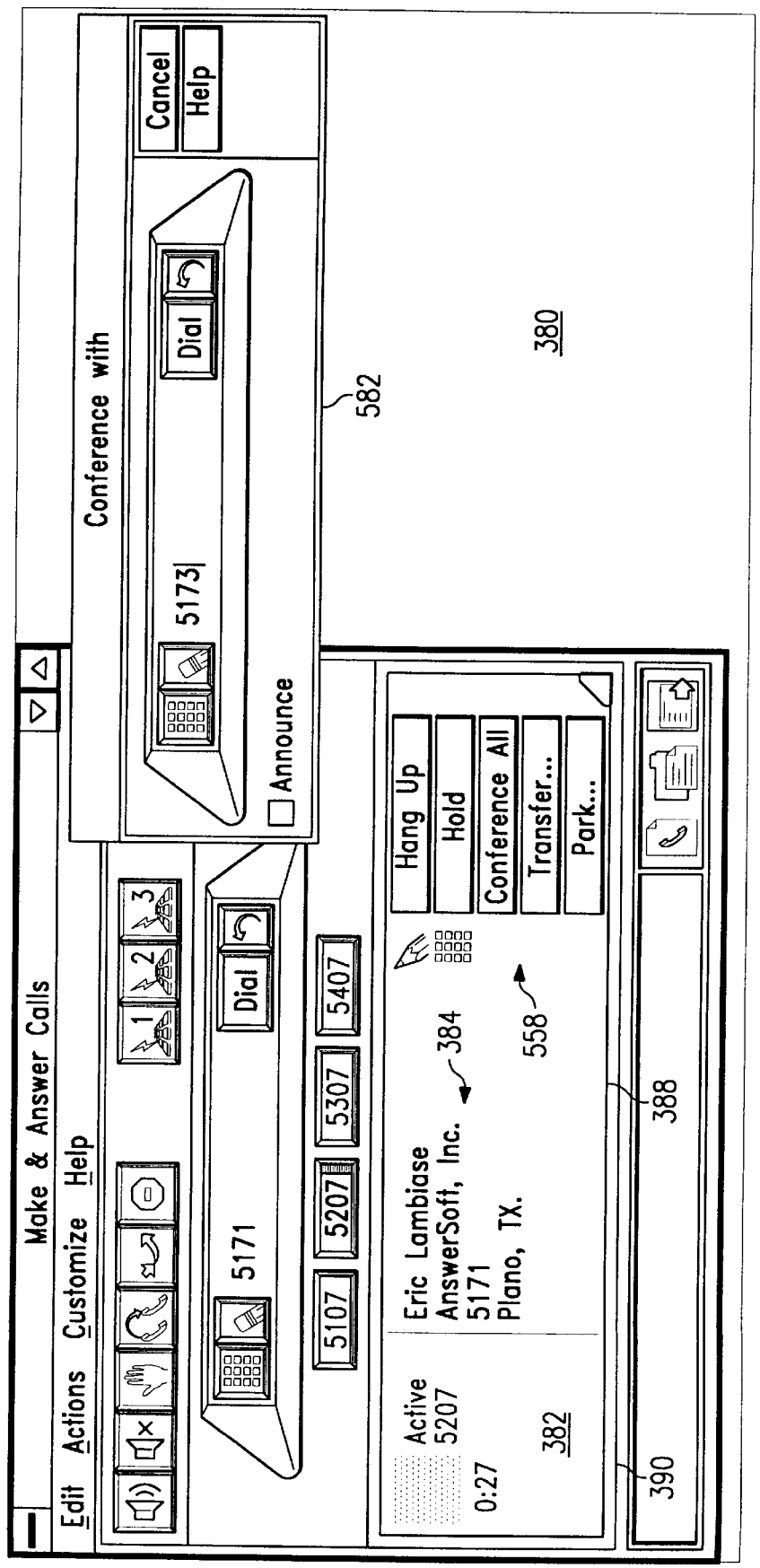
FIG. 52 illustrates a window that shows how a user may create a teleconference in a single step for the computer telephone system of FIG. 1.

In most existing systems, a conference call may be established by calling a first number, calling a second number, and then pressing a button to connect all callers in a conference. The present invention allows a conference to be created automatically as soon as the second call is established. FIG. 52 illustrates one embodiment of the present invention.

In FIG. 52, a call has been established with Eric Lambiase. The user has also pressed conference call control button 558 by clicking on that button with mouse 64. After conference control button 558 was pressed, conference dialogue window 582 appeared in make and answer calls window 380. To establish a conference call at this point, the user need only enter the phone number and dial that number. When the second caller answers the call, a conference is automatically established. The user need not perform any additional steps to establish a conference.

Figure 53:
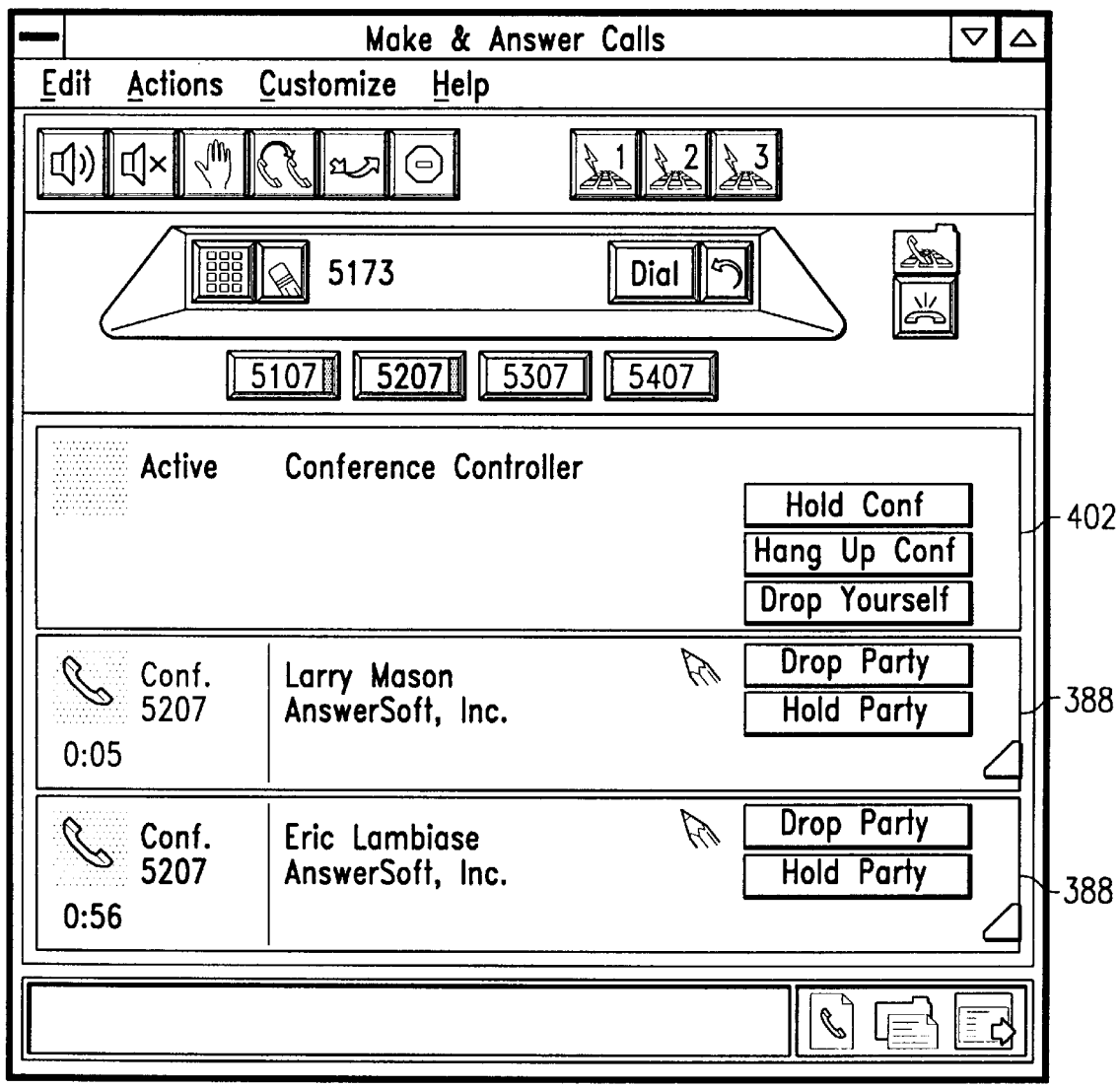
FIG. 53 illustrates the result of creation of a teleconference using the window of FIG. 52.

FIG. 53 illustrates make and answer calls window 380 after the second party, Larry Mason, answers the call. Conference controller 402 automatically appears and the conference may be automatically created between the user, Larry Mason, and Eric Lambiase.

Figure 54:
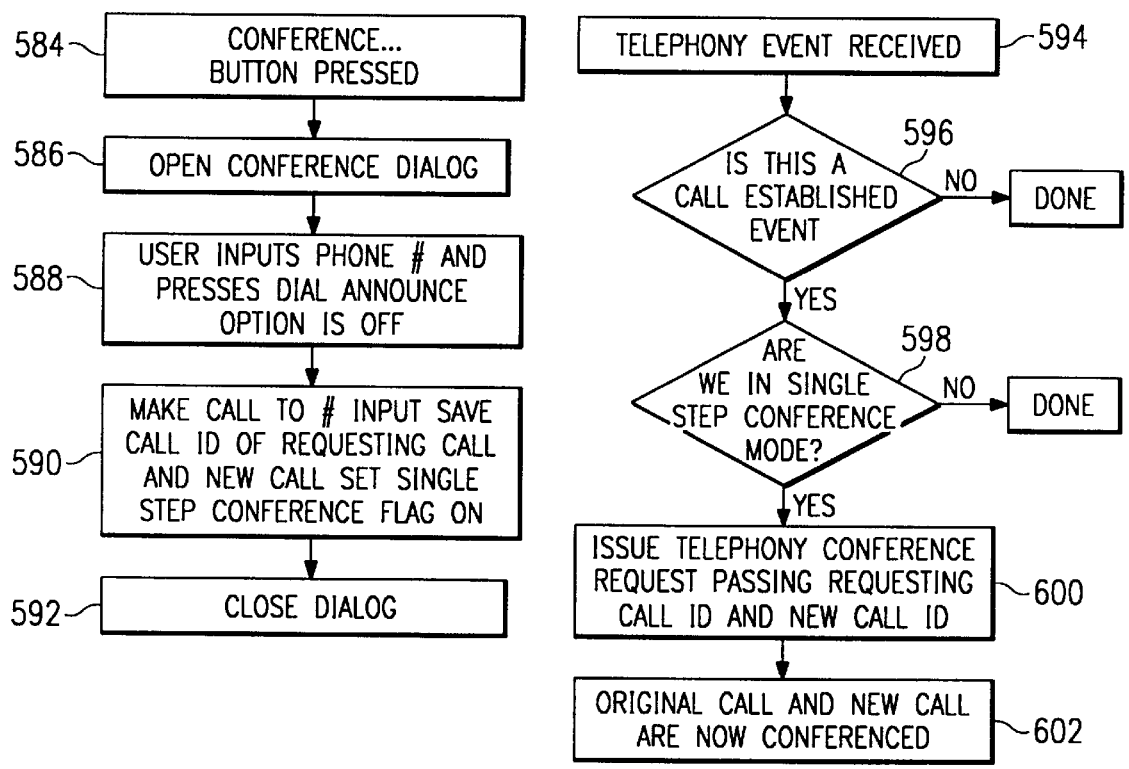
FIG. 54 illustrates an example of a procedure used to implement the single step conferencing feature illustrated in FIGS. 52 and 53.

FIG. 54 gives examples of two processes that may be used to implement single-step conferencing. The first process begins at step 584 when a conference call control button 558 has been pressed. Conference dialogue window 582 is then opened in step 586. Next, in step 588, the user may input the phone number to be dialed and presses "dial." In this example, the announce option is off. Execution may then proceed to step 590 where the actual call is made to the number input by the user. The I.D. number of the requesting call and new call are saved. A single step conference flag may then be turned on. After these steps have been completed, dialogue window 582 may be closed in step 592.

The second process begins in step 594 when a telephony event is received. It is then determined in step 596 whether the event is a call-established event. If the event is not a call-established event, then the procedure terminates. If the event is a call-established event, the process then determines in step 598 if the program is in single step conference mode using the single step conference flag. If not, then the procedure terminates. If the single step conference flag is on, then execution proceeds to step 600 or a telephony conference request is issued. The requesting call I.D. and the new call I.D. may both be passed as parameters with this telephony request. The original call and the new call are now conferenced in Step 602.

CONFERENCE ALL OPTION

A user may desire to join all calls in progress in a conference call. To avoid requiring the user to join each call to each other call individually, the user may instead connect all calls simultaneously using the conference all call control button 558. When the conference all control button 558 is pressed by clicking on it with mouse 64, all calls in progress are joined in a conference call.

Figure 55:
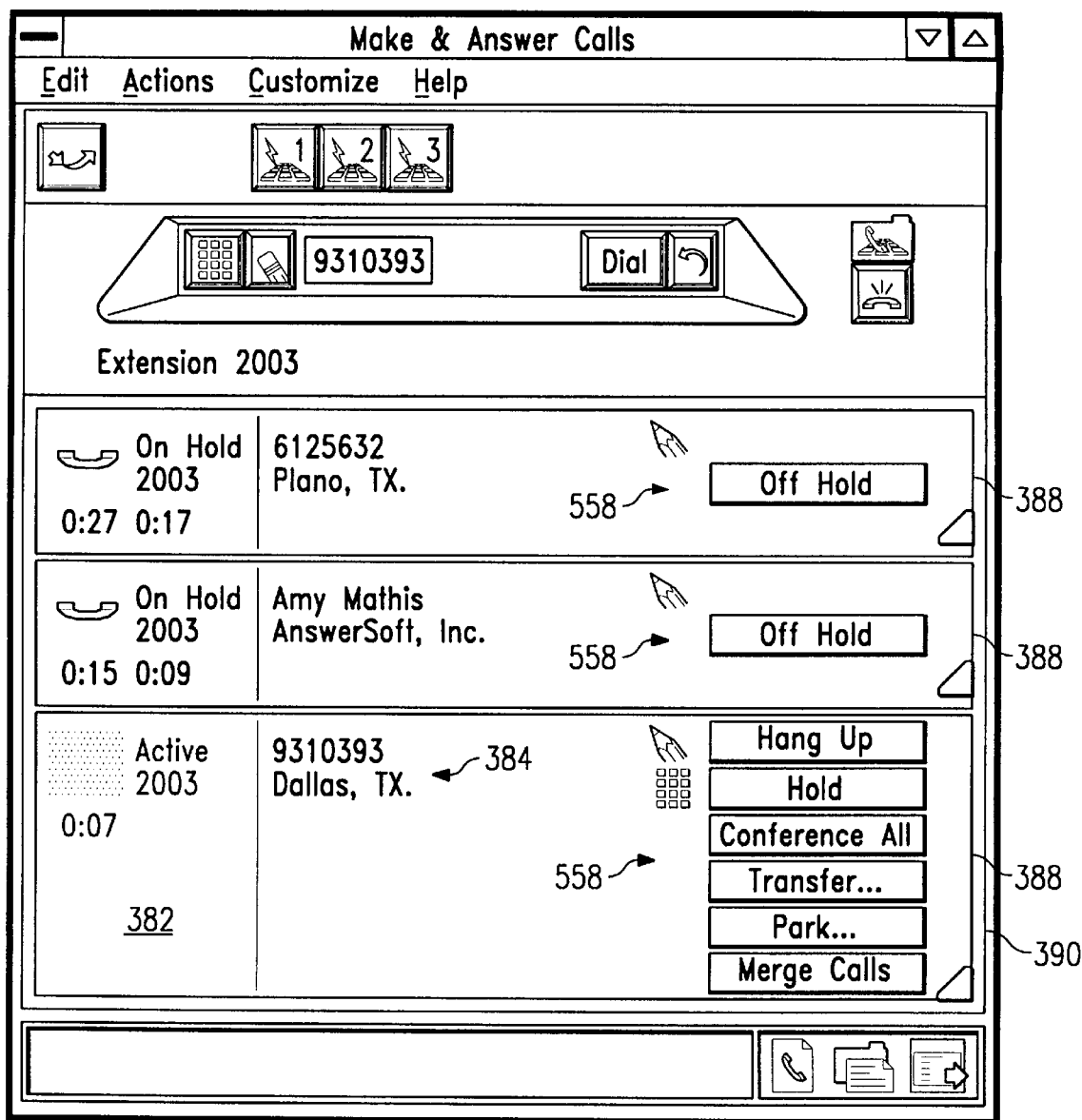
FIG. 55 illustrates the availability of a conference all control button used with the computer telephone system of FIG. 1.
Figure 56:
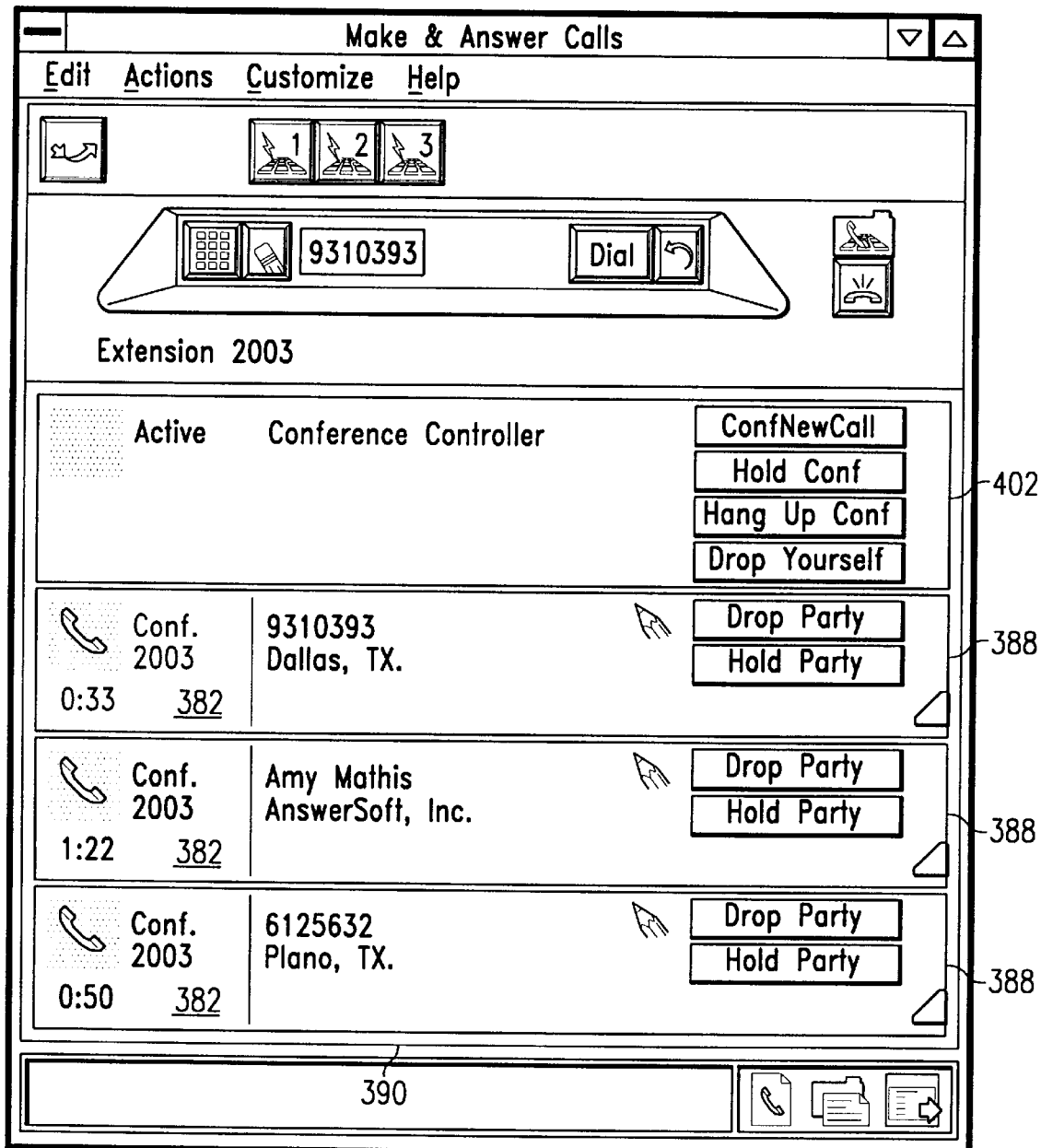
FIG. 56 illustrates the result of pressing the conference all button of FIG. 55.

This aspect of the present invention is illustrated in FIGS. 55 and 56. FIG. 55 illustrates call window 390 with three calls in progress. The user may press conference all call control button 558 to create a four way conference between the user and all three calls in progress. The user activates the conference all call control button 558 by clicking mouse 64 on it.

FIG. 56 illustrates the call window 380 from FIG. 55 after the user presses the conference all call control button 558. As illustrated in FIG. 56, a four way conference has been created between the user and all calls in progress. Conference controller 402 now appears in call window 390 and the call status objects 382 of each call object 388 indicate that each call in progress is now part of a conference call. The Dallas, Tex. call was the selected call in FIG. 55 before the conference all call control button was pressed and remains the selected call in FIG. 56 after conference has been established. The fact that this call is the selected call may be indicated by the light background of call control object 382.

Figure 57:
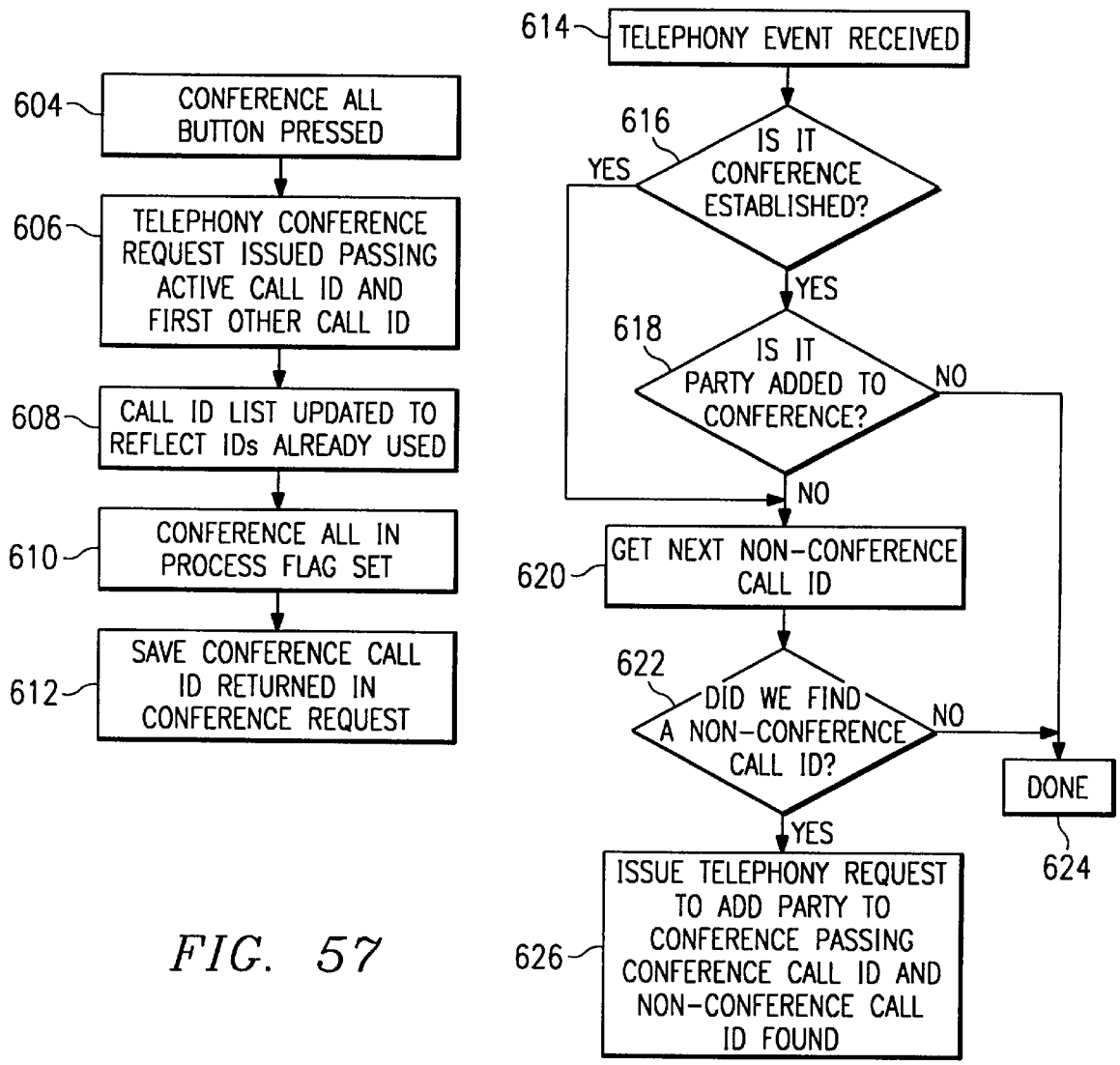
FIG. 57 illustrates a procedure used to implement the conference all feature illustrated in FIGS. 55 and 56.

FIG. 57 illustrates two exemplary processes that may be used to accomplish the conference all feature of the present invention. The first procedure begins in step 604 when conference all call control button 558 is pressed. Execution then proceeds to step 606 where a telephony conference request is issued. This request passes the I.D. of the active call and the first other call identification as parameters. Next, the call I.D. list is updated to reflect I.D.s already used in step 608. Then, the conference in process flag is set in step 610. In step 612, the conference call I.D. returned in the conference request is saved.

The second process begins in step 614 where a telephony event is received. Then, in step 616, it is determined whether the telephony event is a conference being established. If not, execution proceeds to step 618 where it is determined whether the event is a party being added to a conference. If a party is not being added to a conference in step 618, the procedure terminates at step 624. If a party is being added to a conference, execution proceeds to step 620. Execution also proceeds to step 620 if a conference established event was detected in step 616.

In step 620, the next non-conference caller I.D. is retrieved. It is then determined in step 622 whether a non-conference call I.D. was found. If not, the procedure terminates in step 624. If so, then in step 626, a telephony request is issued to add a party to the conference. The telephony request will pass the conference call I.D. and the non-conference call I.D. that was found in step 620 as parameters. This procedure then terminates.

SELECTIVE CONFERENCING

The present invention also allows a user to select certain ones of the calls in progress to establish a conference. The user may select two or more calls to create a conference. The user may initiate a conference in this embodiment by holding down the shift key and clicking mouse 64 on conference all button 604, such as is illustrated in FIG. 49.

Figure 58:
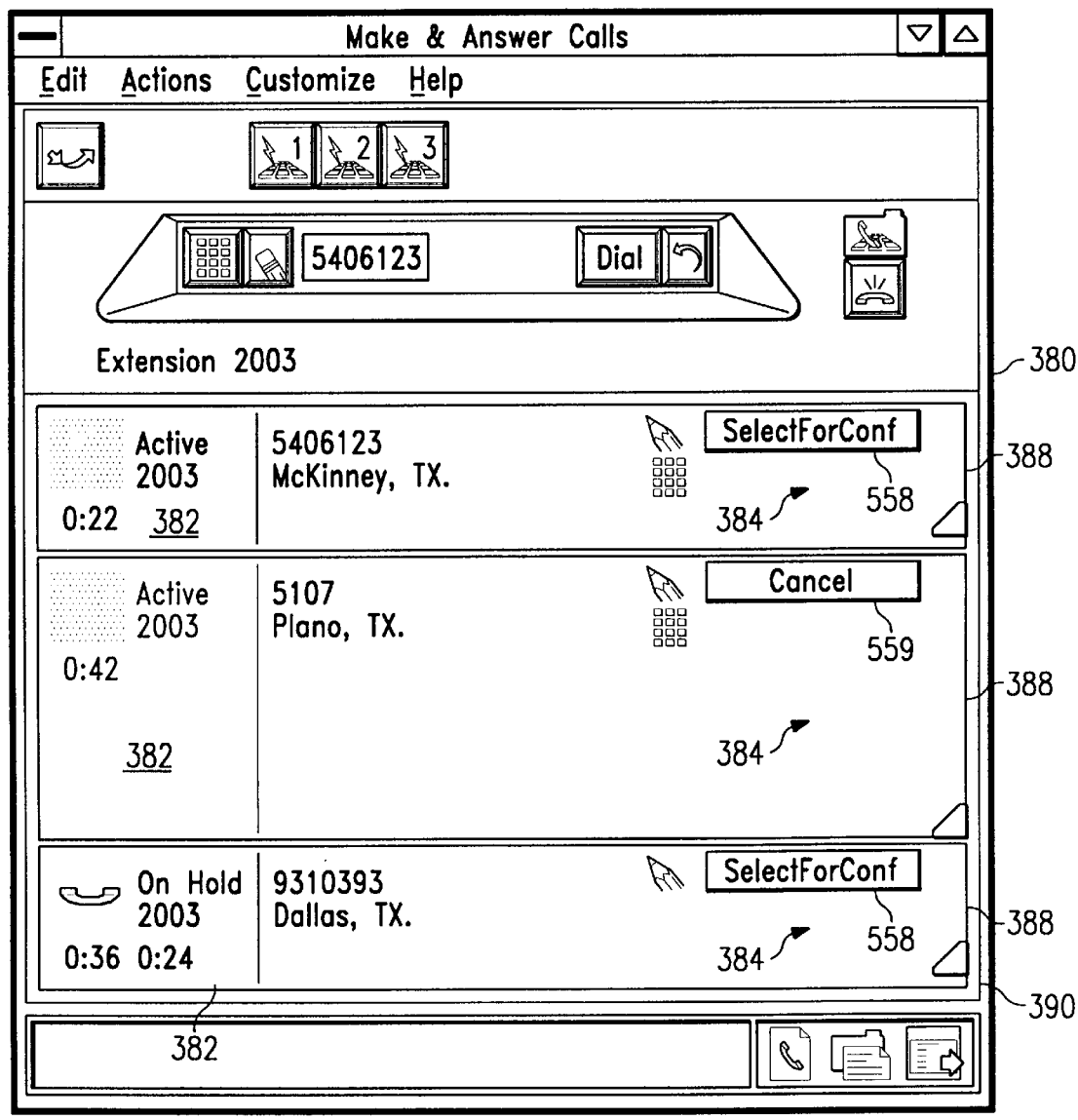
FIG. 58 illustrates the ability of a user of the computer telephone system of FIG. 1 to conduct selective conferencing.

FIG. 58 illustrates make and answer calls window 380 after the selective conference function has been initiated. Because the selective conference function was initiated when the middle call object 388 in call window 390 was selected, this call will be one of the calls that is joined in a conference. If the user desires to cancel the selective conference option, the user may do so in this embodiment by clicking mouse 64 on cancel call control button 559.

To establish a conference between the call represented by the middle call object 388 and one of the other calls in progress, the user can click mouse 64 on one of the select for conference call control buttons 558 appearing in either the top or bottom call object 388 in call window 390.

Figure 59:
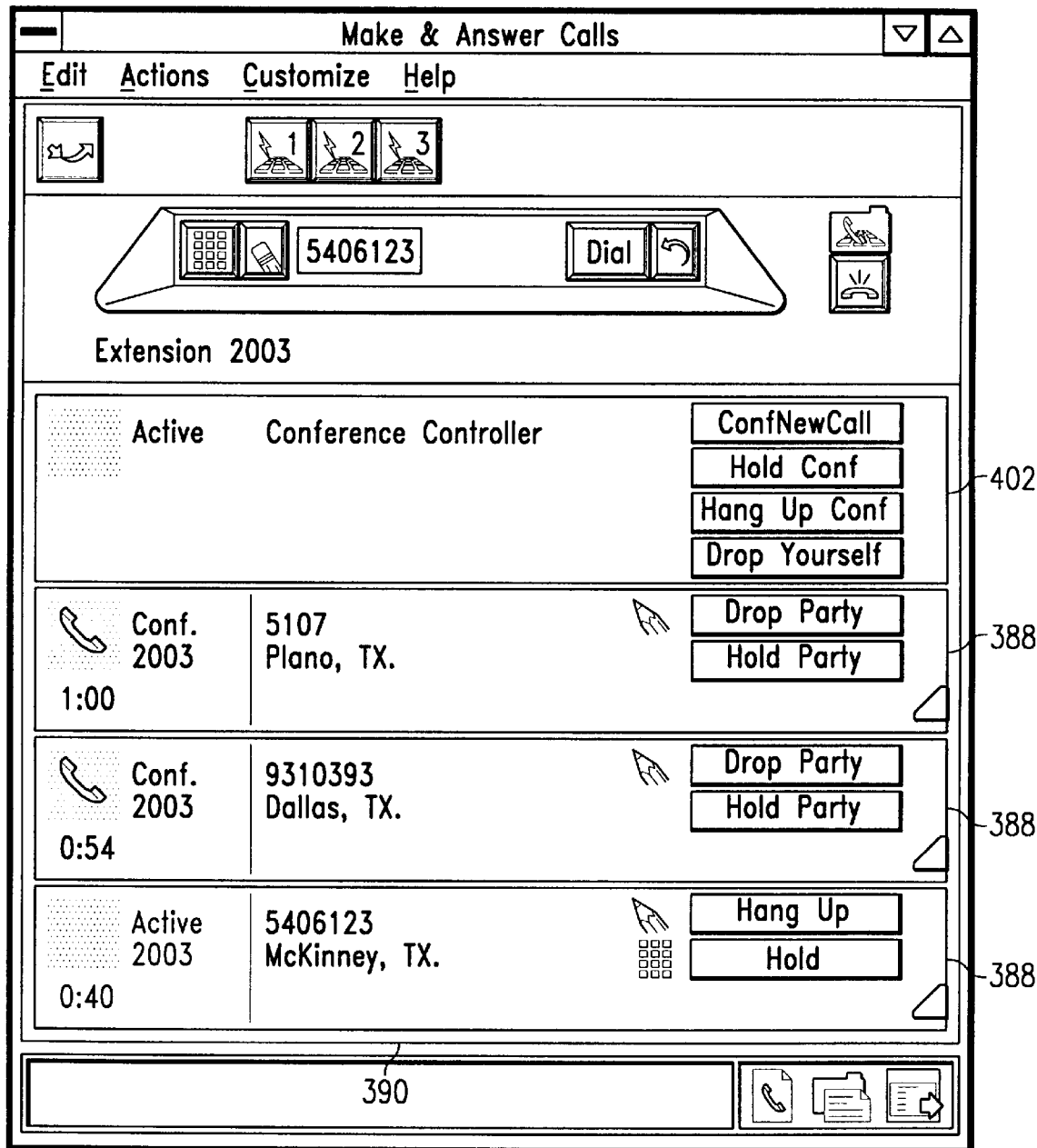
FIG. 59 illustrates the result of a user creating a selective conference using the window illustrated in FIG. 58.

FIG. 59 illustrates call window 390 after a conference call has been established between the user, phone number 5107, and phone number 931-0393. Referring again to FIG. 58, this conference was established by the user by clicking mouse 64 on select for conference call control button 558 in the bottom call object 388. Once the conference was established, conference controller 402 appears with the calls that are participating in the conference.

The selective conference feature of the invention allows users to easily establish conferences between two or more calls in progress. With only a few clicks of mouse 64, a conference may be established and the parties to that conference may be selected from any call in progress.

Figure 60:
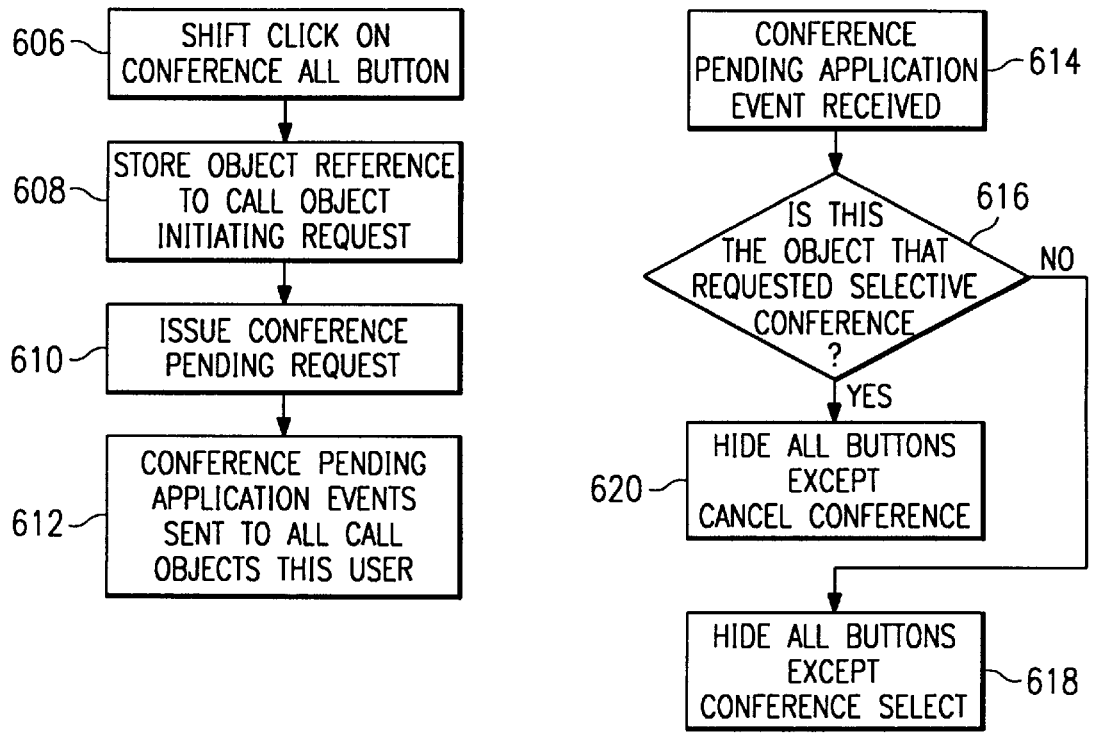
FIG. 60 illustrates a procedure used by the computer telephone system illustrated in FIG. 1 to implement the selective conferencing feature.
Figure 61:
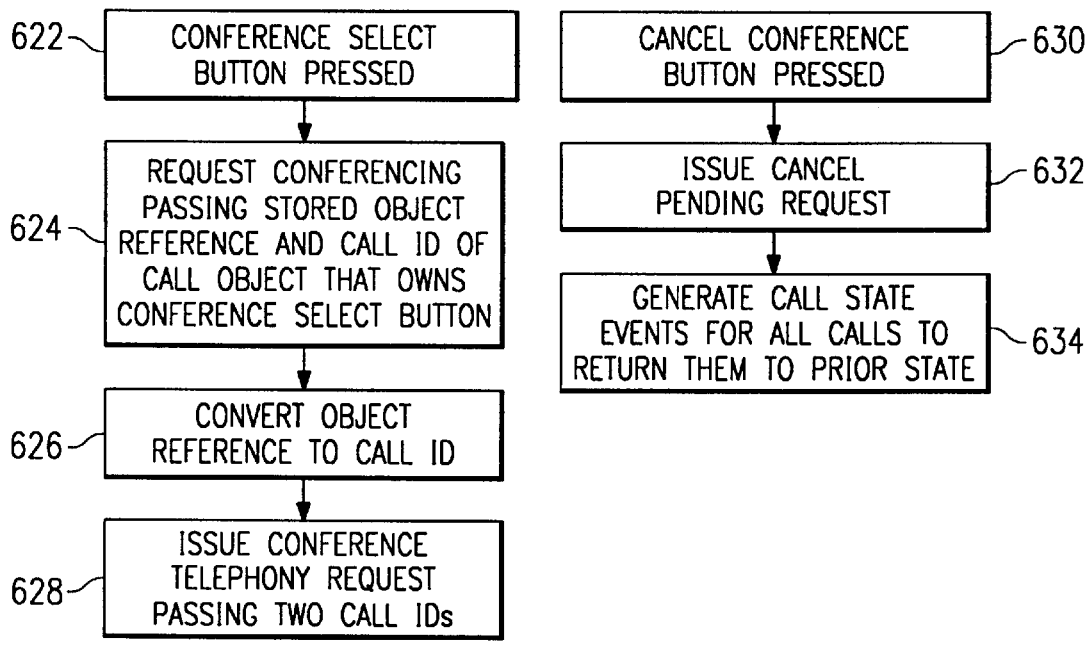
FIG. 61 illustrates a procedure used by the computer telephone system illustrated in FIG. 1 to implement the selective conferencing feature.

FIGS. 60 and 61 illustrate four processes that may be used to implement the selective conferencing feature of the present invention. The first procedure begins at step 606 in FIG. 60 where a user clicks on the conference all call control button 558 while holding down the shift key on keyboard 66. This provides another way for the user to activate the selective conference option. Execution then proceeds to step 608 where an object is referenced to the call object 388 initiating the request for a selective conference.

After the object reference is stored in step 608, a conference pending request is issued in step 610. Then, in step 612, a conference pending application message may be sent to all call objects 388 active for this user.

An example of a second procedure that may be used in implementing the selective conferencing option also appears in FIG. 60. This procedure begins in step 614 with the receipt of a conference pending application event. It is then determined in step 616 whether this is the call object 388 that requested the select conference. If not, then all call control buttons 588 on that object are hidden, except for conference select, in step 618. If so, then all call control buttons 558 are hidden for that call object 388, except for cancel, in step 620.

An embodiment of a third procedure that may be used to implement the select conference feature is illustrated in FIG. 61 and begins in step 622. In step 622, a conference select button 604 is pressed. After the button is pressed, a request for conference is generated. This request passes as parameters the stored object reference and a call I.D. of the call object that is associated with the conference select button. Execution then proceeds to step 626 where an object reference is converted to a call I.D. Finally, in step 628, the procedure issues a conference telephony request passing the two call I.D.s.

A fourth procedure used to implement the selective conference option is illustrated in FIG. 61 and begins at step 630. In step 630, cancel conference call control button 588 is pressed for the call object 388 that initiated the selective conference request. In response to this button being pressed, the procedure issues a cancel pending request in step 632. Call state events are then generated in step 634 for all calls to return to their prior state.

ADDING A NEW CALL TO A CONFERENCE ONCE A CONFERENCE EXITS

The present invention allows new calls to be added to a conference once a conference exists. The invention may also allow a new call to be made and have that call automatically added to the conference when a call is established.

Figure 62:
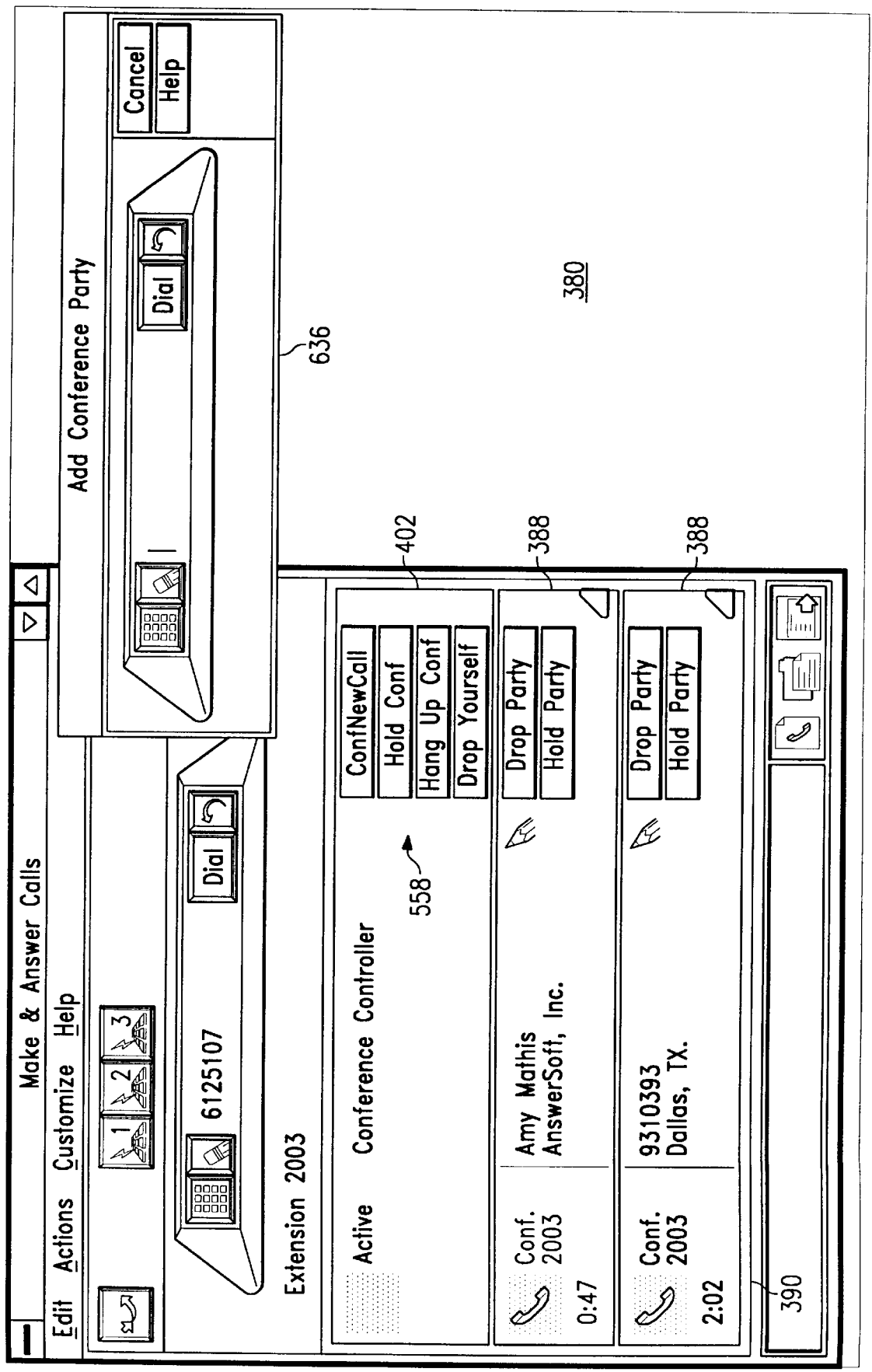
FIG. 62 illustrates how a call may be added to an existing teleconference in a single step using the computer telephone system of FIG. 1.

A user may add a call to an active conference by pressing conference new call control button 558 in conference controller 402. This button may be pressed by clicking mouse 64 on conference new call call control button 558. FIG. 62 illustrates call window 380 after conference new call call control button 558 has been pressed. Add conference party window 636 appears as a result of pressing the conference new call call control button 588. This, window allows a user to enter a phone number to dial. When this phone number is dialed, the call is automatically added to the conference being controlled by conference controller 402 illustrated in FIG. 62.

Figure 63:
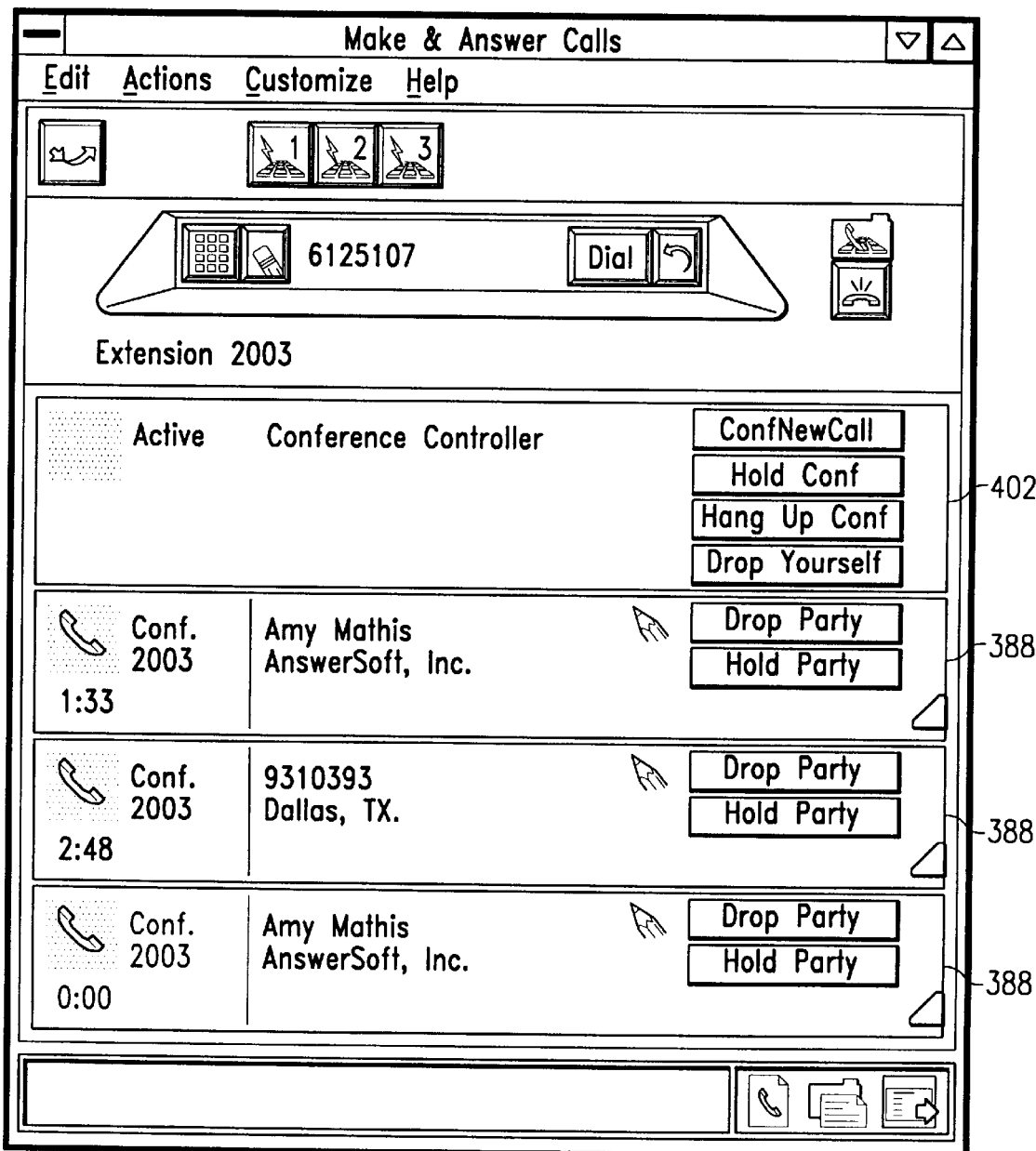
FIG. 63 illustrates the results of adding a telephone call to an existing teleconference using the window illustrated in FIG. 62.

FIG. 63 illustrates call control window 380 after a new number has been dialed and automatically added to the conference. Again, once the new number is dialed in add party conference window 636 illustrated in FIG. 62, the party is automatically added to the conference when the new call is established.

Figure 64:
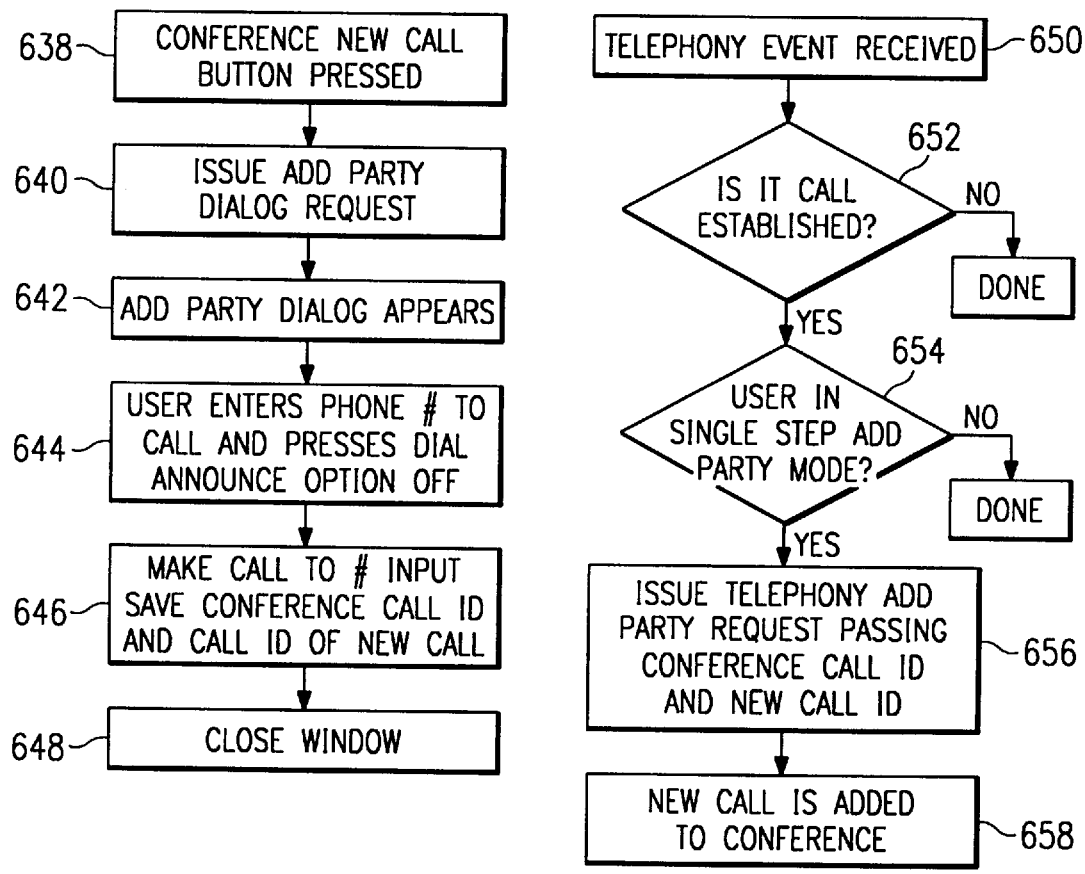
FIG. 64 illustrates an example of a procedure used to add a new call to an existing teleconference as illustrated in FIGS. 62 and 63.

FIG. 64 illustrates examples of procedures that may be used to automatically add a new call to a conference once a conference has been established. The first procedure begins at step 638 when the conference new call call control button 558 has been pressed. After this button has been pressed an add party dialogue request is issued in step 640. Then, the user may enter the new party's phone number in add conference party window 636. The user may then press dial with the announce option off. After these events have occurred in step 644, execution proceeds to step 646 where a call is made to the phone number that was input. The conference call I.D. is saved and the call I.D. of the new call is saved. Then, in step 648, add conference party window 636 is closed.

The second procedure that may be used to add a party to an existing conference is also illustrated in FIG. 64. It begins in step 650 when a telephony event is received. Next, it may be determined in step 652 whether a telephony event is a call established event. If not, then this procedure terminates. If a call established event was received, it may be determined in step 654 whether the user is in single step add party mode. If not, then this procedure terminates. If so, then execution may proceed to step 656.

In step 656, the system may issue a telephony add party request. The conference call I.D. and the new call I.D. may be passed as parameters with this request. This procedure then terminates in step 658 with a new call added to the existing conference.

MERGING OF CALLS

The present invention allows users to merge calls together. When calls are merged, they are no longer connected to the user, but instead are connected to each other. For example, the user may have two non-conferenced calls taking place with two additional parties. The user may desire to terminate his calls with the parties while connecting the other two parties to one another. When this is the case, the user may disconnect himself from the calls and establish the connection between the two other calls using the merge calls feature of the present invention.

Figure 65:
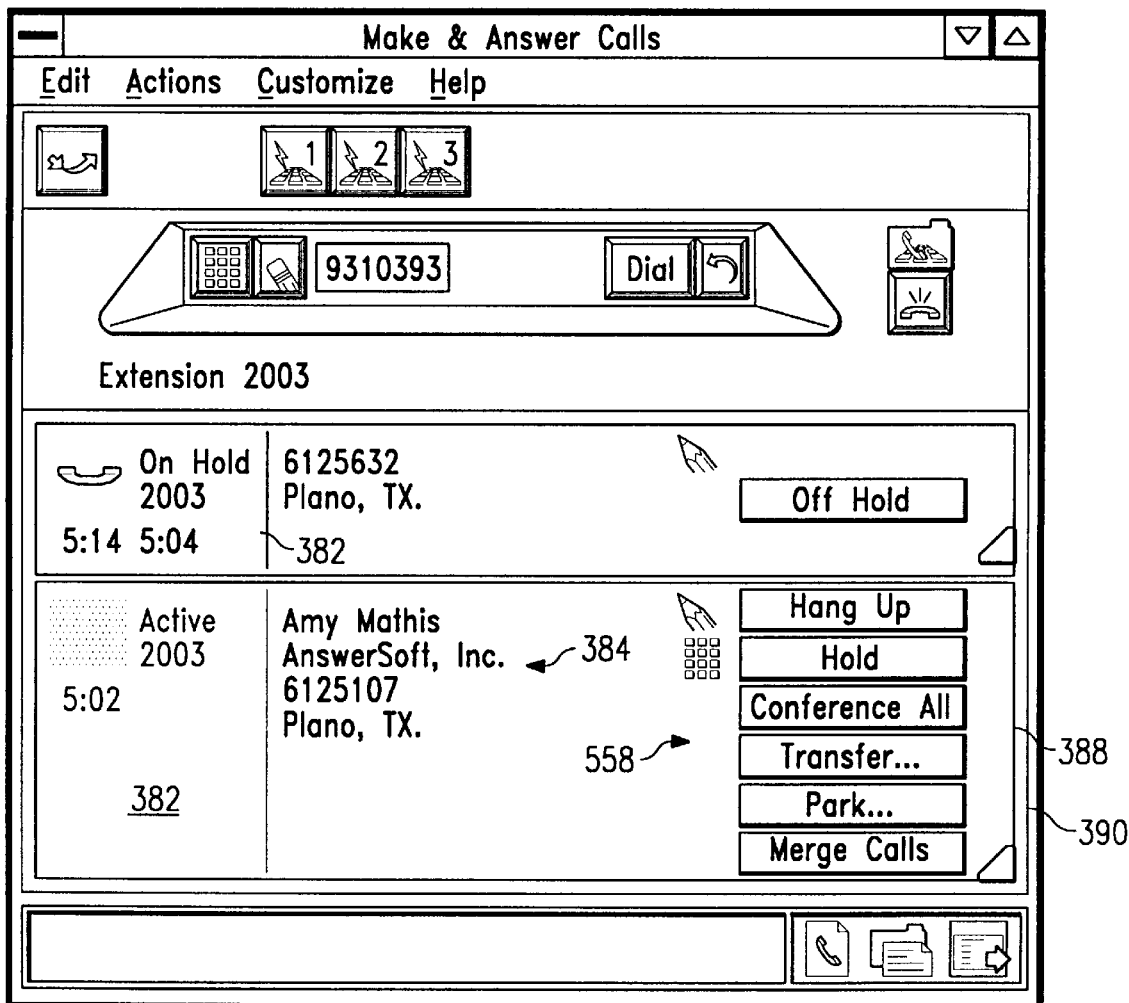
FIG. 65 illustrates a merged call option feature used with the computer telephone system illustrated in FIG. 1.
Figure 66:
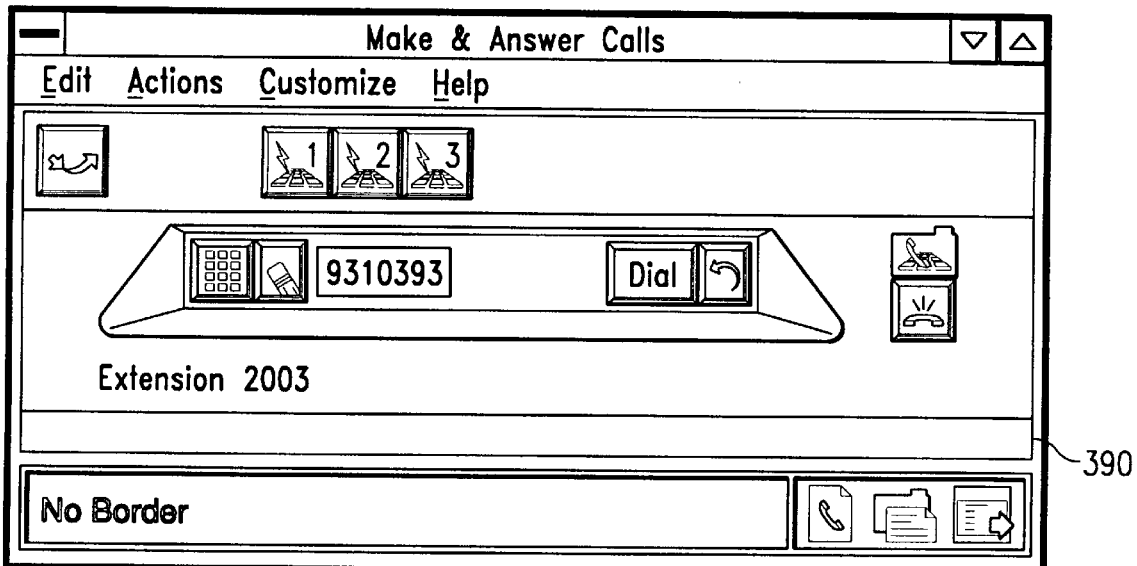
FIG. 66 illustrates a window that results from pressing the merge call control button illustrated in FIG. 65.

Whenever two or more calls are in progress, the opportunity to merge calls may be presented. FIG. 65 illustrates call window 380 with two calls in progress. Because only two calls are active, these two calls may be merged by clicking on the merged calls call control button 558 illustrated in the bottom call object 388 of FIG. 65. After the user presses the merge calls call control button 558, the two parties to the two calls in progress in FIG. 65 end up talking to one another and the user is disconnected from both calls as illustrated in FIG. 66. Because both calls were merged from call window 390 in FIG. 65, this user no longer has any active calls, as shown in FIG. 66. Call window 390 is, therefore, blank in FIG. 66. FIG. 65 and 66 thus provide an example of how calls may be merged when only two calls are in progress with the user.

Figure 69:
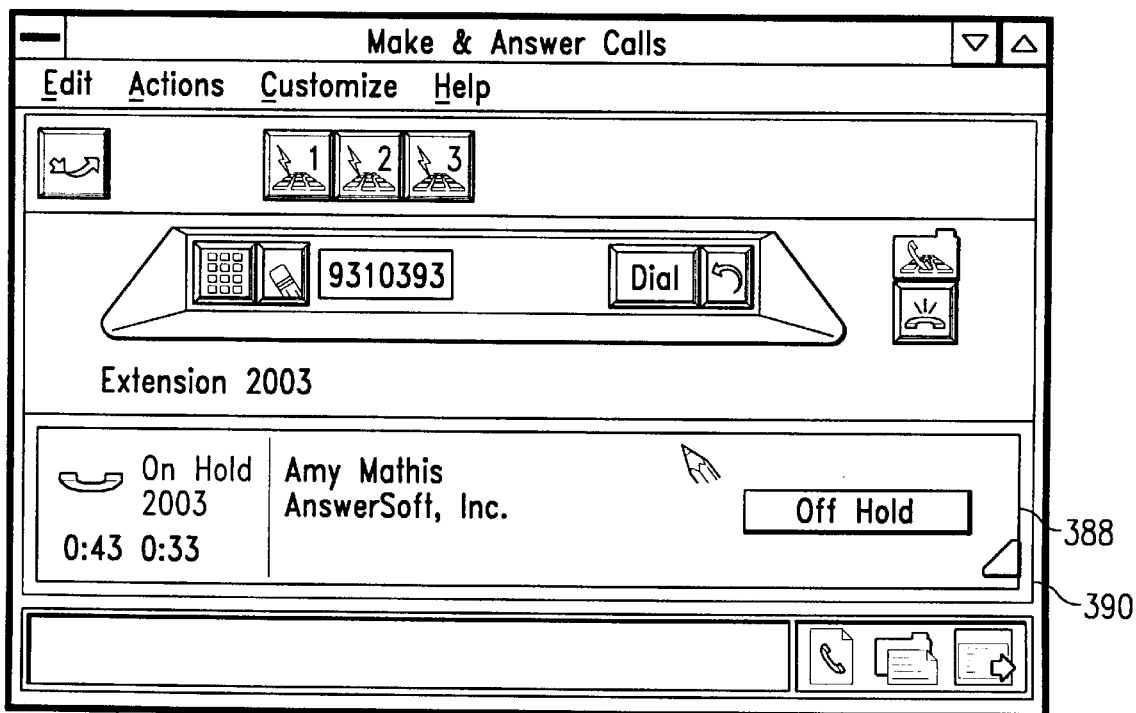
FIG. 69 illustrates the call window after two calls have been merged using the window illustrated in FIG. 68.
Figure 67:
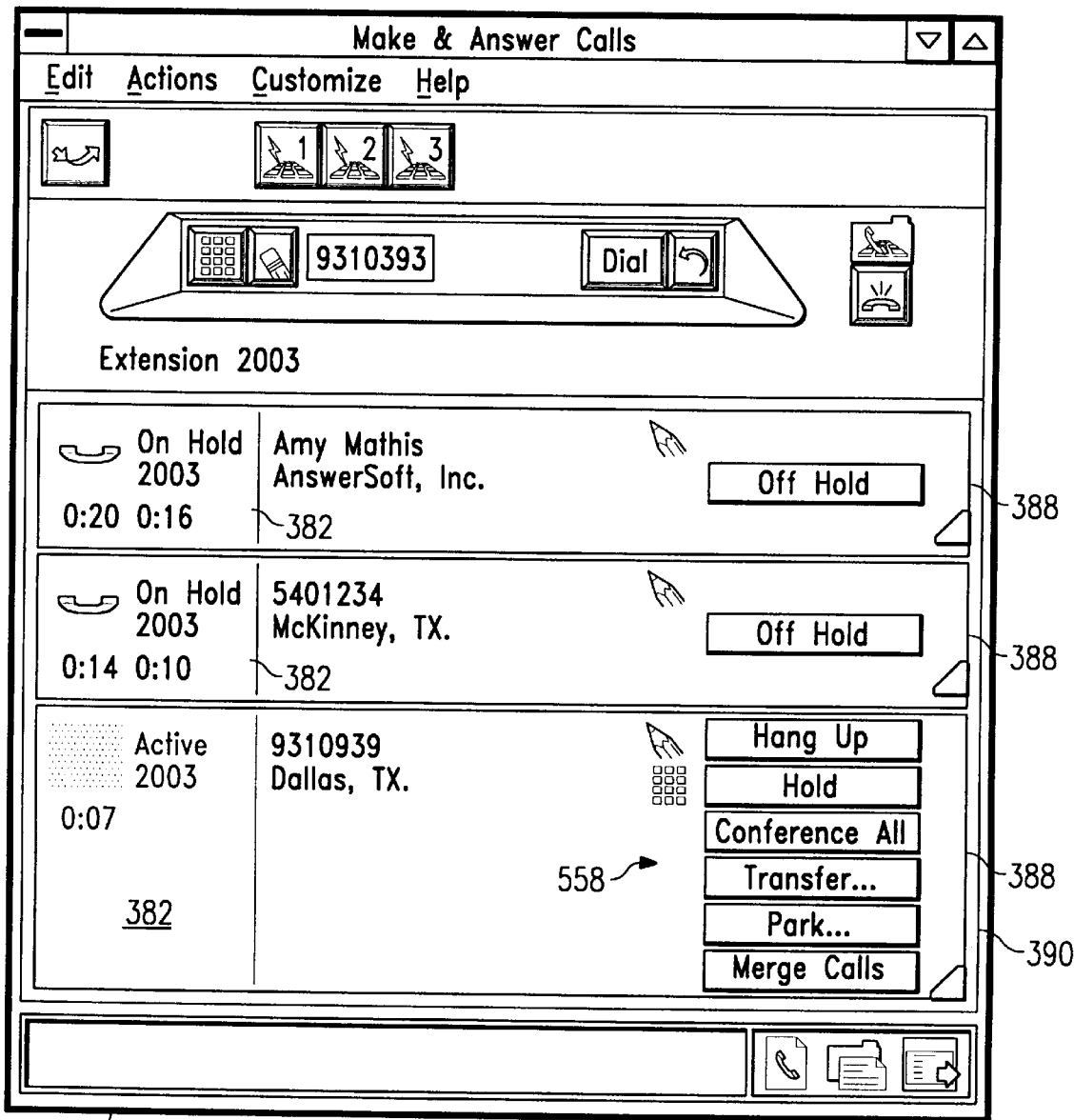
FIG. 67 illustrates the availability of a merge call control option when more than two calls are displayed in a call window in a computer telephone system of FIG. 1.
Figure 68:
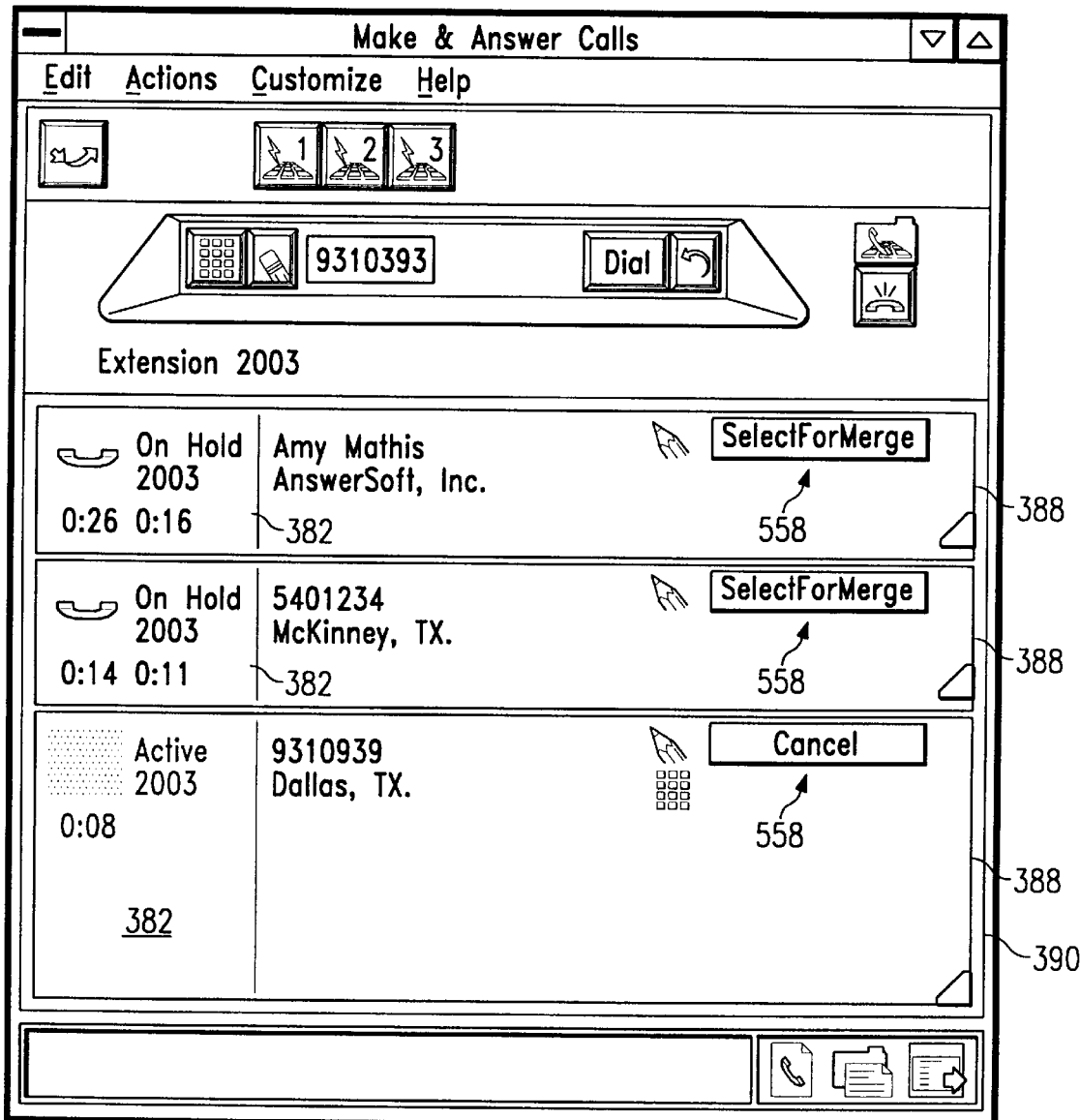
FIG. 68 illustrates the result of pressing the merge call button for the window illustrated in FIG. 67.

FIG. 67 illustrates three calls in progress. FIG. 67 through 69 illustrate how the merge calls feature may operate when more than two calls are in progress for a particular user. As indicated by the light background and call status object 382 of the bottom call object 388 illustrated in call window 390 in FIG. 67, the bottom call object 388 is selected. The merge calls call control button is presented for all active calls. The user may then press the merge calls call control button 558 in the bottom call object 388 resulting in call window 390 illustrated in FIG. 68. Because the merge calls call control button 558 was pressed with the call object 388 for the telephone number 931-0393 active call selected, this call will be one of the calls merged in the selective merge operation. The merge may be cancelled by pressing cancel call control button 558 for the bottom call object 388 as illustrated in FIG. 68. The bottom call object 388 may be merged with either of the other two remaining call objects 388 by clicking mouse 64 on the select for merge call control button 558 illustrated in FIG. 68.

For example, if the user desires to merge the call having phone number 931-0393 with the call having phone number 540-1234, the user may click mouse 64 on the select for merge call control button 558 for the middle call object 388 illustrated in FIG. 68. When the user does so, the two calls are merged and call window 390 may be updated, as shown in FIG. 69, to reflect that the two merged calls are no longer connected to the user. Only the call with Amy Mathis remains in progress with the user.

The ability to merge calls provides an advantage over existing systems. Ordinarily, the user would either need to remain connected to both calls in a conference call relationship to allow two third parties to speak to one another. Alternatively, the third parties could each terminate their calls with the user and call each other. The present invention, however, allows easy connection of two third parties with just a few clicks of mouse 64.

Figure 70:
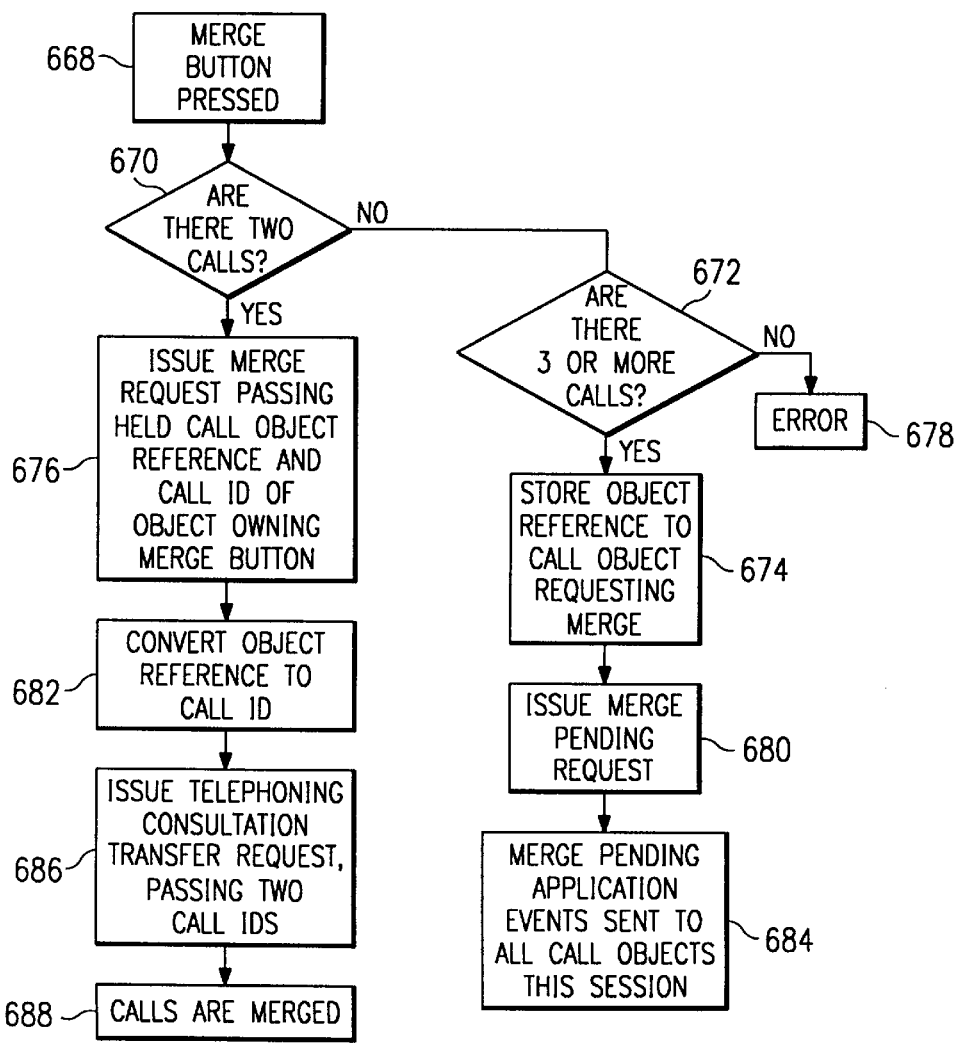
FIG. 70 illustrates procedures used to implement the merge call feature for the computer telephone system of FIG. 1.
Figure 71:
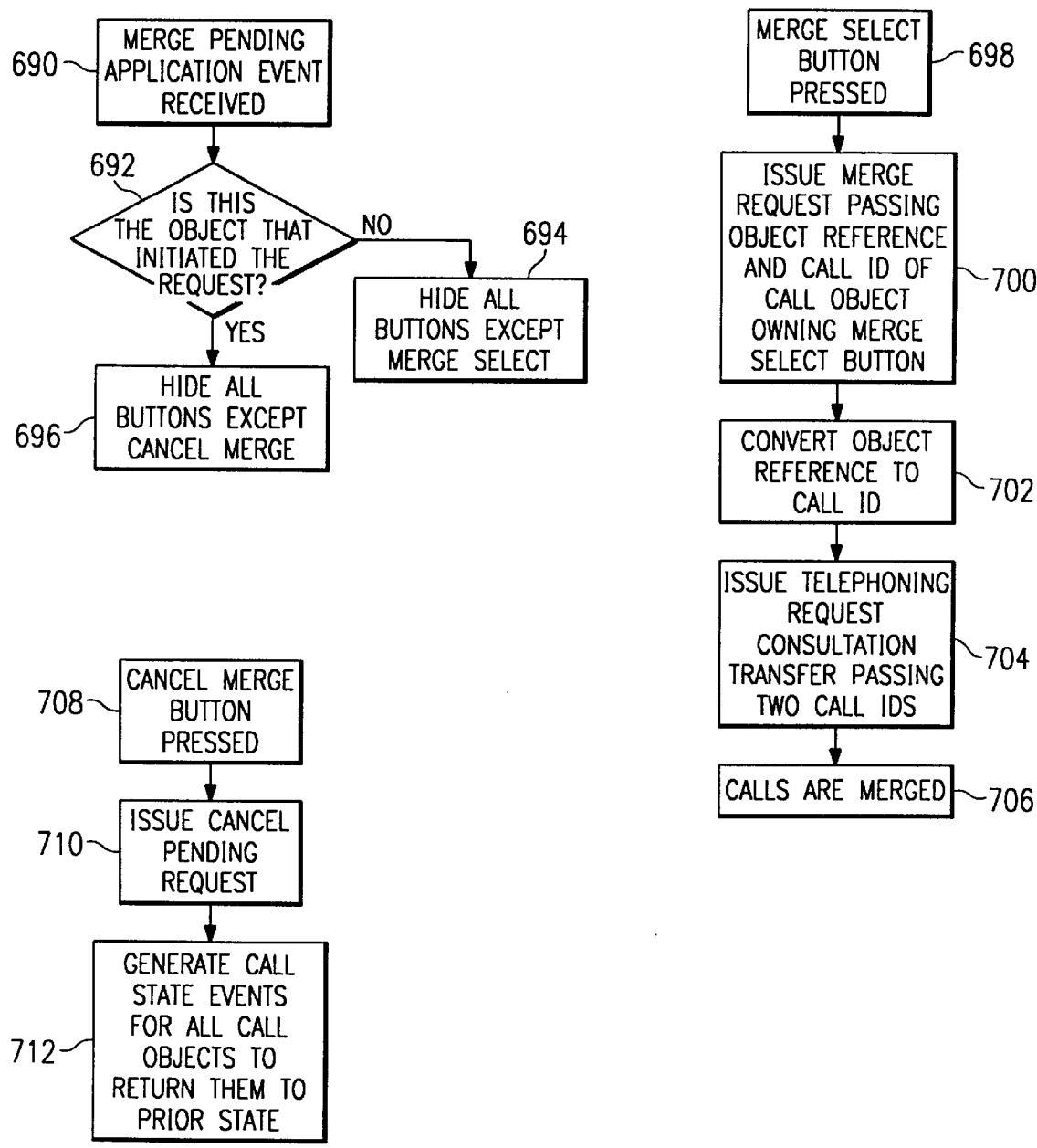
FIG. 71 illustrates procedures used to implement the merge call feature for the computer telephone system of FIG. 1.

FIGS. 70 and 71 illustrate embodiments of five procedures that may be used to implement the merge call feature described above. The first procedure in FIG. 70 begins at step 660 with the receipt of a telephony event. In step 662, the procedure determines whether the telephony event was a call being placed on hold. If not, then the procedure terminates. If so, the procedure determines in step 664 whether there are two calls active. If not, then the procedure terminates. If so, then step 665 is executed in which an object reference is stored to the call object of the held call.

The second procedure begins at step 668 when the merge call control button 558 is pressed. In step 670, the procedure determines whether there are two calls active. If so, execution proceeds to step 676 for a merge request to be generated. The held call object reference and the call I.D. of the object associated with the merge button are passed as parameters with the merge request. Then, in step 682, the object reference is connected to a call I.D.

Execution then proceeds to step 686 where a telephony consultation transfer request is generated with the two call I.D.s passed as parameters. In step 688, following step 686, the two calls are merged.

Referring again to step 670, if there were not two calls in progress when the merge call control button 558 was pressed, it is determined in step 672 whether there are three or more calls active. If three or more calls are not active, then an error has occurred, and an error message is generated in step 678. If three or more calls are active, then execution proceeds from step 672 to 674.

Steps 674, 680, 684 are then executed. First, in step 674 the procedure stores an object reference to the call object requesting the merge. Next, in step 680, the procedure issues a merge pending request. Finally, in step 684, the merge pending application event is sent to all call objects in this user session.

FIG. 71 illustrates embodiments of three additional procedures that may be used to implement the call merge feature discussed above. The third procedure begins at step 690 when a merge pending application event is received. Then, in step 692, the procedure determines whether the call object 388 for which this procedure is running initiated the request. If so, then all buttons are hidden for that call object 388 except for the cancel merge call control button. These actions occur in step 696. If the procedure is not being executed for the call object 338 which initiated the request, then, in step 694, all buttons are hidden except the merge select call control button 588.

An example of the fourth procedure that may be used to implement the merge call feature discussed above is also illustrated in FIG. 71. It begins at step 698 when the merge select call control button 558 is pressed. Execution then proceeds to step 700 where a merge request is issued. The object reference and the call I.D. of the call object owning the merge select button are passed as parameters. Then, in step 702, the object reference is converted to a call I.D. In step 704, a telephony request is issued by the procedure for a consultation transfer. The two call I.D.s are passed as parameters. Finally, in step 706, the calls are merged.

An example of the fifth procedure that may be used to implement the call merge feature illustrated above is also illustrated in FIG. 71. The fifth procedure. begins at step 708 when the cancelled merge button is pressed. Then, in step 710, a cancel pending request is issued. Finally, in step 712 call state events are generated by the procedure for all call objects to return to their prior state.

CONFERENCE LEVEL ACTIONS

Figure 72:
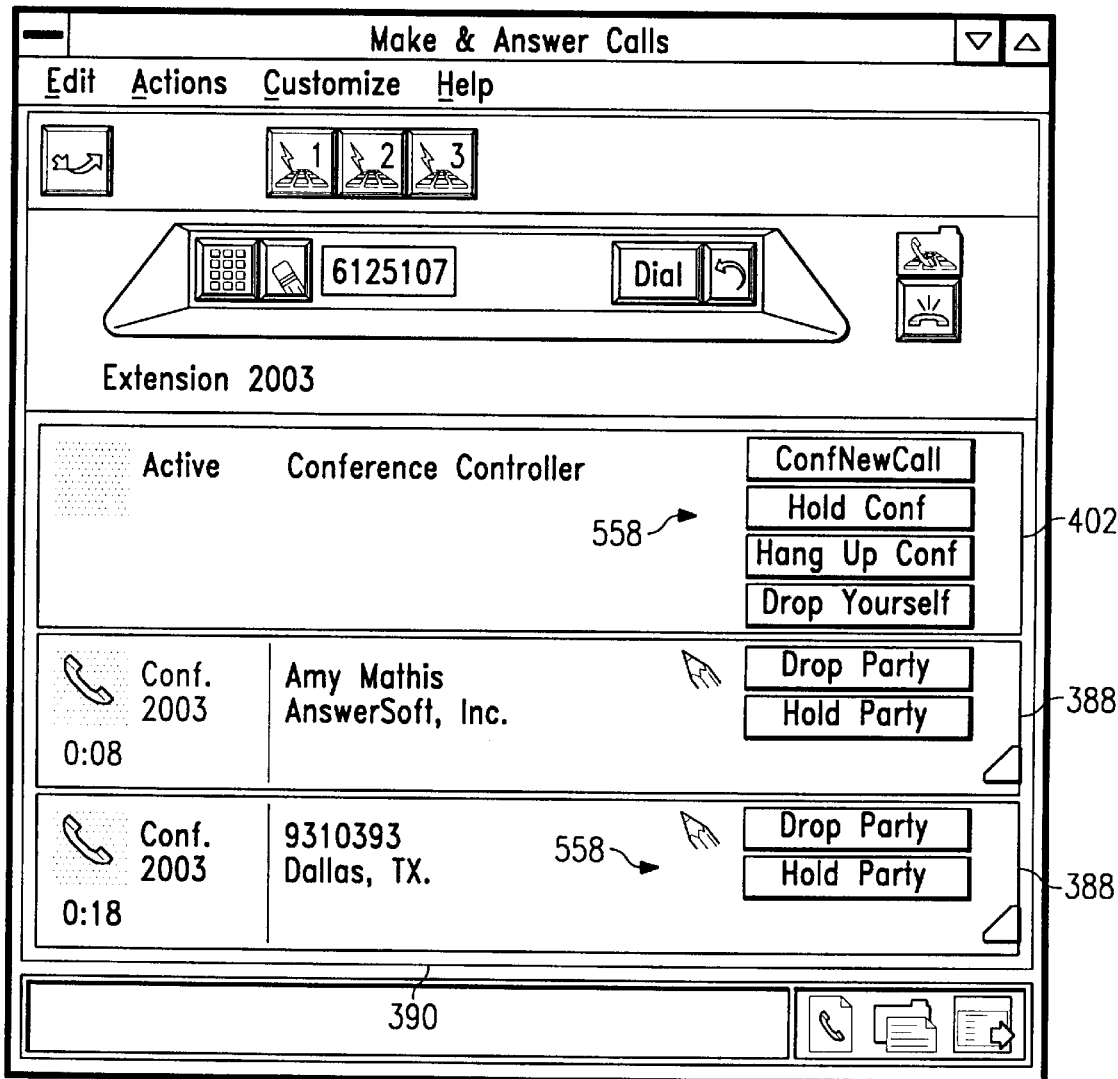
FIG. 72 illustrates how some or all calls in a teleconference may be controlled by call control buttons for a conference controller used with the computer telephone system of FIG. 1.
Figure 73:
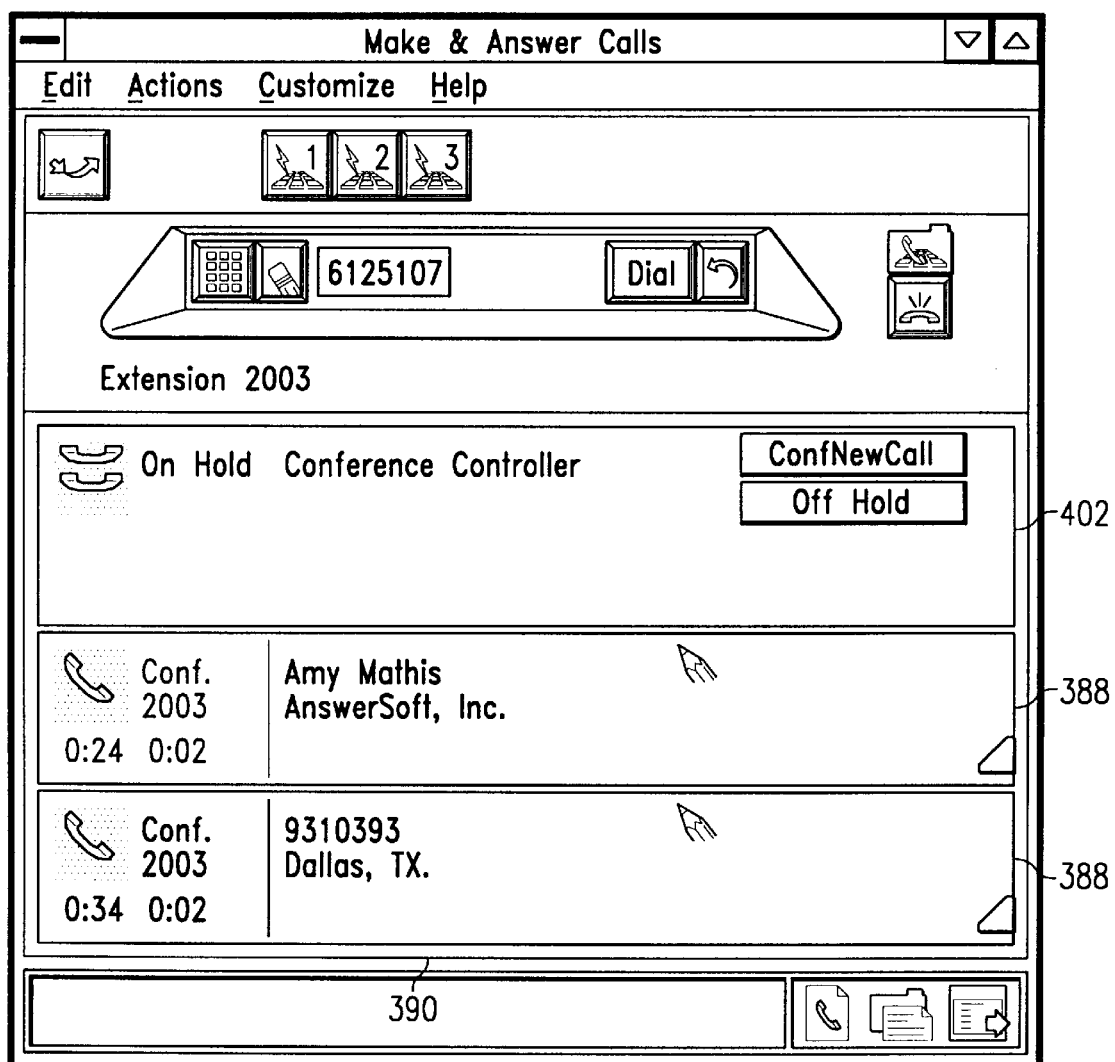
FIG. 73 illustrates the result of controlling all calls in a conference using the window of FIG. 72.

The present invention allows conference level actions to be taken when a conference is in progress. Call level actions may also be taken for parties to the conference. For example, as illustrated in FIG. 72, an entire conference may be placed on hold using the hold conference call control button 558 on conference controller 402. Alternatively, an individual party to a conference may be placed on hold using a hold party call control button 558 available on a call object 388. The present invention thus allows a user maximum flexibility as both conference level actions and call level actions may be taken for calls in progress that are participating in a conference call. FIG. 73 illustrates call window 390 when a conference has been placed on hold by pressing hold conference call control button 558 on conference controller 402. The user thus avoids the need to place each individual party on hold and can place the entire conference on hold at one time.

DISPLAY OF PHONE CONTROL OPTIONS

Each brand of PBX 18 may support different features such as call forwarding, speakerphone and do not disturb. In addition, in other environments such as the use of Centrex services, various levels of service may have different feature sets. The present invention allows the user to be presented with only those features that are valid for their PBX 18 or their service environment. As such, a tool bar in the users make and answer calls window 380 will include only those features supported by the users PBX 18.

Application 20 may determine which features to present to the user in several ways. First, PBX 18 may be queried to determine the brand and model number. This information may be used to access a look-up table indicating what options that PBX 18 supports. Each individual telephone on a particular system could also be queried.

Alternatively, a PBX 18 could be queried directly by server computer system 16 to determine what features it supports. This information could then be used directly to display the correct features to the user. Most PBXs do not currently support this method.

Some PBXs 18 may not support a query to determine its brand and model number. If not, then a system administrator may enter the type and model of the PBX 18 that they are using. This information may then be used to access a look up table indicating which options that the switch supports.

Figure 74:
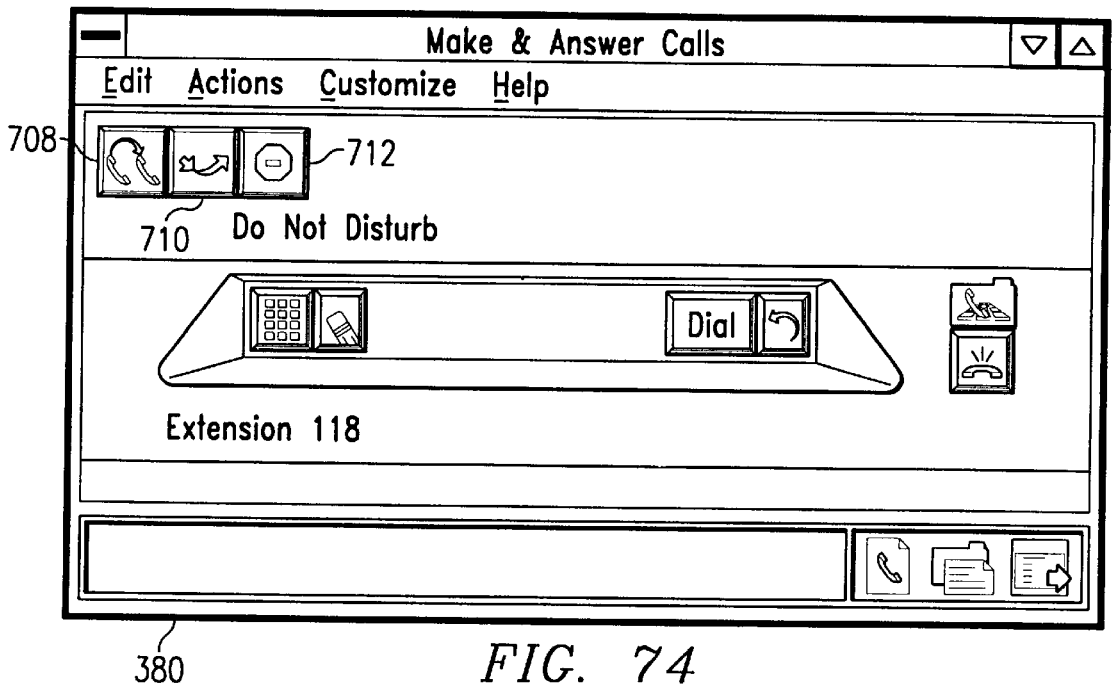
FIG. 74 illustrates the display of valid phone features in the computer telephone system of FIG. 1.

An example of this feature of the present invention is illustrated in FIG. 74. In this example, the tool bar for make and answer calls window 380 presents the user with pickup button 708, forward button 710, and do not disturb button 712, indicating that these functions may be supported by the PBX 18 connected to this user. Thus, the present invention may only display to the user features that the user can use. Those features that are not supported are not presented to the user as choices.

SPEED DIAL FEATURES

The present invention also allows the user to create speed dial entries for commonly dialed numbers. These speed dial icons of the present invention, however, have several features that make them easier to use than existing speed dial systems.

Figure 75:
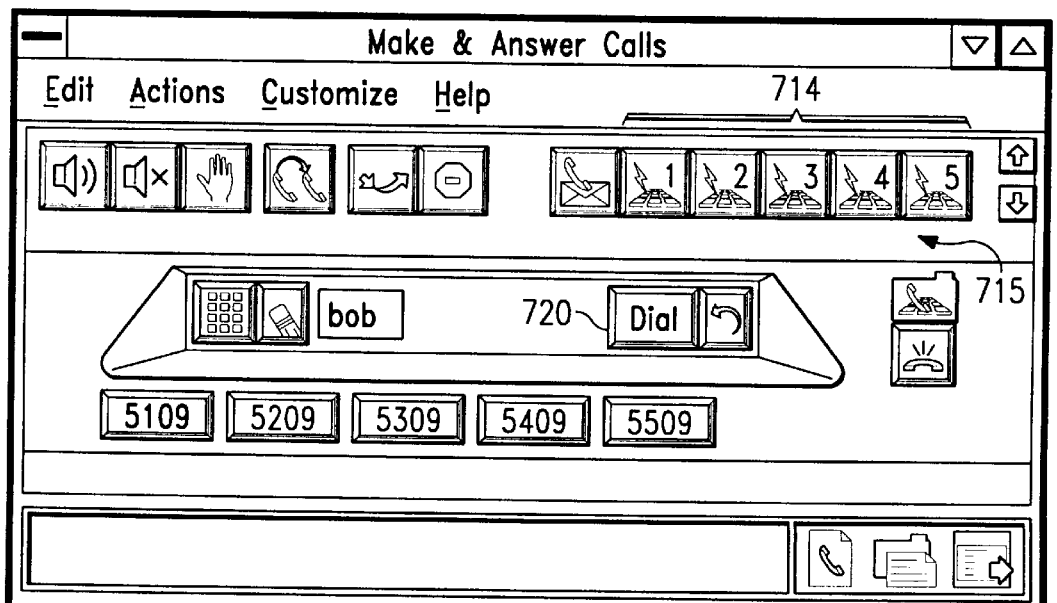
FIG. 75 illustrates speed dial icons used with the computer telephone system of FIG. 1.

FIG. 75 illustrates speed dial icons 714 in make and answer calls window 380. In the present invention, passing the mouse pointer (not explicitly shown) over the surface of one of the speed dial icons 714 will cause the name, if any, associated with that icon to appear underneath the icon. A user can thus easily find the persons name to whom they have assigned a speed dial icon. If the user did not enter a name for the number, the number assigned to the icon appears beneath the icon when the user passes the mouse pointer over a speed dial icon 714.

For example, in FIG. 75, the user passed the mouse pointer (not explicitly shown) over the third speed dial icon 714. The speed dial icon name 715 then appeared below the third speed dial icon 714.

Figure 76:
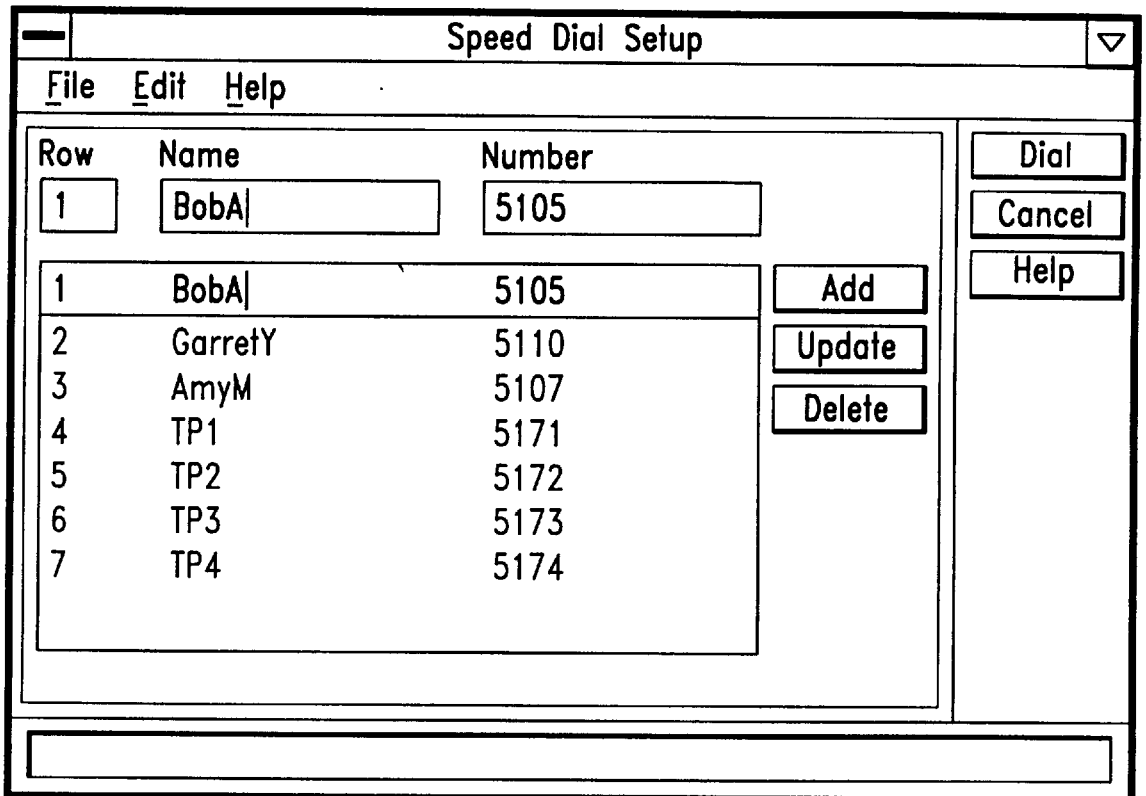
FIG. 76 illustrates a speed dial set-up window used with the computer telephone system of FIG. 1.

Speed dial icons may be set up and defined using speed dial icon setup window 716 illustrated in FIG. 76. The user may enter a name and phone number for each speed dial icon. If the user chooses to only enter a name, computer telephone system 10 may look that name up in a directory each time that particular speed dial icon 714 is pressed. If directory lookup is used, the user may be presented with a choice of all the possible numbers available for that person. The present system thus allows a user to define speed dial icons 714 by phone number or by person. The definition by person is particularly useful when a person has several telephone numbers at which the person may frequently be reached. When this is the case, a user may know which number to reach the person at and can easily access all numbers using the name look up feature of the speed dial system.

To make a call using a speed dial icon 714, the user simply clicks the mouse 64 on the appropriate speed dial icon 714. If a phone number has been entered for that icon 714, computer telephone system 10 will dial that number directly. If only a name has been entered for that speed dial icon, the user is either presented with a list of potential numbers to call or a number is automatically dialed if the database access returns only matching choice. In addition, if more than one number is available for the matching choice returned, the primary number for that party is automatically dialed if the automatic dial feature described previously has been enabled by the user. If this feature is not enabled for the matching party, the user is presented with the list of numbers associated with that party.

DIAL BY NAME FEATURE—PARTIAL STRING SEARCH

Often, a user may not remember the full name of a person with whom they desire to speak. The person may only remember their first name, their last name or even what letter the person's first or last name begins with. The present invention allows a user to locate a number in any of the user's phone directories using either the persons full name, their first name, their last name, an alias, or the beginning of their first or last name. This feature is also useful when the user cannot remember how a person's name is spelled. The search may also not be case sensitive. In other words, the application may search for the name regardless of whether letters are in upper or lower case.

Figure 77:
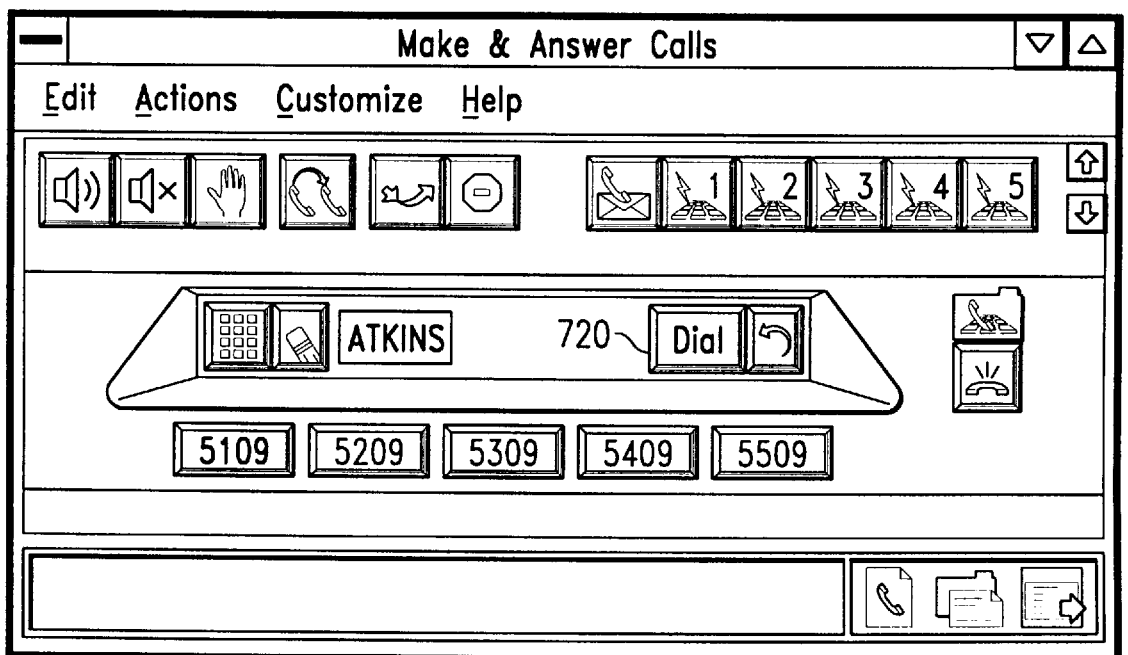
FIG. 77 illustrates a window used to search for a name in a directory with the computer telephone system of FIG. 1.
Figure 78:
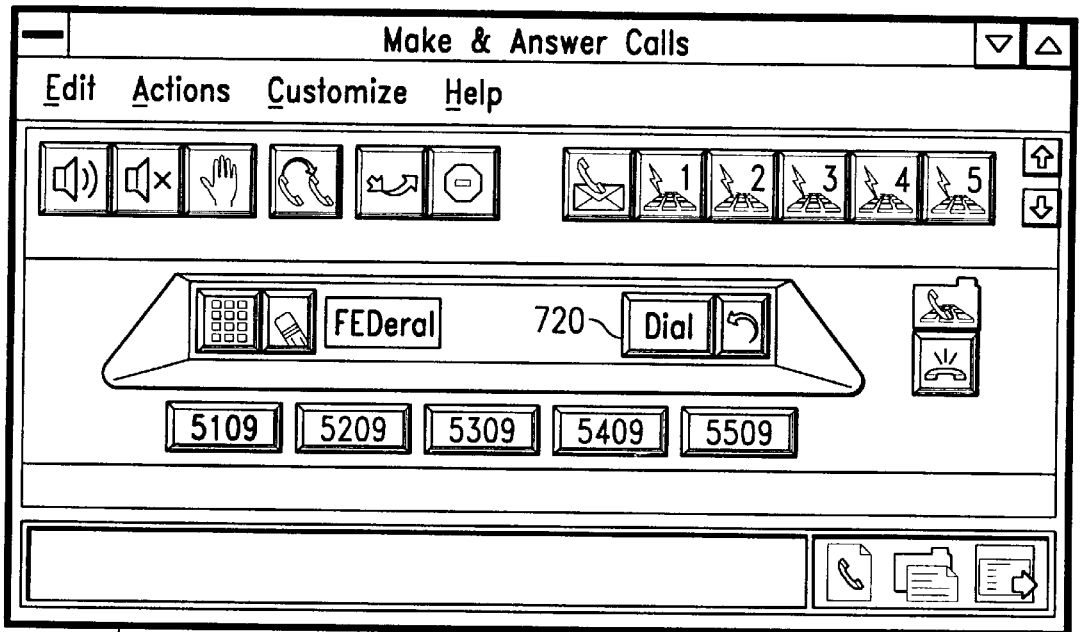
FIG. 78 illustrates a window used to search for a name in a directory with the computer telephone system of FIG. 1.

In FIG. 75, the user has entered the name "bob" in make and answer calls window 380. In FIG. 77, the user has entered the last name "ATKINS" on the dial pad of make and answer calls window 380. In FIG. 78, the user entered the word, "FEDeral" on the dial pad of make and answer calls window 380. The word, "federal," is an alias for Bob Atkins. The present invention may allow an alias to be entered in the directory for a person. The name search feature of the present invention may also search for an alias when searching the directories for an occurrence of the string entered in the dial pad.

To cause the name lookup to occur, the user may either press enter on keyboard 62 or click the mouse 64 on the dial button 720. The name lookup procedure is then performed.

Figure 79:
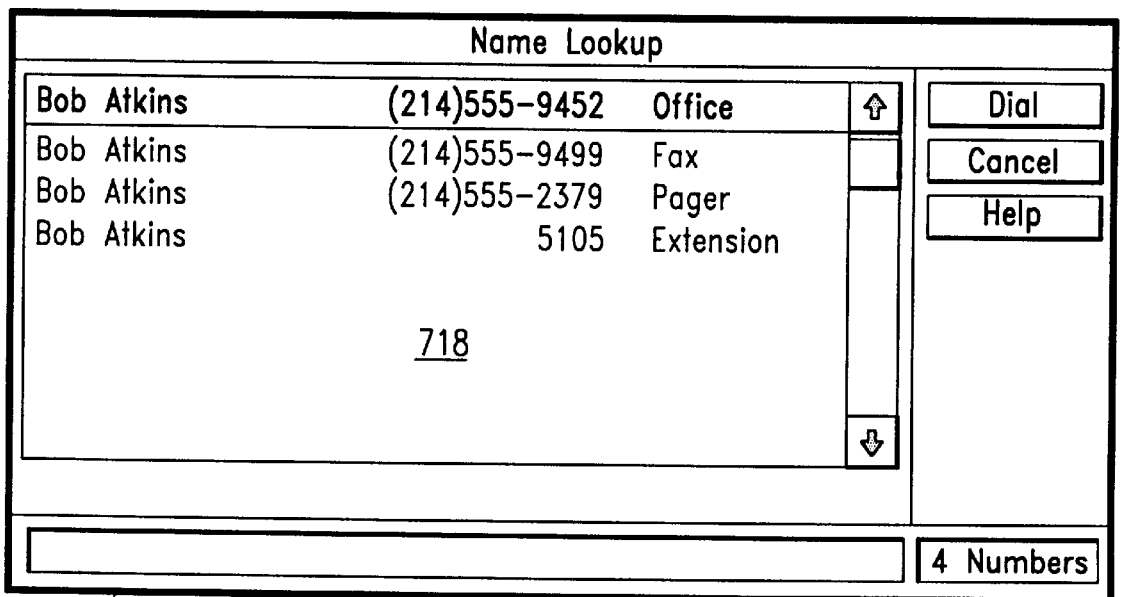
FIG. 79 illustrates the results of searching for a name using the search defined in the windows illustrated in FIGS. 77 or 78.

FIG. 79 illustrates the results of the name lookup for the strings entered in any of the three searches described for FIG. 75, FIG. 77, or FIG. 78. In other words, the present invention will produce all directory entries where either the first name, last name, or alias matches the search string. After performing the search, all names matching the search appear in name lookup window 718. All numbers available for any person found during the name lookup also appear as illustrated in FIG. 79. A procedure used in performing the name lookup feature of the present invention will be described below.

PARTIAL STRING SEARCH

As discussed above, the present invention allows a user to find a name in the directory when the user only knows what letters a persons name begins with. When this is the case, the user simply enters the letters which the user may remember and the present invention will search the directory for any first name, last name, or alias which begins with these letters.

Figures 80, 81:
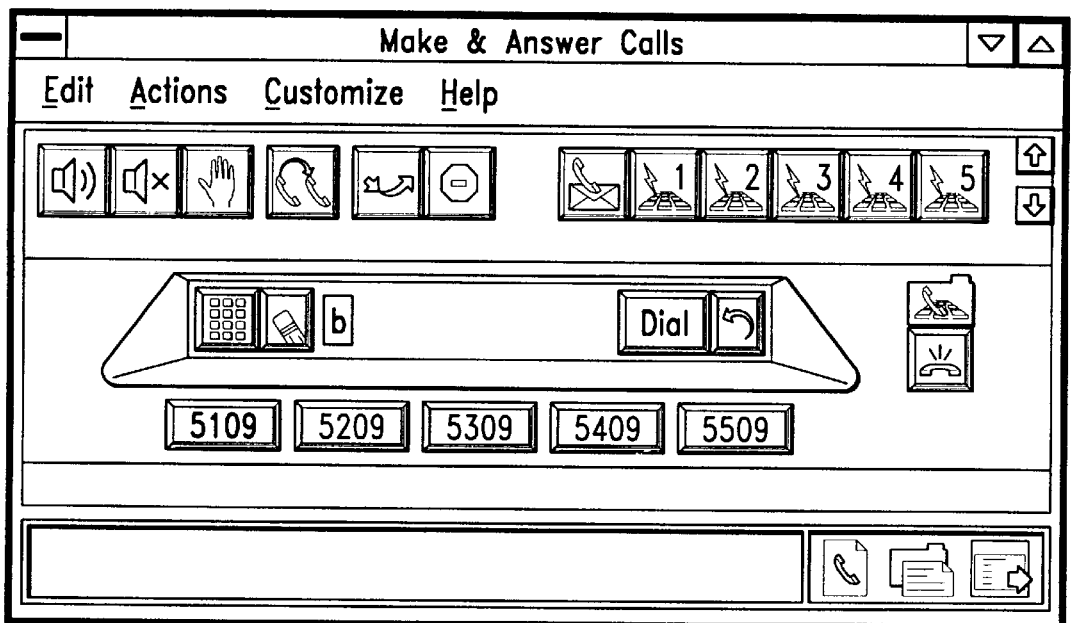
FIG. 80 illustrates how searching for a name may be done using a partial string of the name in the computer telephone system of FIG. 1.
FIG. 81 illustrates the results of searching using the partial string illustrated in FIG. 80.

FIG. 80 illustrates an example of the beginning of a partial string search. In FIG. 80, the user has entered the letter "b" to conduct a partial string search.

When the string search on the letter "b" is conducted, the resulting name lookup window 718 for this user's directory appears in FIG. 81. In this example, the user has produced one entry for Barry Lord, and four entries for Bob Atkins. Each of these entries has a first name that begins with "b". The search also produced an entry for Penny Burton, who has a last name that begins with "b". The search apparently did not produce any names having an alias beginning with the letter "b."

SINGLE MATCH AUTODIAL

A user may only have one name in a directory having a specific first and last name and the user may only have one phone number entered for that person. When this is the case, the result of the name search discussed above will be a single entry for a person with a single phone number. In this case, the user may desire to simply have the number dialed directly without having to press the dial button 720 a second time or select the name to be dialed off a list containing only one entry.

Figure 82:
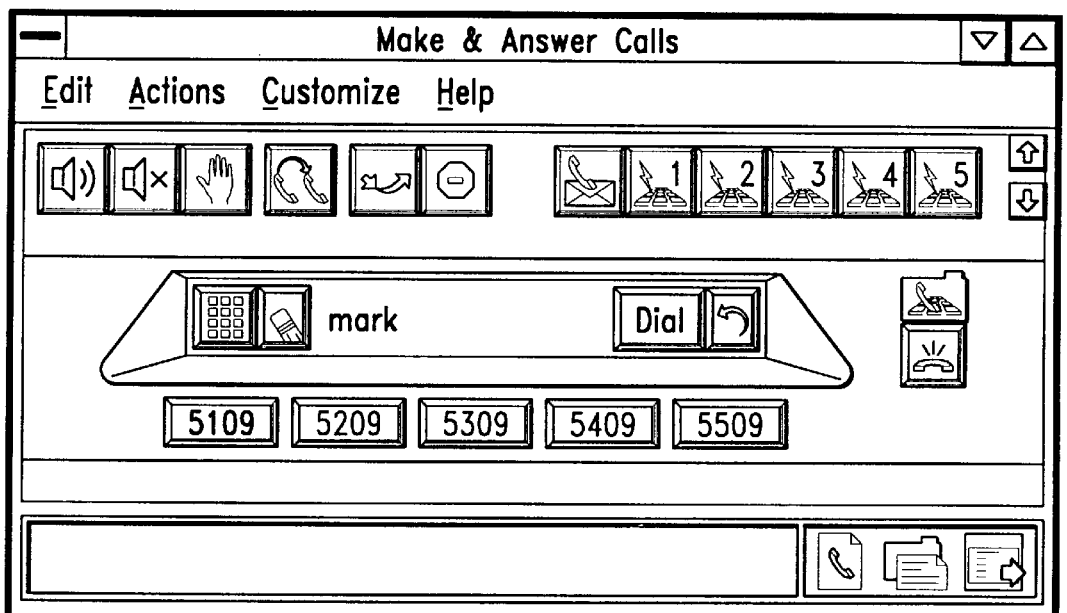
FIG. 82 illustrates the search of a name in a directory entry in the computer telephone system of FIG. 1.
Figure 83:
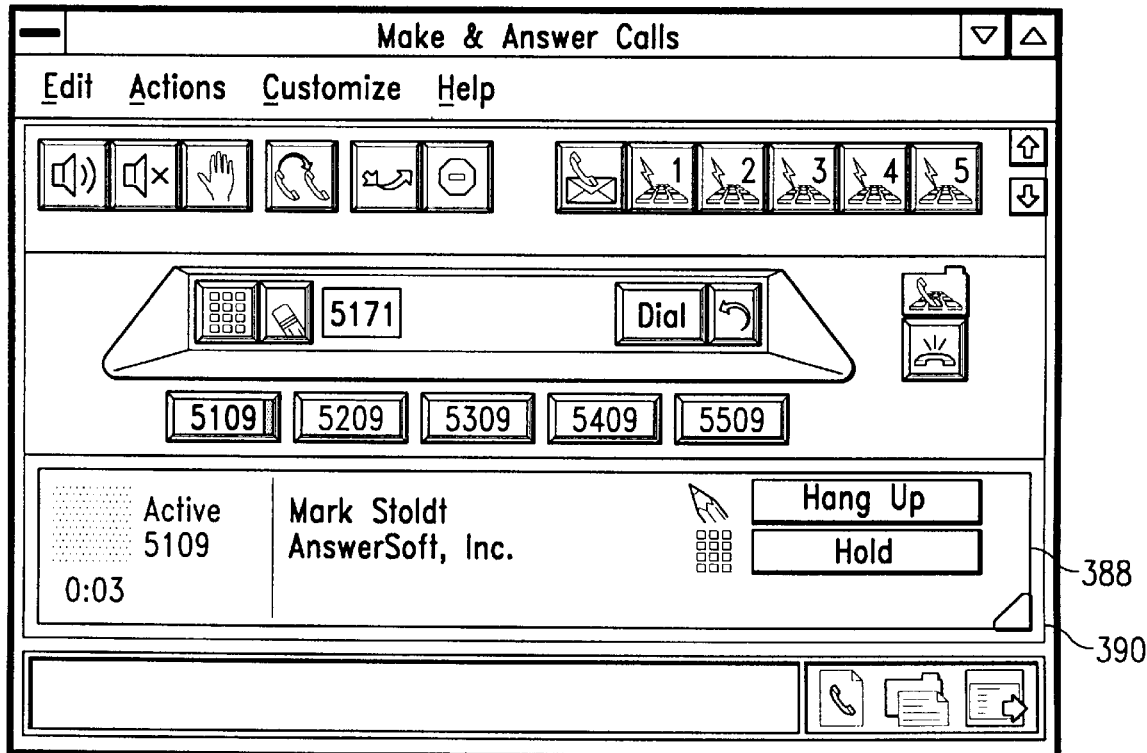
FIG. 83 illustrates the result of the search of FIG. 82 when only one name was found in the directory for the search string.

The present invention will automatically dial a phone number for a person found during a name search when only one person and one phone number for that person is found. FIG. 82 illustrates the name, "Mark," being entered on the dial pad of make and answer calls window 380. Because this user only has one "Mark" in his database, the result of conducting a name search with the name entered in FIG. 82 is the string illustrated in FIG. 83. As illustrated, computer telephone system 10 automatically dialed Mark Stoldt and connected the call when Mr. Stoldt answered, placing a call object 388 in call window 390. In other words, the system automatically dialed Mark Stoldt's phone number because it found only a single name and phone number where the first name, last name, or alias for the entry was the name "Mark."

SINGLE MATCH PRIMARY NUMBER DIALING

In other circumstances, a user may remember a person's full name or may only have a single occurrence in the database for the part of the name that the user can remember. In this case, the user may desire a certain number to always be dialed for that person, unless the user indicates otherwise. For example, a user will normally dial one of its co-workers at work, but may also store home numbers or mobile telephone numbers for that person in the directory. It would be desirable for computer telephone system 10 to automatically dial the co-worker's work number unless the user indicated otherwise. The present invention implements this feature using the mechanism of primary numbers.

Figure 84:
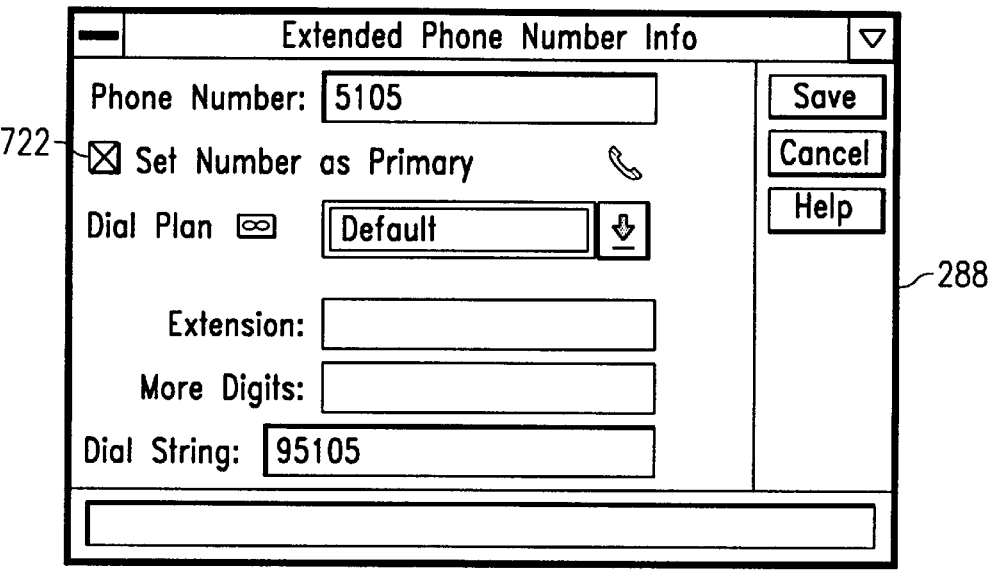
FIG. 84 illustrates extended phone number information that allows a user to establish a primary number in the computer telephone system of FIG. 1.

FIG. 84 illustrates extended phone number information window 288. In this window, the user designates a number as the primary number by checking the primary number check box 722. To check this box, the user simply clicks mouse 64 on the primary number check box 722. If the user desires to deselect a number as primary when an X already appears in primary number check box 722, the user simply clicks mouse 64 on the box 722 again. In this example the user has designated phone number 5105 as a primary number. For purposes of illustration, phone number 5105 is one of the phone numbers for Bob Atkins.

Figure 85:
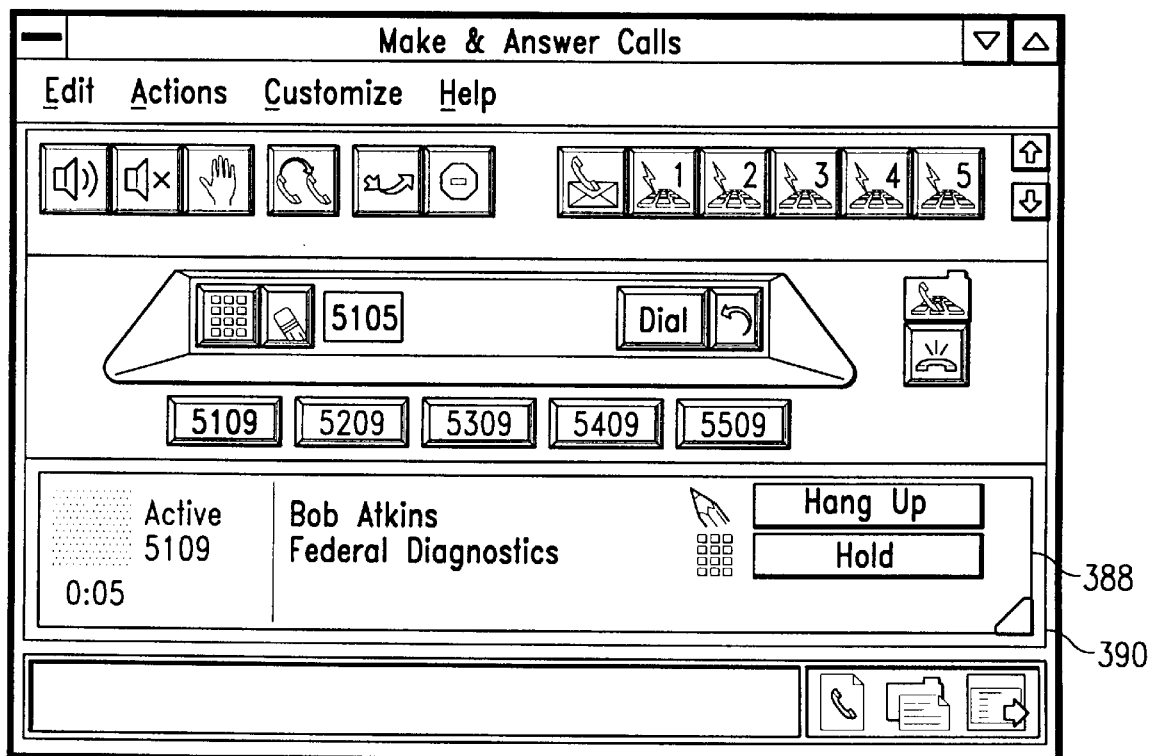
FIG. 85 illustrates how a primary number is dialed as a result of a search for the name of the party found during the search using computer telephone system of FIG. 1.

FIG. 85 illustrates the results of a name search using any of the strings described above in FIGS. 75, 77, or 78. Because the number 5105 for Bob Atkins was designated as his primary number in FIG. 84, computer telephone system 10 automatically dials Mr. Atkins' phone number 5105 and connects the user to this number. The present invention thus allows a user to easily call a person with whom they normally speak using one telephone number, yet the invention allows the user to maintain multiple phone numbers for that person.

Sometimes, a user may desire to call a person using a number other than the number designated as primary. In such a case, the user may override the primary number.

Figure 86:
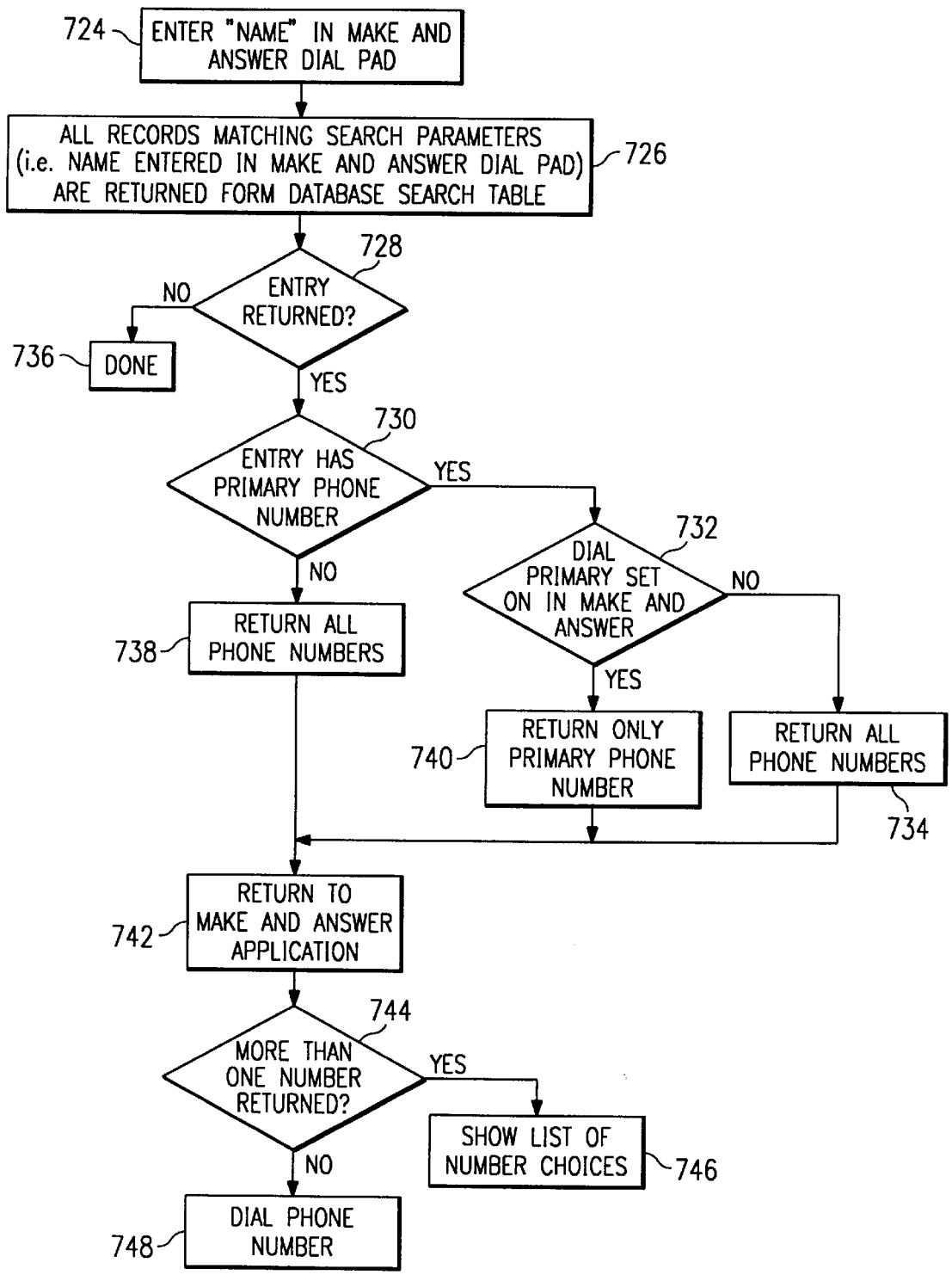
FIG. 86 illustrates a procedure used to search for directory entries in the computer telephone system of FIG. 1.

FIG. 86 illustrates an example procedure that may be used to implement the string search features described above. The procedure begins at step 724 when the user enters a name in the make and answer calls dial pad. Then, in step 726 all records matching the search parameters are returned from the database search table. In this step, each phone directory visible on the user's directory tool bar are searched. The first, last, and alias fields may be searched for that person. The alias field is also known as a search key field.

Execution then proceeds to step 728 where it is determined whether any directory entries were returned. If not, the procedure terminates at step 736. If so, then execution proceeds to step 730.

In step 730, the procedure determines whether an entry returned has a primary phone number designated. If so, then it is determined in step 732 whether the dial primary number feature is turned on in make and answer calls window 380. If not, then the procedure returns all phone numbers as parameters in step 734. If so, then the primary number is dialed in step 740.

Returning to step 730 if the entry returned does not have a primary phone number, then all numbers are returned in step 738. From steps 734 or 738, execution proceeds to step 742 where the procedure returns to the make and answer calls application. Next, the make and answer calls application determines in step 744 whether more than one phone number was returned as a parameter. If so, then a list of dial choices is illustrated in step 746. If not, then the single phone number returned is dialed in step 748.

GLOBAL SEARCH

The features described above give the user of computer telephone system 10 a powerful tool to search for names in the directory. A user, however, may not remember a person's name, but instead may remember their company or what city they live in. In this case it would be desirable to allow the user to search the directory in a way similar to the above using other fields. It may also be desirable for the user to be able to designate which directories this search occurs in. The present invention allows such searches.

Figure 87:
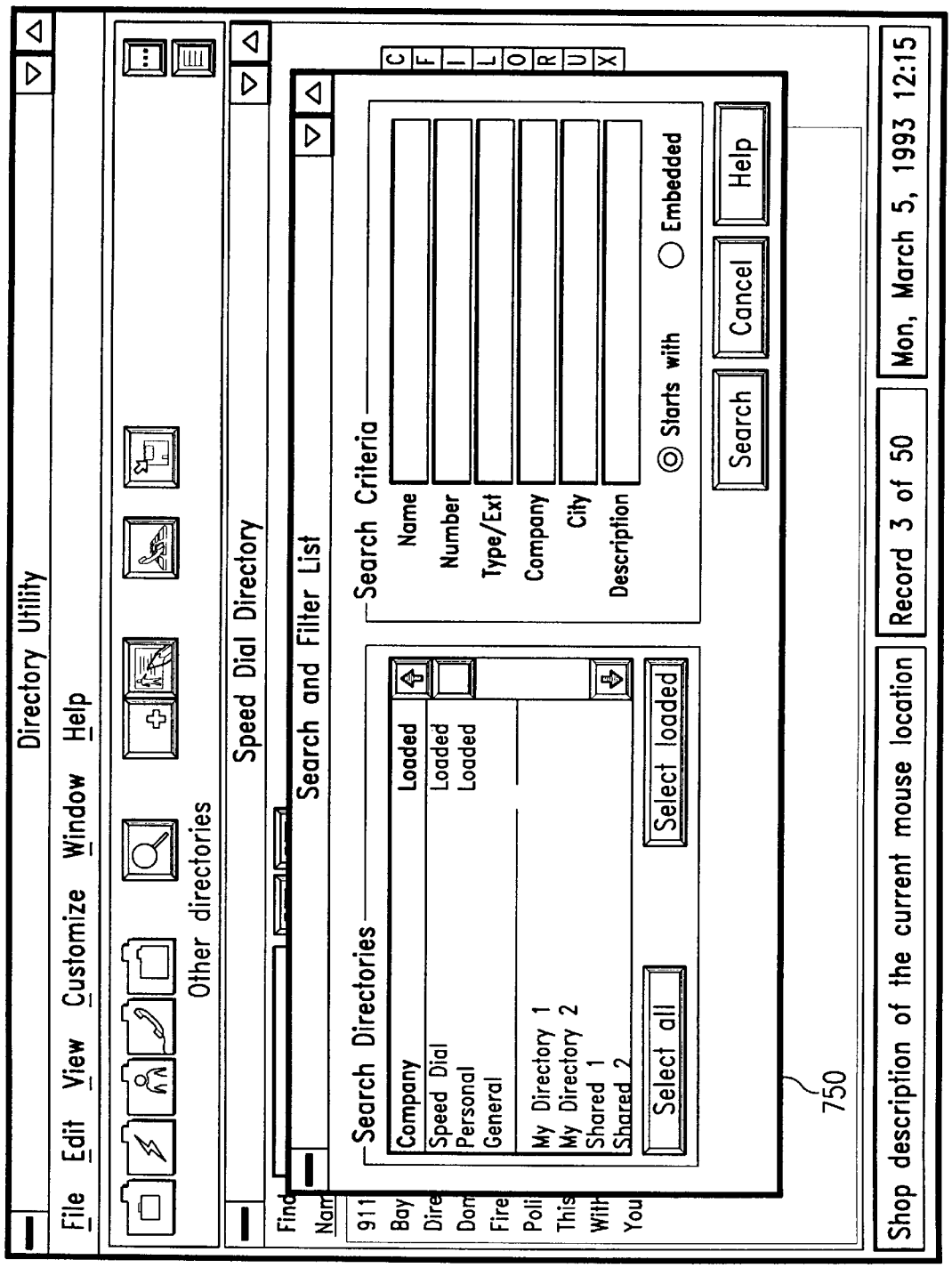
FIG. 87 illustrates a global search window used to conduct a global search of the directories of the computer telephone system illustrated in FIG. 1.

FIG. 87 illustrates search and filter list window 750 that is accessed using the directory utility. Search and filter list window 750 allows a user to designate directories to be selected in which to conduct a search. The user is also given the opportunity to choose a number of fields such as the company name or city as illustrated. The invention also allows the user to perform a "starts with" search or an "embedded" search. An "embedded" search will search for an occurrence of a string anywhere in the field or fields being searched. A "starts with" search will only search for the occurrence of a string at the beginning of fields being searched. The searches performed using search and filter list window 750 are performed in a manner similar to those described above for name searching.

REDIAL AND UNANSWERED CALLS LISTS

A user may desire to know numbers that the user recently dialed. The user may also desire to know who made calls that the user did not answer. The present invention provides for redial lists and unanswered calls lists.

Figure 88:
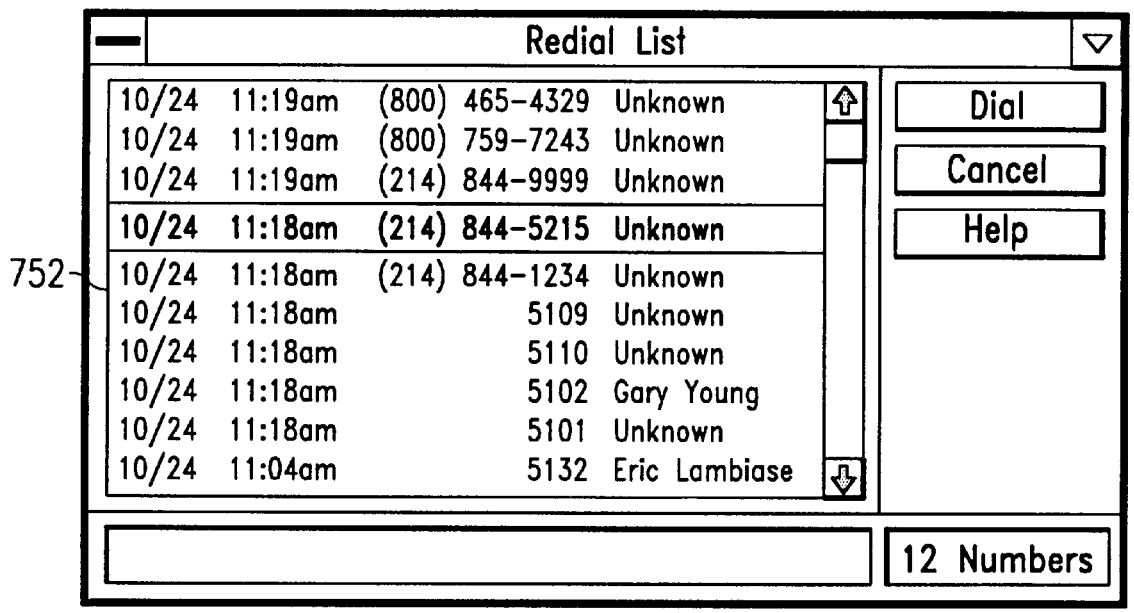
FIG. 88 illustrates a redial list generated by the computer telephone system of FIG. 1.

FIG. 88 illustrates redial list window 752. Redial list window 752 will list the last N previously dialed phone numbers. N is a predetermined number chosen by the user. According to one advantage of the present invention, each entry in redial list window 752 is unique. In other words, if the user dials a number five times, it will only appear once in the redial list. This allows the user to make the most efficient use of the redial list.

A user will sometimes have multiple extensions on his phone. If so, the user may desire a redial list for each extension or a cumulative redial list covering numbers dialed on all extensions. The present invention allows the user to choose whether to display redial lists cumulatively or for each extension.

Figure 89:
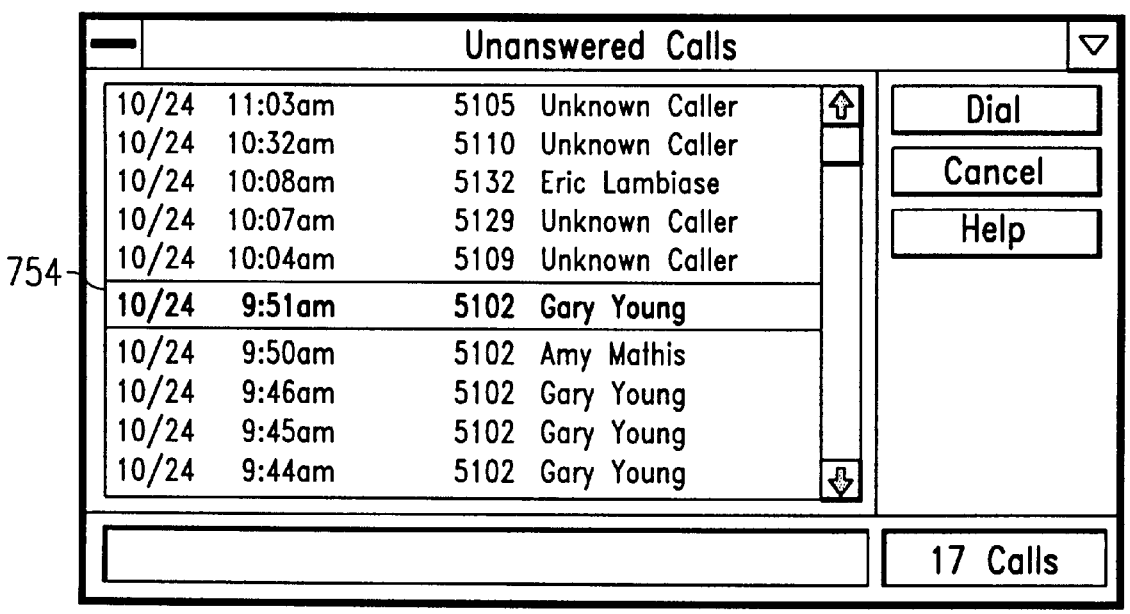
FIG. 89 illustrates an unanswered calls list generated by the computer telephone system of FIG. 1.

FIG. 89 illustrates unanswered calls window 754. This window may display the last N previously unanswered calls for a user. N is a predetermined number set by the user. In this case, however, the user may desire to know when someone has attempted to contact the user multiple times. When this is the case, multiple entries for the caller are displayed in unanswered calls window 754 as illustrated. As described above for the redial list, the user may select whether the unanswered calls list is cumulative or produced only for a single extension used by the user.

Figure 90:
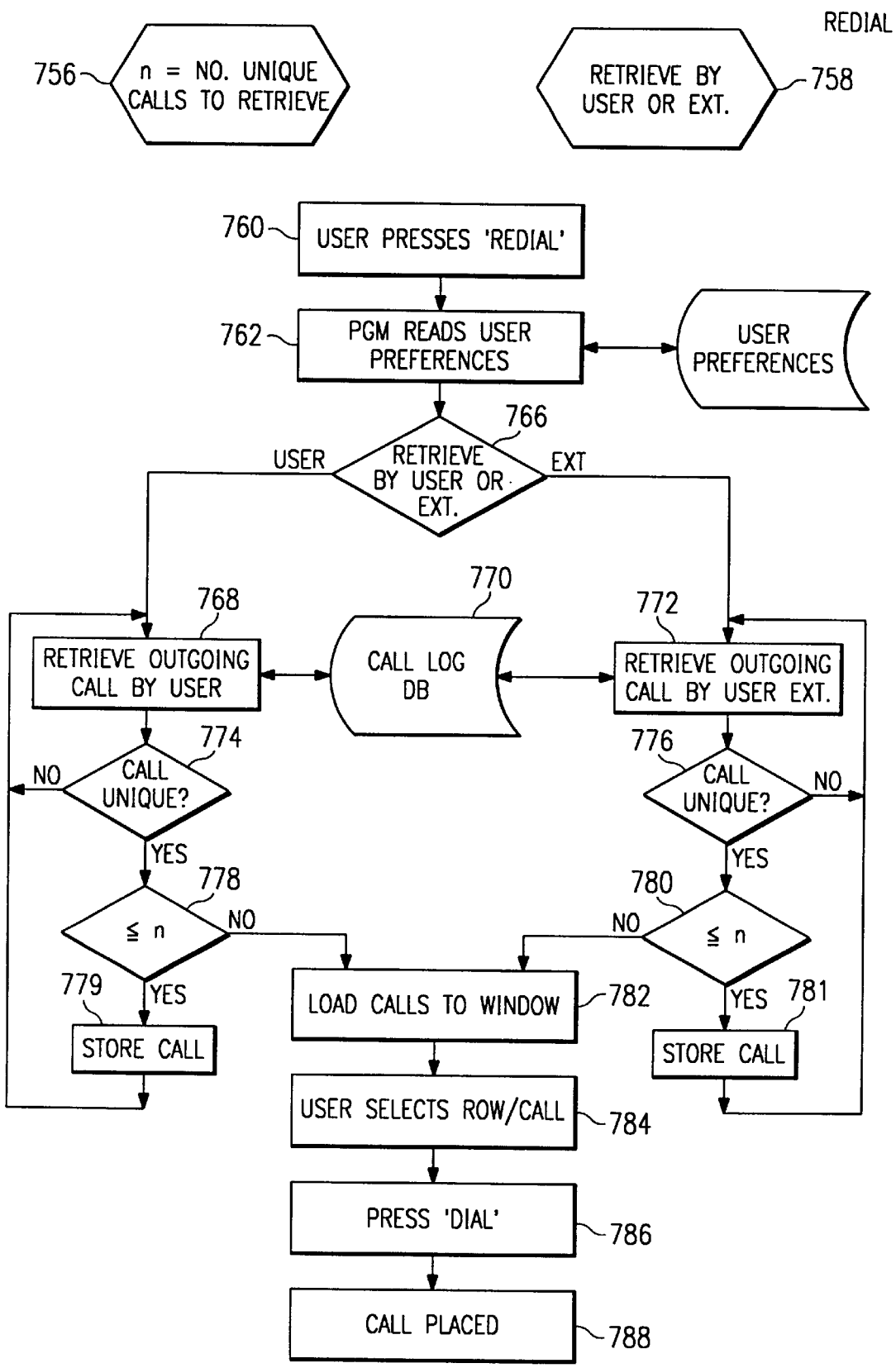
FIG. 90 illustrates an example of a procedure to generate the redial list of FIG. 88.

The redial list and unanswered calls list of the present invention are able to look the phone number up in the user's phone directories and display the name associated with that phone number if available. Otherwise, an "unknown" designation will be given to numbers not found. FIG. 90 illustrates an example of a procedure that may be used to implement redial lists in accordance with the teachings of the present invention. In step 756, the user predefines the number of calls which the user desires to retrieve for the redial list. In step 758, the user predefines whether calls should be retrieved by user or by extension.

The process begins when the user presses redial at step 760. In step 762, the procedure reads user preferences. Then, in step 766 it is determined whether the user desires to retrieve numbers by user or by extension. If the user desires calls be retrieved by user, then execution proceeds to step 768 where an outgoing call is retrieved using the user's name. The record is retrieved from the call log database 770. Call logging is described below.

After a phone number has been retrieved in step 768, in step 774 it is determined whether the call is a unique number. If not, the process loops back to step 768. If so, the procedure determines in step 778 if all N calls have been stored for the redial list. If not, the call is stored in step 779 and execution returns to step 768. If so, then execution proceeds to step 782 where the N last calls dialed are loaded into redial list window 752. In step 784 the user selects the row of the person to call. In step 786, the user presses dial causing the call to be placed in step 788.

Returning again to step 766, if the user desired the redial list to be made by extension, then execution proceeds to step 772, where the procedure retrieves an outgoing call using the user's extension. The call is then retrieved from the call log database 770. Then, in step 776, the procedure determines whether the call is a unique number. If not, the procedure loops back to step 772. If so, then it is determined in step 780 whether N numbers have been retrieved. If not, then execution proceeds to step 781 where the call is stored. The procedure then loops back to step 772. If, in step 780, all N numbers have been retrieved, then execution proceeds to step 782 as above.

Figure 91:
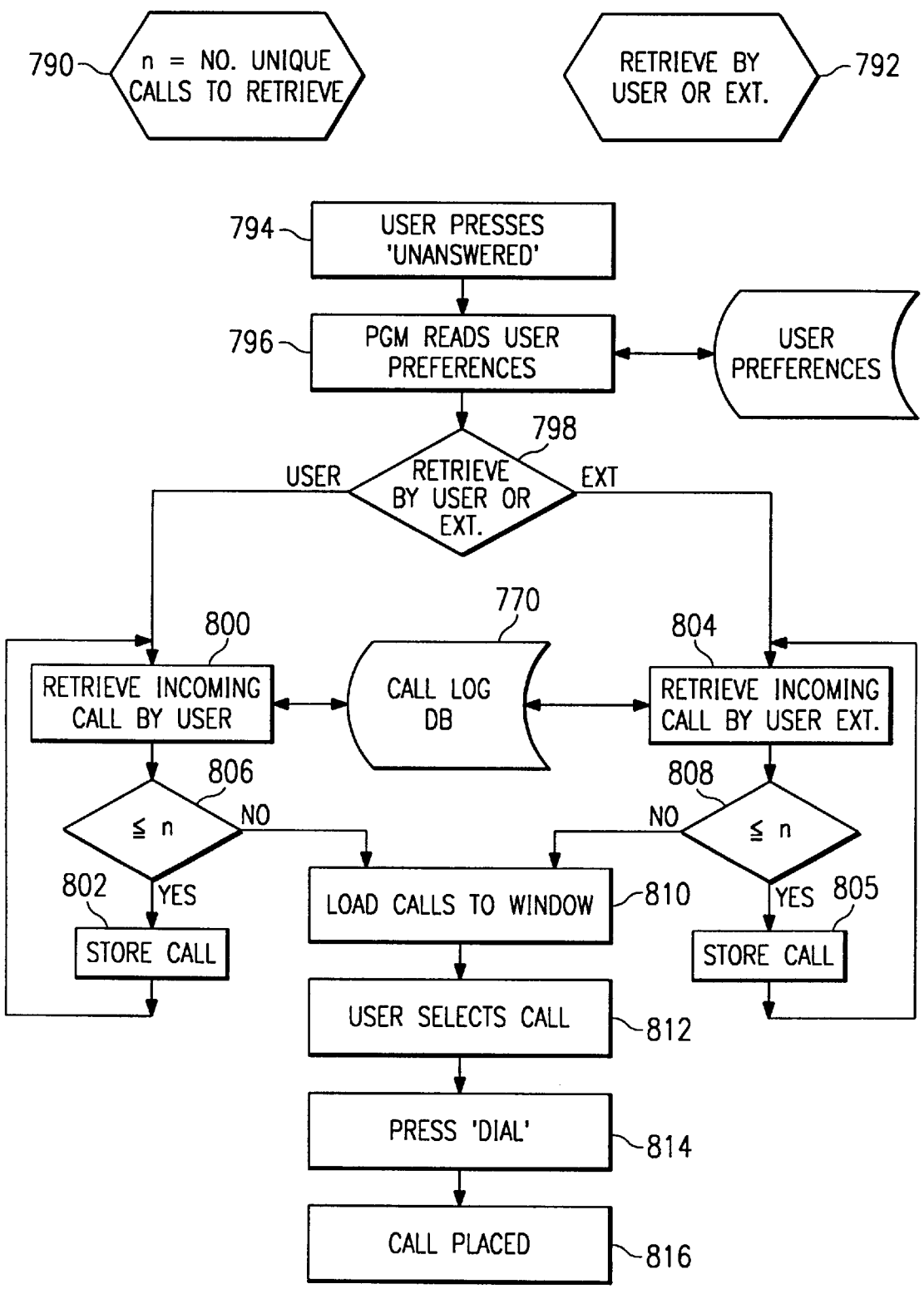
FIG. 91 illustrates a procedure used to generate the unanswered calls list of FIG. 89.

FIG. 91 illustrates a similar procedure that is used to form an unanswered calls list. In this procedure, the user has previously designated N as the number of calls the user desires to retrieve for the list in step 790. The user has also previously indicated whether calls should be retrieved by user name or by an individual extension in step 792.

The procedure begins at step 794 when the user presses the unanswered list button. In step 796, the procedure reads the user preferences so that in step 798 the procedure determines whether the user desires the unanswered calls list to be formed using the user's name or using an individual extension. If the user has designated retrieval by user name, execution proceeds to step 800 where the procedure retrieves an incoming call for the user's name from call log database 770. Then, in step 806, it is determined whether N calls have been retrieved. If not, the call is stored in the unanswered list in step 802 and the procedure loops back to step 800. If all N numbers have been retrieved, then execution proceeds to step 810 where previously unanswered calls are displayed in unanswered calls window 754. In step 812, the user selects a call displayed in window 754. When the user presses the dial button in step 814, the call is placed in step 816.

Returning to step 798, if the user desired the unanswered calls list to be created by extension, then execution proceeds to step 804. In step 804 an incoming call is retrieved from call log database 770 using the user's extension. Then, in step 808, it is determined whether all N calls have been retrieved. If not, then the call is stored in step 805 and the procedure loops back to step 804. If so, then execution proceeds to step 810 for creation of the window and dialing as described above. It should be understood that these procedures may also display a partial list if N numbers are not available in call log database 770. Such checking may be performed, for example, along with steps 778, 780, 806, or 808.

DIAL DIGITS AFTER CALL CONNECT

In many cases, a user may need to dial additional digits after a phone call has been made. For example, if a user calls an automated banking telephone line to determine his balance, the user may have to dial a series of digits and his account number to obtain this information. Sometimes, a user will have to dial additional digits to obtain the correct department when calling a company. The present invention allows this process to be automated by giving the user the option of designating additional digits to be dialed after a call is connected.

Figure 92:
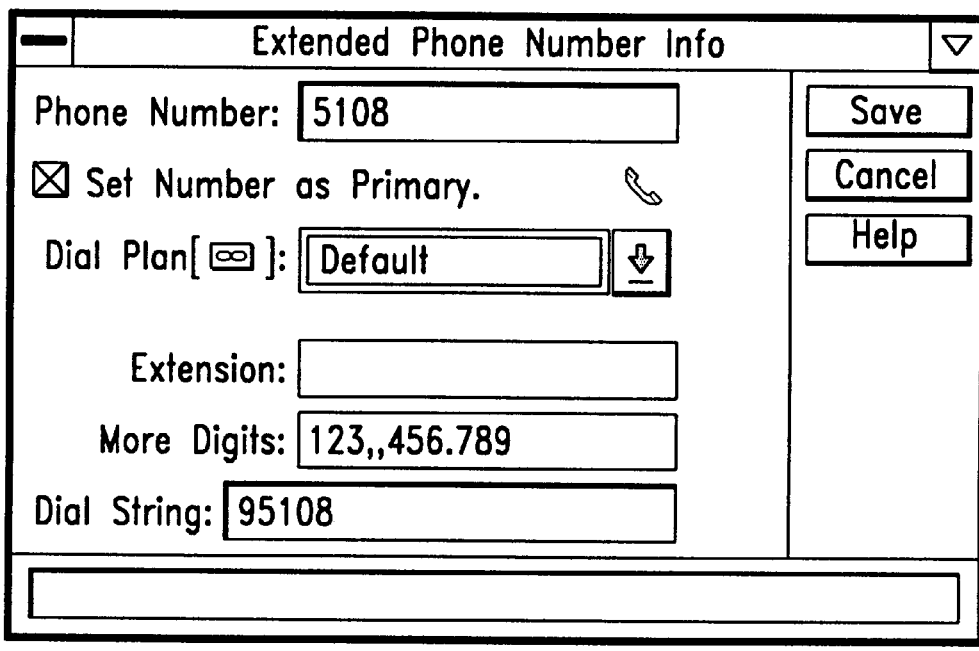
FIG. 92 illustrates a more digits feature used with the computer telephone system of FIG. 1.

As illustrated in FIG. 92, the user may enter more digits to be dialed after a call has been established in extended phone number information window 288. In this example, the user has entered 123,,456.789. As described above, the commas indicate that computer telephone system 10 should pause for a predetermined amount of time before dialing additional digits. Each comma may represent a predetermined time delay such as, for example, two seconds. The 'period' in the more digits string represents a command to wait for input by the user. When the more digits routine reaches this point in the string, it will wait for the user to press the dial button or hit enter on keyboard 62.

Figure 93:
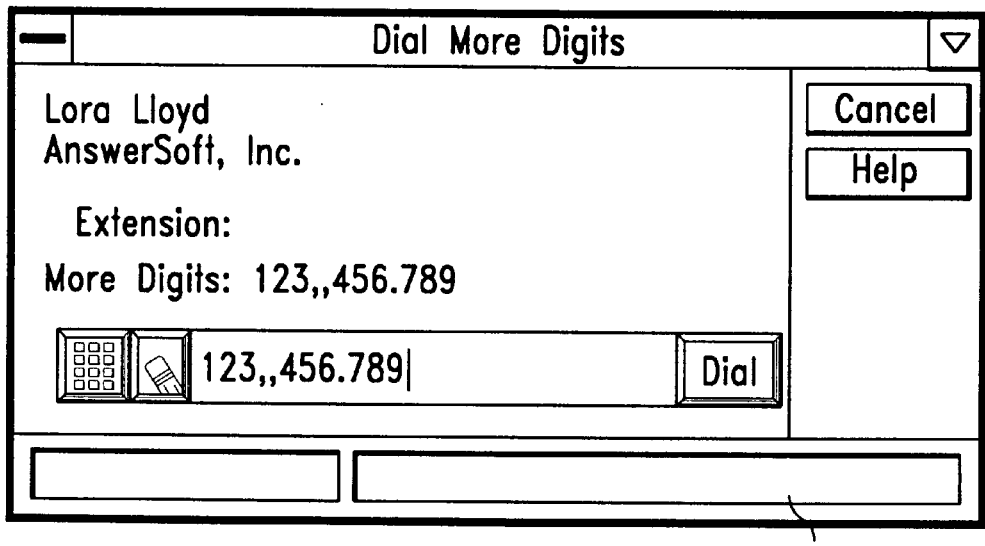
FIG. 93 illustrates the operation of the dial more digits feature used with the computer telephone system of FIG. 1.

FIG. 93 illustrates dial more digits window 818 that appears after a number is dialed. The example illustrated in FIG. 93 illustrates the dial more digits window for a call placed to Lora Lloyd and provides the digit string that was entered in the more digits box in FIG. 92. Dial more digits window 818 may be designated by the user to be opened automatically each time a call to a number is made. If, however, the user does not desire the dial more digits number to appear each time, the user may manually cause dial more digits window 818 to appear for a call in progress by pressing a button in make and answer calls window 380.

Figure 94:
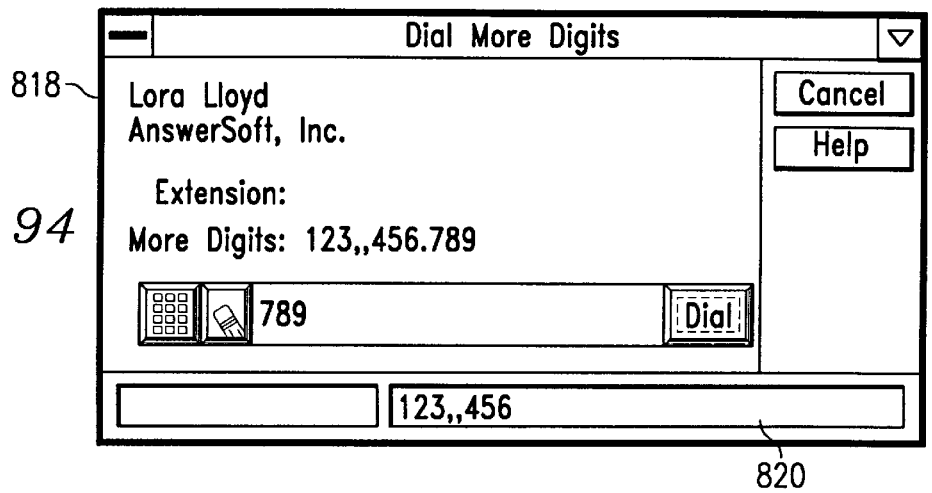
FIG. 94 illustrates the operation of the dial more digits feature used with the computer telephone system of FIG. 1.

As illustrated in FIG. 93, the more digits dial string appears in the dial pad of dial more digits window 818. The user may initiate dialing of the more digits string by hitting enter or clicking mouse 64 on the dial button in dial more digits window 818. After the digits in the more digits string have been dialed, they will appear in dialed digits box 820. FIG. 94 illustrates the results of the user pressing the dial icon in FIG. 93. The first portion of the string, "123,,456" has been dialed and now appears in dialed dialog box 820. Dial more digits window 818 upon reaching the period before the final portion of the more digits string, pauses and waits for the user to hit dial again. The remaining portion ,of the string is displayed in the dial pad portion of dial more digits window 818.

Figure 95:
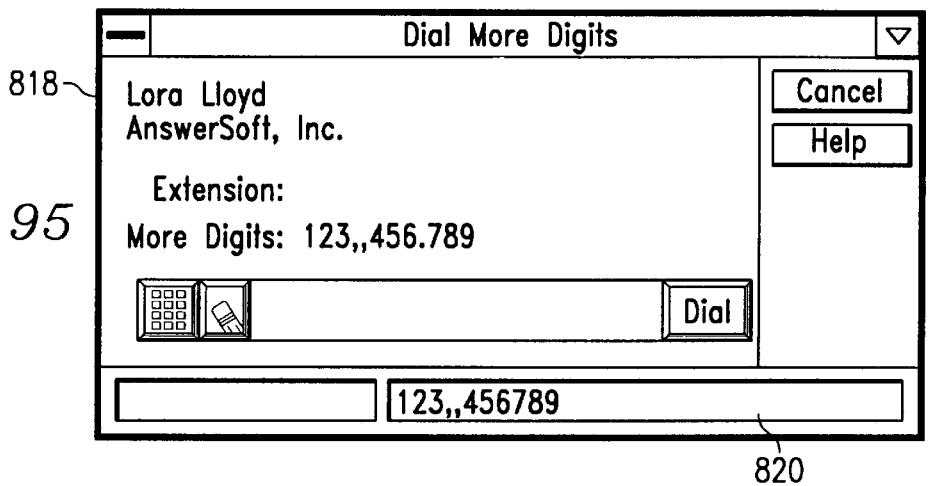
FIG. 95 illustrates the operation of the dial more digits feature used with the computer telephone system of FIG. 1.

After the user causes the rest of the string to be dialed, for example, by clicking the dial button in dial more digits window 818, the dial pad is blank as illustrated in FIG. 95. In addition, the digits that remain to be dialed now appear in dialed digits box 820.

FIG. 96 illustrates an example of a procedure that may be used to implement the dial more digits feature described above when the user has not designated the dial more digits to appear automatically. The procedure begins at step 822 when a call is placed. In step 824, the caller information is retrieved from the phone book database 826. Then, the more digits string is parsed in step 828. In step 830, a call is established and a decision is then made in step 832 whether the user has designated that the more digits window should be opened. If not, then the procedure waits in step 834 for the user to click on the dial more digits button. If in step 832, however, the user has already selected the dial more digits button, then dial more digits window 818 is displayed in step 836. The procedure then waits in step 838 for the user to press dial and when the user presses dial, portions of the dial more digits string are sent to the digits processor in step 840.

FIG. 97 illustrates a procedure that may implement the dial more digits function described above. When the user has designated more digits to be dialed automatically, this procedure begins at step 842 when a call is placed. In step 844, dialing instructions are retrieved from dial plan database 846. The dialing string may be parsed in step 848 and a phone number dialed in step 850. Then, in step 852, the procedure determines whether a call has been established. If no call is established, the procedure terminates.

If a call is established, then in step 854 it is determined whether to send more digits. If no more digits are to be sent, the procedure terminates. If, however, more digits must be dialed, execution proceeds to step 856. In this step, it is determined whether a character in the string is a pause character. If so, then the procedure waits for a predetermined period of time in step 858 and the procedure loops back to step 854. If not, then digits are sent to the telephony system in step 860 and the procedure again loops back to step 854.

TRANSFER CALL INFORMATION WITH A PHONE CALL

As described previously, users may transfer calls to other users in the system. When a call is transferred, it is desirable for all the information about a call to be transferred with a call. With the information about a call transferred, the transferee can immediately be able to determine who the call is from and determine other information about the call. The present invention allows information to be transferred with the call.

Computer telephone system 10 maintains a call status database that keeps track of calls in progress. This call status database is triggered by a transfer from a user. The call status database keeps track of both the transferor and the transferee. When a call is transferred, the status of that call is stored in the call status database. The transferee process then reads the call status database to retrieve information that was left by the transferor. At this point, the call status record is deleted for the transfer. If the call is transferred again, this process is repeated.

If a call is transferred to or from a phone that does not have the application 20 running, the chain may be broken and the call status data may be lost. In this case, however, the call information may be recreated by the next person to receive the transferred call that has the software running. This re-creation may occur by referencing a user's private and public directories when the call is transferred.

Figure 98:
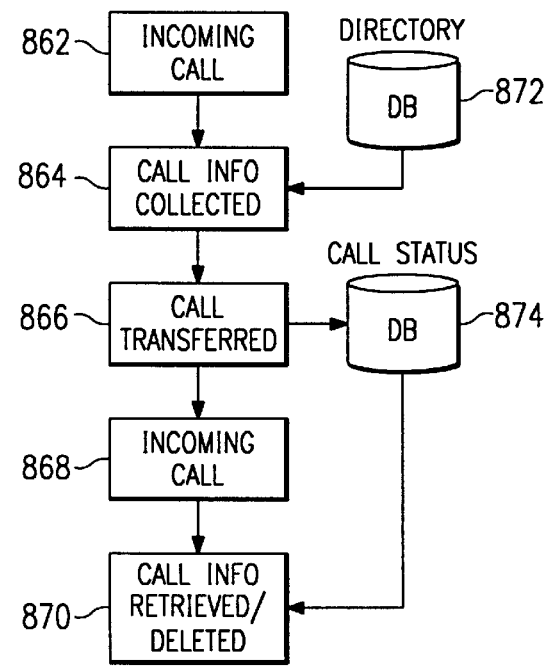
FIG. 98 illustrates a procedure used to transfer call information with a call in the computer telephone system of FIG. 1.

FIG. 98 illustrates an example of a procedure that may be used to implement the transfer-information-with-the-call feature described above. The procedure begins at step 862 when an incoming call is received. Information about the call is collected in step 864 using directory database 872. Then, in step 866, when a call is transferred, that information is stored in call status database 874. When the transferee receives an incoming call in step 868, the transferee retrieves the call information in step 870 from call status database 874. This information may then be deleted from call status database 874.

PHONEMAIL INTERFACE—DTMF INTERFACE

The present invention provides an interface to a phonemail system that may be accessed by a user. Phonemail systems are often cumbersome to use because the user may need to listen for a list of options available at a specific state in the system. In addition, the user may not be able to access certain functions from certain states in the system without first backing up to a different state. This is a result of the hierarchical tree structure of the commands normally found in voicemail systems. The present invention allows a user to access voicemail features simply by clicking mouse 64 on an icon for that function appearing on the screen. As was described above with regard to telephone features, only valid features are presented to the user for selection on the screen.

The invention provides access to a voicemail system through a DTMF interface. Application 20 maintains a state table of the possible states available for the voicemail system being used by the user. This state table is shared among the different users of computer telephone system 10 by storing it on server computer system 16 or a separate local table may be maintained on a client computer system 14 for specific users.

The system of the present invention keeps track of the phone digits entered by the user into the voicemail system. By doing so, the present invention keeps track of the state of the voicemail system. Errors will rarely occur as the user is only a given a choice of valid options. If, however, an error occurs, the user is provided with an error mechanism to return to a predefined state so that the voicemail software state may be matched with the actual state of the voicemail system.

The voicemail software module of the present invention stores the current state of the voicemail system. If the user requests an action that does not appear in the state table for the current state, that action is rejected. This method may also be used to change the state of the voicemail system from an existing state to a new state. The state table may be used by the software system of the present invention to determine which new state to enter based upon an existing state and a requested action. For example, the state table may provide DTMF digits that should be dialed to achieve the requested new state.

After the voicemail system acknowledges that an action has been completed, the voicemail software may update its current state. The voicemail system may send an event to indicate that an action has been completed. The event may be received by the voicemail software. In some cases, the event will merely be receiving a digits dialed event from the phone system.

An example state table is illustrated below in Table 2 for a VMX Voicemail System. The voicemail ID, or the identification number of the voicemail device is 5690. Column 2 of the table lists the existing state of the voicemail system. Column 3 lists the action which the user desires to take. Column 4 lists the new state that the system will be in after that action is taken. Column 5 lists the digits to be dialed to obtain the new state.

In Column 5 of Table 2, multiple digits appear in the table for certain actions. This feature avoids the need for the user to go through multiple levels of the voicemail system. Instead, the voicemail interface software handles the transition from the current state to the state desired by the user.

TABLE 2

| VM ID Device | Existing State | Action | New State | Method Digits |
|---|---|---|---|---|
| "5690" | Listen | FastFwd(stop) | Listen | "4" |
| "5690" | Listen | NextMsg(Play-Greeting) | Listen | "5" |
| "5690" | Listen | PrevMsg-Listen(last) | Listen | "15" |
| "5690" | Listen | Erase | Listen | "3" |
| "5690" | Listen | Pause | ListenPause | "*" |
| "5690" | Listen | Forward | ForwardRecord | "13" |
| "5690" | Listen | Reply | ReplyRecord | "17" |
| "5690" | Listen | Backup/Beginning | Listen | "22" |
| "5690" | Listen | CallSender | Disconnected | "14" |
| "5690" | Listen-Pause | Listen(Listen-Feature) | ListenPause | "+" |
| "5690" | Listen-Pause | RecordMessage | Record | "96" |
| "5690" | Listen-Pause | Greeting-Feature | Greeting | "94" |
| "5690" | Listen-Pause | CheckSent | CheckSent | "912" |
| "5690" | Listen-Pause | Security | Security | "9162" |
| "5690" | Listen-Pause | ExitVoiceMail | Disconnected | "99" |
| "5690" | Listen-Pause | Exit | Connected | "9" |
| "5690" | Listen-Pause | Date/Time | ListenPause | "−" |

TABLE 2-continued

| VM ID Device | Existing State | Action | New State | Method Digits |
|---|---|---|---|---|
| "5690" | Listen-Pause | Save | ListenPause | "–" |
| "5690" | Listen-Pause | PreAnnPrevMsg-Listen(last) | ListenPause | "–" |
| "5690" | Listen-Pause | PreAnnNextMsg-Listen(first) | ListenPause | "–" |
| "5690" | Listen-Pause | Rewind | ListenPause | "–" |
| "5690" | Listen-Pause | FastFwd(stop) | ListenPause | "–" |
| "5690" | Listen-Pause | NextMsg(Play-Greeting) | ListenPause | "–" |
| "5690" | Listen-Pause | PrevMsg-Listen(last) | ListenPause | "–" |
| "5690" | Listen-Pause | Erase | ListenPause | "–" |
| "5690" | Listen-Pause | Pause | ListenPause | "+" |
| "5690" | Listen-Pause | Resume(pass-wordok) | Listen | "*" |
| "5690" | Listen-Pause | Forward | ListenPause | "–" |
| "5690" | Listen-Pause | Backup/Beginning | ListenPause | "–" |
| "5690" | Listen-Pause | CallSender | ListenPause | "–" |
| "5690" | Record | PreAnnPrevMsg-Listen(last) | Listen | "39158" |
| "5690" | Record | PrevMsg-Listen(last) | Listen | "3915" |
| "5690" | Record | PreAnnNextMsg-Listen(first) | Listen | "3958" |
| "5690" | Record | Listen(Listen-Feature) | Listen | "395" |
| "5690" | Record | RecordMessage | Record | "–" |
| "5690" | Record | Greeting-Feature | Greeting | "394" |
| "5690" | Record | CheckSent | CheckSent | "3912" |
| "5690" | Record | Security | Security | "39162" |
| "5690" | Record | ExitVoiceMail | Disconnected | "399" |
| "5690" | Record | Exit | Connected | "3" |
| "5690" | Record | Erase | Connected | "3" |
| "5690" | Record | Rewind | RecordPause | "2" |
| "5690" | Record | Pause | RecordPause | "*" |
| "5690" | Record | Send | Send | "#" |
| "5690" | Record | Backup/Beginning | RecordPause | "22" |
| "5690" | Record-Pause | PreAnnPrevMsg-Listen(last) | Listen | "3158" |
| "5690" | Record-Pause | PrevMsg-Listen(last) | Listen | "315" |
| "5690" | Record-Pause | PreAnnNextMsgListen(first) | Listen | "358" |
| "5690" | Record-Pause | Listen(ListenFeature) | Listen | "35" |
| "5690" | Record-Pause | RecordMessage | RecordPause | "–" |
| "5690" | Record-Pause | Greeting-Feature | Greeting | "394" |
| "5690" | Record-Pause | CheckSent | CheckSent | "3912" |
| "5690" | Record-Pause | Security | Security | "39162" |
| "5690" | Record-Pause | ExitVoiceMail | Disconnected | "399" |
| "5690" | Record-Pause | Erase | Connected | "3" |
| "5690" | Record-Pause | Exit | Connected | "3" |
| "5690" | Record-Pause | Rewind | RecordPause | "–" |
| "5690" | Record-Pause | Backup/Beginning | RecordPause | "–" |
| "5690" | Record-Pause | Send | RecordPause | "–" |
| "5690" | Record-Pause | Pause | RecordPause | "–" |
| "5690" | Record-Pause | Resume(password-ok) | Record | "+" |
| "5690" | Send | PreAnnPrevMsg-Listen(last) | Listen | "**9158" |
| "5690" | Send | PrevMsg-Listen(last) | Listen | "**915" |
| "5690" | Send | PrevAnnNext-MsgListen(last) | Listen | "**958" |
| "5690" | Send | Listen(ListenFeature) | Listen | "**95" |
| "5690" | Send | RecordMessage | Record | "**96" |
| "5690" | Send | Greeting-Feature | Greeting | "**94" |
| "5690" | Send | CheckSent | CheckSent | "**912" |
| "5690" | Send | Security | Security | "**9162" |
| "5690" | Send | ExitVoiceMail | Disconnected | "**99" |
| "5690" | Send | Erase | Connected | "**" |
| "5690" | Send | Exit | Connected | "**" |
| "5690" | Send | Send | Connected | "##" |
| "5690" | Send | EnterAddress | Send | "@4" |
| "5690" | Send | EraseAddress | SendErase | "*" |
| "5690" | Send | SendReceipt | Connected | "#1" |
| "5690" | Greeting | PreAnnPrevMsgListen(last) | Listen | "##9158" |
| "5690" | Greeting | PrevMsg-Listen(last) | Listen | "##915" |
| "5690" | Greeting | PreAnnNextMsgListen(first) | Listen | "##958" |
| "5690" | Greeting | Listen(ListenFeature) | Listen | "##95" |
| "5690" | Greeting | RecordMessage | Record | "##96" |
| "5690" | Greeting | Greeting-Feature | Greeting | "–" |
| "5690" | Greeting | CheckSent | CheckSent | "##912" |

TABLE 2-continued

| VM ID Device | Existing State | Action | New State | Method Digits |
| --- | --- | --- | --- | --- |
| "5690" | Greeting | Security | Security | "##9162" |
| "5690" | Greeting | ExitVoiceMail | Disconnected | "##99" |
| "5690" | Greeting | Exit | Connected | "##" |
| "5690" | Greeting | FastFwd(stop) | Greeting | "*" |
| "5690" | Greeting | NextMsg(Play-Greeting) | Greeting | "5" |
| "5690" | Greeting | GreetingOn | Connected | "*1" |
| "5690" | Greeting | GreetingOff | Connected | "*2" |
| "5690" | Greeting | Record-Greeting | Greeting-Record | "*6" |
| "5690" | Greeting-Record | PreAnnPrevMsgListen (last) | Listen | "39158" |
| "5690" | Greeting-Record | PrevAnnNext-MsgListen- (first) | Listen | "3958" |
| "5690" | Greeting-Record | Listen(ListenFeature) | Listen | "395" |
| "5690" | Greeting-Record | RecordMessage | Record | "396" |
| "5690" | Greeting-Record | Greeting-Feature | Greeting-Record | "-" |
| "5690" | Greeting-Record | CheckSent | CheckSent | "3912" |
| "5690" | Greeting-Record | Security | Security | "39162" |
| "5690" | Greeting-Record | ExitVoiceMail | Disconnected | "399" |
| "5690" | Greeting-Record | Send | Connected | "#" |
| "5690" | Greeting-Record | Exit | Connected | "3" |
| "5690" | Greeting-Record | Erase | Connected | "3" |
| "5690" | Greeting-Record | Pause | GreetingPause | "*" |
| "5690" | Greeting-Pause | PreAnnPrevMsgListen (last) | Listen | "39158" |
| "5690" | Greeting-Pause | PreMsg-Listen(last) | Listen | "3915" |
| "5690" | Greeting-Pause | PreAnnNextMsgListen (first) | Listen | "3958" |
| "5690" | Greeting-Pause | Listen(Listen-Feature) | Listen | "395" |
| "5690" | Greeting-Pause | RecordMessage | Record | "396" |
| "5690" | Greeting-Pause | Greeting-Feature | GreetingPause | "-" |
| "5690" | Greeting-Pause | CheckSent | CheckSent | "3912" |
| "5690" | Greeting-Pause | Security | Security | "39162" |
| "5690" | Greeting-Pause | ExitVoiceMail | Disconnected | "399" |
| "5690" | Greeting-Pause | Exit | Connected | "3" |
| "5690" | Greeting-Pause | Erase | Greeting | "3" |
| "5690" | Greeting-Pause | Pause | GreetingPause | "+" |
| "5690" | Greeting-Pause | Resume(pass-wordok) | Greeting-Record | "*" |
| "5690" | Reply-Record | Listen(ListenFeature) | ReplyRecord | "+" |
| "5690" | Reply-Record | RecordMessage | Record | "396" |
| "5690" | Reply-Record | Greeting-Feature | Greeting | "394" |
| "5690" | Reply-Record | CheckSent | CheckSent | "3912" |
| "5690" | Reply-Record | Security | Security | "39162" |
| "5690" | Reply-Record | ExitVoiceMail | Disconnected | "399" |
| "5690" | Reply-Record | Exit | Connected | "39" |
| "5690" | Reply-Record | Erase | Listen | "3" |
| "5690" | Reply-Record | Rewind | ReplyPause | "2" |
| "5690" | Reply-Record | Pause | ReplyPause | "*" |
| "5690" | Reply-Record | Send | Listen | "##" |
| "5690" | Reply-Record | Backup/Beginning | ReplyPause | "22" |
| "5690" | Reply-Record | SendReceipt | Listen | "#1" |
| "5690" | ReplyPause | Listen(ListenFeature) | ReplyPause | "+" |
| "5690" | ReplyPause | RecordMessage | Record | "396" |
| "5690" | ReplyPause | Greeting-Feature | Greeting | "394" |
| "5690" | ReplyPause | CheckSent | CheckSent | "3912" |
| "5690" | ReplyPause | Security | Security | "39162" |
| "5690" | ReplyPause | ExitVoiceMail | Disconnected | "399" |
| "5690" | ReplyPause | Exit | Connected | "39" |
| "5690" | ReplyPause | Erase | Listen | "3" |
| "5690" | ReplyPause | Resume(pass-wordok) | ReplyRecord | "*" |
| "5690" | ReplyPause | Send | ReplyPause | "-" |
| "5690" | ReplyPause | SendReceipt | ReplyPause | "-" |
| "5690" | Forward-Record | Listen(ListenFeature) | ForwardRecord | "+" |
| "5690" | Forward-Record | RecordMessage | Record | "396" |
| "5690" | Forward-Record | Greeting-Feature | Greeting | "394" |
| "5690" | Forward-Record | CheckSent | CheckSent | "3912" |
| "5690" | Forward-Record | Security | Security | "39162" |
| "5690" | Forward-Record | ExitVoiceMail | Disconnected | "399" |
| "5690" | Forward-Record | Exit | Connected | "39" |
| "5690" | Forward-Record | Erase | Listen | "3" |
| "5690" | Forward-Record | Rewind | ForwardPause | "2" |
| "5690" | Forward-Record | Pause | ForwardPause | "*" |
| "5690" | Forward-Record | Send | ForwardSend | "#" |
| "5690" | Forward-Record | Backup/Beginning | ForwardPause | "*" |
| "5690" | Forward-Pause | Listen(ListenFeature) | ForwardPause | "+" |
| "5690" | Forward-Pause | RecordMessage | Record | "396" |
| "5690" | Forward-Pause | Greeting-Feature | Greeting | "394" |
| "5690" | Forward-Pause | CheckSent | CheckSent | "3912" |

TABLE 2-continued

| VM ID Device | Existing State | Action | New State | Method Digits |
|---|---|---|---|---|
| "5690" | Forward-Pause | Security | Security | "39162" |
| "5690" | Forward-Pause | Erase | Listen | "3" |
| "5690" | Forward-Pause | Exit | Connected | "39" |
| "5690" | Forward-Pause | ExitVoiceMail | Disconnected | "399" |
| "5690" | Forward-Pause | Pause | ForwardPause | "+" |
| "5690" | Forward-Pause | Resume(pass-wordok) | ForwardRecord | "*" |
| "5690" | Forward-Send | Listen(ListenFeature) | ForwardSend | "+" |
| "5690" | Forward-Send | RecordMessage | Record | "**96" |
| "5690" | Forward-Send | Greeting-Feature | Greeting | "**94" |
| "5690" | Forward-Send | CheckSent | CheckSent | "**912" |
| "5690" | Forward-Send | Security | Security | "**9162" |
| "5690" | Forward-Send | ExitVoiceMail | Disconnected | "**99" |
| "5690" | Forward-Send | Exit | Connected | "**9" |
| "5690" | Forward-Send | Erase | Listen | "**" |
| "5690" | Forward-Send | Send | Listen | "##" |
| "5690" | Forward-Send | EnterAddress | ForwardSend | "@4" |
| "5690" | Forward-Send | EraseAddress | ForwardSend | "*" |
| "5690" | Forward-Send | SendReceipt | Listen | "#1" |
| "5690" | CheckSent | PreAnnPrevMsgListen (last) | Listen | "##9158" |
| "5690" | CheckSent | PrevMsg-Listen(last) | Listen | "#915" |
| "5690" | CheckSent | PreAnnNextMsgListen (first) | Listen | "#958" |
| "5690" | CheckSent | Listen(ListenFeature) | Listen | "#95" |
| "5690" | CheckSent | RecordMessage | Record | "#96" |
| "5690" | CheckSent | Greeting-Feature | Greeting | "#94" |
| "5690" | CheckSent | CheckSent | CheckSent | "-" |
| "5690" | CheckSent | Security | Security | "#9162" |
| "5690" | CheckSent | ExitVoiceMail | Disconnected | "#99" |
| "5690" | CheckSent | Exit | Connected | "#" |
| "5690" | Security | PreAnnPrevMsgListen (last) | Listen | "##9158" |
| "5690" | Security | PrevMsg-Listen(last) | Listen | "##915" |
| "5690" | Security | PreAnnNextMsgListen (first) | Listen | "##958" |
| "5690" | Security | Listen(Listen-Feature) | Listen | "##95" |
| "5690" | Security | RecordMessage | Record | "##96" |
| "5690" | Security | Greeting-Feature | Greeting | "##94" |
| "5690" | Security | CheckSent | CheckSent | "##912" |
| "5690" | Security | Security | Security | "-" |
| "5690" | Security | ExitVoiceMail | Disconnected | "##99" |
| "5690" | Security | Exit | Connected | "##" |
| "5690" | Security | Send | Security | "#" |
| "5690" | SendErase | PreAnnNextMsgListen (last) | ReplyRecord | "*158" |
| "5690" | SendErase | PrevMsg-Listen(last) | ReplyRecord | "*15" |
| "5690" | SendErase | PreAnnNextMsgListen (first) | ReplyRecord | "*58" |
| "5690" | SendErase | Listen(Listen-Feature) | ReplyRecord | "*5" |
| "5690" | SendErase | RecordMessage | Record | "*6" |
| "5690" | SendErase | Greeting-Feature | Greeting | "*4" |
| "5690" | SendErase | CheckSent | CheckSent | "*12" |
| "5690" | SendErase | Security | Security | "*162" |
| "5690" | SendErase | ExitVoiceMail | Disconnected | "*99" |
| "5690" | SendErase | Erase | Connected | "*" |
| "5690" | SendErase | Exit | Connected | "*" |
| "5690" | SendErase | Send | Connected | "##" |
| "5690" | SendErase | EnterAddress | Send | "@4" |
| "5690" | SendErase | EraseAddress | Send | "*" |
| "5690" | SendErase | SendReceipt | Connected | "#1" |
| "5690" | QuickMsg | Listen(ListenFeature) | QuickMsg | "-" |
| "5690" | QuickMsg | RecordMessage | QuickMsg | "-" |
| "5690" | QuickMsg | Greeting-Feature | QuickMsg | "-" |
| "5690" | QuickMsg | CheckSent | QuickMsg | "-" |
| "5690" | QuickMsg | Security | QuickMsg | "-" |
| "5690" | QuickMsg | none | QuickMsg | "@4" |
| "5690" | QuickMsg | Exit | Disconnected | " " |
| "5690" | QuickMsg | Send | Disconnected | "99" |
| "5690" | Initial | ExitVoiceMail | Disconnected | " " |
| "5690" | Initial | Error | Error | " " |
| "5690" | Initial | Listen(ListenFeature) | Initial | "-" |
| "5690" | Initial | RecordMessage | Initial | "-" |
| "5690" | Initial | Greeting-Feature | Initial | "-" |
| "5690" | Initial | CheckSent | Initial | "-" |
| "5690" | Initial | Security | Initial | "-" |
| "5690" | Initial | Send | Password | " " |
| "5690" | Initial | Pause | Password | "*" |

TABLE 2-continued

| VM ID Device | Existing State | Action | New State | Method Digits |
|---|---|---|---|---|
| "5690" | Initial | QuickMsg-Feature | QuickMsg | "*" |
| "5690" | Password | ExitVoiceMail | Disconnected | "99" |
| "5690" | Password | Error | Error | " " |
| "5690" | Password | PreAnnPrevMsgListen (last) | Listen | "158" |
| "5690" | Password | PrevMsg-Listen(last) | Listen | "15" |
| "5690" | Password | PreAnnNextMsgListen (first) | Listen | "58" |
| "5690" | Password | Listen(ListenFeature) | Listen | "5" |
| "5690" | Password | RecordMessage | Record | "6" |
| "5690" | Password | Greeting-Feature | Greeting | "4" |
| "5690" | Password | CheckSent | CheckSent | "12" |
| "5690" | Password | Security | Security | "162" |
| "5690" | Error | ExitVoiceMail | Disconnected | "–" |
| "5690" | Error | Error | Error | "–" |
| "5690" | Error | Listen(ListenFeature) | Error | "–" |
| "5690" | Error | RecordMessage | Error | "–" |
| "5690" | Error | Greeting-Feature | Error | "–" |
| "5690" | Error | CheckSent | Error | "–" |
| "5690" | Error | Security | Error | "–" |
| "5690" | Error | Exit | Password | " " |
| "5690" | Error | Resume(pass-wordok) | Password | " " |
| "5690" | Listen | Rewind | Listen | "2" |
| "5690" | Listen | PreAnnNextMsgListen (first) | Listen | "2" |
| "5690" | Listen | PreAnnPrevMsgListen (last) | Listen | "158" |
| "5690" | Listen | Save | Listen | "7" |
| "5690" | Listen | Date/Time | Listen | "8" |
| "5690" | Listen | Exit | Connected | "9" |
| "5690" | Listen | Security | Security | "9162" |
| "5690" | Listen | Greeting-Feature | Greeting | "94" |
| "5690" | Listen | RecordMessage | Record | "96" |
| "5690" | Listen | Listen(ListenFeature) | Listen | "+" |
| "5690" | Listen | ExitVoiceMail | Disconnected | "99" |

FIGS. 99–107 illustrate several windows that may be used with the voicemail interface software of the present invention. These windows are only examples of how the system described above may be implemented. These examples may be used with the voicemail system whose state table is listed in Table 2.

Figure 99:
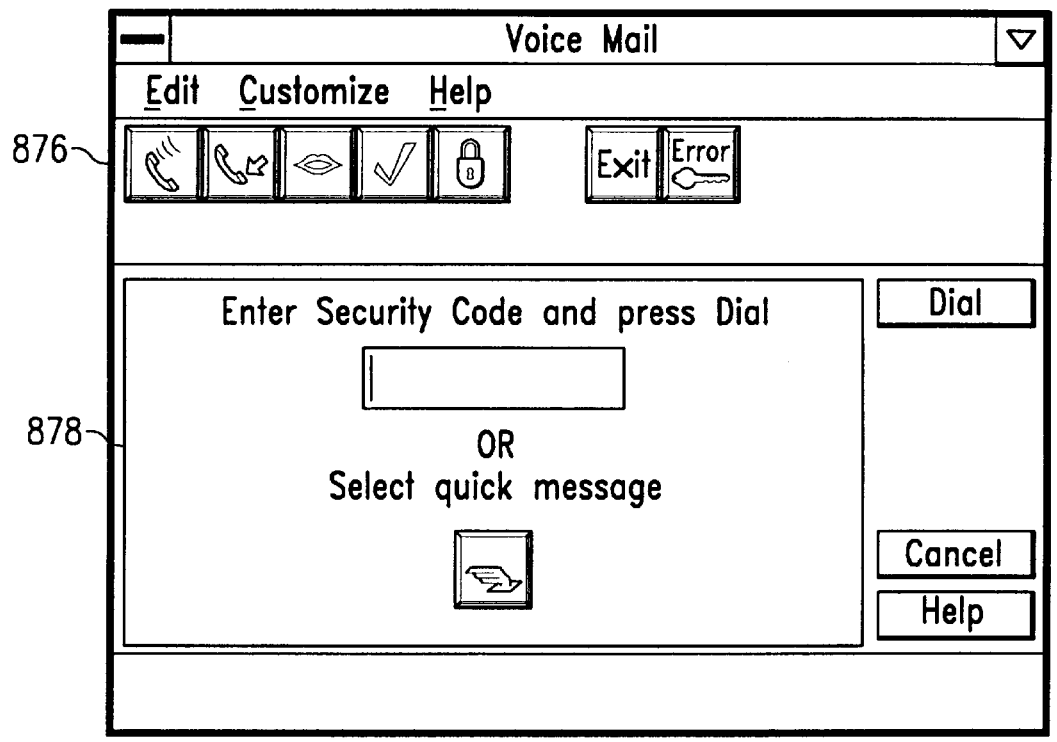
FIG. 99 illustrates a window used with a voice mail tool provided as part of the computer telephone system of FIG. 1.

FIG. 99 illustrates voicemail window 876 with access code window 878 in it. When the user first activates the voicemail system, this screen may appear on the user's display. Access code window 878 gives the user the option of entering a security code and dialing that code or sending a quick message.

Figure 100:
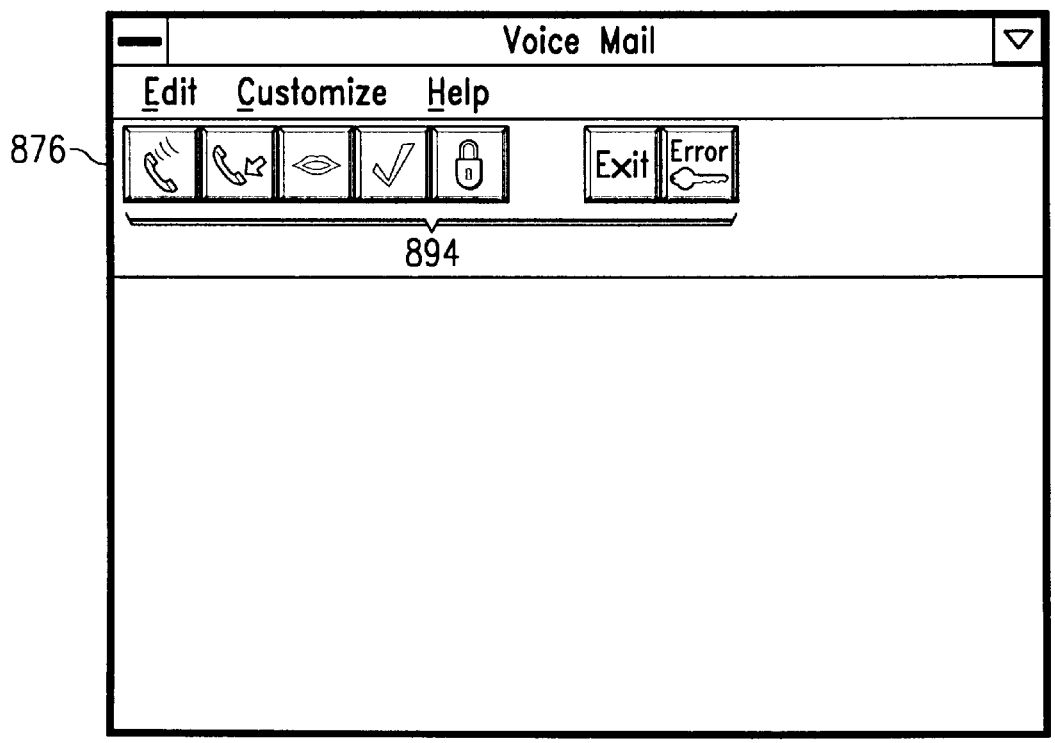
FIG. 100 illustrates a window used with a voice mail tool provided as part of the computer telephone system of FIG. 1.

FIG. 100 illustrates voicemail window 876 after the user has entered the security code and established a connection to the voicemail system. The system gives the user the choice of selecting a series of voicemail option icons 894 which may represent voicemail actions that can be performed by the user. For example, the first or leftmost icon 894 allows the user to listen to his messages. The second voicemail icon 894 allows the user to record a message. The third voicemail icon 894 allows a user to change his greeting. The fourth voicemail icon 894 allows a user to access a function to check if recipients have listened to messages that were sent. The fifth voicemail icon 894 allows a user to change his security code. The sixth voicemail icon 894 allows a user to exit the voicemail system. The seventh voicemail icon 894 allows a user to return to a predefined state when an error occurs. These icons are only examples of valid functions that may be provided when a user first enters a voicemail system. The number of icons displayed may depend upon the features supported by the voicemail system and which features are valid when the user first enters the system.

Figure 101:
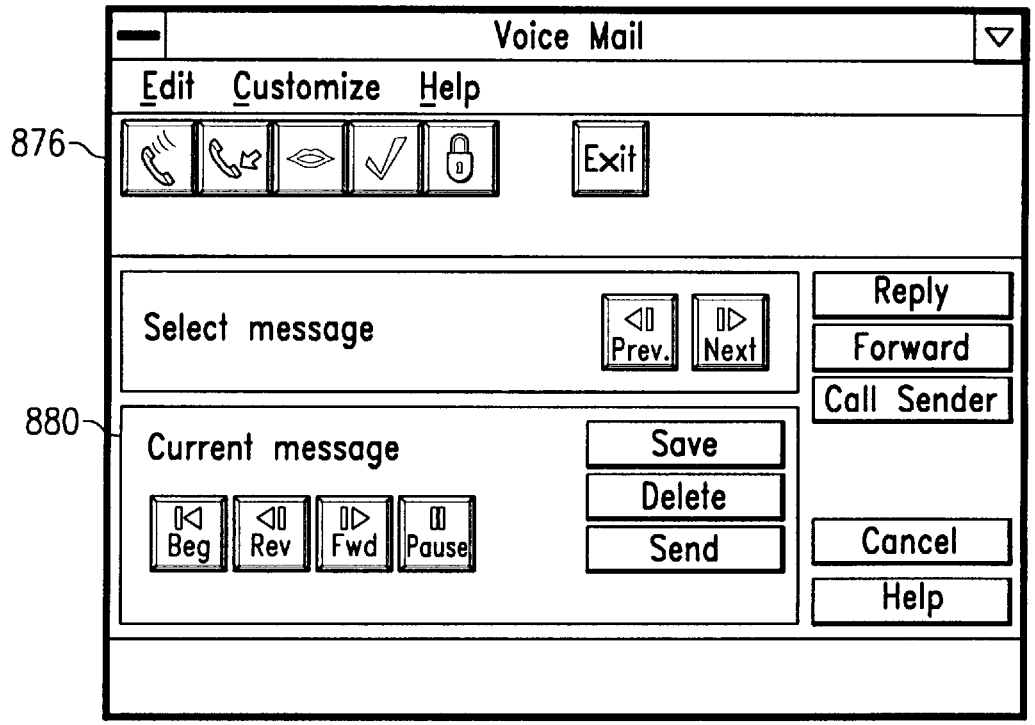
FIG. 101 illustrates a window used with a voice mail tool provided as part of the computer telephone system of FIG. 1.
Figure 102:
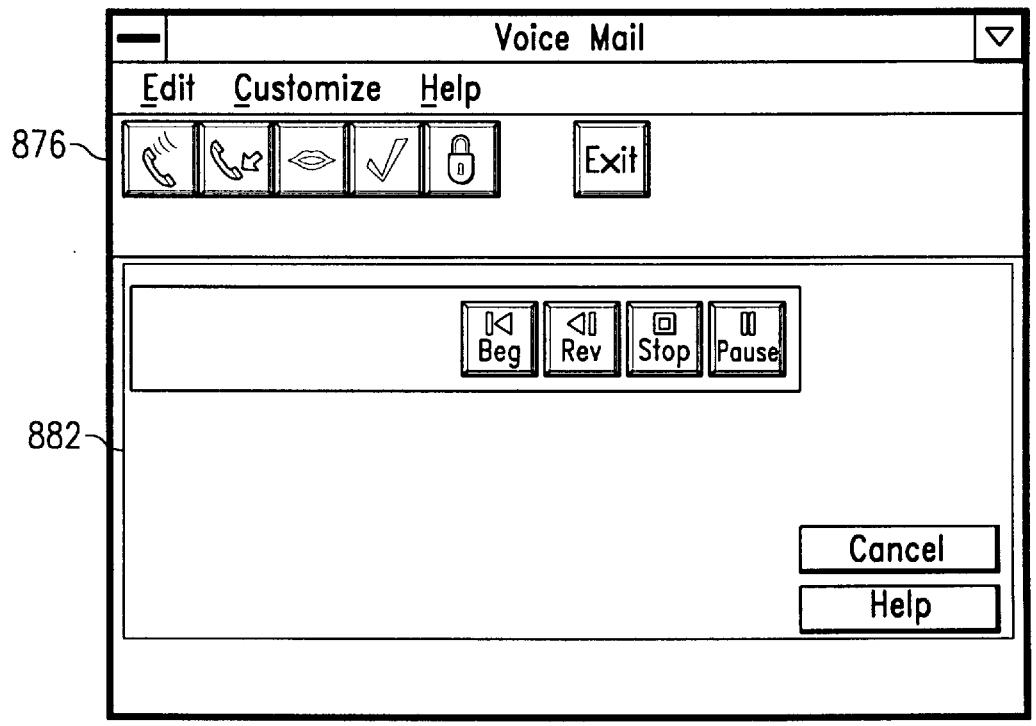
FIG. 102 illustrates a window used with a voice mail tool provided as part of the computer telephone system of FIG. 1.

FIG. 101 illustrates message listen tool 880 in voicemail window 876. This tool 880 is used by the user to listen to messages in that user's voicemail mailbox. FIG. 102 illustrates message record tool 882. This tool 882 is used to record messages, reply to messages, or record comments to be placed at the beginning of a message when forwarding that message. In the example illustrated in FIG. 102, the user is using message record tool to reply to a message.

Figure 103:
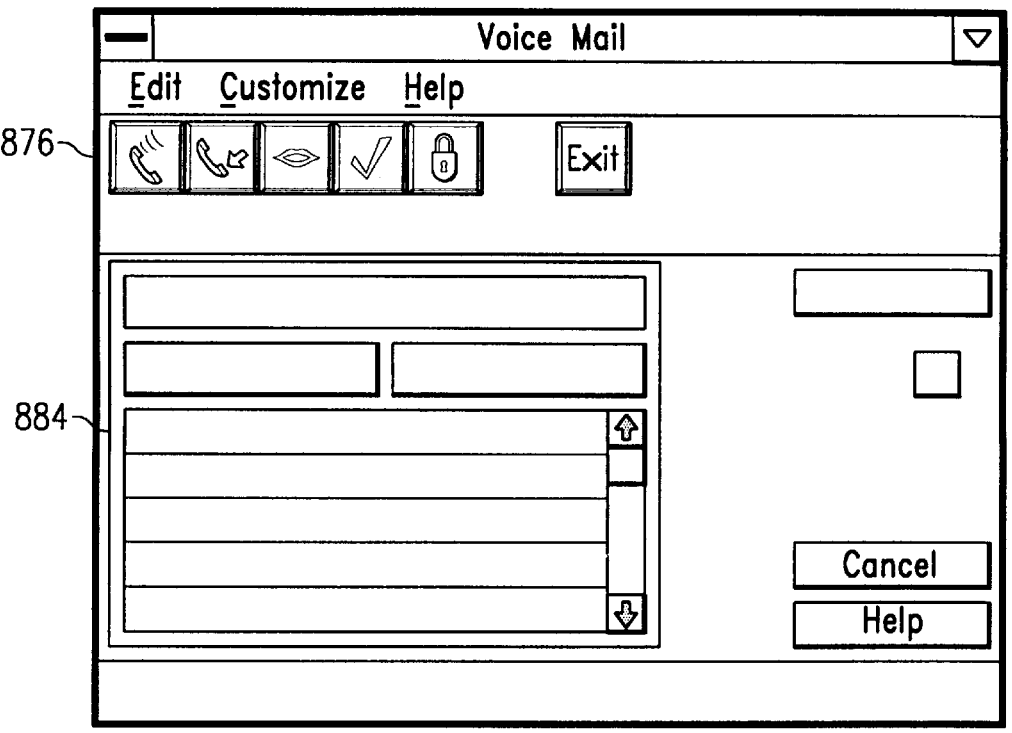
FIG. 103 illustrates a window used with a voice mail tool provided as part of the computer telephone system of FIG. 1.

FIG. 103 illustrates address and send tool 884 in voicemail window 876. Address and send tool 884 may be used to address and send a new message or address and send a forward message to one or more recipients.

Figure 104:
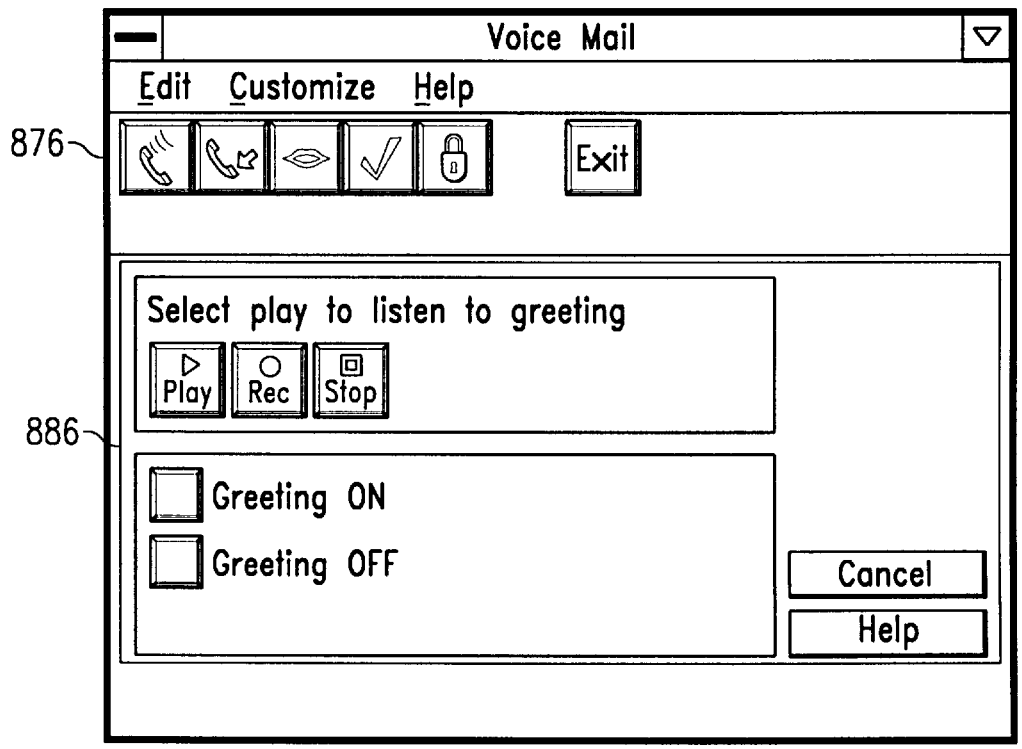
FIG. 104 illustrates a window used with a voice mail tool provided as part of the computer telephone system of FIG. 1.

FIG. 104 illustrates a change greeting tool 886 in voicemail window 876 that may be used with the present invention. This tool 886 may allow a user to change the greeting received when someone attempts to call the user and reaches the voicemail system.

Figure 105:
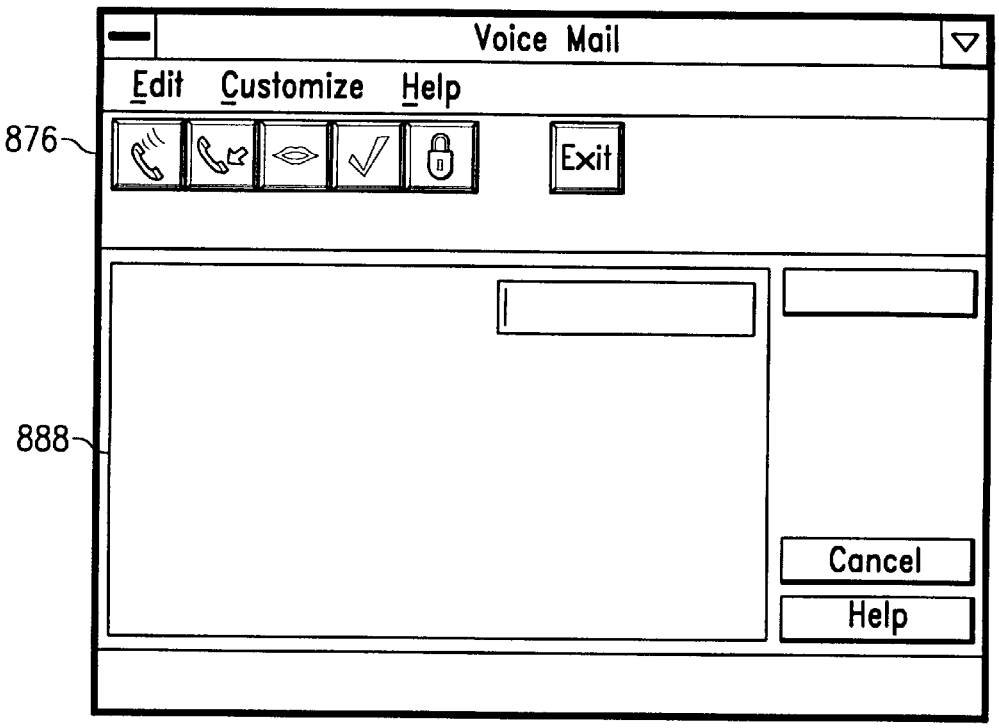
FIG. 105 illustrates a window used with a voice mail tool provided as part of the computer telephone system of FIG. 1.

FIG. 105 illustrates a check for listen tool 888 in voicemail window 876 that may be used for the present invention. This tool 888 may allow a user to check whether recipients have listened to messages that the user sent to them.

Figure 106:
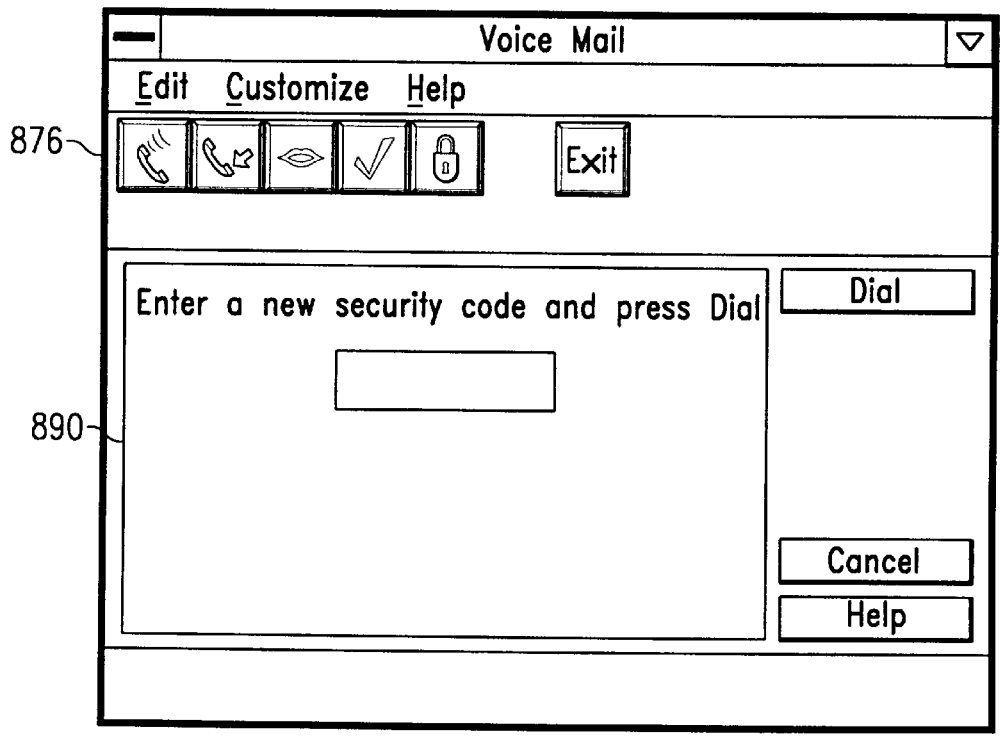
FIG. 106 illustrates a window used with a voice mail tool provided as part of the computer telephone system of FIG. 1.
Figure 107:
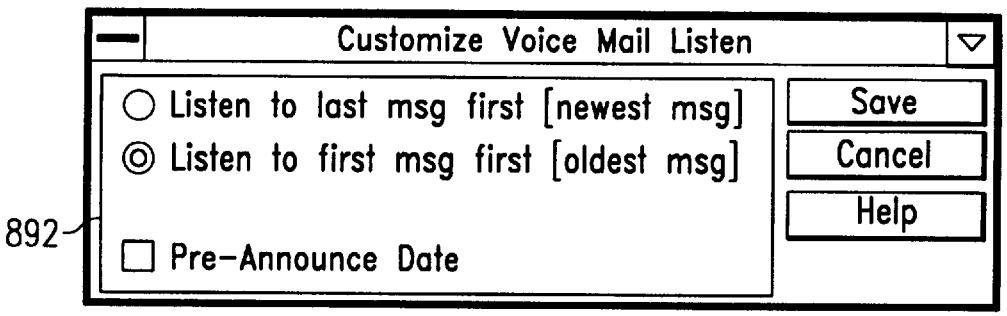
FIG. 107 illustrates a window used with a voice mail tool provided as part of the computer telephone system of FIG. 1.

FIG. 106 illustrates a change security code tool 890 in voicemail window 876 that may allow a user to change his security code. FIG. 107 illustrates a customized voicemail listen tool 892 that is used to customize the way in which a user listens to his messages. The user is given the choice of listening to the last message first or listening to the first message first. The date of the message may or may not be preannounced according to the user's preference.

Other features may be provided for the voicemail system without departing from the scope and teachings of the present invention.

Figure 108:
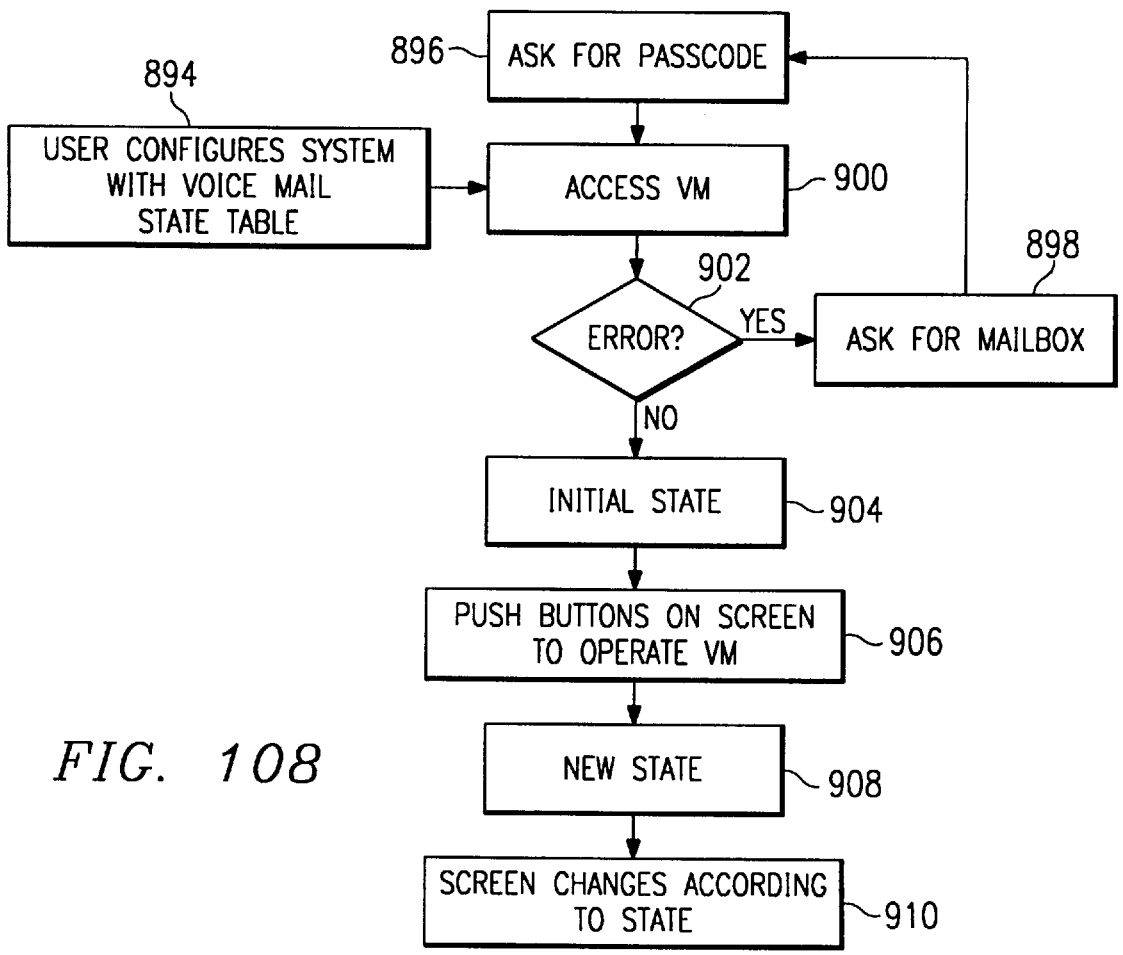
FIG. 108 illustrates an example of a procedure used to implement a voice mail feature used with the computer telephone system of FIG. 1.
Figure 109:
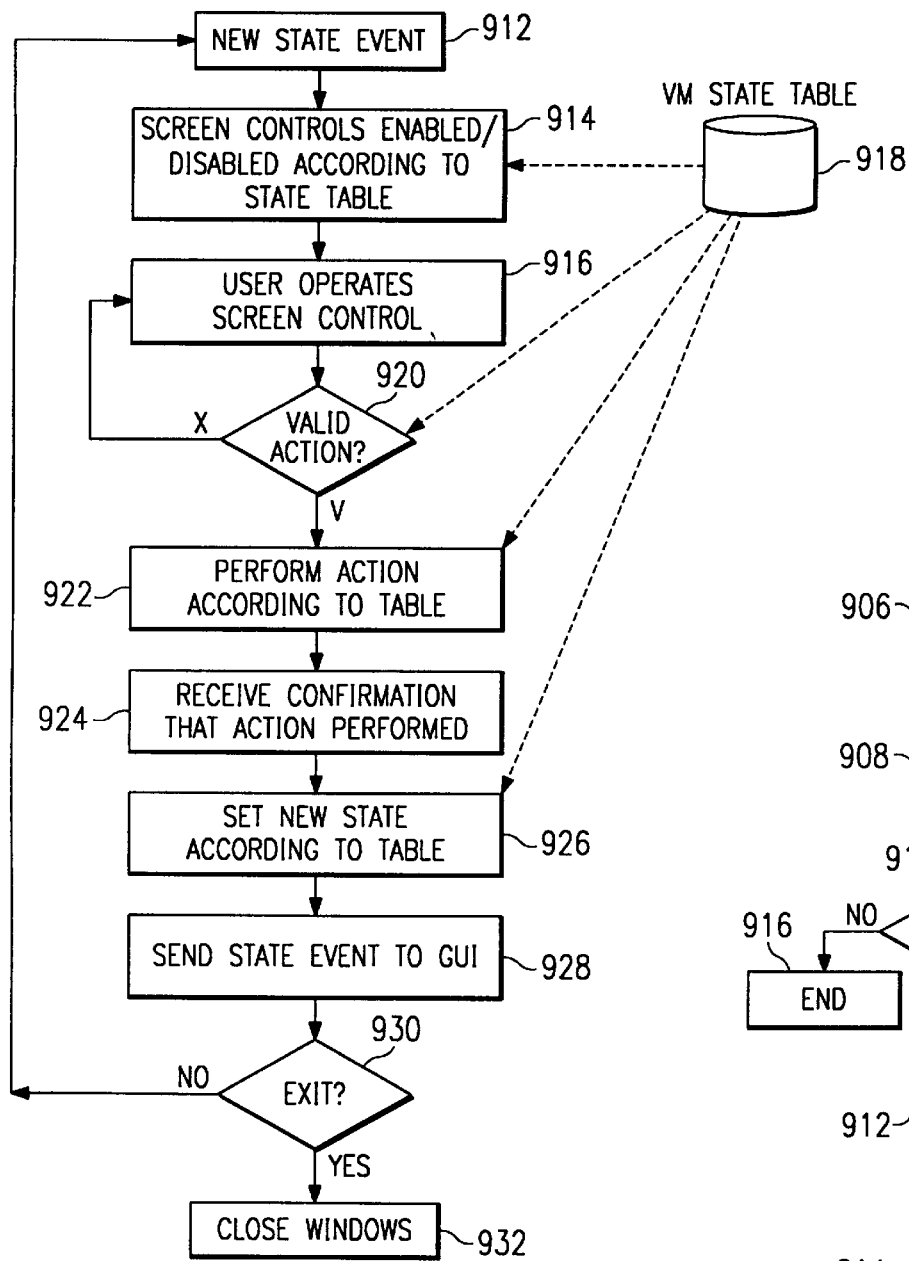
FIG. 109 illustrates an example of a procedure used to implement a voice mail feature used with the computer telephone system of FIG. 1.

FIG. 108 and FIG. 109 give an example of procedures that may be used to implement the DTMF voicemail access tool described above. The first procedure illustrated in FIG. 108 begins at step 894 where the user configures the voicemail system using data about the voicemail system. For example, the user may enter the data in a voicemail state table as described above. Then, in step 900, the user may access the voicemail system. In step 902, it is determined whether an error occurred. If an error occurred, the user may be prompted for his mailbox ID in step 898 and password in 896 and execution may then proceed to step 900.

If no error occurred in step 902, then the voicemail software enters the voicemail system initial state in step 904. Execution then proceeds to step 906 where the user may push buttons on the screen to operate the voicemail system. Pressing various buttons may cause the state of the voicemail software to change in step 908. State changes, in turn, may cause the screen to change according to the state in step 910. Execution then returns to step 906 and the steps may be repeated until the user exits the voicemail system.

FIG. 109 illustrates an example of a procedure that may be used to go from one state to a new state in step 908 of FIG. 108. This procedure begins in step 912 when a new state event is received. Then, in step 914, screen controls are enabled or disabled according to the state table. This information may be obtained from the voicemail state table 918 which may be stored on client computer system 14 or server computer system 16. In step 916, the user may operate a screen control. Then, in step 920, the voicemail software may access voicemail state table 918 to determine whether a valid action occurred. If no valid action occurred, the software simply returns to step 916. If a valid action did occur, then execution may proceed to step 922.

Valid actions may cause an action to be performed according to the state table in step 922. For example, the action may be sending digits to the phone for DTMF dialing. The action may be retrieved from voicemail state table 918. Then, in step 924 a confirmation may be received that the action has been performed. For example, a confirmation may be received that digits have been dialed. This confirmation may be in the form of a digits dialed event.

After confirmation has been received, the new state of the voicemail system may be set according to the state table in step 926. The new state may be obtained from voicemail state table 918. Then, in step 928 a new state event may be sent to the graphical user interface. Following step 928, it may be determined in step 930 whether the event. was an exit event. If it was not, then the procedure may return to step 912. If, however, the event was an exit event, the voicemail window is closed in step 932 and the voicemail software may terminate.

VOICEMAIL CONFIGURATION TOOL

It may be cumbersome for a user to create a voicemail state table such as that illustrated in Table 2. It may be desirable, therefore, for a user to have a voicemail configuration tool to allow the user to easily create a voicemail state table. The present invention allows a user to enter a graphical diagram of a voicemail system. The configuration tool may then generate the voicemail software using the graphical description.

Figure 110:
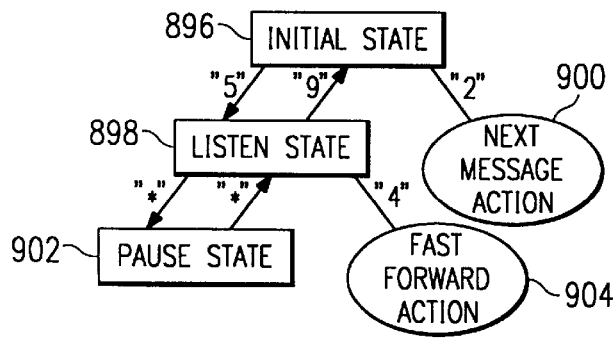
FIG. 110 illustrates an example diagram of a voice mail system interfaced using software included with the computer telephone system of FIG. 1.

FIG. 110 illustrates a sample graphical diagram of a voicemail system that may be created using the present invention. The user enters a series of states and actions. The user then defines which telephone keys cause transitions between those states and actions. These states and actions may be assigned the names of common voicemail functions. Using graph algorithms, the software may generate the state table for this voicemail system.

The example illustrated in FIG. 110 may be used to illustrate the operation of the configuration tool. First, the user defines a series of states 896, 898, 902 and a series of actions 900, 904. State 896 is an initial state after the user obtains access to the voicemail system. State 898 is a listen state where a user may listen to his messages. Action 900 is a next message action where the user may proceed to the next message. State 902 is a pause state where the user may pause a message while listening to it. Action 904 may be a fast forward action where the user may fast forward through a message.

The user may also define transitions between the various states 896, 898, 902 and actions 900, 904. For example, to go from state 896 to state 898, the user may press the "5" key. Pressing the "9" key in state 898 may return the user to state 896. The user may cause action 900 to occur from state 896 by pressing the "2" key. Similarly, the "*" key may be used to go from state 898 to state 902 or return to state 898 from state 902. The "4" key may be used to cause action 904 to occur from state 898.

Table 3 illustrates an example state table that may be generated by the comfiguration tool using the graphical description of the voicemail system of FIG. 110. As illustrated in FIG. 110, the user may indicate steps required to perform an action in the voicemail system even though the resulting state of the system does not change. For example, in FIG. 110, the resulting state of the system does not change when a fast forward action is produced. The steps may be stored in a state/action table that may be sued to process requests from the voicemail software interacting with the voicemail system. In existing voicemail systems, there may be many different combinations of steps to go from one state to another or to perform a task. Some combinations may be more efficient than others. For example, to get to the next message, the user may try to avoid listening to the complete current message. The user may indicate an action/state change that contains multiple steps/DTMF digits to make the transition more efficient. The user may associate an action/state change with one or more controls on the computer screen at one time. Operation of the control may perform the action or state change.

TABLE 3

| VM ID (Device) | Existing State | Action | New State | Method (Digit) |
|---|---|---|---|---|
| "5690" | Initial | PlayMessage | Listen | "5" |
| "5690" | Listen | FastFwd | Listen | "4" |
| "5690" | Listen | Pause | ListenPause | "*" |
| "5690" | ListenPause | Resume | Listen | "*" |
| "5690" | Listen | Initial | Initial | "9" |
| "5690" | Initial | NextMessage | Initial | "2" |
| "5690" | ListenPause | NextMessage | Initial | "*92" |

CALL LOGGING FEATURE

One advantage of the present invention is that the software may log information about each call generated or received by a user. This information may be stored in a call log database using database client service provider 22 and/or database server service provider 40. Calls may be logged or deleted from either the client computer system 14 or server computer system 16. The system may be implemented using a program which hooks into telephony client service provider 26 and/or telephony server service provider 44. The call log software may monitor all devices on a system such as all devices on PBX 18. The system may log all calls for the users of the system and may keep track of what happened to each of those calls.

The present invention may also maintain an active calls database using, for example, the in-memory database described above. The information stored in the call log database may include time stamps of when the call began, whether the call went to voicemail, also time duration of the voicemail message, the parties to the call, etc. The call log software may also obtain call information using a software hook into the directory software that provides the name of the caller, the city and state from which a caller is calling, the local time in that city and state, and the caller's telephone number. This information and any other information about a telephone call may be stored in the call log database.

The present invention allows logging by either the client computer system 14 or server computer system 16. A client computer system 14 may receive notification when there is a new call and may determine whether the server computer system 16 is running or not. If the call log software is not running on server computer system 16, then client computer system 14 may log the call. If the client logging software is running on server computer system 16, then the server may log the call.

FIG. 111 illustrates an example procedure that may be used to implement the call logging feature described above. In step 908, the call log program receives telephony events from telephony software 906. Then, in step 910, it may be determined whether the telephony event is a telephony event for a user of computer telephone system 10. If so, then a call log record may be maintained for that call in step 912. If a call log record already exists, the record may be updated. In step 912, the call log records may be stored in call log database 914. If, in step 910 the telephone event was not for a user of the system of the present invention, then the procedure terminates in step 916.

Although the present invention and its advantages have been described in detail, it should be understood that various changes, substitutions, and alterations can be made without departing from the spirit and scope of the invention as defined by the appended claims.

What is claimed is:

1. A method for automatically updating telephone directory information in a client/server architecture, comprising:
    updating a data value representing shared telephone directory information;
    broadcasting the data value to a plurality of clients; and
    updating an active window of ore of the plurality of clients with the data value where the active window was displaying a previous version of the data value.

2. The method of claim 1 wherein the data value represents a telephone number.

3. The method of claim 1 wherein the data value represents a name.

4. The method of claim 1 wherein the data value represents a company name.

5. The method of claim 1 further comprising:
    informing one of the plurality of clients that the data value has been updated.

6. The method of claim 1 wherein the step of broadcasting the data value to a plurality of clients is performed in response to the step of updating the data value.

7. A system for automatically updating telephone directory information in a client/server architecture, said system comprising:
    means for updating a data value representing shared telephone directory information;
    means for broadcasting the data value to a plurality of clients in response to updating the data value; and
    means for updating an active window of one of the plurality of clients with the data value where the active window was displaying a previous version of the data value.

8. The system of claim 7 wherein the data value represents shared telephone directory information selected from the group consisting of a telephone number, a name, and a company name.

9. A system for automatically updating telephone directory information in a client/server architecture, said system comprising:
    means for receiving a database update request;
    means for updating a shared database record in response to said database update request;
    means for determining whether said database record is a broadcast record type; and
    means, responsive to a determination that said database record is a broadcast record type, for sending a broadcast synchronization message to a plurality of active clients, wherein said broadcast synchronization message informs each of said plurality of active clients that said database record has been updated, and wherein said broadcast synchronization message updates said data record in an active window if said active window displays a previous version of said data record.

10. A computer telephone system comprising:
    a private branch exchange (PBX) for establishing telephone calls;
    at least one server computer system connected to said PBX;
    a plurality of client computer systems, connected to said at least one server computer system by way of a network, for providing a window to display telephone directory information to users;
    a plurality of telephone units associated with respective ones of said client computer systems and connected to said PBX for use by said users to communicate with parties to said telephone calls;
    said at least one server computer system comprising:
        means for receiving a database update request;
        means for updating at least one database record in response to said update request;
        means for determining whether said database record is a broadcast record type; and
        means for sending a broadcast synchronization message to at least one of said client computer systems in response to determining that said database record is said broadcast record type; and
    each of said client computer systems comprising:
        means for receiving said broadcast synchronization message from said at least one server computer system;
        means for sending said broadcast synchronization message to active windows displayed on said client computer system;
        means for determining whether said database record is currently being displayed on one of said active windows; and
        means for updating said database record in said one of said active windows if a previous version of said database record is being displayed.

* * * * *